INVENTORS C. E. BROOKS
A. E. JOEL, JR.
BY [signature]
ATTORNEY

Feb. 9, 1960 C. E. BROOKS ET AL 2,924,666

TELEPHONE SYSTEM CALLING STATIONS IDENTIFIER

Filed Sept. 19, 1957 18 Sheets-Sheet 2

INVENTORS C. E. BROOKS
A. E. JOEL, JR.
BY [signature]

ATTORNEY

INVENTORS C. E. BROOKS
A. E. JOEL, JR.
BY [signature]
ATTORNEY

Feb. 9, 1960 C. E. BROOKS ET AL 2,924,666

TELEPHONE SYSTEM CALLING STATIONS IDENTIFIER

Filed Sept. 19, 1957 18 Sheets-Sheet 4

INVENTORS C. E. BROOKS
A. E. JOEL, JR.

BY [signature]

ATTORNEY

INVENTORS C. E. BROOKS
A. E. JOEL, JR.
BY [signature]
ATTORNEY

INVENTORS C. E. BROOKS
A. E. JOEL, JR.
BY [signature]
ATTORNEY

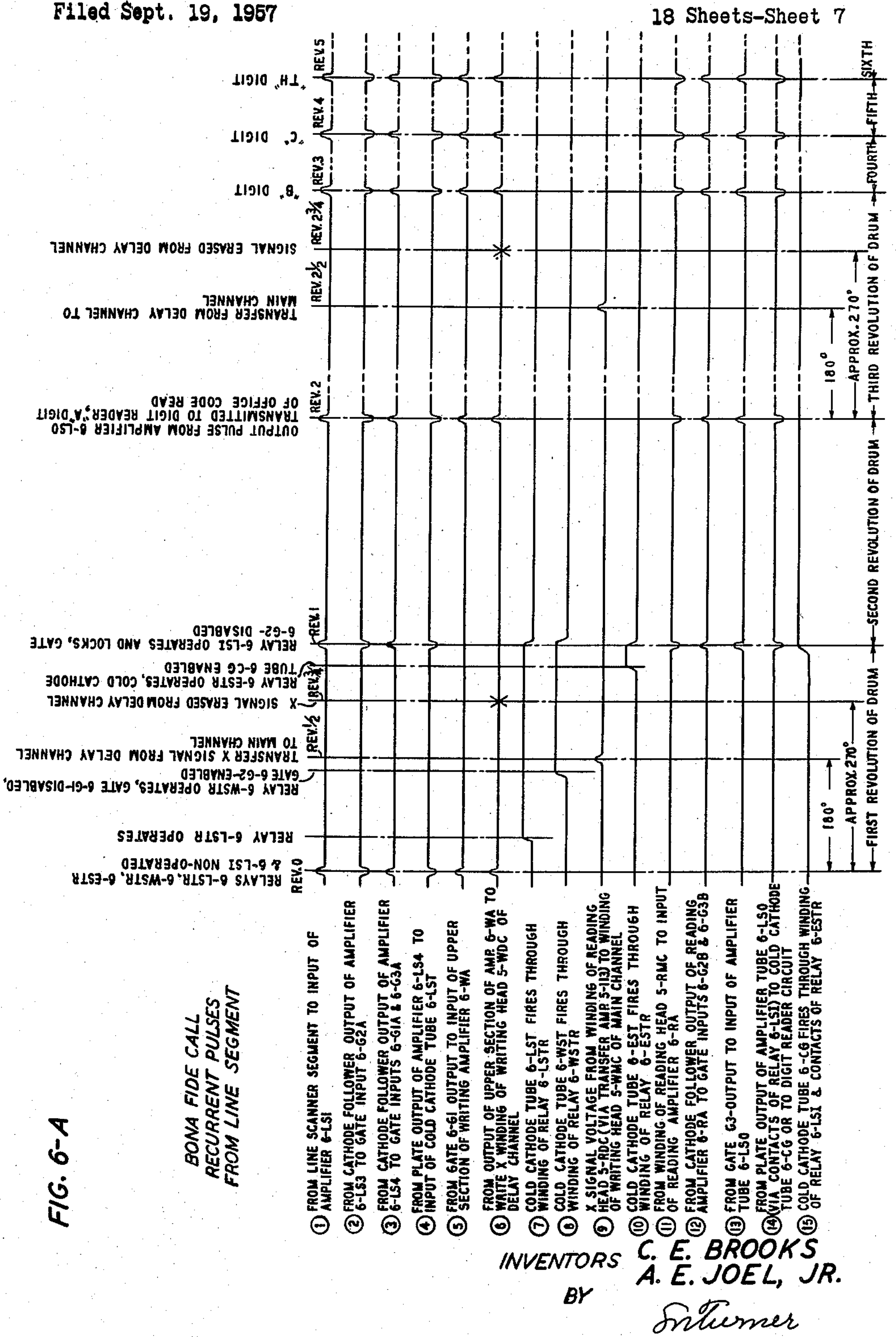
FIG. 6-A
INVENTORS C. E. BROOKS
A. E. JOEL, JR.
BY [signature]
ATTORNEY TELEPHONE SYSTEM CALLING STATIONS IDENTIFIER
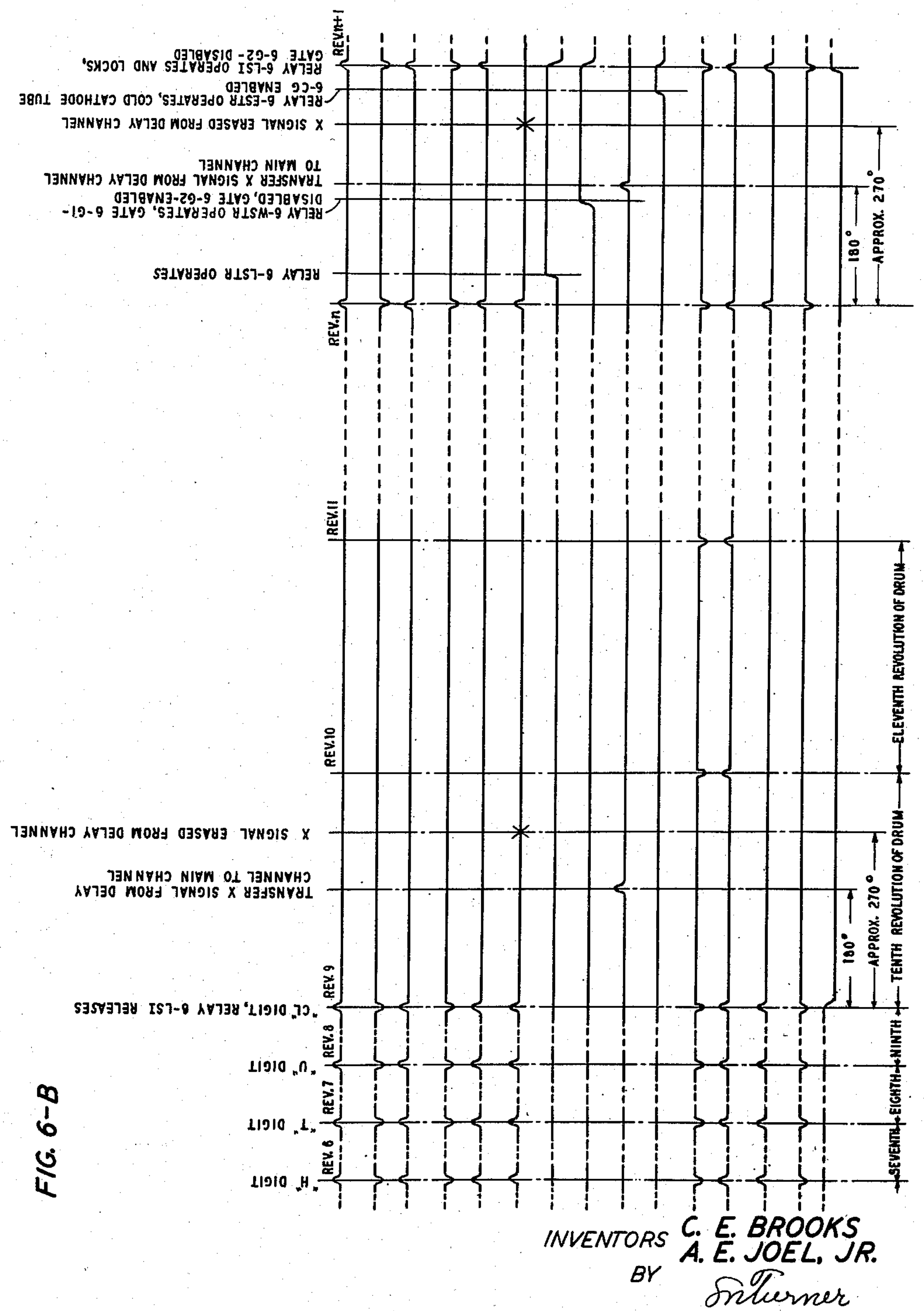
FIG. 6-B
INVENTORS C. E. BROOKS
A. E. JOEL, JR.
BY [signature]
ATTORNEY TELEPHONE SYSTEM CALLING STATIONS IDENTIFIER
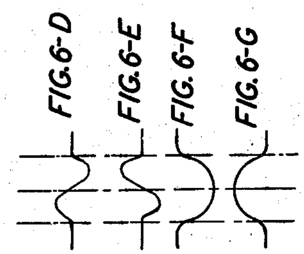
FIG. 6-D, FIG. 6-E, FIG. 6-F, FIG. 6-G
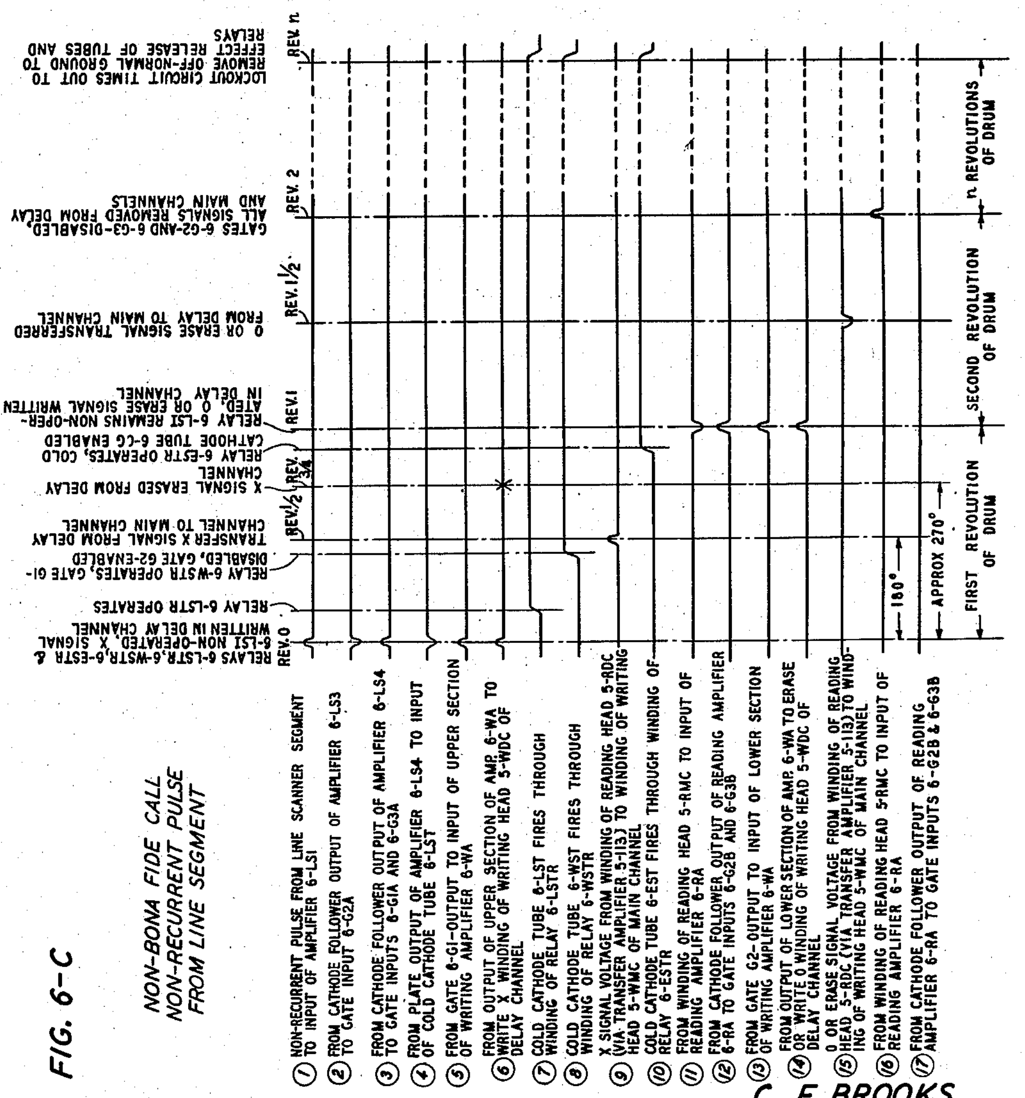
FIG. 6-C
INVENTORS C. E. BROOKS
A. E. JOEL, JR.
BY [signature]
ATTORNEY Feb. 9, 1960 C. E. BROOKS ET AL 2,924,666

TELEPHONE SYSTEM CALLING STATIONS IDENTIFIER

Filed Sept. 19, 1957 18 Sheets-Sheet 10

INVENTORS C. E. BROOKS
A. E. JOEL, JR.
BY [signature]
ATTORNEY

Feb. 9, 1960 C. E. BROOKS ET AL 2,924,666

TELEPHONE SYSTEM CALLING STATIONS IDENTIFIER

Filed Sept. 19, 1957 18 Sheets-Sheet 11

INVENTORS C. E. BROOKS
A. E. JOEL, JR.
BY [signature]
ATTORNEY

INVENTORS C. E. BROOKS
A. E. JOEL, JR.
BY [signature]
ATTORNEY

INVENTORS C. E. BROOKS
A. E. JOEL, JR.
BY [signature]
ATTORNEY

TELEPHONE SYSTEM CALLING STATIONS IDENTIFIER

INVENTORS C. E. BROOKS
A. E. JOEL, JR.
BY [signature]
ATTORNEY

INVENTORS C. E. BROOKS
A. E. JOEL, JR.
BY [signature]
ATTORNEY

TELEPHONE SYSTEM CALLING STATIONS IDENTIFIER

Filed Sept. 19, 1957

INVENTORS C. E. BROOKS
A. E. JOEL, JR.
BY [signature]
ATTORNEY

TELEPHONE SYSTEM CALLING STATIONS IDENTIFIER

Filed Sept. 19, 1957 18 Sheets-Sheet 17

INVENTORS C. E. BROOKS
A. E. JOEL, JR.
BY [signature]
ATTORNEY

INVENTORS C. E. BROOKS
A. E. JOEL, JR.
BY [signature]
ATTORNEY

United States Patent Office 2,924,666

Patented Feb. 9, 1960

2,924,666

TELEPHONE SYSTEM CALLING STATIONS IDENTIFIER

Chester E. Brooks, Montvale, and Amos E. Joel, Jr., South Orange, N.J., assignors to Bell Telephone Laboratories, Incorporated, New York, N.Y., a corporation of New York Application September 19, 1957, Serial No. 685,025

18 Claims. (Cl. 179—18)

The present invention relates generally to telephone switching systems and more particularly to means therein used to identify calling stations incident to the extension of connections from station lines.

The present invention is particularly adapted for identifying purposes in a switching system of the type wherein a signal is applied to a line incident to the extension therefrom of a connection and wherein a calling station on said line is identified incident to the application to said line of the said signal.

The prior art includes systems using various means for effecting station or line identification incident to the application of such a signal to a line. The main object of the present invention is the improvement of such means. Improvement by virtue of the present invention lies in increased speed and reliability of the identification process attributable to what is believed to be the use for such purposes of new techniques and new circuit and apparatus arrangements.

One feature of the present invention is a storage device wherein are stored identity data for each of a plurality of stations and from which pertinent data may be read-out on a selective basis.

Another feature is a scanner-detector for scanning the lines one at a time in repeated cycles at a rapid rate to ascertain which lines exhibit the significant signal and to control the selective read-out of data from storage.

Another feature is selectively operable reading means for reading from storage the identity data pertaining to particular stations.

Another feature is a gating means controlled by the scanner-detector to operate the read-out arrangement selectively and uniquely for each different line exhibiting said signal.

The foregoing features are combined to embody the invention in a station identifier of novel configuration. In the exemplary embodiment magnetic-drum storage is used in conjunction with a capacitive line scanner and with drum read-out heads such that the time interval per scan cycle during which the scanner-detector is ascertaining whether or not a line exhibits the signal is substantially the same time interval during which the reading heads are in position relative to the rotating drum to read out stored data unique to a station on that line. Circuits including electronic gates are provided controlled by said scanner-detector to permit the reading heads to read-out from the drum the pertinent identity data only during the pertinent time interval.

Another feature of the invention is the provision of connector circuits and interrelated control means whereby one of a plurality of trunks, over which a connection may be set up responsive to a calling condition on a line, may obtain access to an identifier to the exclusion of other trunks and whereby, as an incident to such identifier seizure by a trunk, the trunk applies said signal to a control conductor of the connected line and initiates the identifying action of the identifier.

The latter feature is combined with similar connector and control circuits whereby one of a plurality of drum storage devices, each of which serves a separate plurality of lines, may, through the agency of its associated scanner-detector, seize and connect to a common identifier to the exclusion of other drum-scanner-detector pairs such that the identifier action, while capable of servicing any line in the system, may limit its attention to one operation at a time.

The latter two features enable an identifier according to the present invention to serve a relatively large plurality of possible line-to-trunk connections rapidly and without interference.

A further feature of the invention is provision of outpulsing controls whereby the identified data may be outpulsed over the connected trunk. Such information can be used at a remote termination of the trunk, such as at a tandem accounting center, as part of the data necessary for billing of a calling customer.

A particular feature of the invention is the provision of a single register in combination with a sequence or walking control circuit whereby identity data may be read from the drum a portion at a time in sequence through the agency of selectively operated connectors interposed between the reading heads and the register. The registration of a preceding portion of data is arranged to control the outpulsing means, whereupon the walking control advances to release the register and to set up a new selective connector operation to enable a new data portion registration under the control of the previously-mentioned gating means.

Another particular feature resides in the arrangement whereby the data portions prerecorded on a drum are digits arranged in a two-out-of-five code of binary digits and the register is aranged to register each digit in a two-out-of-five code and a translator is provided interposed between the register and the outpulsing means whereby the two-out-of-five coded digits may be translated to decimal digits prior to outpulsing.

Another specific feature, directly related to the latter, is the provision of a plurality of selectively operable connectors associated with the aforementioned translator and which are operated by the walking control circuit in conjunction with connectors interposed between the reading heads and the register, whereby a particular digit may be repeatedly read from a portion of the drum on successive revolutions thereof and may be translated differently, according to a preestablished plan, each time it is read.

Other features and advantages of the present invention will be apparent in the light of the following detailed description of the exemplary embodiment disclosed in the drawings, brief descriptions of which are set forth below.

BRIEF DESCRIPTIONS OF DRAWINGS

Figure 1:
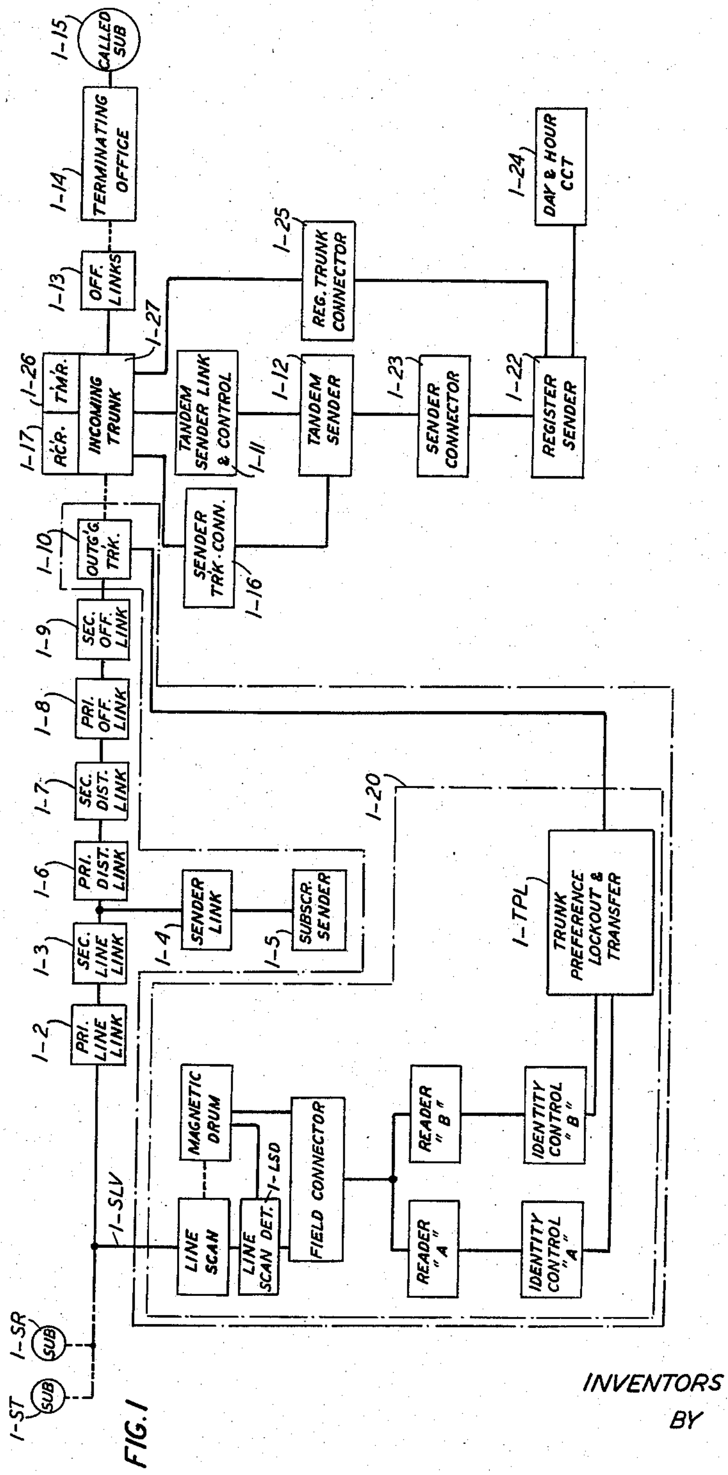
Fig. 1 shows in block diagram form the principal functional features of the present invention as applied to a type of telephone system known to the prior art.
Figure 16:
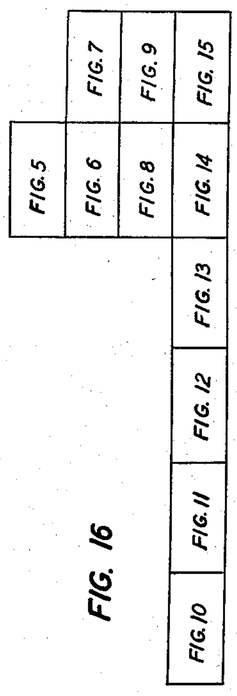
Figure 3:
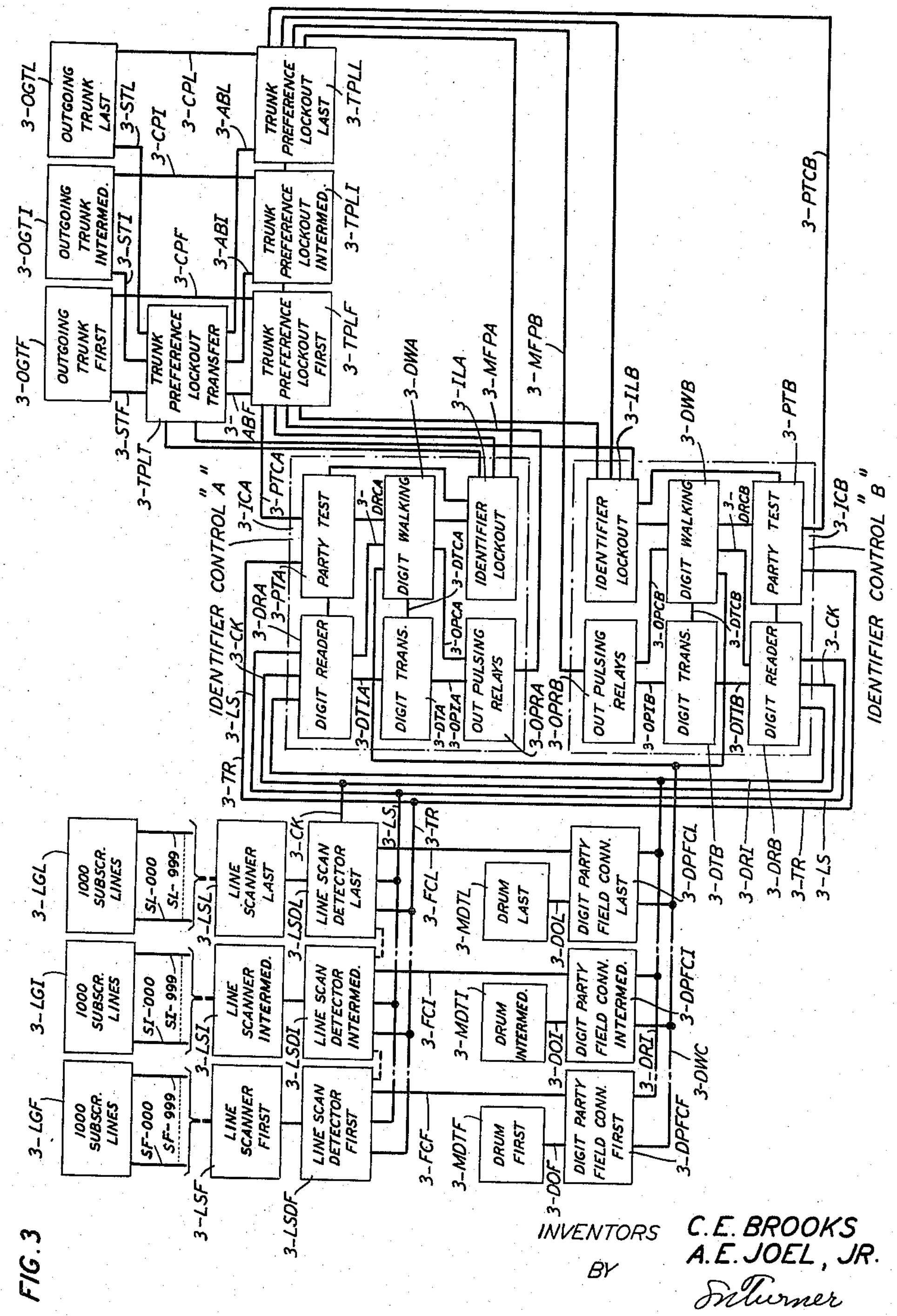
Figure 4:
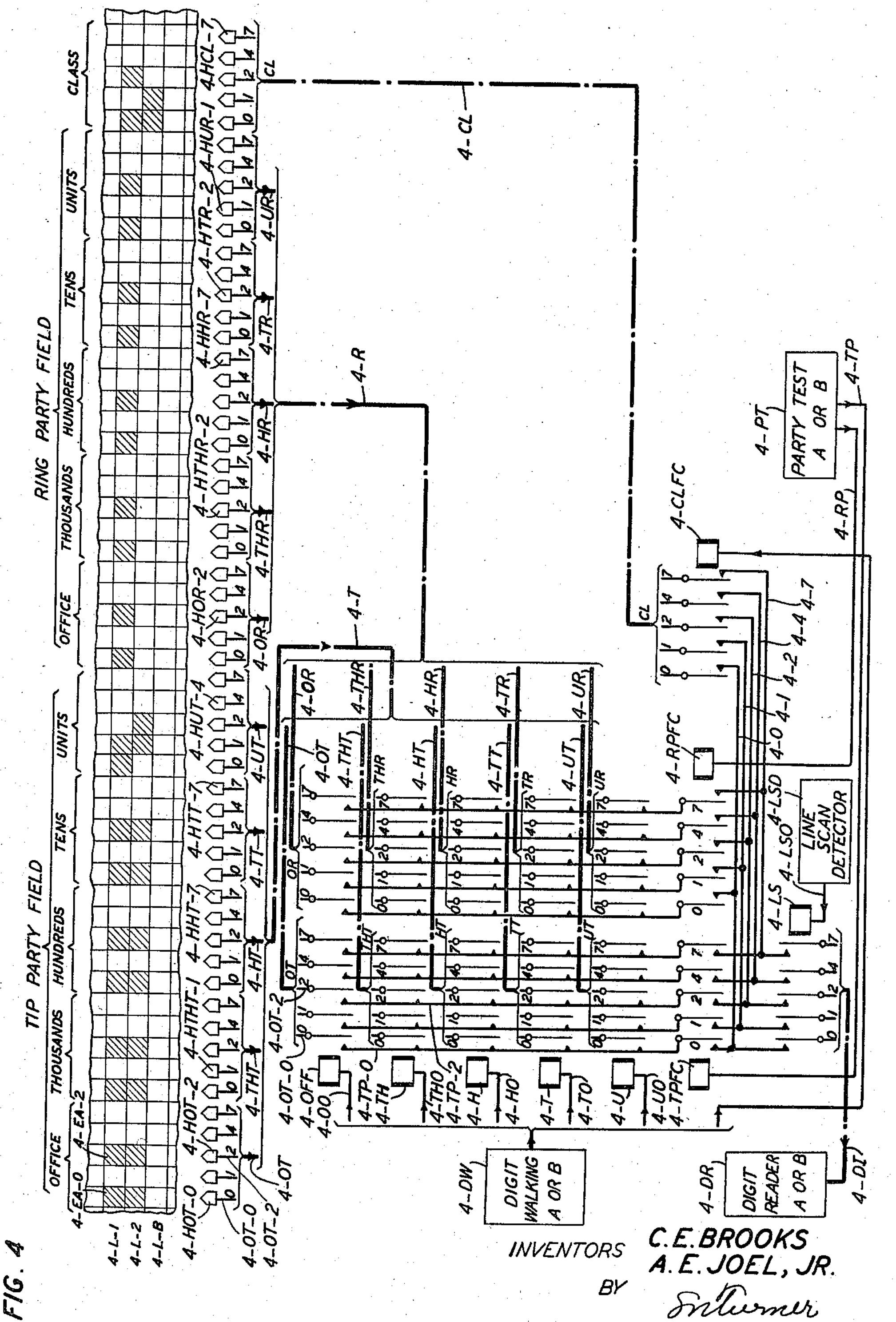
Figure 5:
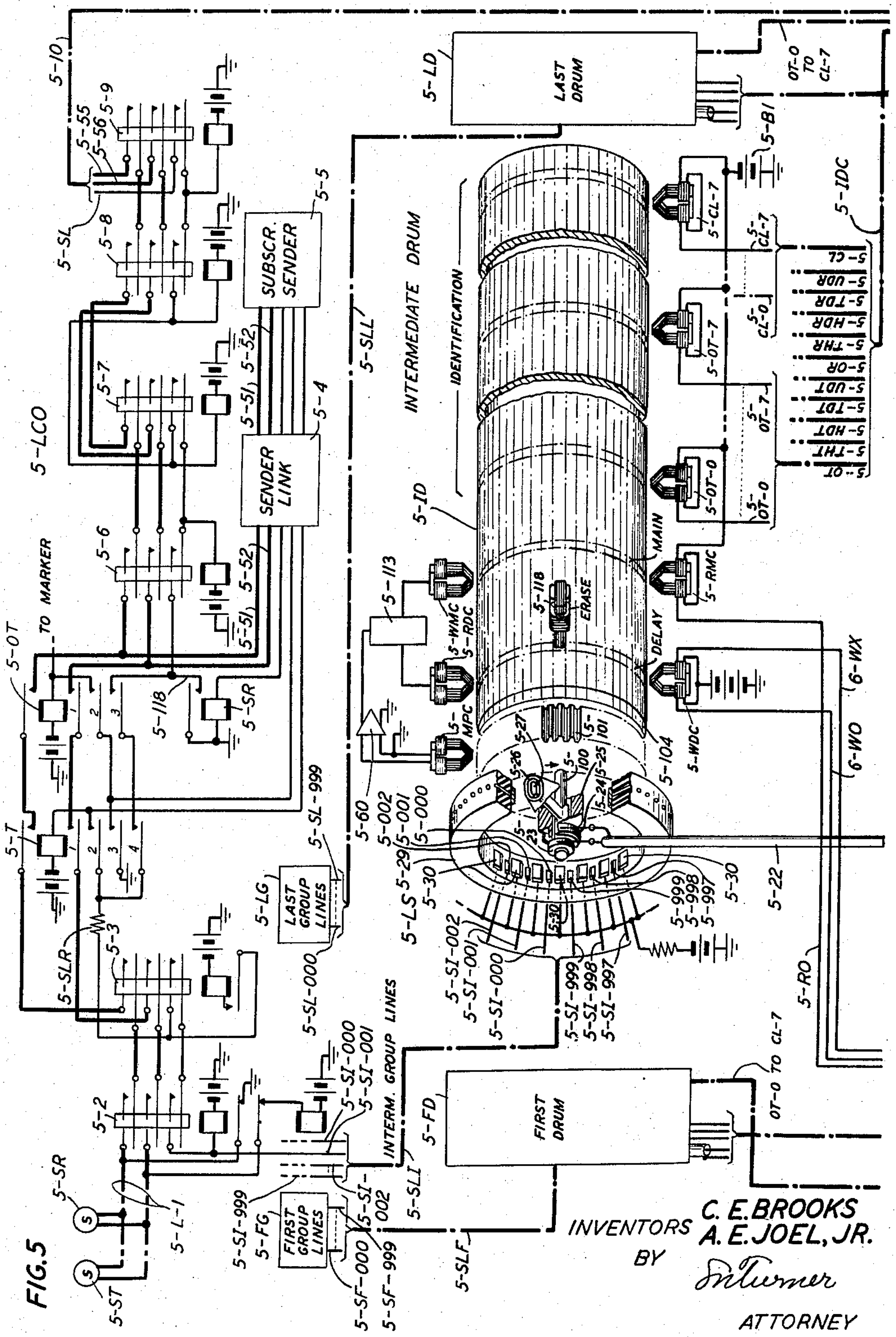
Figure 6:
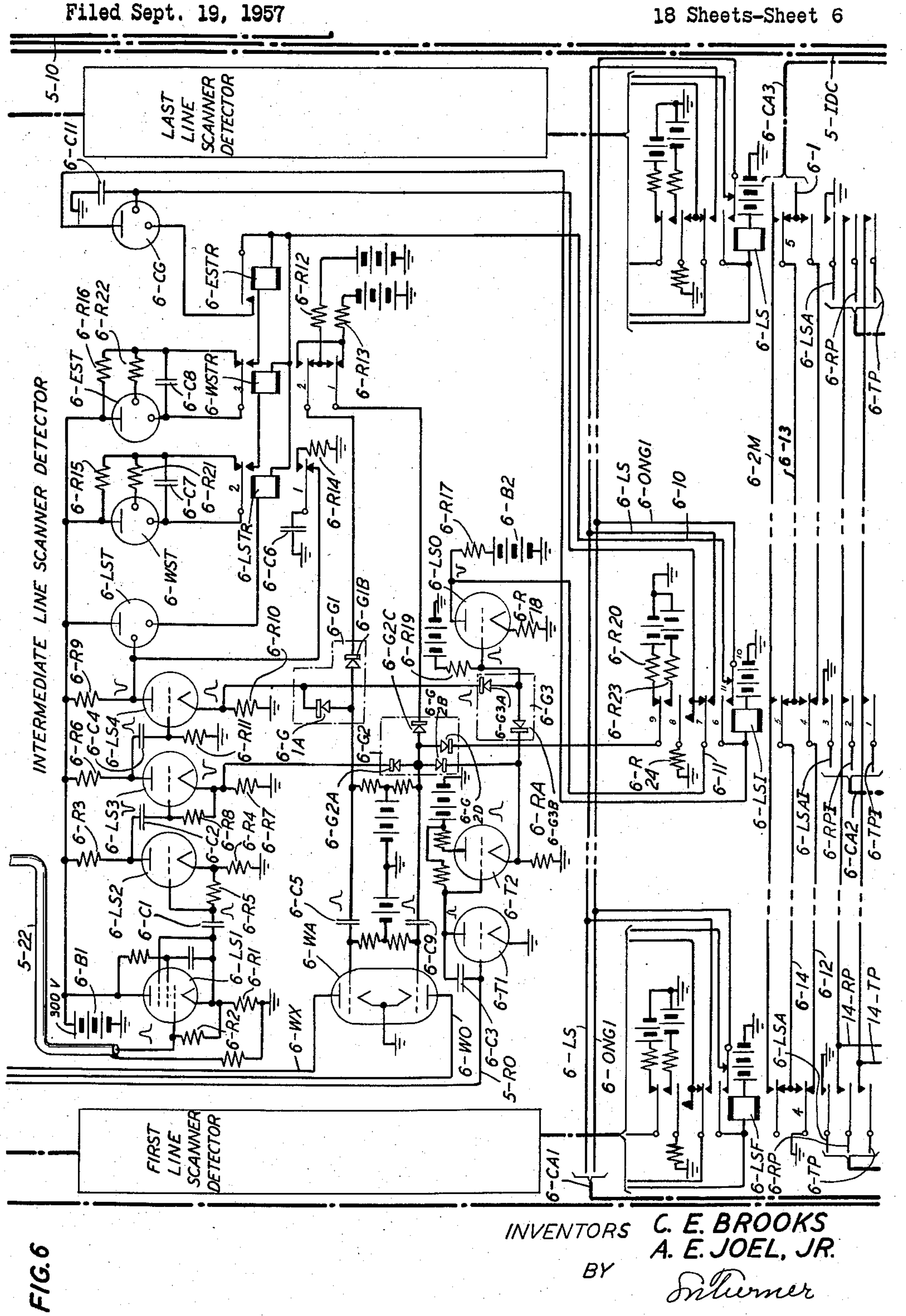
Figure 7:
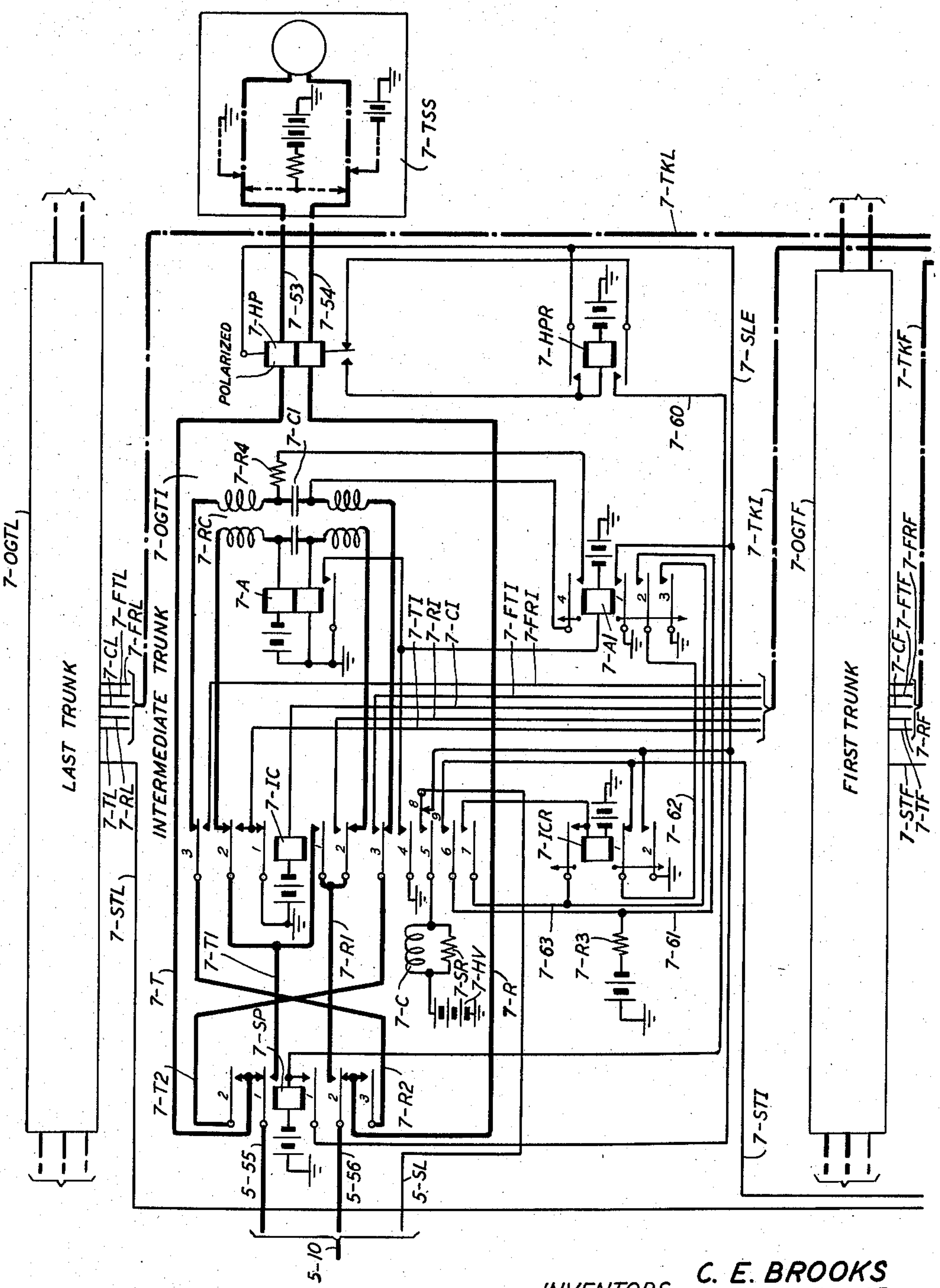
Figure 8:
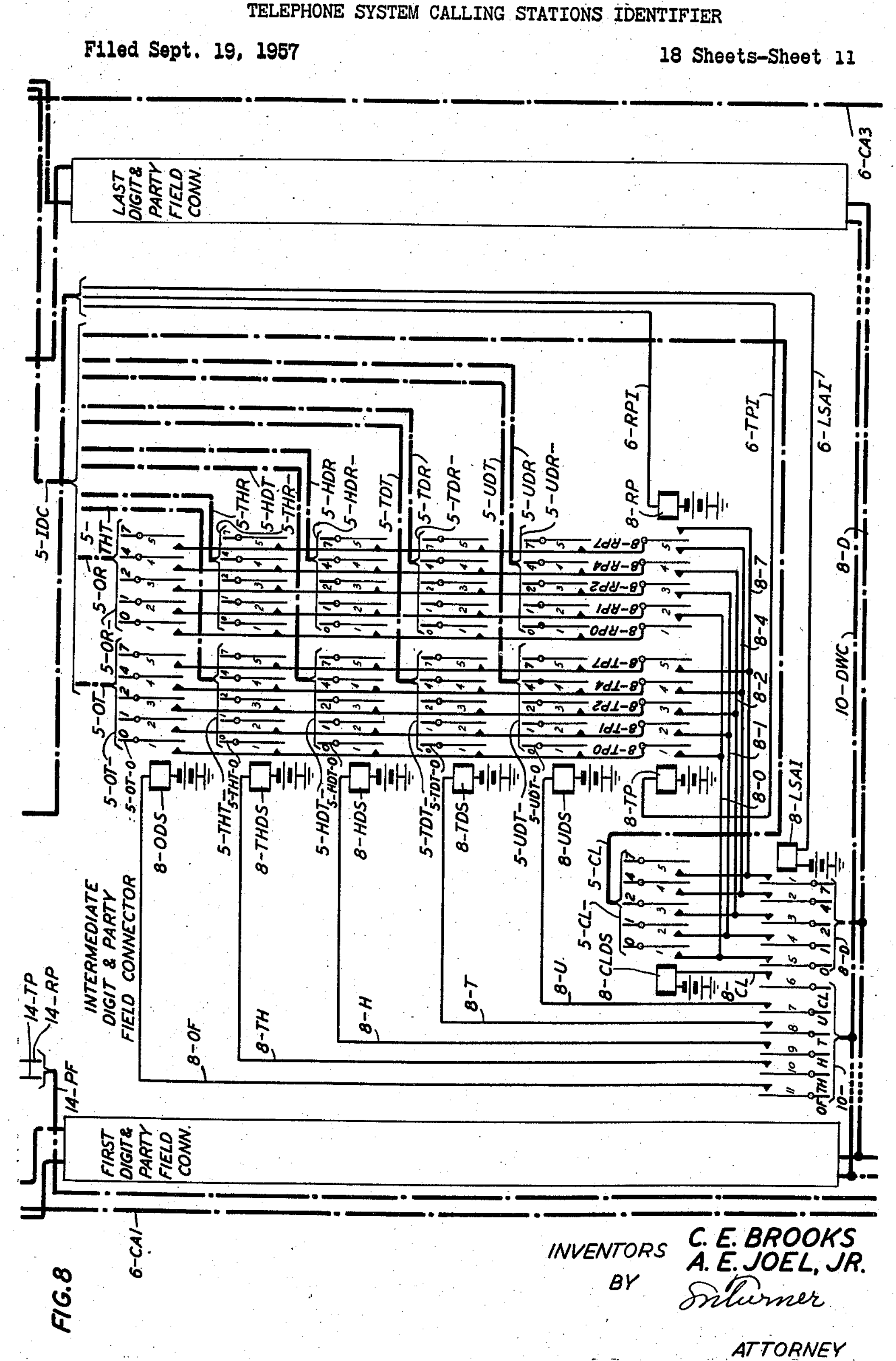
Figure 9:
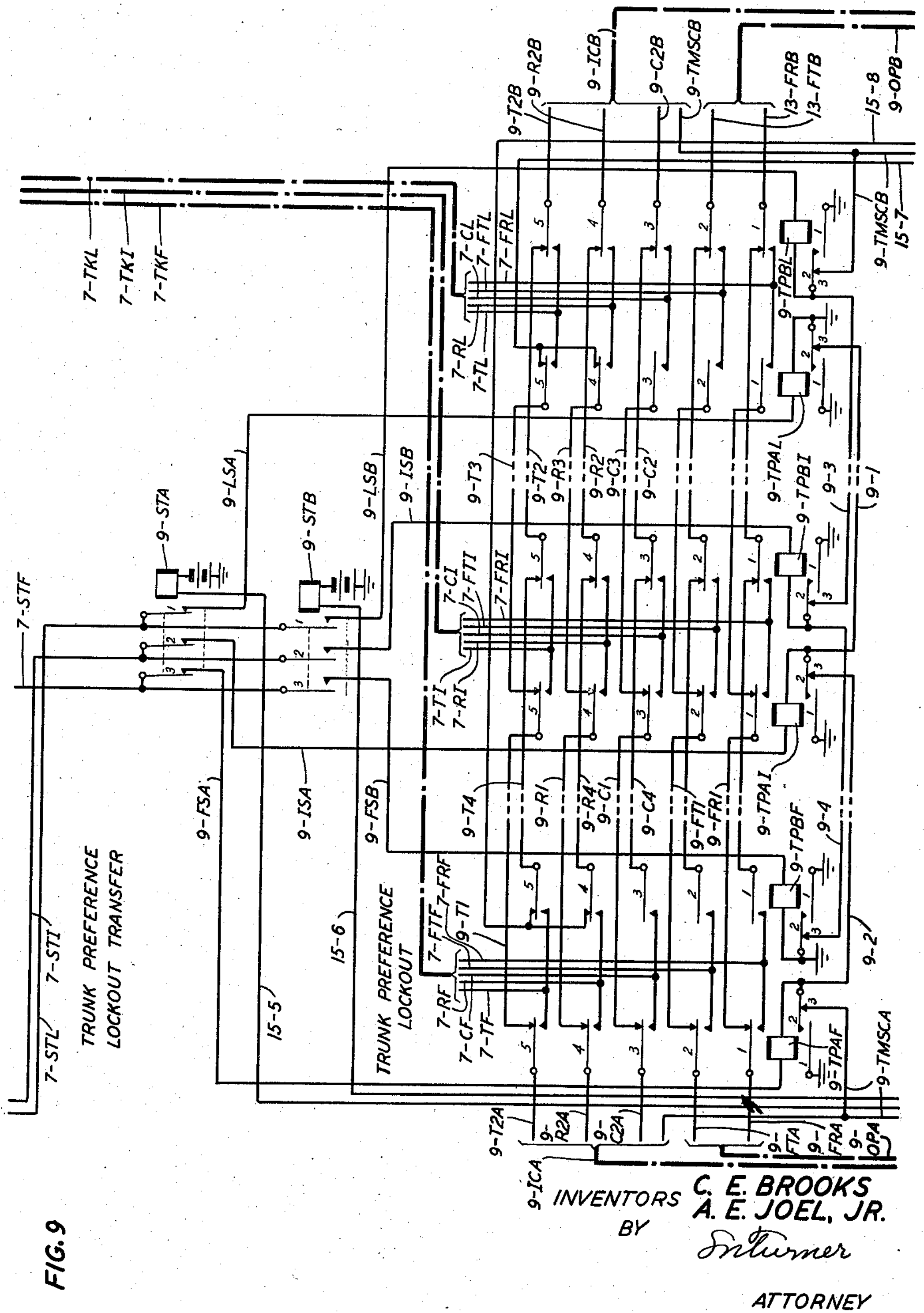
Figure 10:
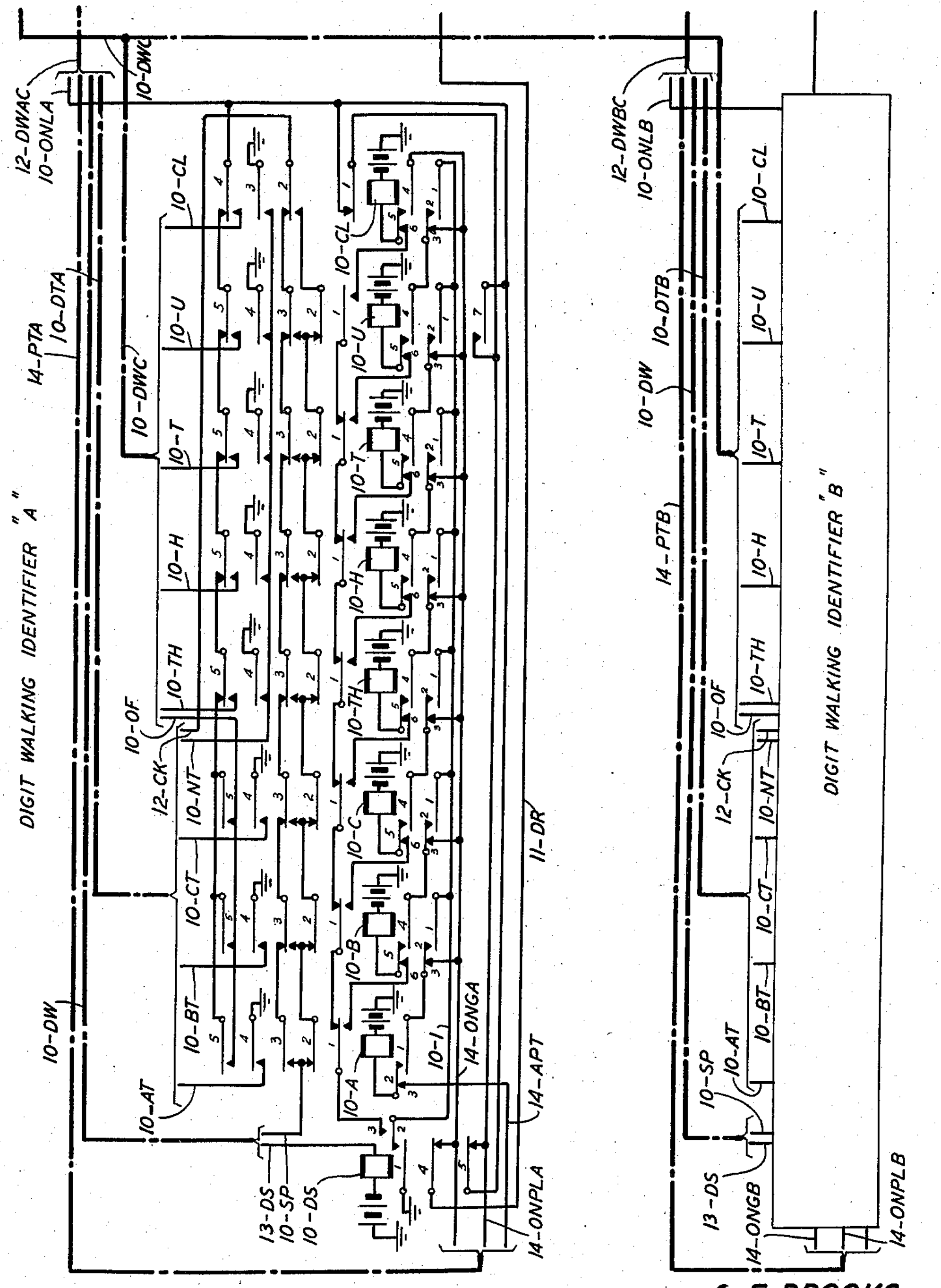
Figure 11:
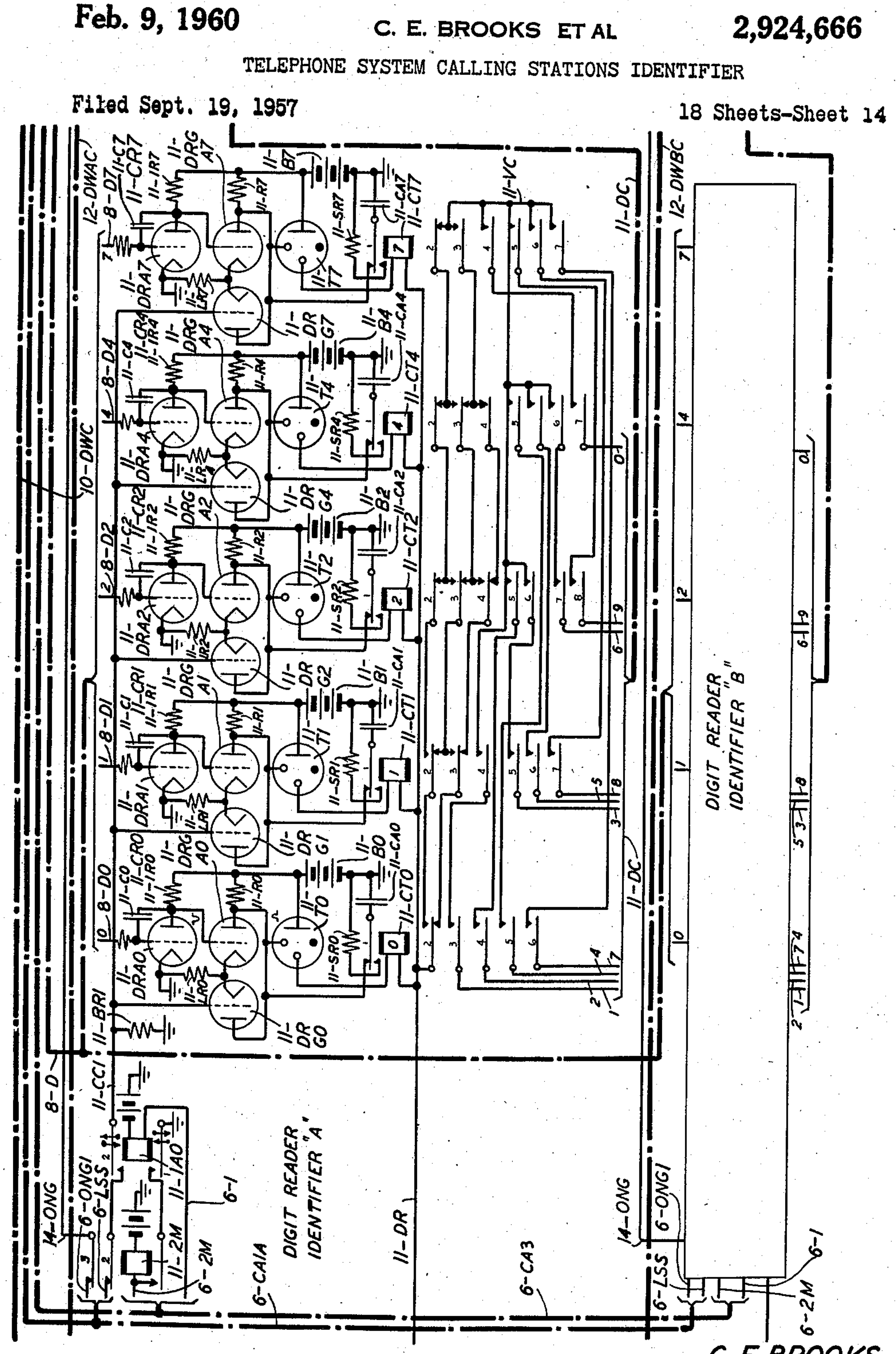
Figure 12:
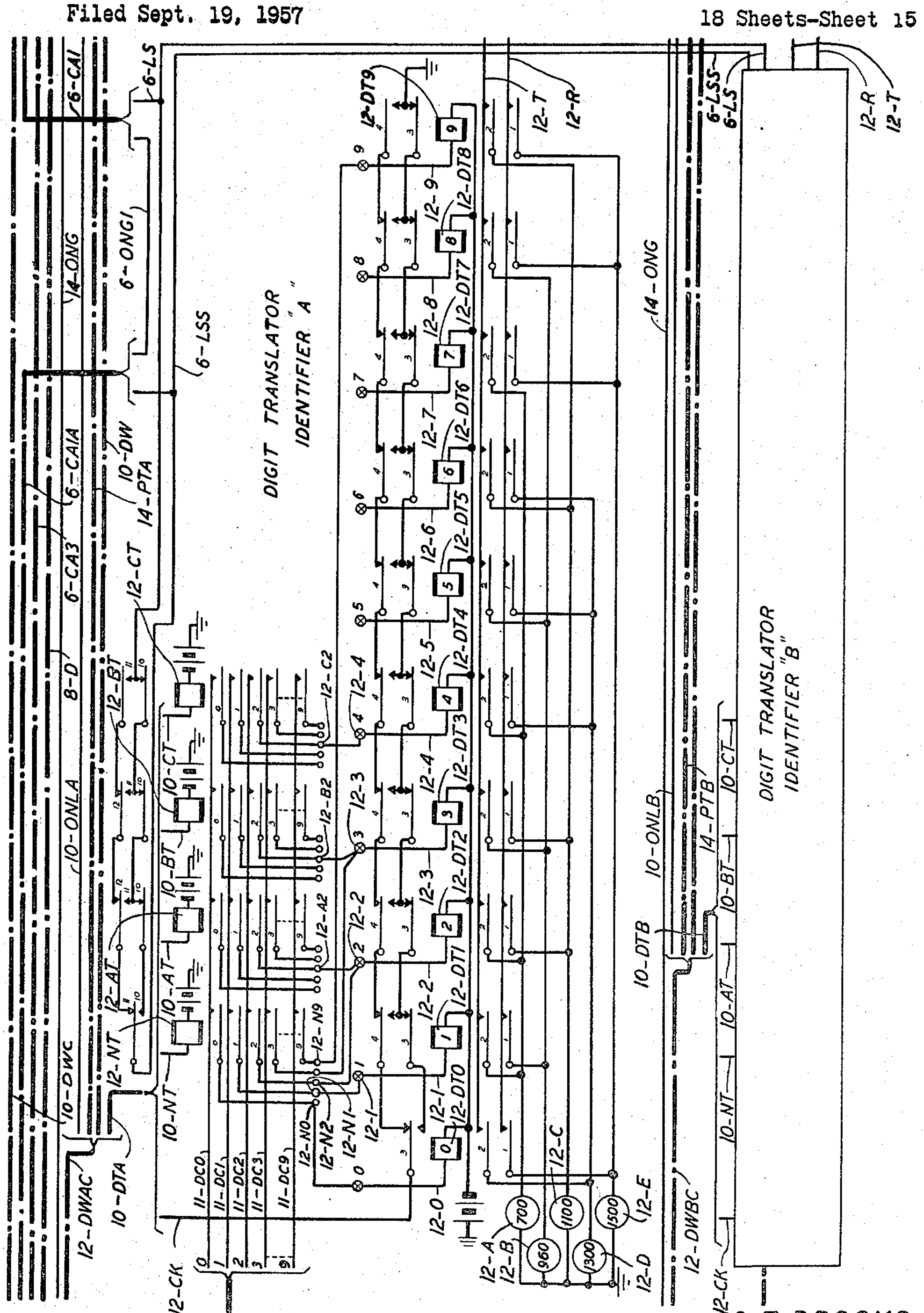
Figure 13:
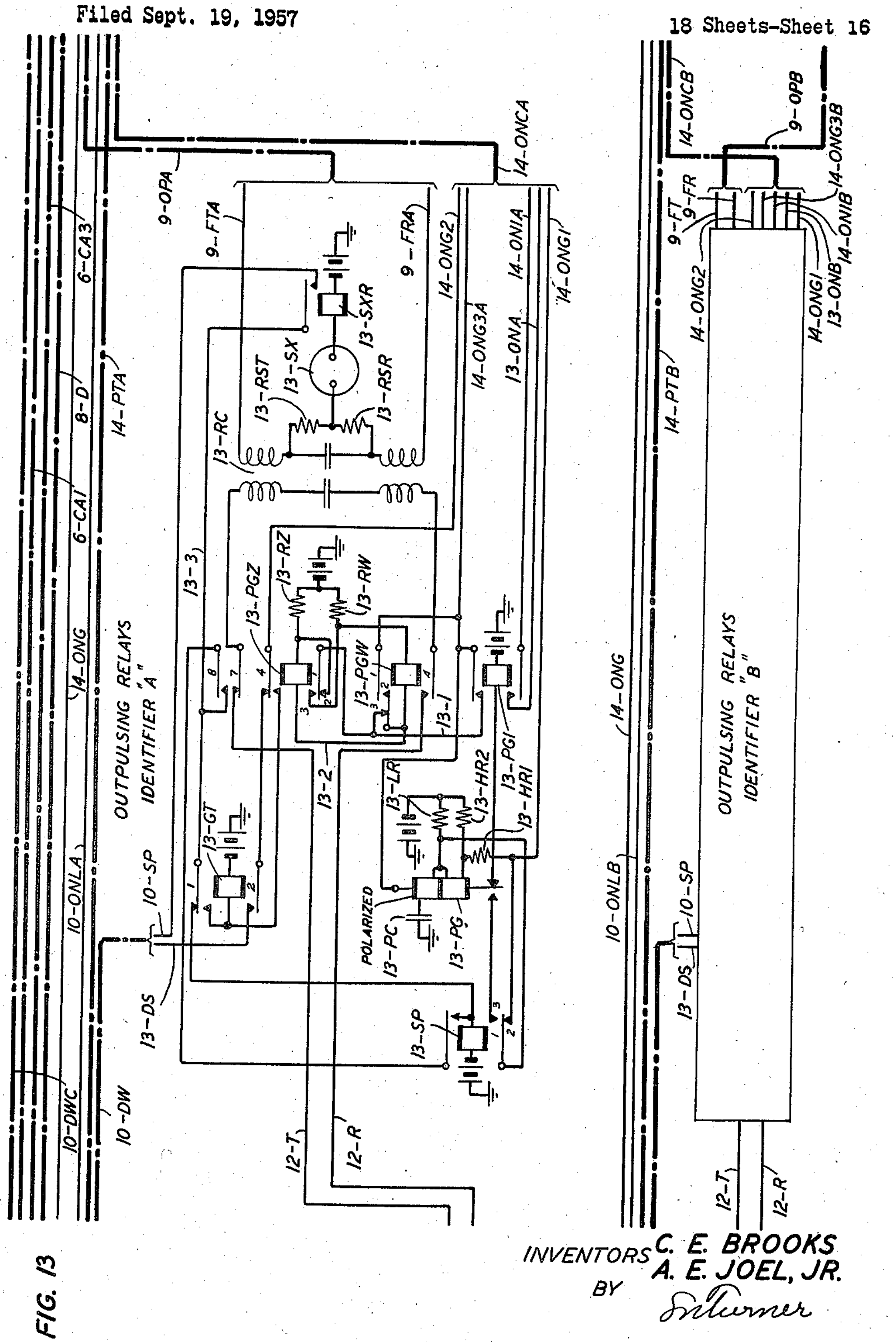
Figure 14:
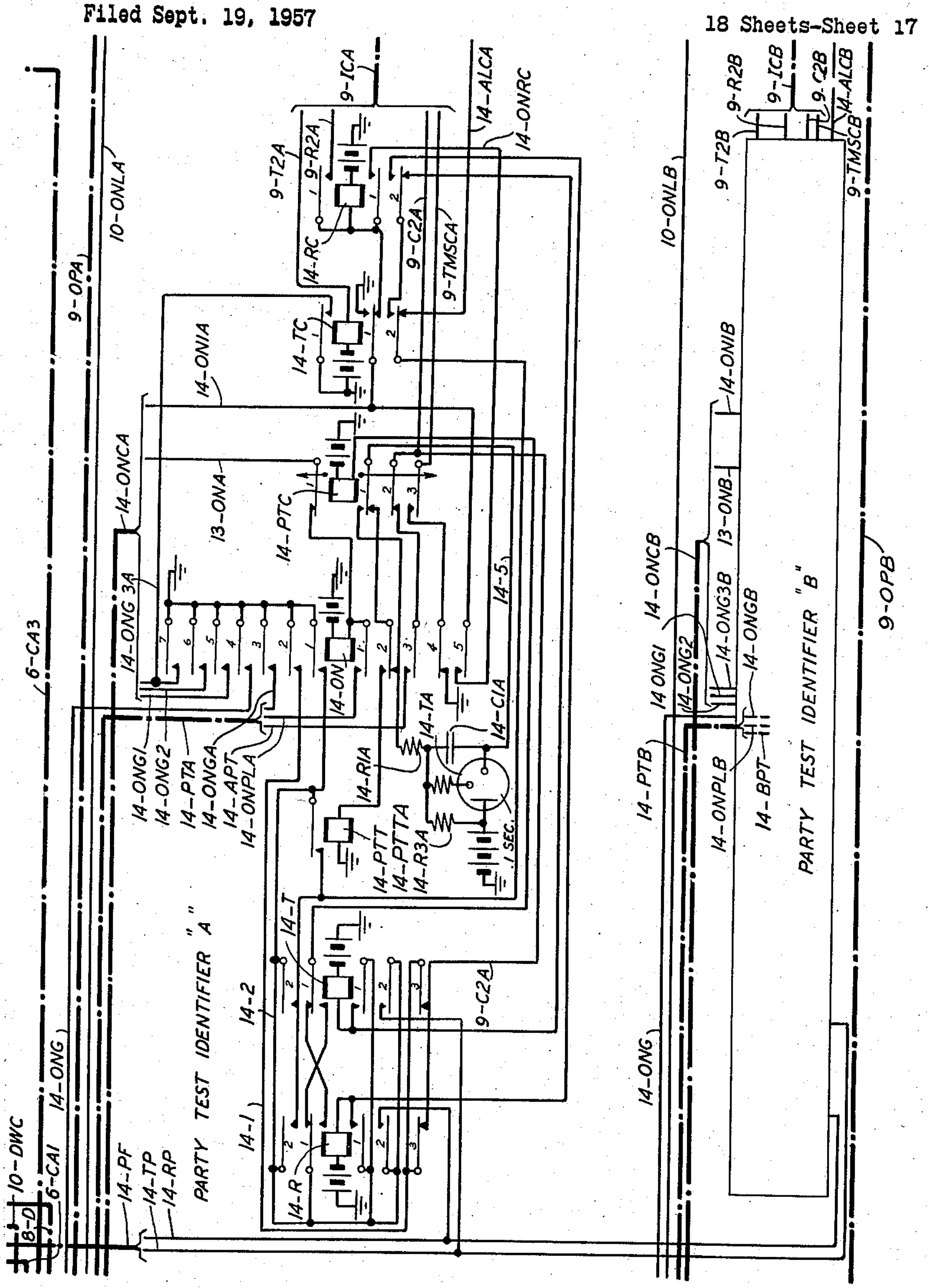
Figure 15:
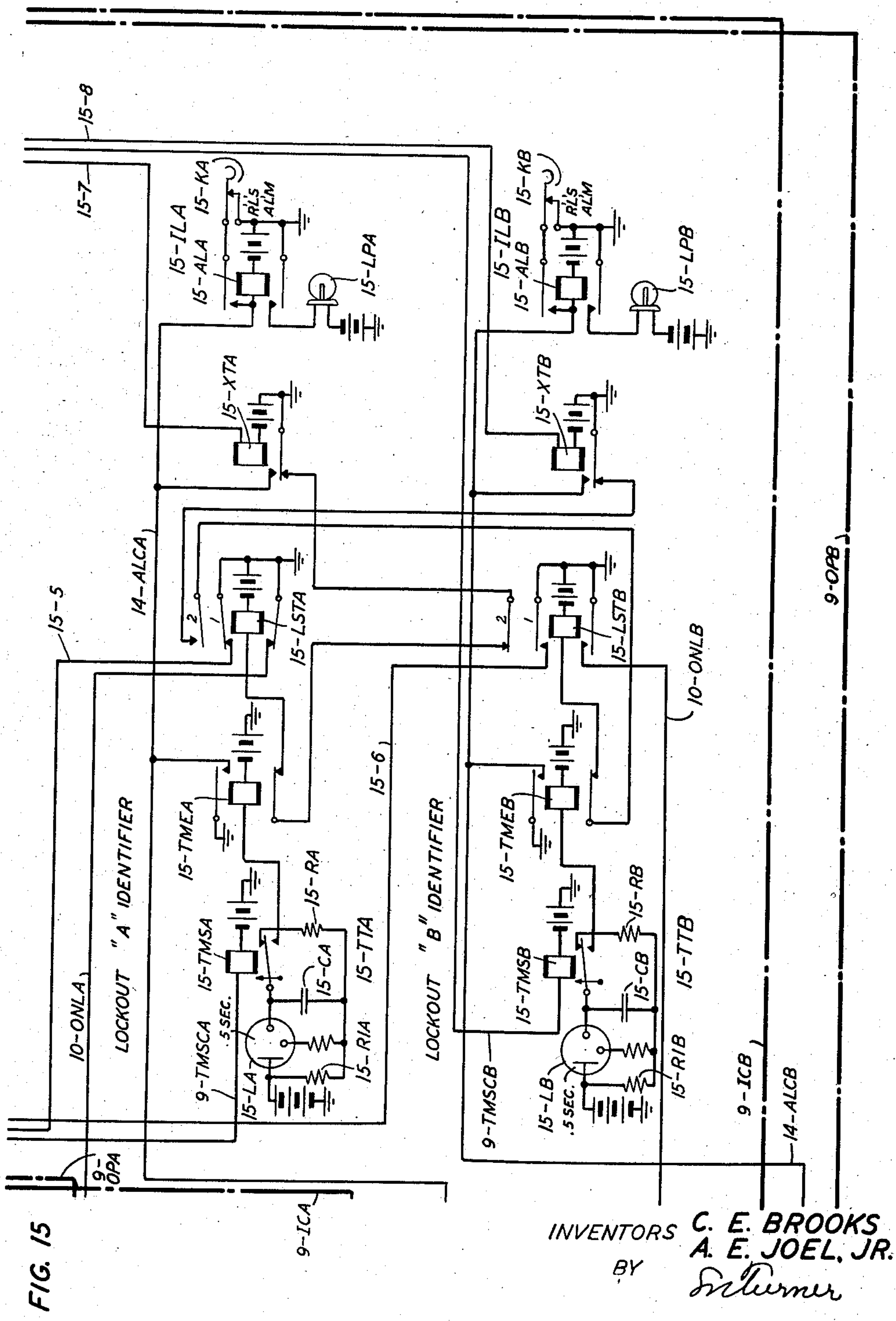

Fig. 3 shows, in block diagram form, the functional organization of a plurality of groups of subscriber's lines, some of which may be multiparty lines, served by a plurality of outgoing trunks to other offices some or all of which may be tandem switching centers, a plurality of line identifiers each common to a group of subscriber's lines, two alternatively usable identifier control circuits designated A and B, a trunk preference lockout circuit, and a trunk preference lockout transfer circuit;

Fig. 4, in semidiagrammatic form, shows a portion of the developed surface of a typical one of the magnetic-drum translators, the reading heads cooperative therewith, the circuitry by means of which the prerecorded information in the drum may be read, a digit at a time, by the reader circuits, and the related control circuits;

Fig. 5 shows a plurality of groups of subscriber's lines some of which may be multiparty lines such as the illustrated example, a plurality of magnetic storage drums each common to a group of lines, and the equipment in a local central office for establishing a connection between one of said lines and one of a number of outgoing trunks;

Fig. 6 shows a plurality of line scanner-detector circuits each associated with its respective magnetic-drum scanner;

Figs. 6–A and 6–B, when placed end to end with Fig. 6–A on the left, show, in graphical form for a bona fide call, the time relationship between the scanning of a line segment of the magnetic-drum scanner, the detection, storage and reading of a first positive pulse in the magnetic drum, the detection of a second positive pulse, and the switching operations occurring during the time interval required for one revolution of the drum between the detection of said first and said second positive pulses; Fig. 6–B also, in graphical form, shows the presence of a pulse which remains stored in the main channel of the drum after the termination of a call, and the detection of a second pulse indicating a second call by the same subscriber;

Fig. 6–C, shows, in graphical form for a non-bona fide call, the time relationship between the scanning of a line segment of the magnetic-drum scanner, the detection, storage and reading of a positive pulse, the non-recurrence of a positive pulse, and the switching operations occurring during and after the time interval required for one revolution of the drum between the detection of said positive pulse and its non-recurrence;

Fig. 6–D is a curve illustrative of the wave form of the alternating current voltage output from a typical one of the reading heads (operatively associated with one of the channels of the drum wherein are stored the line identification data) in response to the presence of an X signal in the drum channel cell passing under said reading head;

Fig. 6–E is a curve illustrative of the wave form of the alternating current voltage output from a typical one of the reading heads (operatively associated with one of the channels of the drum wherein are stored the line identification data) in response to the presence of an O signal in the drum channel cell passing under said reading head;

Fig. 6–F is a curve illustrative of the wave form of the voltage output from a typical one of the integrator tubes of the channel reader circuits in response to an X signal voltage to the input of said integrator tube;

Fig. 6–G is a curve illustrative of the wave form of the voltage output from a typical one of the integrator tubes of the channel reader circuits in response to an O signal voltage to the input of said integrator tube;

Fig. 7 shows the circuitry at the local central office of a plurality of outgoing trunks to other central offices, and illustrates in detail one of said outgoing trunks, and indicates diagrammatically a telephone switching system of a known type in which the illustrated trunk is terminated;

Fig. 8 shows a plurality of digit and party field connector circuits each associated with its respective magnetic drum;

Fig. 9 shows a multisection trunk preference lockout circuit with one section for each outgoing trunk, and a trunk preference lockout transfer circuit;

Fig. 10 shows two digit-walking circuits designated A and B, respectively;

Fig. 11 shows two digit-reader circuits designated A and B, respectively;

Fig. 12 shows two digit-translator circuits designated A and B, respectively;

Fig. 13 shows two outpulsing relay circuits designated A and B, respectively;

Fig. 14 shows two party-test circuits designated A and B, respectively; and,

Fig. 15 shows two identifier lockout circuits designated A and B, respectively;

Fig. 16 shown on the same drawing sheet as Fig. 1, illustrates the manner in which Figs. 5 to 15 (Figs. 6–A through 6–G are not included unless specifically enumerated) inclusive, should be arranged for a complete disclosure of the invention as embodied in an automatic telephone switching system.

In Figs. 10 to 15, inclusive, the like designated circuits, in combination, respectively constitute two identifier-control circuits A and B.

GENERAL DESCRIPTION OF SYSTEM OPERATION

In order to facilitate the tracing of circuit operations, each functional feature or item of apparatus appearing in Figs. 1 to 15 is designated either by a numerical designation or by a functional designation consisting primarily of letters, which is preceded by the number of the figure in which said item appears. Thus, a relay or other item mentioned in the text may readily be found in the drawings by reference to the figure number included in the designation of said item. For example, the subscriber's station designated 1–ST will be found in Fig. 1.

For a complete and clear understanding of the invention, as a preliminary matter the general functioning of the system as illustrated in Fig. 1 will be described. Next, the functional organization of the features shown in Fig. 2 will be discussed. Then, in somewhat greater detail, the functional relationship of the features shown in Fig. 3 will be covered.

Then, the purpose and operation of the magnetic drum translator and related circuitry diagrammatically shown in Fig. 4 will be set forth. Finally, a description will be provided concerning the detailed operations of the circuits incident to the placing of a call by a subscriber, the extension of a path to a tandem office, and the transmission to said tandem office of the indicia characterizing the identity of said calling subscriber, as disclosed in Figs. 5 to 15, inclusive.

Referring to Fig. 1, when a call is initiated at station 1–ST by the removal of the receiver at that station, the station is connected in the well-known manner through the primary line link 1–2, secondary line link 1–3 and sender link 1–4, to a subscriber's sender 1–5 which operates to transmit dial tone to the calling station. Upon receipt of dial tone, the subscriber at station 1–ST dials the office code and number of the station desired. This information is registered in the subscriber's sender 1–5 which then operates, with the aid of a marker (not shown), to extend the connection through the required number of line-extending switches such as, for example, the primary district link 1–6, secondary district link 1–7, primary office link 1–8 and secondary office link 1–9, over an outgoing trunk 1–10 at the local office, to an incoming trunk 1–27 at, for instance, a tandem switching point.

At the tandem office a sender link and controller 1–11 associates a tandem sender 1–12 with the trunk 1–27. The called line information registered in the subscriber's sender 1–5 is then transmitted to and registered in the tandem sender 1–12 by means of revertive pulsing from the tandem sender in the well-known manner. When the called-line information has been transmitted to the tandem sender 1–12, the subscriber's sender 1–5 is disconnected. The tandem sender 1–12, with the assistance of a marker (not shown), extends the connection through the tandem office links 1–13 to the terminating office 1–14 and through the switches of the terminating office to the called station 1–15 in the usual manner.

According to the present invention, however, when the called-line information has been registered in the tandem sender 1–12, the latter is connected to the trunk 1–27 by a sender trunk connector 1–16. The items of called-line information registered in the tandem sender 1–12 are then transmitted to a recording device 1–17 forming part of the equipment of the trunk 1–27 and are, by means of the recording device, recorded on a paper tape or similar means.

When the connection is extended under control of the tandem sender 1–12 to the terminating office, 1–14, a register sender 1–22 is connected to the tandem sender 1–12 by a sender connector 1–23.

After the connection to the trunk circuit has been established, the equipment in the local central office outgoing trunk 1–10 causes a potential condition to appear on the sleeve conductor 1–SLV of the calling subscriber's line to initiate the operation of the line scanner-detector circuit 1–LSD with respect to that particular line. At the same time, the outgoing trunk circuit 1–10 also applies a potential condition to the trunk preference lockout circuit 1–TPL to request the services of identifier control circuit A or B. The complete identifier equipment, indicated within broken line 1–20, comprises two control sections designated A and B, a reader designated A or B for each control section, a field connector, a line scanner-detector, a line scanner, and a magnetic drum, etc. The identifier drum contains a plurality of sets of items of previously recorded information, each of said sets being respectively associated with one of a plurality of calling subscribers' stations and indicative of the identity of the office in which the calling station is located and the directory number including the party designation, if any, of said calling station. The previously recorded calling subscriber's station identifying information, made available by the identifier 1–20, is transmitted, by multifrequency pulsing via the trunk preference lockout and transfer circuit 1–TPL and outgoing trunk 1–10, etc., to the tandem register-sender 1–22 wherein said information is registered. At the completion of said registration the identifier equipment is disconnected from the outgoing trunk circuit 1–10.

A day and hour circuit 1–24 is connected to the register-sender 1–22 by suitable means and said register-sender is connected to the incoming trunk 1–27 by a register trunk connector 1–25. The day and hour on which the call is made and the calling station information registered in the register-sender 1–22 are then transmitted to equipment associated with the incoming trunk 1–27 and recorded on the tape by the recording device 1–17. When said recording is completed the register-sender 1–22 is disconnected from the trunk.

When the connection is extended under the control of the tandem sender 1–12 to the called station 1–15 the tandem sender 1–12 is disconnected from the trunk. When the call is answered by the removal of the receiver at station 1–15 a timing device 1–26, associated with the incoming trunk 1–27, commences to measure the duration of the conversation time. At the termination of the call by the replacement of the receiver at station 1–15, the elapsed conversation time, measured by the timing device 1–26, is recorded on the tape by the recording device 1–17. If the conversation time exceeds 99 minutes, the elapsed time is printed at the end of each 99-minute period as well as at the termination of the call.

Disconnection is under control of the calling station in the usual manner.

Figure 2:
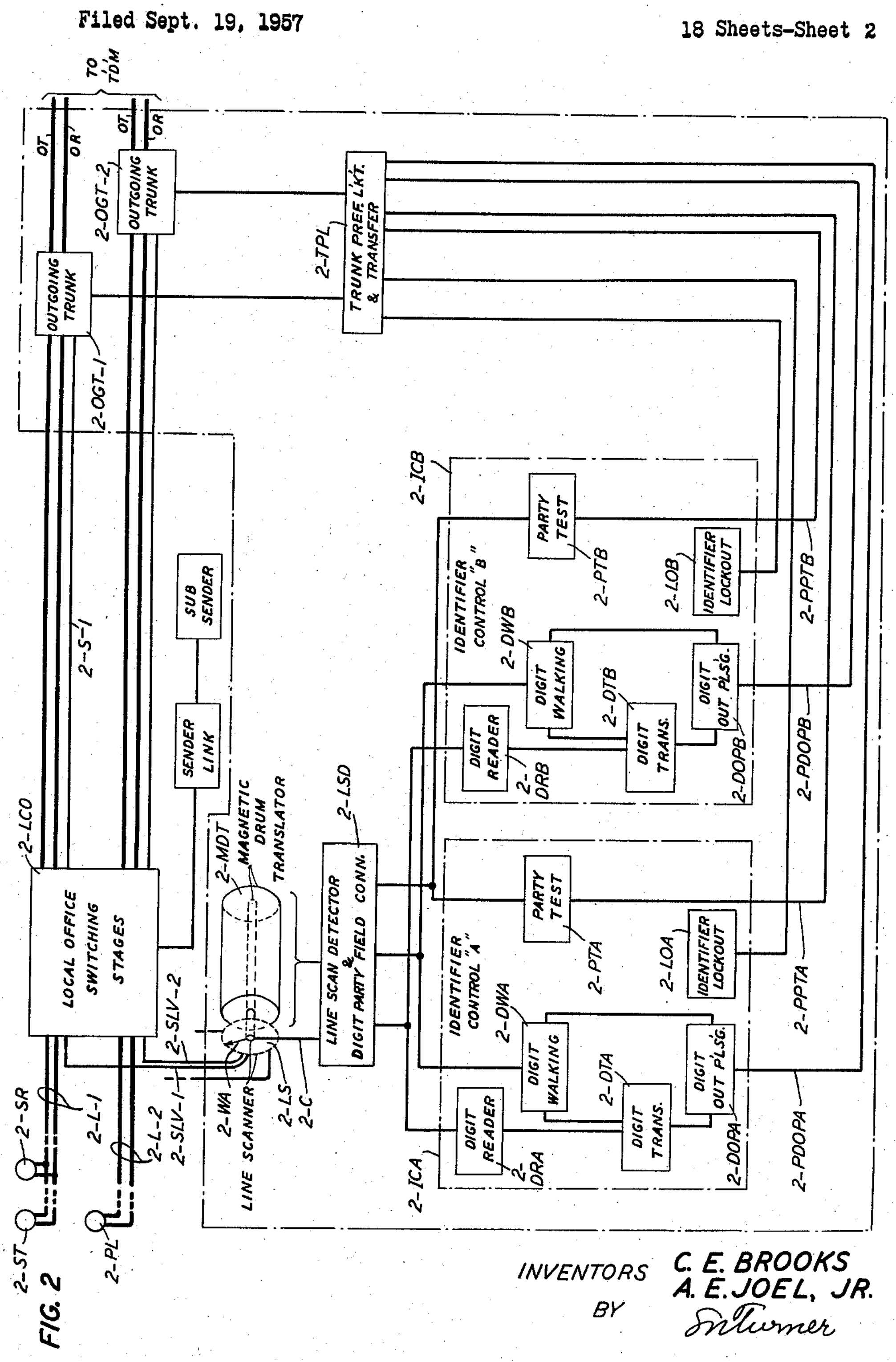
Fig. 2 shows, in block diagram form, amplification of the organization of the principal functional features of the present invention as applied to a telephone system comprising a plurality of subscriber's lines, some of which may be multiparty lines, served by a plurality of outgoing trunks to other offices some or all of which may be tandem switching centers.

In Fig. 2 the subscribers' lines, such as 2–L–1 and 2–L–2, are terminated in local central office 2–LCO which comprises suitable switching means, controlled by calling subscriber dialing, for extending a connection via an outgoing trunk, such as 2–OGT–1, or 2–OGT–2, to a desired called subscriber through a distant central office or offices. Subscriber line 2–L–1 is a two-party line serving subscribers' stations 2–ST and 2–SR. Subscriber line 2–L–2 is a private line serving subscriber's station 2–PL. The local central office 2–LCO serves a plurality of subscriber lines some of which may be multiparty lines, such as 2–L–1 and some of which may be private lines, such as 2–L–2. Each of the sleeve conductors, such as 2–SLV–1 and 2–SLV–2, of all of the subscriber lines is connected to its respective segment of line scanner 2–LS, and through the wiper arm 2–WA and conductor 2–C to the line scanner-detector and digit party field connector 2–LSD.

The magnetic-drum translator 2–MDT comprises a plurality of discrete areas or slots, each slot having prerecorded therein one or more sets of items of information, each of said slots being fixedly related to one of line scanner segments and, therefore, to the subscriber line having its sleeve conductor connected to said segment. Each of said sets of items of information in a given slot comprises data respectively pertinent to the "Tip" or "Ring" party of a calling subscriber line and indicative of the central office in which said calling subscriber line is located, and the directory number of said calling subscriber.

Let it be assumed, for example, that a number has been dialed at subscriber's station 2–ST resulting in the extension of a connection to a called subscriber via outgoing trunk 2–OGT–1. When the outgoing trunk circuit is seized, the equipment in the outgoing trunk circuit 2–OGT–1 functions to apply a potential condition to its sleeve conductor 2–S–1, through the switching equipment in local central office 2–LCO, through sleeve conductor 2–SLV–1 of subscriber line 2–L–1, through line scanner 2–LS, wiper arm 2–WA and conductor 2–C to initiate the operation of line scanner-detector 2–LSD with respect to subscriber line 2–L–1. At the same time, the outgoing trunk circuit 2–OGT–1 also applies a potential condition to the trunk preference lockout and transfer circuit 2–TPL which, under control of a mutually exclusive arrangement of identifier lockout circuits 2–LOA and 2–LOB, requests the services of identifier control 2–ICA or 2–ICB. After it has been determined whether identifier control 2–ICA or 2–ICB is to be used, the outgoing trunk circuit 2–OGT–1 causes a connection to be extended therefrom, through the trunk preference lockout circuit of 2–TPL, via path 2–PPTA or 2–PPTB to the party test circuit 2–PTA or 2–PTB, respectively, to determine whether the call was originated by the "Tip" party or the "Ring" party of the subscriber line.

The line scanner-detector at 2–LSD recognizes the presence of a bona fide call on the subscriber line 2–L–1 with which sleeve conductor 2–SLV–1 is associated and causes the digit walking circuits 2–DWA and 2–DWB, and the digit reader circuits 2–DRA and 2–DRB to be connected to the magnetic-drum translator 2–MDT. When the identifier control 2–ICA has been preferred, under control of the trunk preference lockout and transfer 2–TPL, the digit walking circuit 2–DWA controls digit translator circuit 2–DTA and digit outpulsing 2–DOPA to progressively read the items of information from the magnetic-drum translator 2–MDT, a digit at a time, and to transmit, by multifrequency pulsing, the output of the digit outpulsing circuit 2–DOPA, via path 2–PDOPA, through trunk preference lockout and transfer 2–TPL, to the outgoing trunk circuit 2–OGT–1, and thence to a distant office. If the identifier 2–ICB is preferred, the digit walking circuit 2–DWB controls digit translator circuit 2–DTB and digit outpulsing circuit 2–DOPB to progressively read the items of information from the magnetic-drum translator 2–MDT, a digit at a time, and to transmit the output of the digit outpulsing circuit 2–DOPB by multifrequency pulsing via path 2–PDOPB, through a trunk preference lockout and transfer 2-TPL, to the outgoing trunk circuit 2-OGT-1, and thence to a distant office.

In Fig. 3, the groups of subscriber lines designated 3-LGF, 3-LGI and 3-LGL, respectively, represent a first, an intermediate, and a last group of a plurality of groups of subscriber lines some or all of which may be multiparty lines. One or more of said groups of subscriber lines may be served by the same local central office or, alternatively, each of said groups of subscriber lines may be served by a different local central office. Each such group of subscriber lines may consist of a maximum of 1000 subscriber lines. From each such group the sleeve conductor of each subscriber line is connected to its respective segment on the line scanner 3-LSF, 3-LSI or 3-LSL which is respectively associated with said group of subscriber lines. The sleeve conductors from groups 3-LGF, 3-LGI and 3-LGL are respectively designated SF-000 to SF-999, SI-000 to SI-999 and SL-000 to SL-999.

When a call originated by a subscriber connected to a subscriber line in group 3-LGF, 3-LGI or 3-LGL is connected to outgoing trunk 3-OGTF, 3-OGTI or 3-OGTL, a potential condition, evidencing the completion of a connection to a trunk, supplied by the outgoing trunk circuit 3-OGTF, 3-OGTI or 3-OGTL, appears on the sleeve conductor of the subscriber line on which said call originated. Said potential condition on said sleeve conductor in group 3-LGF, 3-LGI or 3-LGL is transmitted via the line scanner 3-LSF, 3-LSI or 3-LSL respectively associated with said line group, to the respective line scanner-detector 3-LSDF, 3-LSDI or 3-LSDL which recognizes the existence of a bona fide call on the subscriber line associated with said sleeve conductor. At the same time, the outgoing trunk circuit 3-OGTF, 3-OGTI or 3-OGTL employed in completing the call applies a potential condition via its respective "start" path 3-STF, 3-STI or 3-STL, through the trunk preference lockout transfer circuit 3-TPLT, via path 3-ABF, 3-ABI or 3-ABL, respectively, to the trunk preference lockout section 3-TPLF, 3-TPLI or 3-TPLL respectively associated with the one of the said outgoing trunk circuits employed in completing the call, thus requesting the services of identifier control 3-ICA or 3-ICB. When one of the outgoing trunks 3-OGTF, 3-OGTI or 3-OGTL has been seized for service, the respective trunk preference lockout section 3-TPLF, 3-TPLI or 3-TPLL completes a chain connection to the various components of identifier control 3-ICA or 3-ICB. Identifier lockout circuits 3-ILA and 3-ILB are connected in a mutually exclusive arrangement whereby identifier control 3-ICA is normally preferred for service. At this time, the outgoing trunk circuit 3-OGTF, 3-OGTI or 3-OGTL completes a circuit via path 3-CPF, 3-CPI or 3-CPL, respectively, through the trunk preference lockout sections, via path 3-PTCA or 3-PTCB to the party test circuit 3-PTA or 3-PTB, respectively, thus indicating to the identifier control 3-ICA or 3-ICB whether the call was originated by the "Tip" or the "Ring" party connected to the calling subscriber line.

When the existence of a bona fide call has been recognized by line scanner-detector 3-LSDF, 3-LSDI or 3-LSDL, a potential condition is extended thereby, via path 3-LS, simultaneously to the digit readers 3-DRA and 3-DRB, one of which is employed in identifying the calling subscriber as determined by the preference lockout circuits. At the same time, a chain circuit arrangement in line scanner-detectors 3-LSDF, 3-LSDI and 3-LSDL also extends a potential condition, via path 3-CK, simultaneously to the digit readers 3-DRA and 3-DRB for preventing the operation of the digit readers in the event that two or more of the line scanner-detectors should simultaneously recognize the existence of a bona fide call. A potential condition indicative of whether the call was originated by the "Tip" or the "Ring" party is extended from the party test circuit 3-PTA or 3-PTB via path 3-TR, through the line scanner-detector 3-LSDF, 3-LSDI or 3-LSDL, via path 3-FCF, 3-FCI or 3-FCL, respectively, to the digit and party field connector 3-DPFCF, 3-DPFCI or 3-DPFCL, respectively.

When the existence of a bona fide call has been recognized by the line scanner-detector 3-LSDF, 3-LSDI or 3-LSDL, after the identifier lockout circuits have determined which of the identifier controls 3-ICA or 3-ICB is to be used, and after the party test circuit 3-PTA or 3-PTB has determined whether the call was originated by a "Tip" or "Ring" subscriber, the digit walking circuit 3-DWA or 3-DWB transmits control signals, via control path 3-DWC, to the digit and party field connectors 3-DPFCF, 3-DPFCI and 3-DPFCL causing the prerecorded item of information in the magnetic-drum translator 3-MDTF, 3-MDTI or 3-MDTL to be read and transmitted via path 3-DOF, 3-DOI or 3-DOL, respectively, through the digit and party field connector circuit 3-DPFCF, 3-DPFCI or 3-DPFCL, respectively, via path 3-DRI to the input of digit reader circuits 3-DRA and 3-DRB.

The digit reader circuit 3-DRA or 3-DRB, respectively under the control of the digit walking circuit 3-DWA or 3-DWB via path 3-DRCA or 3-DRCB respectively, reads the information prerecorded in the magnetic drum in two-out-of-five code and translates it into a decimal code which is transmitted, via path 3-DTIA or 3-DTIB, respectively, to the digit translator 3-DTA or 3-DTB respectively associated therewith.

The digit translator circuit 3-DTA or 3-DTB, respectively under the control of the digit walking circuit 3-DWA or 3-DWB via path 3-DTCA or 3-DTCB, respectively, translates the decimal code input thereto into multifrequency pulses which are transmitted, via path 3-OPIA or 3-OPIB, respectively, to the outpulsing relay circuit 3-OPRA or 3-OPRB, respectively associated therewith.

The outpulsing relay circuit 3-OPRA or 3-OPRB, respectively under the control of the digit walking circuit 3-DWA or 3-DWB via path 3-OPCA or 3-OPCB, respectively, applies the multifrequency pulses, via path 3-MFPA or 3-MFPB, respectively, to the trunk preference lockout sections 3-TPLF or 3-TPLL, respectively, and through a chain circuit arrangement therein to the particular outgoing trunk 3-OGTF, 3-OGTI or 3-OGTL, by means of which the connection has been completed, and through which the multifrequency pulses are transmitted to a distant office.

In Fig. 4 is shown a portion of the developed surface of the drum of a typical magnetic-drum translator such as indicated in Figs. 1, 2 and 3, and also shown in greater structural detail in Fig. 5.

The drum comprises a cylinder of magnetic material in which the magnetic condition impressed therein persists until changed by other magnetic fields. The drum is rotatably supported on a shaft as shown in Fig. 5. The surface of the drum is angularly divided into 1000 elongated "slots" or strips each of which is parallel to the axis of the drum and may be respectively related to a particular one of a large plurality of subscriber lines, some or all of which may be multiparty lines. The drum is further divided into circumferential strips or annular bands or "channels." The drum surface area defined by the superposition of a slot and a circumferential strip is called an "elemental area" or cell. A slot, therefore, comprises a plurality of elemental areas or cells disposed substantially parallel (in the example disclosed in Fig. 4) to the axis of the drum. That plurality of elemental areas or cells lying wtihin the same annular band is called a channel.

In Fig. 4 is shown a diagrammatical representation of that part of the drum shown in the right-hand portion of Fig. 5 designated "identification." For illustrative purposes, only three of the slots 4–L–1, 4–L–2 and 4–LB are shown. A plurality of heads 4–HOT–0 to 4–HCL–7, inclusive, are shown, each head comprising a winding on a ferromagnetic core structure located adjacent the periphery of the magnetic drum. One reader head is provided for each channel and is employed to respond to the magnetic field or condition of the elemental areas of the channel successively passing in proximity to said head. The drum is organized into a tip party field section, a ring party field section, and a class section, each section consisting of a sufficient number of channels for the information prerecorded therein.

In the tip party field section each slot, if the tip part of the subscriber line respectively related thereto is equipped, has prerecorded therein the office, thousands, hundreds, tens and units digits, respectively expressive of the identity of the office in which the tip party's subscriber line is located, and of the thousands, hundreds, tens and units digits of the directory number of said calling tip subscriber.

Similarly, in the ring party field section each slot, if the ring party of the subscriber line respectively related thereto is equipped, has prerecorded therein the office, thousands, hundreds, tens and units digits, respectively expressive of the identity of the office in which the ring party's subscriber line is located, and of the thousands, hundreds, tens and units digits of the directory number of said calling ring subscriber.

In the class section each slot, if the subscriber line respectively related thereto is equipped, has a single digit number prerecorded therein expressive of the class of said calling subscriber line.

The slot 4–L–1 is illustrative of a condition where both the tip and the ring parties of a subscriber line are equipped. The slot 4–L–2 is illustrative of a condition where only the tip party of a subscriber line is equipped. The slot 4–LB is blank and is illustrative of a condition where the slot has no equipped subscriber line related thereto.

The shaded portions in slots 4–L–1 and 4–L–2 are representative of those elemental areas of the drum the magnetic state of which has been conditioned by prerecorded information signals so as to be productive of a flux change in the magnetic cores of the respectively related reading heads as the drum is rotated, and to induce a voltage across the windings of said cores. It will be noted that each digital subdivision of the drum consists of five elemental areas. In each digital subdivision two elemental areas are shown shaded. Each pair of shaded elemental areas in each digital subdivision is respectively representative of a number prerecorded therein in a two-out-of-five code. In the example shown, the shaded areas 4–EA–0 and 4–EA–2 are representative of the number 2 prerecorded in the office digit of the tip party fields.

When it has been established that a bona fide call is in progress, the line scanner-detector 4–LSD completes an operating circuit for connector relay 4–LS via path 4–LSO.

If, as a result of the operation of the party test circuits 4–PT, it has been ascertained that the call was originated by the tip party, an operating circuit, via path 4–TP, is closed for the tip party field connector relay 4–TPFC. At the same time, the digit walking circuit 4–DW will successively complete opertaing circuits via paths 4–OO, 4–THO, 4–HO, 4–TO and 4–UO for the digit field connector relays 4–OFF, 4–TH, 4–H, 4–T and 4–U, respectively.

In the tip party field section, the magnetic state of the elemental areas, for example, 4–EA–0 and 4–EA–2, respectively, cause a voltage to be induced in the windings of reading heads 4–HOT–0 and 4–HOT–2, and respectively transmitted via conductors 4–OT–0 and 4–OT–2, cables 4–OT and 4–T, respectively, through contacts of relay 4–OFF, respectively via conductors 4–TP–0 and 4–TP–2, respectively through contacts of relay 4–TPFC, respectively via conductors 4–0 and 4–2, respectively through contacts of relay 4–LS, and via cable 4–DI to the input of digit reader 4–DR. The magnetic state of other pairs of elemental areas in the thousands, hundreds, tens or units digits of the tip party field selection of the drum, in a similar manner, cause a voltage to be induced in the windings of their respective reading heads, and respectively transmitted via cable 4–THT, 4–HT, 4–TT or 4–UT, and via cable 4–T, through the contacts of relay 4–OFF, 4–TH, 4–H, 4–T or 4–U, through the contacts of relay 4–TPFC, via conductors 4–0 to 4–7, through the contacts of relay 4–LS, and via cable 4–DI to the input of digit reader 4–DR.

If, as a result of the operation of the party test circuits 4–PT, it has been ascertained that the call was originated by the ring party, an operating circuit, via path 4–RP, is closed for the ring party field connector relay 4–RPFC. The digit walking circuit 4–DW will function as previously described.

In the ring party field section the magnetic states of pairs of elemental areas, in a similar manner to that described for the tip party field, cause a voltage to be induced in the windings of their respective reading heads, and respectively transmitted via cable 4–OR, 4–THR, 4–HR, 4–TR or 4–UR, and via cable 4–R, through contacts of relay 4–OFF, 4–TH, 4–H, 4–T or 4–U; through contacts of relay 4–RPFC, via conductors 4–0 to 4–7, through contacts of relay 4–LS and via cable 4–DI to the input of digit reader 4–DR.

In the class section of the drum the magnetic states of pairs of elemental areas, in a similar manner to that above described, cause a voltage to be induced in the windings of their respective reading heads, and transmitted, via cable 4–CL, through contacts of relay 4–CLFC, via conductors 4–0 to 4–7, through contacts of relay 4–LS, and via cable 4–DI to the input of digit reader 4–DR.

Thus, the several digits prerecorded in the tip party field or the ring party field, together with the prerecorded class digit, are successively and progressively read by the digit reader in a routine sequence set up by the control circuits.

To further facilitate the understanding of the functioning of the identifier circuits reference is made to Fig. 4 wherein a portion of the developed surface of the magnetic drum is shown, consisting of three slots 4–L–1, 4–L–2 and 4–LB, respectively.

Slot 4–L–1 is assumed, for example, to be associated with a two-party subscriber line such as line 2–L–1 shown in Fig. 2. Slot 4–L–2 is assumed, for example, to be associated with a single party or private line such as line 2–L–2 shown in Fig. 2. Slot 4–LB is assumed to be unused or blank and not associated with any equipped subscriber line.

The tip and ring party field sections of slot 4–L–1 are respectively associated with tip and ring subscriber stations such, for example, as stations 2–ST and 2–SR, respectively, connected to subscriber line 2–L–1 in Fig. 2.

The tip party field section of slot 4–L–2 is associated with a private line subscriber such, for example, as 2–PL connected to line 2–L–2 in Fig. 2. The ring party field section of slot 4–L–2 is unused or blank because there is only one party (the tip party) connected to line 2–L–2.

The class sections of slots 4–L–1 and 4–L–2 are respectively associated with subscriber lines 2–L–1 and 2–PL and contain information respectively indicative of the service contract category of said associated subscriber lines.

Each slot corresponding to an equipped line, therefore, contains one or more sets of digital information plus a class digit. Each set of information consists of the office, thousands, hundreds, tens and units digits, respectively identifying the office in which the calling subscriber line is located, and the thousands, hundreds, tens and units digits of the directory number of the subscriber station connected to said subscriber line.

The tip party subscriber station connected to the two-party subscriber line associated with slot 4–L–1 is identified, for example, by office code 2, by directory number 2221, and by class index No. 2. The ring party subscriber station also connected to the two-party subscriber line associated with slot 4–L–1 is identified, for example, by office code 2, by directory No. 2222, and by class index No. 2. The class index number is the same for the tip and ring parties because both are connected to the same subscriber line and therefore have the same class of service. The private line subscriber station connected to the private subscriber line associated with slot 4–L–2 is identified, for example, by office code 2, by directory No. 2223, and by class index No. 1. The office code number is the same in all of the above-described examples because it is assumed that all of the subscriber lines are located in the same office. The exemplary digital values assumed in the foregoing description are merely chosen as typical illustrations and are not intended to imply any such limitation in the practice of the invention.

The office code digit and the directory number thousands, hundreds, tens and units digits pertinent to the identification of the tip or ring party, and the accompanying class digit, prerecorded in the magnetic drum in two-out-of-five code, are successively read out a digit at a time, via the digit and party field connector relay contacts as previously described, into the digit reader circuits 4–DR. The party test circuits 4–PT, having ascertained, as previously described, whether the call was originated by the tip or ring party, operates either relay 4–TPFC or 4–RPFC accordingly to cause the information to be read out respectively from the tip or ring party field of the drum.

Referring now to Fig. 3, the information received by the digit reader circuit 3–DRA or 3–DRB in two-out-of-five code is converted therein to a decimal code output which is respectively transmitted to digit translator 3–DTA or 3–DTB. The decimal code input to digit translator 3–DTA or 3–DTB is translated therein to multifrequency pulses which are respectively transmitted to outpulsing relay circuit 3–OPRA or 3–OPRB. The outpulsing relay circuit 3–OPRA or 3–OPRB transmits the multifrequency output pulses, respectively via paths 3–MFPA or 3–MFPB, through the appropriate section of the trunk preference lockout circuit to the outgoing trunk circuit associated therewith, and thence to the distant switching point, such as the tandem office shown in Fig. 1.

The office code digit and the directory number thousands, hundreds, tens and units digits are employed at the distant office to establish the identification of the subscriber who originated and who is to be billed for a particular call. The class digit is indicative of the service contract category of the calling subscriber and is determinative of the rate to be employed in computing the toll service charge for a given completed call.

DETAILED DESCRIPTION OF OPERATION

*Origination of call and seizure of outgoing trunk to tandem office*

Referring now to the complete detailed schematic drawings of the exemplary disclosure of the system as shown on Figs. 5 to 15, inclusive, a call will be described in full detail, to explain the operation of the circuits.

Let it be assumed that the tip party 5–ST has originated a call by removal of his telephone from its cradle. The calling line 5–L–1 is extended by the operation of primary line link 5–2, secondary line link 5–3, relays 5–T and 5–OT and sender link 5–4, to a subscriber's sender 5–5 in the usual manner. After receiving dial tone, the calling party 5–ST dials the office code and directory number of the station with which connection is desired. The subscriber's sender 5–5 registers the office code and number dialed and, with the assistance of a marker (not shown), causes the operation of primary district link 5–6, secondary district link 5–7, primary office link 5–8, and secondary office link 5–9 in the well-known manner to select an outgoing trunk, in this case trunk 5–10 (shown in detail in Fig. 7), which terminates at the tandem office.

*Transmission of called line number to tandem office*

The subscriber's sender 5–5, when it has tested the trunk 5–10 and found it idle, joins, in a manner not shown, tip conductor 5–51 to ring conductor 5–52 thereby completing a circuit extending from battery in the tandem office incoming trunk circuit through conductor 7–54, the lower winding of polarized relay 7–HP, conductor 7–R, lower No. 2 back contacts of relay 7–SP, conductor 5–56 extended through secondary office link 5–9, primary office link 5–8, secondary district link 5–7, and primary district link 5–6, conductor 5–52 extended through sender link 5–4 and joined to conductor 5–51 in subscriber's sender 5–5; conductor 5–51 extended through primary district link 5–6, secondary district link 5–7, primary office link 5–8, secondary office link 5–9, conductor 5–55, upper No. 1 back contacts of relay 7–SP, conductor 7–T, upper winding of polarized relay 7–HP and conductor 7–53 to ground in the tandem office incoming trunk circuit. When subscriber sender 5–5 has completed the sending of the called line number to the tandem sender at the distant central office, it sends a heavy positive pulse over the tip conductor 5–51 which operates polarized relay 7–HP to its left contact. For a description of the construction and operation of the tandem office incoming trunk and the circuits cooperative therewith, reference may be had to Patent No. 2,531,637, granted to C. G. Miller on November 28, 1950. For a description of the construction and operation of the sender link and controller, reference may be had to Patent No. 2,224,251, granted to A. J. Busch et al. on December 10, 1940. Ground is extended through the contacts of relay 5–SR, conductor 5–118, primary district link 5–6, secondary district link 5–7, primary office link 5–8, secondary office link 5–9, sleeve conductor 5–SL, No. 8 and No. 9 continuity contacts of relay 7–IC, conductor 7–SLE, the left hand contacts of polarized relay 7–HP and the winding of relay 7–HPR to battery, causing relay 7–HPR to operate and lock to ground on extended sleeve conductor 7–SLE through its upper contacts, thus registering the indication that the heavy positive pulse has been transmitted.

*Operation of trunk splitting relay*

When polarized relay 7–HP releases (to its right hand contact) at the end of the heavy positive pulse, ground on extended sleeve conductor 7–SLE is extended through the right-hand contacts of relay 7–HP, lower contacts of relay 7–HPR, conductor 7–60 and winding of splitting relay 7–SP to battery, causing relay 7–SP to operate and lock to ground on extended sleeve conductor 7–SLE through it lower No. 1 contacts. The operation of relay 7–SP splits the connection so that tip conductor 5–55 and ring conductor 5–56 from the originating end of the connection are disconnected from the path extended via the windings of polarized relay 7–HP to the incoming tandem trunk circuit. The tip conductor 5–55 is connected through the upper No. 1 front contacts of relay 7–SP, the upper No. 2 back contacts of relay 7–IC, the upper left-hand winding of repeating coil 7–RC and the upper winding of supervisory relay 7–A to negative battery. The ring conductor 5–56 is connected through the lower No. 2 front contacts of relay 7–SP, the lower No. 2 back contacts of relay 7–IC, the lower left-hand winding of repeating coil 7–RC and the lower winding of supervisory relay 7–A to ground. The circuit completed between the tip and ring conductors 5–55 and 5–56, respectively, via the subscriber set 5–ST, subscriber line 5–L–1 and the switching train causes the operation of supervisory relay 7–A. When relay 7–SP operates, the outgoing trunk tip conductor 7–53 is connected through the upper winding of polarized relay 7–HP, conductor 7–T, the upper No. 2 contacts of relay 7–SP, conductor 7–T2, the lower No. 4 back contacts of relay 7–IC and to the lower right-hand winding of repeating coil 7–RC; also the outgoing trunk ring condutor 7–54 is connected through the lower winding of polarized relay 7–HP, conductor 7–R, the lower No. 3 front contacts of relay 7–SP, conductor 7–R2, the upper No. 3 back contacts of relay 7–IC and to the upper right-hand winding of repeating coil 7–RC. The inner ends of the right-hand windings of repeating coil 7–RC are connected to each other through capacitor 7–C1. Relay 7–A, in operating, extends ground through its contacts and through the winding of slow-release relay 7–A1 to battery, causing it to operate. When relay 7–A1 operates, resistor 7–R4 is connected through the No. 4 contacts of slow-releasing relay 7–A1, to place a direct current shunt across capacitor 7–C1, thereby providing a circuit for holding the tandem trunk over momentary flashes by the calling subscriber; also ground is connected through the lower No. 1 contacts of relay 7–A1 to extended sleeve conductor 7–SLE as a local source of locking ground for relays 7–SP and 7–HPR, in lieu of the ground extended from the originating central office via sleeve conductor 5–SL.

*Operation of trunk preference lockout circuit by seized outgoing trunk*

When relay 7–A1 operates, battery through resistor 7–R3 is extended through conductor 7–61, lower No. 2 contacts of relay 7–A1, conductor 7–62, lower No. 1 back contacts of relay 7–ICR, conductor 7–STI into Fig. 9, No. 2 front contacts (relay 9–STA normally operated as shown) of relay 9–STA in trunk preference lockout transfer circuit, conductor 9–ISA, the winding of relay 9–TPAI (in the intermediate section of trunk preference lockout circuit), conductor 9–1 (and intervening sections of the trunk preference lockout circuit) and through lower continuity contacts No. 3 and No. 2 of relay 9–TPAL (in the last section of trunk preference lockout circuit) to ground. Relay 9–TPAI operates and locks to ground through its lower No. 1 and No. 2 contacts. Relay 9–TPAI, in operating, removes ground from its lower No. 3 contact spring, thus removing ground from conductor 9–2 and disabling the operating circuit for all preference relays to the left, such as relay 9–TPAF.

The outgoing trunk circuit 7–OGTI is an intermediate one of a plurality of such trunks extending to other central offices. Outgoing trunks 7–OGTF and 7–OGTL respectively are diagrammatically representative of the first and last of a group of trunks, and may be structurally identical with outgoing trunk circuit 7–OGTI. The rectangle 7–TSS is diagrammatically representative of a telephone switching system of a known type in which outgoing trunk 7–OGTI is terminated.

*The A and B identifier control circuits*

Two alternatively usable identifier control circuits, respectively designated A and B, are provided in each local central office building. Each identifier control circuit comprises a digit walking circuit, a digit reader, a digit translator, outpulsing relays, a party test circuit, and a lockout circuit, shown respectively in Figs. 10, 11, 12, 13, 14 and 15. Battery extended via conductor 7–STI (or conductor 7–STF or 7–STL) initiates the selection of the working identifier control circuit to be associated with the trunk on a preference lockout basis among the other outgoing trunks arranged for this service.

The trunk preference lockout circuit comprises a plurality of sections, one section for each trunk of a plurality of outgoing trunks to tandem. Each section consists of two relays such, for example, as 9–TPAI and 9–TPBI for the intermediate section. Relay 9–TPAI is operable when the "A" identifier control circuit is to be used and, alternatively, relay 9–TPBI is operable when the "B" identifier control circuit is to be used in the identification of a calling subscriber. When an outgoing trunk (7–OGTI for example) is seized for service, the conductors (7–TI, 7–RI, 7–CI, 7–FTI and 7–FRI in cable 7–TKI, for example) are connected through the trunk preference lockout circuit, under control of the identifier lockout circuits, to the various components of the identifier control circuit.

The identifier lockout circuits 15–ILA and 15–ILB respectively control the order of preference for the use of identifier control circuits A or B. The idenifier lockout circuits 15–ILA and 15–ILB are interconnected in a mutually exclusive circuit arrangement which precludes their simultaneous effectuation and also conditions the circuits to cause the "A" identifier control circuits to be normally preferred for use. Identifier lockout circuit 15–ILA monitors over the use of the normally preferred "A" identifier control circuits so that, if more than a predetermined time interval elapses in securing an identification requested by a trunk, the preference is transferred to the "B" identifier control circuits. In identifier lockout circuit 15–ILA, slow-operating timing start relay 15–TMSA is normally held operated from battery through its winding, conductor 9–TMSCA into Fig. 9, a chain circuit comprising the lower No. 3 and No. 2 contacts of relay 9–TPAF, conductor 9–2 (and intervening sections of trunk preference lockout circuit), the lower No. 3 and No. 2 contacts of relay 9–TPAI, conductor 9–1 (and intervening sections of trunk preference lockout circuit), and the lower No. 3 and No. 2 contacts of relay 9–TPAL to ground. Similarly, in identifier lockout circuit 15–ILB, slow-operating start relay 15–TSMB is normally held operated from battery through its winding, conductor 9–TMSCB into Fig. 9, a chain circuit comprising the lower No. 3 and No. 2 contacts of relay 9–TPBL, conductor 9–3 (and intervening sections of trunk preference lockout circuit), the lower No. 3 and No. 2 contacts of relay 9–TPBI, conductor 9–4 (and intervening sections of trunk preference lockout circuit), and the lower No. 3 and No. 2 contacts of relay 9–TPBF to ground. In identifier lockout circuit 15–ILA, preference control relay 15–LSTA is normally held operated from battery through its winding, the lower No. 1 contacts of relay 15–TMEA, the upper No. 2 contacts of relay 15–LSTB, and the back contacts of relay 15–XTA to ground. In identifier lockout circuit 15–ILB, preference control relay 15–LSTB is normally deenergized, its operating circuit being open at the upper No. 2, contacts of normally operated preference control relay 15–LSTA.

Ground, extended through the upper No. 1 closed contacts of normally operated preference control relay 15–LSTA, via conductor 15–5 into Fig. 9 and through the winding of relay 9–STA to battery, holds relay 9–STA normally operated, thus conditioning the circuits for the preferential connection of the trunk circuits to the "A" identifier control circuits. The "A" and "B" identifiers are in control of circuits to their respective trunk preference lockout chain circuits and through the activated section thereof to the trunk circuit which has been seized for service. The trunk preference chains respectively connected to the "A" and "B" identifier control circuits are in reverse directions so that trouble in one section of a chain due to a trouble condition in the associated trunk circuit will not prevent any other trunk from being served by either the "A" or the "B" identifier control circuit.

*Start of timing cycle in lockout circuit of identifier control A*

Relay 9–TPAI, in operating, in addition to disabling the operating circuit for relay 9–TPAF, also opens the circuit over which timing start relay 15–TMSA is held normally operated. Relay 15–TMSA releases and at its lower front contacts breaks the circuit for resistor 15–RA which shunted capacitor 15–CA. Relay 15–TMSA, when released, completes a circuit from positive battery through resistor 15–R1A, capacitor 15–CA, back contacts of relay 15–TMSA and winding of relay 15–TMEA to negative battery, in which circuit capacitor 15–CA starts to charge. Relay 15–TMEA does not operate immediately because of the 500 millisecond delay inherent in the circuit constants of tube timer circuit 15–TTA. The function of relay 15–TMEA and its chronological relationship to the operation of other components of the identifier control circuits will later be discussed in detail.

*Start of party test cycle*

Relay 9–TPAI, in operating, also completes a circuit whereby "test" ground is extended through the upper No. 1 back contacts of relay 7–IC, conductor 7–TI, cable 7–TKI to Fig. 9, conductor 7–TI, upper No. 5 front contacts of relay 9–TPAI, conductor 9–T1 (and intervening sections of trunk preference lockout circuit), upper No. 5 back contacts of relay 9–TPAF, conductor 9T2A, cable 9–ICA to Fig. 14, conductor 9–T2A, and the winding of relay 14–TC to battery causing it to operate.

The operation of relay 14–TC, in the "A" party test identifier circuit, initiates an operating cycle whereby a test is made to ascertain, for call charging purposes, whether the call was originated by the "tip" or the "ring" subscriber line. A test is also made to check the reliability of the contacts involved in gaining access to the calling subscriber line conductors. A further test is made to check the reliability of the relay making the party test.

*Operation of off-normal relay and preparation of "A" identifier control circuits*

Relay 14–TC, in operating, extends ground through its upper No. 1 front contacts, conductor 14–ONG3A, cable 14–ONCA to Fig. 13, conductor 14–ONG3A, right-hand contacts of polarized relay 13–PG, through the winding of relay 13–PG1 to battery. The polarized relay 13–PG, of the outpulsing relay circuit of the "A" identifier, is of the "stay-put" type, and is or should be in the condition where its armature is in contact with its right-hand contact, in which condition it remained at the conclusion of the preceding operating cycle. Prior to the seizure of the identifier by a trunk circuit, ground is not present on conductors 14–ONG2, 14–ONG3A, 14–ON1A or 14–ONG1, and all of the non-polarized relays of the outpulsing relay circuit are in an unoperated condition, during which condition the conductor 12–R of the outpulsing circuit is open at the No. 4 contacts of relay 13–PGW. When the trunk circuit seizes the identifier, ground is extended over conductor 14–ONG3A through the above described circuit, causing relay 13–PG1 to operate.

When relay 13–PG1 operates, off-normal ground on conductor 14–ONG3A is extended through the upper contacts of relay 13–PG1, the upper No. 3 and No. 2 continuity contacts and the winding of relay 13–PGW, and the resistor 13–RW to battery, causing relay 13–PGW to operate and to lock to off-normal ground on conductor 14–ONG3A through its No. 1 and No. 2 continuity contacts. Off-normal ground on conductor 14–ONG3A extends through the upper contacts of relay 13–PG1 and over the lower No. 1 and No. 2 transfer contacts of relay 13–PGZ to short-circuit resistor 13–RZ at the right-hand end of the winding of relay 13–PGZ, thus preventing relay 13–PGZ from operating at this time.

With relay 13–PGW operated and relay 13–PGZ non-operated, the conductors 12–R and 12–T of the outpulsing circuit are respectively closed through the No. 4 contacts of relay 13–PGW and the No. 7 back contacts of relay 13–PGZ; but, no useful purpose is served thereby at this time because no pulsing information will be available until the drum has completed its second revolution. The first two revolutions of the drum, it will be recalled, are employed to ascertain the validity of the call and also to operate the required connector circuits between the reading heads of the drum and the digit reader circuit. The operation of relay 13–PG1 prepares the outpulsing relay circuit of identifier "A." A circuit is now completed to extend ground through the lower No. 1 front contacts of relay 14–TC, conductor 14–ON1A in cable 14–ONCA, the lower front contacts of relay 13–PG1, conductor 13–ONA in cable 14–ONCA, the upper back contacts of relay 14–PTC and the winding of relay 14–ON to battery. Relay 14–ON operates and locks up over a circuit through its lower No. 1 front contacts, conductor 14–ONPLA in cables 14–PTA and 12–DWAC into Fig. 10, conductor 14–ONPLA, lower No. 5 back contacts of relay 10–DS in parallel with the upper No. 1 back contacts of relay 10–CL in the "A" digit walking circuit, conductor 10–ONLA, cable 12–DWAC to Fig. 12, conductor 10–ONLA to Fig. 15, and the lower front contacts of normally operated relay 15–LSTA in the "A" identifier lockout circuit to ground. Off-normal relay 14–ON remains locked up in the above-described circuit until the completion of a normal operating cycle of the identifier circuits unless released by an emergency release condition which will later be described in detail.

Relay 14–ON, in operating, extends ground through its upper No. 7 front contacts, conductor 14–ONG3A, cable 14–ONCA to Fig. 13, conductor 14–ONG3A, the right-hand contacts of polarized relay 13–PG and the winding of relay 13–PG1 to battery to maintain relay 13–PG1 in its operated condition independently of the ground from the upper No. 1 contacts of relay 14–TC.

When off-normal relay 14–ON operates, off-normal ground is extended through the upper No. 5 contacts of relay 14–ON, conductor 14–ONG1, cable 14–ONCA into Fig. 13, conductor 14–ONG1, resistors 13–HR1 and 13–HR2 to negative battery. Off-normal ground on conductor 14–ONG1 is also extended through the No. 2 and No. 1 contacts of relay 13–SP to the mid-point of the series-connected upper and lower windings of polarized relay 13–PG. The ground applied to the mid-point of the series-connected windings of polarized relay 13–PG causes the charge, if any remains, in capacitor 13–PC to be discharged to ground through the upper winding of polarized relay 13–PG. Current also flows through the lower winding of polarized relay 13–PG due to the potential from the mid-point of series-connected resistors 13–HR1 and 13–HR2 (both of which are of high resistance). The currents flowing through the upper and lower windings of polarized relay 13–PG produce magnetic fluxes which are additive, and if the armature of polarized relay 13–PG is not in its right-hand position it will be driven thereto when capacitor 13–PC discharges.

The operation of off-normal relay 14–ON closes a plurality of other contacts which enable a plurality of circuit operations to be performed. The sequence of these circuit operations is dependent upon whether the call was originated by a "tip" or a "ring" subscriber and also whether or not a trouble condition is encountered during the operating cycle of the circuits.

*Start timing cycle for party test of "A" identifier control*

Relay 14–ON, in operating, breaks the circuit from the upper plate of capacitor 14–C1A, through resistor 14–R1A, the lower No. 2 back contacts of relay 14–ON, the lower No. 1 back contacts of relay 14–PTC, conductor 14–5 to the lower plate of capacitor 14–C1A, thus removing the shunt across capacitor 14–C1A. Relay 14–ON, in operating, completes a circuit from positive battery through resistor 14–R3A, capacitor 14–C1A, conductor 14–5, lower No. 1 back contacts of relay 14–PTC, lower No. 2 front contacts of relay 14–ON, and the winding of relay 14–PTT to ground, in which circuit capacitor 14–C1A starts to charge. Relay 14–PTT does not operate immediately because of the 100 millisecond delay inherent in the circuit constants of tube timer circuit 14–PTTA. After the passage of the 100 millisecond delay interval, the charge on capacitor 14–C1A, in the tube timer circuit 14–PTTA, will have attained a potential large enough to fire tube 14–TA, which will then become sufficiently conductive to operate relay 14–PTT in series therewith. The operation of relay 14–PTT indicates the end of the 100 millisecond time interval allocated for completing the party identification, that is to say, for ascertaining whether the call was originated by the "tip" or the "ring" subscriber's station.

Relay 14–ON, in operating, momentarily extends ground through its upper No. 2 contacts, conductor 14–1, the lower No. 3 contacts of relays 14–R and 14–T in parallel, conductor 9–C2A, the lower No. 2 contact of relay 14–PTC, the lower No. 3 contacts of relay 14–ON, conductor 14–APT, cables 14–PTA and 12–DWAC into Fig. 10, conductor 14–APT, the lower No. 3 and No. 2 continuity contacts and winding of relay 10–A to battery. Relay 10–A operates and locks-up to ground through its lower No. 2 and No. 1 contacts, the lower No. 2 and No. 3 contacts of relay 10–B to off-normal ground on conductor 14–ONGA. When relay 10–A operates, ground is extended through the upper No. 4 contacts of relay 10–A, conductor 10–AT, cables 10–DTA and 12–DWAC to Fig. 12, conductor 10–AT, and through the winding of relay 12–AT to battery, causing relay 12–AT to operate. The operation of relay 10–A thus prepares the "A" digit walking circuit to take the first step in identifying the number of the calling subscriber station.

*Extension of connections from calling subscriber's station to "A" party test circuit*

Relay 14–ON, in operating, extends ground through its upper No. 2 front contacts, conductor 14–1, the lower No. 3 back contacts of relays 14–R and 14–T in parallel, conductor 9–C2A, cable 9–ICA into Fig. 9, conductor 9–C2A, upper No. 3 back contacts of relay 9–TPAF, conductor 9–C1 (and intervening sections of trunk preference lockout circuit), upper No. 3 front contacts of relay 9–TPAI, conductor 7–C1, cable 7–TKI in Fig. 7, conductor 7–CI, and through the winding of relay 7–IC to battery, causing it to operate. Relay 7–IC, in operating, breaks its upper No. 2 and No. 3 back contacts and its lower No. 2 and No. 3 back contacts, thus disconnecting the repeating coil 7–RC from the trunk circuit and opening the operating circuit for supervisory relay 7–A, causing it to release. Relay 7–IC, in operating, extends ground through its lower No. 4 front contacts, through the winding of slow-releasing relay 7–AI to hold it in its operated condition. Relay 7–IC, in operating, extends the tip conductor 7–TI and the ring conductor 7–RI respectively through its upper No. 2 front contacts and its lower No. 2 front contacts to conductors 7–TI and 7–RI, respectively, into cable 7–TKI. Relay 7–IC, in operating, also extends the tip conductor 7–T2 and the ring conductor 7–R2 respectively through its lower No. 3 front contacts and its upper No. 3 front contacts to conductors 7–FTI and 7–FRI, respectively, into cable 7-TKI and, at the same time, at its upper No. 1 back contacts, disconnects "test" ground from conductor 7–TI into cable 7–TKI. Relay 7–IC, in operating, completes a circuit by which ground is extended through the No. 3 contacts of slow releasing relay 7–A1, conductor 7–63, the lower No. 7 contacts of relay 7–IC and the winding of slow releasing relay 7–ICR to battery, causing relay 7–ICR to operate and to lock up through its upper contacts to ground on conductor 7–63; also, battery through resistor 7–R3 is now extended over conductor 7–61 and the lower No. 6 contacts of relay 7–IC to conductor 7–STI, thus maintaining battery on conductor 7–STI after relay 7–ICR has opened its No. 1 back contacts.

Relay 7–ICR, in operating, connects ground through its lower No. 2 contacts to extend sleeve conductor 7–SLE.

*Call originated by "Tip" party subscriber's station*

It has been assumed that the call was originated by the tip party subscriber's station 5–ST connected to subscriber line 5–L–1 of Fig. 5. Therefore, ground from the subscriber's station 5–ST is extended via the tip conductor of line 5–L–1, primary line link 5–2, secondary line link 5–3, upper contacts of relays 5–T and 5–OT, primary district link 5–6, secondary district link 5–7, primary office link 5–8, secondary office link 5–9, tip conductor 5–55, cable 5–10 to Fig. 7, upper No. 1 front contacts of relay 7–SP, upper No. 2 front contacts of relay 7–IC, conductor 7–TI, cable 7–TKI to Fig. 9, conductor 7–TI, upper No. 5 front contacts of relay 9–TPAI, conductor 9–TI (and intervening sections of trunk preference lockout circuit), upper No. 5 back contacts of relay 9–TPAF, conductor 9–T2A, cable 9–ICA to Fig. 14, conductor 9–T2A, and the winding of relay 14–TC to battery, causing relay 14–TC to remain operated.

It will be noted that ground on conductor 7–TI (originating at the tip subscriber's station) is also extended (Fig. 7) through the lower No. 1 and No. 2 front contacts of relay 7–IC (strapped together), conductor 7–RI, cable 7–TKI to Fig. 9, conductor 7–RI, the upper No. 4 front contacts of relay 9–TPAI, conductor 9–R1 (and intervening sections of trunk preference lockout circuit), upper No. 4 back contacts of relay 9–TPAF, conductor 9–R2A, cable 9–ICA to Fig. 14, conductor 9–R2A, to the upper (normally open) contacts of relay 14–RC and is ineffective at this time.

*Call originated by "Ring" party subscriber's station*

If, on the other hand, the call were originated by the "ring" party subscriber's station 5–SR, connected to subscriber line 5–L–1 in Fig. 5, there would be no ground on the tip conductor at the subscriber's station and, upon the operation of relay 7–IC, the relay 14–TC would release. The locking ground for relay 14–ON, at its lower No. 1 contacts, would be extended through the upper back contacts of relay 14–PTC, conductor 13–ONA, cable 14–ONCA to Fig. 13, conductor 13–ONA, lower front contacts of relay 13–PG1, conductor 14–ON1A, cable 14–ONCA to Fig. 14, conductor 14–ON1A, lower No. 1 back contacts of relay 14–TC and through the winding of relay 14–RC to battery, causing the latter relay to operate and to lock up through its lower No. 1 front contacts to ground on conductor 14–ONRC, extended thereto through the lower No. 5 front contacts of relay 14–ON from conductor 14–ON1A. Relay 14–RC, in operating, extends its locking ground through its upper contacts, conductor 9–R2A, cable 9–ICA to Fig. 9, conductor 9–R2A, the upper No. 4 back contacts of relay 9–TPAF, conductor 9–R1 (and intervening sections of trunk preference lockout circuit), the upper No. 4 front contacts of relay 9–TPAI, conductor 7–RI, cable 7–TKI to Fig. 7, conductor 7–RI, the lower No. 2 and No. 1 front contacts of relay 7–IC, the upper No. 2 front contacts of relay 7–IC, conductor 7–TI, cable 7–TKI etc., the upper No. 5 front contacts of relay 9–TPAI, conductor 9–T1 (and intervening sections of trunk preference lockout circuit), the upper No. 5 back contacts of relay 9–TPAF, conductor 9–T2A, cable 9–ICA etc., and through the winding of relay 14–TC to battery, causing it to reoperate.

The paths completed by the above-described operations, resulting from a call originated by either a "tip" or a "ring" subscriber, check all of the contacts involved in completing the two-party test.

Again, let it be assumed that the call was originated by the "tip" party 5–ST. With relay 14–PTT operated under control of tube timer circuit 14–PTTA, as previously described, ground is extended through the upper No. 1 contact of relay 14–ON, contacts of relay 14–PTT, the lower No. 2 front contacts of relay 14–TC, the lower No. 2 back contacts of relay 14–RC, and the winding of relay 14–T to battery causing it to operate and to lock up to ground through its lower No. 1 front contacts and the upper No. 1 contacts of relay 14–ON.

If the call were originated by the "ring" subscriber, ground would extend through the upper No. 1 contact of relay 14–ON, contacts of relay 14–PTT, the lower No. 2 front contacts of relay 14–TC, the lower No. 2 front contacts of relay 14–RC and the winding of relay 14–R to battery to cause it to operate and to lock up to ground through its lower No. 1 contacts and the upper No. 1 contacts of relay 14–ON.

The operation of relay 14–T extends ground through the upper No. 1 contacts of relay 14–ON, the upper No. 1 back contacts of relay 14–R, the upper No. 1 front contacts of relay 14–T and the winding of relay 14–PTC to battery. Similarly, the operation of relay 14–R extends ground through the upper No. 1 contacts of relay 14–ON, the upper No. 1 front contacts of relay 14–R, the upper No. 1 back contacts of relay 14–T and the winding of relay 14–PTC to battery. Thus, it will be seen that the operation of either relay 14–T or 14–R (but not both simultaneously) completes a circuit through its upper No. 1 front contacts to operate relay 14–PTC to reconnect resistor 14–R1A in shunt to capacitor 14–C1A to dissipate the charge thereon and thus to restore the tube timer circuit 14–PTTA to normal. The operation of either relay 14–T or relay 14–R respectively grounds either conductor 14–TP or conductor 14–RP into cable 14–PF to determine whether the "tip" party field connector relay 8–TP or the "ring" party field connector 8–RP of Fig. 8 is to be employed in obtaining the directory number of the calling subscriber's station.

On a call originated by a "tip" subscriber the relays 14–TC, 14–ON, 14–PTT, 14–T and 14–PTC (in the "A" party test circuit) will operate in that sequence. On a call originated by a "ring" subscriber the relays 14–TC and 14–ON operate. Relay 14–TC momentarily releases. Relay 14–RC operates. Relay 14–TC reoperates. Relays 14–PTT, 14–R and 14–PTC (in the "A" party test circuit) operate, and in that sequence.

From the foregoing description it will be understood that a call originated by "tip" or a "ring" subscriber will respectively cause the operation of a different predetermined sequence and combination of relay operations. Any deviation from such predetermined sequences or combinations of operations will be indicative of a circuit malfunction.

Up to this point the description of the operation of the circuits has been predicated on the assumption that all of the apparatus and circuits involved have functioned in a satisfactory manner and that no trouble has been encountered. The circuits comprising the present invention include means for recognizing the existence of a trouble condition and for displaying a visual alarm signal when such trouble occurs. Means are also provided, responsive to a trouble condition, for shifting from the normally preferred "A" identifier control circuits to the alternatively usable "B" identifier control circuits.

*Operation when trouble condition is encountered*

To facilitate an understanding of the operation of the circuits when a trouble condition is encountered, it is advantageous, at this point, to digress from the description of the normal operating cycle and to describe the operation of the circuits in response to trouble conditions.

Let it be assumed, for example, on a call originated by a "tip" subscriber that the relay 14–RC should become operated due to a circuit fault. Ground extended through the upper No. 1 contacts of relay 14–ON, the upper No. 2 contacts of relay 14–T, the lower No. 2 front contacts of relay 14–TC, the lower No. 2 front contacts of relay 14–RC (falsely operated), and the winding of relay 14–R to battery cause it to operate and to lock up in a manner previously described. The coincidental operation of the 14–T and 14–R relays is a condition which is unacceptable to the identifier control circuits. With both of the relays 14–T and 14–R in an operated condition, ground extended through the upper No. 2 contacts of relay 14–ON and over conductor 14–1 will be removed from conductor 9–C2A and the previously-described operating circuits for relay 7–IC, causing the release of the latter. Relay 7–IC, in releasing, removes ground (extended from "tip" subscriber's station as previously described) at its upper No. 2 front contacts from conductor 7–TI and the previously-described operating circuit for relay 14–TC, causing it to release. Relay 14–TC in releasing extends ground through the upper No. 1 contacts of relay 14–ON, the parallel-connected upper No. 2 contacts of relays 14–T and 14–R, the lower No. 2 back contacts of relay 14–TC, alarm conductor 14–ALCA into Fig. 15, and the winding of alarm relay 15–ALA to battery, causing it to operate.

Alarm relay 15–ALA, in operating, locks up through its upper contacts to ground through the release key 15–KA. Relay 15–ALA extends ground through its lower contacts and lamp 15–LPA to battery, causing it to light to furnish a visual indication of an unstandard or trouble condition in the "A" identifier control circuits. When the attendant shall have cleared the trouble condition, the operation of key 15–KA releases relay 15–ALA from its operated condition and extinguishes lamp 15–LPA.

It will be remembered that relay 14–PTT, in the tube timer circuit 14–PTTA, is operable only after 100 milliseconds have elapsed subsequent to the operation of off-normal relay 14–ON. During this 100 millisecond interval, relay 7–IC (in the trunk circuit) must operate to remove "test" ground from conductor 7–TI and connect the "tip" conductor of the line thereto to ascertain, by the operation of relay 14–TC and/or relay 14–RC, whether the call was originated by the "tip" or the "ring" subscriber. At the expiration of the 100 millisecond interval, relay 14–PTT operates permitting the operation of relay 14–T or 14–R. The conclusion of a satisfactory test on a call originated by a "tip" party must always result in the operation of relays 14–TC and 14–T. The conclusion of a satisfactory test on a call originated by a "ring" party must always result in the operation of relays 14–TC, 14–RC and 14–R. If relay 14–TC should be in a released condition in conjunction with either relay 14–T or 14–R being in an operated condition, ground will be applied to conductor 14–ALCA to operate the alarm relay 15–ALA as above described.

*Shift of preference from "A" to "B" identifier control circuits*

It will also be remembered that when the trunk was seized for service, ground was removed from conductor 9–TMSCA by the operation of relay 9–TPAI, thus releasing relay 15–TMSA and starting the operation of tube timer circuit 15–TTA. Relay 9–TPAI, in operating, also completed a circuit to start the operation of timing circuit 14–PTTA. Since approximately 100 milliseconds will have elapsed between the seizure of the trunk and the operation of alarm relay 15–ALA, an interval of approximately 400 milliseconds will have elapsed after the operation of tube timer 14–PTTA before relay 15–TMEA can operate.

Considered from the viewpoint of everyday operating maintenance procedure, it is practically impossible for the attendant to note the lighted condition of trouble alarm lamp 15–LPA, to locate and to eliminate the cause of the trouble condition, and to operate the alarm release key 15–KA all within the 400 millisecond interval which transpires between the lighting of trouble alarm lamp 15–LPA and the operation of relay 15–TMEA. Therefore, as a practical consideration, when a trunk is seized for service and a trouble condition is encountered, relay 15–TMSA remains in its released condition. The charge on capacitor 15–CA will, after a 500 millisecond interval as determined by the circuit constants of tube timer circuit 15–TTA, attain a potential large enough to fire tube 15–LA, which will then become sufficiently conductive to operate relay 15–TMEA in series therewith. Relay 15–TMEA, in operating, extends ground through its upper contacts to conductor 14–ALCA over which the alarm relay 15–ALA was operated as previously described. Relay 15–TMEA, in operating, breaks a circuit extending from ground through the back contacts of relay 15–XTA, the upper No. 2 contacts of preference control relay 15–LSTB, the lower contacts of relay 15–TMEA, and the winding of normally operated preference control relay 15–LSTA to battery, causing the latter to release.

Relay 15–LSTA, in releasing, removes locking ground extended through its lower contacts, conductor 10–ONLA into Fig. 12, cable 12–DWAC into Fig. 10, conductor 10–ONLA, upper No. 1 contacts of relay 10–CL in parallel to lower No. 5 contacts of relay 10–DS, conductor 14–ONPLA, cables 14–PTA and 12–DWAC into Fig. 14, conductor 14–ONPLA, and the lower No. 1 contacts of off-normal relay 14–ON, causing it to release. Relay 14–ON, in releasing, removes ground extended through its upper No. 1 contacts, the parallel connected upper No. 2 contacts of relays 14–T and 14–R, and the lower No. 2 contacts of relay 14–TC to the alarm conductor 14–ALCA. Relay 14–ON, in releasing, also momentarily extends ground through its lower No. 4 contacts, the lower No. 3 contacts of slow releasing relay 14–PTC (the operating ground for which is extended through the upper No. 1 contacts of relay 14–ON), conductor 9–TMSCA, cable 9–ICA to Fig. 9, conductor 9–TMSCA into Fig. 15, and the winding of relay 15–TMSA, causing it to reoperate and to connect shunt resistor 15–RA across capacitor 15–CA to dissipate the charge thereon. Relay 15–LSTA, in releasing, also removes ground extended through its upper No. 1 contacts, conductor 15–5 to Fig. 9 and the winding of (normally operated) relay 9–STA, causing its release. Relay 9–STA, in releasing, opens a circuit at its No. 2 contacts, thus disconnecting conductor 7–STI from conductor 9–ISA and removing battery from the winding of relay 9–TPAI, causing its release. Relay 9–TPAI, in releasing, completes a circuit through its lower No. 2 and No. 3 contacts to extend ground through conductor 9–TMSCA into Fig. 15 and winding of relay 15–TMSA to battery, to hold it in its operated position. Preference control relay 15–LSTA, in releasing, also completes a circuit extending from ground through the back contacts of relay 15–XTB, the upper No. 2 contacts of relay 15–LSTA, the lower contacts of relay 15–TMEB, and the winding of preference control relay 15–LSTB to battery, causing its operation.

Relay 15–LSTB, in operating, extends ground through its lower contacts to conductor 10–ONLB to provide a locking ground for the off-normal relay (see Fig. 14—a relay similar to 14–ON but not shown) in the party test circuits of alternatively usable identifier "B." Relay 15–LSTB, in operating, also extends ground through its upper No. 1 contacts, conductor 15–6 to Fig. 9 and the winding of relay 9–STB, causing its operation. Relay 15–LSTB, in operating, disables, by the opening of its upper No. 2 contacts, the operating circuit for relay 15–LSTA, thus preventing its reoperation after relay 15–TMEA has released.

Relay 9–STB, in operating, completes a circuit at its No. 2 contacts, thus connecting conductor 7–STI to conductor 9–ISB and extending battery from the trunk circuit through the winding of relay 9–TPBI, conductor 9–4 (and intervening sections of trunk preference lockout circuit), the lower No. 3 and No. 2 contacts of relay 9–TPBF to ground, thus causing relay 9–TPBI to operate. Relay 9–TPBI, in operating, breaks the circuit extending from ground through the lower No. 2 and No. 3 contacts of relay 9–TPBF, conductor 9–4 (and intervening sections of trunk preference lockout circuit), the lower No. 2 and No. 3 contacts of relay 9–TPBI, conductor 9–3 (and intervening sections of trunk preference lockout circuit), the lower No. 2 and No. 3 contacts of relay 9–TPBL, conductor 9–TMSCB into Fig. 15 and the winding of relay 15–TMSB (normally operated) to battery, causing its release.

Relay 15–TMSB, when released, completes a circuit from positive battery through resistor 15–R1B, capacitor 15–CB, back contacts of relay 15–TMSB and the winding of relay 15–TMEB to negative battery, in which circuit capacity 15–CB starts to charge. Relay 15–TMEB does not operate immediately because of the 500 millisecond delay inherent in the circuit constants of tube timer circuit 15–TTB.

As previously stated, the "A" identifier control circuits are normally preferred for use with a trunk seized to complete a call. The control of the preferential order of use resides in the normally operated relay 15–LSTA and the mutually exclusive operating circuit arrangement existing between preference control relay 15–LSTA and preference control relay 15–LSTB. As a result of a trouble condition in the "A" party test circuits the preferred order of use has now been shifter to the "B" party test circuits under control of the "B" lockout circuit. The seized trunk circuit is now associated with the alternatively usable "B" identifier control circuits through the upper Nos. 5, 4 and 3 front contacts of relay 9–TPBI, conductors 9–T2, 9–R2 and 9–C2 (and intervening sections of trunk preference lockout circuit), the upper Nos. 5, 4 and 3 back contacts of relay 9–TPBL, conductors 9–T2B, 9–R2B and 9–C2B, cable 9–ICB into Fig. 14 to the "B" party test identifier circuit, to initiate therein the operation to ascertain whether the call was originated by the "tip" or the "ring" subscriber's station. The "B" identifier control circuits, indicated by rectangles in the lower portions of Figs. 10 to 14, inclusive, respectively are structurally and operatively the same as the corresponding "A" identifier control circuits shown in detail in the upper portions of Figs. 10 to 14, inclusive.

Now, let it be assumed that the party test circuit of identifier "B" operates in an unsatisfactory manner evidencing a trouble condition. Ground is extended through alarm conductor 14–ALCB from Fig. 14 into Fig. 15 and to the winding of alarm relay 15–ALB, causing it to operate.

Alarm relay 15–ALB, in operating, locks up through its upper contacts to ground through the release key 15–KB. Relay 15–ALB extends ground through its lower contacts and lamp 15–LPB to battery, causing lamp 15–LPB to light to furnish a visual indication of an unstandard or trouble condition in the party test circuit of identifier control circuits "B." When the attendant shall have cleared the trouble condition in the "B" party test circuits, the operation of key 15–KB releases alarm relay 15–ALB from its operated condition and extinguishes lamp 15–LPB.

At the end of the 500 millisecond time interval following the shift of preference to the "B" identifier control circuits and the consequent release of relay 15–TMSB, if relay 15–TMSB has not been reoperated by the release of the off-normal relay in the "B" identifier control circuits at the end of a normal operating cycle, the charge on capacitor 15–CB will attain a potential large enough to fire tube 15–LB, which will then become sufficiently conductive to operate relay 15–TMEB in series therewith. Relay 15–TMEB, in operating, extends ground through its upper contacts to conductor 14–ALCB over which the alarm relay 15–ALB was operated as previously described.

Relay 15–TMEB, in operating, opens the operating circuit for relay 15–LSTB, causing its release. Relay 15–LSTB, in releasing, removes ground extended through its lower contacts to conductor 10–ONLB, thus opening the locking circuit for the off-normal relay in the "B"

identifier control circuits, causing its release. The off-normal relay in the "B" identifier control circuits, in releasing, removes ground from alarm conductor 14–ALCB (in the manner described for the "A" identifier control circuits).

The off-normal relay in the "B" identifier control circuits, in releasing, also momentarily extends ground (in the manner described for the "A" identifier control circuits) through conductor 9–TMSCB and the winding of relay 15–TMSB, causing it to reoperate and to connect shunt resistor 15–RB across capacitor 15–CB to dissipate the charge thereon.

Preference control relay 15–LSTB, in releasing, also removes ground extended through its upper No. 1 contacts, conductor 15–6 into Fig. 9 and to the winding of relay 9–STB, causing it to release. Relay 9–STB, in releasing, opens a circuit at its No. 2 contacts thus disconnecting conductor 7–STI from conductor 9–ISB, thus removing battery from the winding of relay 9–TPBI, causing its release. Relay 9–TPBI, in releasing, completes a circuit through its lower No. 2 and No. 3 contacts to extend ground through conductor 9–TMSCB and winding of relay 15–TMSB to battery to hold it in its operated position. Preference control relay 15–LSTB, in releasing, also closes a circuit extending from ground through the back contacts of relay 15–XTA, upper No. 2 contacts of relay 15–LSTB, the lower contacts of relay 15–TMEA and the winding of preference control relay 15–LSTA to battery, causing it to operate.

Preference control relay 15–LSTA (again returned to its normal or operated position) restores ground through its lower contacts to conductor 10–ONLA to furnish locking ground for off-normal relay 14–ON in the "A" party test identifier via the previously described circuit. Preference control relay 15–LSTA, in its reoperated position, also extends ground through its upper No. 1 contacts, conductor 15–5 to Fig. 9 and to the winding of relay 9–STA to battery, causing it to reoperate. Relay 9–STA, in operating, closes a circuit at its No. 2 contacts, thus reconnecting conductor 7–STI to conductor 9–ISA to again extend battery from the trunk circuit through the winding of relay 9–TPAI to ground through the circuit previously described. Relay 9–TPAI operates and reconnects the conductors in cable 7–TKI through the trunk preference lockout circuit in the manner previously described, via the conductors in cable 9–ICA, to the "A" party test identifier.

Relay 9–TPAI, in operating, breaks a circuit at its No. 2 and No. 3 contacts to remove ground from conductor 9–TMSCA to effect the release of relay 15–TMSA in the manner previously described. Relay 15–LSTA, in reoperating, breaks a circuit at its upper No. 2 contacts to disable the operating circuit for relay 15–LSTB until the "B" identifier lockout circuit shall have again timed out at the end of its 500 millisecond delay interval.

Assuming that the trouble in the "A" identifier control circuit has been cleared and that key 15–KA has been operated to release alarm relay 15–ALA, the preference of use has been restored to the "A" identifier control circuits to permit them to proceed to ascertain whether the call was originated by the "tip" or the "ring" subscriber's station.

*False start of timing cycle in lockout circuit "A" or "B" due to contact failure*

During the periods when no outgoing trunk circuits are in use, all of the relays in the trunk preference lockout circuit are unoperated. During such periods of nonuse by the outgoing trunk circuits, relays 15–TMSA and 15–TMSB in the lockout circuits 15–ILA and 15–ILB (Fig. 15), respectively, are held in a normally operated condition by grounds connected through the chain circuits in the trunk preference lockout circuit as previously described. In the event of a contact failure in the chain circuit which furnishes ground to relay 15–TMSA, relay 15–TMSA will release and start the timing cycle in tube timer circuit 15–TTA. At the expiration of the 500 millisecond delay interval, relay 15–TMEA will operate in the previously described manner. Relay 15–TMEA, in operating, closes ground through its upper contacts to alarm conductor 14–ALCA to operate alarm relay 15–ALA in the manner previously described. Similarly, in the event of a contact failure in the chain circuit which furnishes ground to relay 15–TMSB, relay 15–TMSB will release and start the timing cycle in tube timer circuit 15–TTB. At the expiration of the 500 millisecond delay interval, relay 15–TMEB will operate in the previously described manner. Relay 15–TMEB, in operating, closes ground through its upper contacts to alarm conductor 14–ALCB to operate alarm relay 15–ALB in the manner previously described. The attendant, upon observing that alarm lamp 15–LPA or 15–LPB is lighted, will proceed to locate and eliminate the trouble condition and, after making the necessary repair or adjustment, will operate key 15–KA or 15–KB, respectively, to release the alarm relay and extinguish the lamp.

*"Cross detecting" relay operation*

"Cross" detecting relays 15–XTA and 15–XTB in lockout circuits 15–ILA and 15–ILB, respectively, are provided to detect the occurrence of "crosses" or short circuits to ground on the tip and ring conductors of the trunk preference lockout chain circuit. For example, during a period when no outgoing trunk circuits are in use, a circuit may be traced from negative battery through the winding of relay 15–XTA, conductor 15–7 into Fig. 9, upper No. 5 back contacts of relay 9–TPAL, tip conductor 9–T3 (and intervening sections of trunk preference lockout circuit), upper No. 5 back contacts of relay 9–TPAI, conductor 9–T1 (and intervening sections of trunk preference lockout circuit), upper No. 5 back contacts of relay 9–TPAF, conductor 9–T2A, cable 9–ICA to Fig. 14, conductor 9–T2A, and the winding of relay 14–TC to negative battery. With a negative potential at both ends of the chain neither relay 15–XTA nor relay 14–TC can operate. At the same time, a circuit may also be traced from negative battery through the winding of relay 15–XTA, conductor 15–7 into Fig. 9, upper No. 4 back contacts of relay 9–TPAL, ring conductor 9–R3 (and intervening sections of trunk preference lockout circuit), upper No. 4 back contacts of relay 9–TPAI, conductor 9–R1 (and intervening sections of trunk preference lockout circuit), upper No. 4 back contacts of relay 9–TPAF, conductor 9–R2A, cable 9–ICA to Fig. 14, to the upper front contacts of relay 14–RC, which contacts, being normally open, will fail to complete an operating circuit for relay 15–XTA.

Now, let it be assumed that outgoing trunk circuit 7–OGTI has been seized to serve a call and that, responsive thereto, relay 9–TPAI has been operated as previously described. "Test" ground extended from the trunk circuit via conductor 7–TI in cable 7–TKI is applied to the upper No. 5 front contact of relay 9–TPAI as previously described. Now, let it be further assumed, for example, that the upper No. 5 back contact of relay 9–TPAI "sticks" (that is to say fails to break from the transfer contact spring). Ground is now simultaneously applied to the front and the back contacts of the upper No. 5 transfer springs of relay 9–TPAI through tip conductor 9–T3 (and intervening sections of trunk preference lockout circuit), upper No. 5 back contacts of relay 9–TPAL, conductor 15–7 to Fig. 15, and the winding of "cross" detecting relay 15–XTA to battery, causing its operations. Relay 15–XTA, in operating, removes ground extended through its back contacts, upper No. 2 back contacts of preference control relay 15–LSTB, lower back contacts of relay 15–TMEA and the winding of preference control relay 15–LSTA to battery, causing its release. Relay 15–LSTA, in releasing, shifts the normal use preference from the "A" identifier control circuits to the "B" identifier control circuits in the manner previously described. Relay 15–XTA, in operating extends ground through its front contacts to alarm conductor 14–ALCA to operate alarm relay 15–ALA in the manner previously described.

Again, let it be assumed that outgoing trunk circuit 7–OGTI has been seized to serve a call and that the preference has been shifted to the "B" identifier control circuits and that, responsive thereto, relay 9–TPBI has been operated as previously described. "Test" ground extended from the trunk circuit via conductor 7–TI in cable 7–TKI is applied to the upper No. 5 front contact of relay 9–TPBI as previously described. Now, let it be further assumed, for example, that the upper No. 5 back contact of relay 9–TPBI "sticks" (fails to break from the transfer contact spring). Ground is now simultaneously applied to the front and the back contacts of the upper No. 5 transfer springs of relay 9–TPBI through tip conductor 9–T4 (and intervening sections of trunk preference lockout circuit), upper No. 5 back contacts of relay 9–TPBF, conductor 15–8 to Fig. 15, and the winding of "cross" detecting relay 15–XTB to battery, causing its operation. Relay 15–XTB, in operating, removes ground extended through its back contacts, upper No. 2 back contacts of preference control relay 15–LSTA (released), lower contacts of relay 15–TMEB and the winding of preference control relay 15–LSTB, causing it to release. Relay 15–LSTB, in releasing, shifts the use preference from the "B" identifier control circuits to the "A" identifier control circuits in the manner previously described. Relay 15–XTB extends ground through its front contacts to alarm conductor 14–ALCB to operate alarm relay 15–ALB in the manner previously described.

The attendant, as before described, upon observing a lighted alarm lamp will clear the trouble before operating the alarm release key associated with the lamp.

Reverting to the assumptions that the call was originated by the "tip" subscriber's station on subscriber line 5–L–1, that outgoing trunk circuit 7–OGT1 was seized for service, that the trunk preference lockout transfer and trunk preference lockout circuits (Fig. 9) and the lockout circuit 15–ILA (Fig. 15) have caused the outgoing trunk circuit 7–OGT1 to be connected to the party test circuit of the "A" identifier control circuits, and that no trouble conditions have been encountered, the circuits will be operated as previously described.

*Extension of high positive potential from outgoing trunk circuit to activate line scanner segment*

Relay 7–IC in the outgoing trunk circuit, in operating, breaks the connection between its No. 8 and No. 9 continuity contacts, and establishes a connection between its No. 5 and No. 8 continuity contacts, thereby disconnecting sleeve conductor 5–SL from extended sleeve conductor 7–SLE, and, at the same time, extending a high positive potential from battery 7–HV through parallel connected coil 7–C and resistor 7–SR, lower No. 5 and No. 8 continuity contacts of relay 7–IC, sleeve conductor 5–SL, cable 5–10 to Fig. 5, conductor 5–SL, secondary office link 5–9, primary office link 5–8, secondary district link 5–7, primary district link 5–6, lower No. 3 contacts of relay 5–OT, lower No. 4 contacts of relay 5–T, resistor 5–SLR, secondary line link 5–3, primary line link 5–2, and sleeve conductor 5–SI–001 in cable 5–SLI to activate segment 5–001 of the line scanner 5–LS. Relays 7–SP and 7–HPR remain locked up to ground on extended sleeve conductor 7–SLE. The high positive potential on the sleeve conductor also maintains a busy condition and continues the magnets of the crossbar switches connected thereto in an operated condition, thereby holding the connection.

The sleeve conductor 5–SI–001 is operatively associated with subscriber line 5–L–1 and is a typical one of the large group of such conductors, which group also comprises sleeve conductors 5–SI–000 and 5–SI–002 to 5–SI–999, each sleeve conductor being operatively associated with its respective subscriber line in an arrangement similar to that disclosed with respect to sleeve conductor 5–SI–001 and subscriber line 5–L–1. The subscriber line 5–L–1, in the exemplary disclosure, is a two-party line of a type well known in the prior art and is terminated in local central office 5–LCO, which comprises suitable switching means, controlled by calling subscriber dialing, for extending a connection via an outgoing trunk, such as 7–OGTI, to a desired called subscriber through a distant central office or offices.

The sleeve conductors 5–SI–000 and 5–SI–002 to 5–SI–999 are respectively operatively related to subscriber line 5–L–0 (not shown) and 5–L–2 to 5–L–999 (not shown), some of which may be two-party lines similar to subscriber line 5–L–1, and some of which may be private lines of the type well known in the prior art. Each of the sleeve conductors 5–SI–000 to 5–SI–999 is respectively connected via cable 5–SLI to its corresponding segment of the line scanner 5–LS which is a part of the operative structure of the intermediate drum 5–ID. Thus, the intermediate group of 1000 subscriber lines in the local central office, the sleeves of which respectively designated 5–SI–000 to 5–SI–999, is served by intermediate drum 5–ID. Similarly, the first group of 1000 subscriber lines 5–FG in the local central office, the sleeves of which are respectively designated 5–SF–000 to 5–SF–999, connected via cable 5–SLF, is served by the first drum 5–FD. Also, in a similar manner, the last group of 1000 subscriber lines 5–LG in the local central office, the sleeve of which are respectively designated 5–SL–000 to 5–SL–999, connected via cable 5–SLL, is served by the last drum 5–LD. The first and last groups of subscriber lines are indicated by rectangles 5–FG and 5–LG, respectively. The first and last drums are indicated by rectangles 5–FD and 5–LD, respectively. The circuit details for the sleeve conductor connections for all of the subscriber lines in all of the groups of lines in the central office will be similar to those shown for the exemplary disclosure of sleeve conductor 5–SI–001. The electrical and mechanical construction and operation of the first drum 5–FD and the last drum 5–LD is similar to the intermediate drum 5–ID which will now be described in detail.

*Line scanner—construction*

The electrostatic line scanner 5–LS is of a type suitable for use with the magnetic drum for recording indicia pertinent to, and representatives of, the office code directory number, and service contract category of each of the plurality of equipped subscriber lines respectively associated with the slots in said drum. As shown in the exemplary embodiment described herein in detail, the annularly disposed segments 5–000 to 5–999, inclusive (not all of which are shown), are insulatedly supported by ring 5–29, which is mounted coaxially with the magneic drum 5–104.

The line scanner 5–LS also comprises a rotating conductive arm 5–25 insulatedly mounted on shaft 5–100, which is the same shaft employed to rotate drum 5–104. The end 5–27 of the rotating arm 5–25 passes adjacent to but does not touch or make contact with the plurality of segments 5–000 to 5–999, inclusive. The end 5–27 in approaching each segment constitutes one plate of a capacitor and the segment the other plate of a capacitor, and the end 5–27 has a current or voltage induced in or on it in acocrdance with the voltage applied to the segment. The rotating arm 5–25 is surrounded by a shield 5–26 which rotates therewith but is insulatedly supported therefrom. A pair of stationary rings 5–23 and 5–24 is provided. The ring 5–23 is electrostatically coupled to the rotating member 5–25 of the line scanner 5–LS and stationary ring 5–24 is capacitatively coupled to the shielding member 5–26. As shown in the drawings the capacitative elements 5–23 and 5–24 are in the form of rings placed in close proximity to the respective rotating elements of the line scanner 5–LS with which they cooperate to form an electric circuit. It is to be understood, of course, that any suitable form of electrostatic capacitative coupling may be employed or that any other suitable type of coupling may be employed including brushes resting on slip rings. However, the capacitative coupling is employed in the present embodiment of this invention because it is particularly well adapted for coupling to the rotating elements which, in turn, are capacitatively coupled to the segments 5–000 to 5–999, inclusive, because this form of coupling introduces substantially no extraneous signals, noise currents or other interfering or stray currents, which currents would interfere with the low level signals picked up by the rotating member 5–25 as will be described hereinafter. In order to prevent excessive voltage drop across this coupling capacity, it is desirable that its capacity be large compared to the capacity between the rotating arm 5–25 and the segments which it passes.

The line segments 5–000, 5–001, etc., of the line scanner 5–LS are separated by shielding segments, such as 5–30, interposed therebetween and which are connected through a common resistor to negative battery as shown in the drawing. These shielding segments are provided to prevent interference between the various adjacent line segments, as will be described hereinafter, and also to improve the response or output obtained from the rotating arm 5–25.

The shielded member 5–26 is provided together with the shielded cable 5–22 from the stationary rings 5–23 and 5–24 to prevent stray voltages induced from other sources from interfering with signals picked up by the rotating arm 5–25.

In an exemplary embodiment of the invention the magnetic drum translator consists of a magnetic drum, the magnetic surface of which is provided with sufficient area to be employed in common by 1000 subscriber lines, each equipped line having reserved for its use an arc of about .36 degree. The line segments, such as 5–000, 5–001, etc., of the capacitative line scanner 5–LS for such an exemplary embodiment may be arranged on a flat plate perpendicular to the shaft or they may be arranged on the inner surface of a ring as shown in the drawing, the line segments also being spaced .36 degree. The scanning electrode 5–25 is mounted on the shaft which supports the drum 5–ID and transmits the signals or potential conditions encountered on the line segments, through shielded cable 5–22 into Fig. 6 to the input of amplifier 6–LS1, the operation of which will hereinafter be described in detail.

As shown in the drawing each line segment, such as 5–001 for example, individual to a calling line, such as 5–L–1 for example, is connected to the sleeve conductor of the line, such as 5–SI–001 shown in the exemplary disclosure. The positive voltage extended from the outgoing trunk circuit through the sleeve conductor meets negative voltage through the windings of the crossbar switch hold magnets as previously described and is productive of a positive voltage on the sleeve conductor 5–SI–001, which voltage is applied to line segment 5–001 and causes a voltage to be induced in the rotating element 5–25 as will be described hereinafter.

*Magnetic drum*

Another element of the present translating mechanism comprises a magnetic storage device. In the exemplary embodiment of this invention set forth herein, the magnetic material employed for recording and storing signals comprises a layer upon a rotating drum. However, any suitably moving layer or surface of magnetic material, such as a disc, belt, etc., which moves in a closed or reentrant path may be employed equally well in combination with the circuits and other apparatus embodying this invention.

The drum employed in the exemplary embodiment of this invention set forth herein in detail may be constructed of suitable structural material, as, for example, brass, bronze tubing, stainless steel tubing or any other suitable type of structural material including plastic materials and other insulating materials, the purpose of the structural material being to provide a cylindrical surface which may be rotated about its axis by driving means of suitable type, such as an electric motor. The drum may be driven directly or by means of gears, belts or any other form of mechanical connection, and the motor energized from a suitable source of power, including batteries or other means. The speed of the motor is not critical and need not be maintained in synchronism with any other apparatus, so long as it rotates the shaft 5–100 and thus the drum 5–104 and the capacitative collector or distributor or scanning element 5–25 at the same speed and in synchronism with each other and sufficiently fast to provide one sampling interval for each equipped line during each of the shortest sleeve conductor signaling conditions which it is desired to recognize.

The surface of the drum is accurately true running and is provided with a layer of magnetic material which in an exemplary embodiment employing metallic drums may take the form of an electroplated coating of magnetic material, such as a nickel cobalt alloy or the like which has a thickness in the range from approximately .0003 inch to approximately .0006 inch.

A plurality of recording and pick-up coils comprising one or more windings on a ferromagnetic core structure are mounted in close proximity to the plated surface but not in contact with it. It will be convenient hereafter to speak of the recording process as "writing." The signals to be "written" or "recorded" are of a pulse-like character and have one or the other of two different values or characteristics, one being called X signals and the other, O signals. The recording coils and the pick-up coils comprise a core structure having pole tips brought close together and placed in close proximity to the magnetic surface of the drum. Coils are wound on each of these cores and when employed for recording or writing the coil is employed to produce a magnetic flux across the pole tips which alters the magnetic condition of the surface of the drum. In the pick-up coils the magnetic condition of the drum induces a flux change between the pole-pieces and thus within the core structure of the pick-up coil. Consequently, a winding surrounding these cores has a voltage induced in it in accordance with the magnetic condition of the drum.

The circumferential area of the drum which passes immediately beneath the pole tips of a given coil or head is defined as a "channel" and that part of the channel which is directly under or immediately adjacent to the pole tips of a given coil when a pulse of recording or writing current is applied to the coil is known as a cell or "elemental area" of the channel and is assigned to a given subscriber line. In the case of a multiplicity of pick-up coils or reading heads, the aggregate of the elemental area or cells which are under the several coils at any one instant of time is defined as a "slot" and is assigned to a given subscriber line. The group of cells or elemental areas assigned to a calling line passes under the respective coils at substantially the instant of time that the line scanner electrode 5–27 is passing over the line segment of the electrostatic distributor assigned to the same subscriber line. The simplest arrangement of such a slot is a rectangular area running parallel with the axis on the surface of the drum. It is to be understood, however, that in the usual case this slot will be of a more complicated form and is not therefore limited to such a rectangular area. When the various pick-up coils or recording coils or heads are staggered or arranged in the form of a spiral or helix around the drum the slot may be helical or may have a saw-tooth form or other discontinuous shape depending upon the location of the various recording and pick-up coils.

The recording or writing head 5–WDC, operatively associated with the delay channel, is equipped with a lefthand or "write O" winding and a right-hand or "write X" winding, which windings are respectively energizable over conductors 6–WO and 6–WX from the recording or writing amplifier 6–WA of Fig. 6. Both the upper and the lower sections of amplifier 6–WA are normally biased so that in the absence of a signal input thereto substantially no current flows in the windings of recording head 5–WDC.

Because the two windings of writing head 5–WDC are on the same core, the winding associated with the section of the amplifier tube 6–WA which is not being pulsed will have induced therein a high voltage corresponding, in general, with that developed across the winding associated with the section of the amplifier tube 6–WA which is being pulsed. The voltage induced across the non-pulsed winding is applied to the plate of its associated section of amplifier tube 6–WA, in series with the direct plate voltage; the grid bias, therefore, should be sufficient to maintain the non-pulsed section of amplifier tube 6–WA in a cutoff condition even when the direct plate voltage is augmented by the positive swing of the voltage induced in the winding. This arrangement prevents part of the energy supplied by the pulsed section of the amplifier tube 6–WA being dissipated by the non-pulsed section of the tube and by the winding associated therewith.

The reading head 5–RMC, operatively associated with the main channel, is equipped with a read-out winding which is connected via conductor 5–RO to Fig. 6 to the input or control grid of tube 6–T1 of reading amplifier 6–RA. The resistance of the winding of the reading head 5–RMC in combination with the capacitor 6–C3 causes the amplifier tube 6–T1 to emit a suitably shaped output pulse when a write O or a write X signal is present in an elemental area encountered by the reading head 5–RMC.

In Fig. 5, the right-hand section of the magnetic drum 5–ID, designated "identification," comprises a plurality of channels, each channel respectively having a reading head such as 5–OT–0, 5–OT–7 or 5–CL–7 operatively associated therewith for reading out digital information pre-recorded in the corresponding channel of the drum. The reading heads 5–OT–0 and 5–OT–7, for example, are respectively employed for reading out the first and the last elements of a two-out-of-five code representation of a single digit number indicating the identity of the calling office in which the "tip" subscriber station is located. The reading head 5–CL–7, for example, is employed for reading out the last element of a two-out-of-five code representation of a single digit number indicating the "class" or service contract category of the calling subscriber line.

Referring again to the diagrammatic illustration in Fig. 4, it will be seen that in both the tip party field section and in the ring party field section five digits are required, one digit to indicate the identity of the calling office, and four digits to indicate the directory number of the calling subscriber. Only a single digit is required to indicate the "class." Each digit requires a group of five reading heads.

In Fig. 5, to indicate the identity of the calling office in which the "tip" subscriber is located, a group of five reading heads 5–OT–0, 5–OT–1, 5–OT–2, 5–OT–4 and 5–OT–7 is furnished, of which only 5–OT–0 and 5–OT–7 are shown. Reading heads 5–OT–0, 5–OT–1, 5–OT–2, 5–OT–4 and 5–OT–7 respectively correspond to reading heads 4–HOT–0, 4–HOT–1, 4–HOT–2, 4–HOT–4 and 4–HOT–7 in Fig. 4. The output conductors from the "tip office" reading heads in Fig. 5 are included in cable 5–OT which corresponds to cable 4–OT in Fig. 4.

In Fig. 5, to indicate the identity of the calling office in which the "ring" subscriber is located, a group of five reading heads 5–OR–0, 5–OR–1, 5–OR–2, 5–OR–4 and 5–OR–7 is furnished (none of which are shown) which respectively correspond to reading heads 4–HOR–0, 4–HOR–1, 4–HOR–2, 4–HOR–4 and 4–HOR–7 in Fig. 4. The output conductors from the "ring office" reading heads in Fig. 5 are included in cable 5–OR which corresponds to cable 4–OR in Fig. 4.

In Fig. 5, to indicate the directory number of the "tip" subscriber, four groups of five reading heads 5–THT–0, 5–THT–1, 5–THT–2, 5–THT–4, 5–THT–7, 5–HDT–0, 5–HDT–1, 5–HDT–2, 5–HDT–4, 5–HDT–7, 5–TDT–0, 5–TDT–1, 5–TDT–2, 5–TDT–4, 5–TDT–7, 5–UDT–0, 5–UDT–1, 5–UDT–2, 5–UDT–4 and 5–UDT–7 are furnished (none of which are shown) which respectively correspond to reading heads 4–HTHT–0, 4–HTHT–1, 4–HTHT–2, 4–HTHT–4, 4–HTHT–7, 4–HHT–0, 4–HHT–1, 4–HHT–2, 4–HHT–4, 4–HHT–7, 4–HTT–0, 4–HTT–1, 4–HTT–2, 4–HTT–4, 4–HTT–7, 4–HUT–0, 4–HUT–1, 4–HUT–2, 4–HUT–4 and 4–HUT–7 in Fig. 4. The thousands, hundreds, tens and units output conductors from the "tip" subscriber reading heads in Fig. 5 are respectively included in cables 5–THT, 5–HDT, 5–TDT and 5–UDT which respectively correspond to cables 4–THT, 4–HT, 4–TT and 4–UT in Fig. 4.

In Fig. 5, to indicate the directory number of the "ring" subscriber, four groups of five reading heads 5–THR–0, 5–THR–1, 5–THR–2, 5–THR–4, 5–THR–7, 5–HDR–0, 5–HDR–1, 5–HDR–2, 5–HDR–4, 5–HDR–7, 5–TDR–0, 5–TDR–1, 5–TDR–2, 5–TDR–4, 5–TDR–7, 5–UDR–0, 5–UDR–1, 5–UDR–2, 5–UDR–4 and 5–UDR–7 are furnished (none of which is shown) which respectively correspond to reading head 4–HTHR–0, 4–HTHR–1, 4–HTHR–2, 4–HTHR–4, 4–HTHR–7, 4–HHR–0, 4–HHR–1, 4–HHR–2, 4–HHR–4, 4–HHR–7, 4–HTR–0, 4–HTR–1, 4–HTR–2, 4–HTR–4, 4–HTR–7, 4–HUR–0, 4–HUR–1, 4–HUR–2, 4–HUR–4 and 4–HUR–7 in Fig. 4. The thousands, hundreds, tens and units output conductors from the "ring" subscriber reading heads in Fig. 5 are respectively included in cables 5–THR, 5–HDR, 5–TDR and 5–UDR which respectively correspond to cables 4–THR, 4–HR, 4–TR and 4–UR in Fig. 4.

In Fig. 5, to indicate the "class" or service contract category of the calling subscriber line, a group of five reading heads 5–CL–0, 5–CL–1, 5–CL–2, 5–CL–4 and 5–CL–7 is furnished, of which only 5–CL–7 is shown. Reading heads 5–CL–0, 5–CL–1, 5–CL–2, 5–CL–4 and 5–CL–7 respectively correspond to reading heads 4–HCL–0, 4–HCL–1, 4–HCL–2, 4–HCL–4 and 4–HCL–7 in Fig. 4. The output conductors from the "class" reading heads in Fig. 5 are included in cable 5–CL which corresponds to cable 4–CL in Fig. 4.

In Fig. 5, the output cables from the several digital groups of reading heads are connected via cable 5–IDC to the digit and party field connector in Fig. 8, which connects the reading head output conductors, a digit at a time, to the "A" and "B" digit reader circuits in Fig. 10, the operation which will hereinafter be described in detail.

In addition to writing and reading heads located adjacent the magnetic drum and described above, an additional pick-up or reading head 5–MPC is provided for generating master or synchronizing pulses. As shown in the drawing, master pulse reading head 5–MPC is located adjacent the periphery of the timing wheel 5–101 which is shown to be in the form of a gear wheel having a plurality of substantially uniformly spaced teeth or poles. Each of the teeth or poles of the wheel 5–101, in passing adjacent reading head 5–MPC, generates a pulse in the coils thereof which is employed to control the recording or writing of signals in the main channel of the drum by means of writing head 5–WMC as will be described hereinafter. While master pulse reading head 5–MPC is shown adjacent the gear or toothed wheel 5–101 for generating master pulses, it is also within the scope of this invention to provide the master pulses from a reading head such as 5–MPC located adjacent a channel on the drum which channel will have the master pulses recorded therein in any suitable manner, such as by an oscillator or continuous pulse generator or the like. However, in the exemplary embodiment set forth herein the master pulses are generated by means of the gear or toothed wheel which is mounted upon the same shaft, or at least driven at the same speed as the magnetic drum and usually from the same motor or other driving means. The output of master pulse reading head 5–MPC is amplified by amplifier 5–60. The reading head 5–MPC and the amplifier 5–60 are so designed that a high positive output pulse is obtained for each tooth of the gear wheel 5–101 which passes under the pole pieces of reading head 5–MPC. The amplifier 5–60 contains the necessary pulse forming, pulse shaping means, and means for otherwise controlling pulse characteristics as required. In an exemplary embodiment of this invention, the pulse output from amplifier 5–60, for each of the teeth of the gear wheel 5–101 under the pole pieces of reading head 5–MPC, has a duration of one-tenth of the time required for a cell of the magnetic surface of the drum, as defined above, to pass under a pick-up coil. The pulse duration is not critical and satisfactory results may be obtained with pulses of such a duration. The output of amplifier 5–60 is connected to an input of transfer amplifier 5–113.

Reading head 5–RDC, operatively associated with the delay channel, is equipped with a read-out winding which is connected to the input of transfer amplifier 5–113, the output of which transfer amplifier is applied to the recording winding of writing head 5–WMC operatively associated with the main channel. The transfer amplifier 5–113 is enabled to emit an output signal voltage only when a potential representing an O or an X signal read from the delay channel and a master pulse potential are simultaneously applied to the input of the transfer amplifier.

For a detailed disclosure of the transfer amplifier 5–113, reference is made to United States Patent No. 2,679,551, granted to N. D. Newby on May 25, 1954.

The magnetic drum, as viewed from its left end, rotates in a clockwise direction. An O or an X signal recorded in a cell in the delay channel of the drum will, after approximately 180 degrees of rotation, pass beneath the pole pieces of reading head 5–RDC causing an output voltage to be developed in the winding thereof. The O or X signal recorded in the cell of the delay channel will, after approximately 90 degrees of further rotation, pass beneath the erasing head 5–118, thereby to be erased. The erasing head 5–118 comprises a permanent magnet or a continuously energized electromagnet oriented in such direction that the magnetization of the drum after passing under this head produces no output voltage in the pick-up coil under whose pole pieces this portion of the drum will pass. During the time that the cell in the delay channel in which the signal was recorded by the writing head 5–WDC is rotating from the reading head 5–RDC to the erasing head 5–118 and then to the recording head 5–WDC again, the cell in the main channel in which the signal was recorded by the writing head 5–WMC is also rotated around the drum so that at approximately the same time that the pick-up arm 5–25 again passes the line segment 5–001, connected to subscriber line 5–L–1 in the manner described above, the cell in the main channel, assigned to subscriber line 5–L–1, in which the signal was recorded by writing head 5–WMC, will pass under reading head 5–RMC causing an output voltage to be developed in the winding thereof.

The signal to be recorded will comprise either one or the other of two different signaling conditions such as voltage or potential conditions applied to the respective sleeve conductors, such as the conductors comprising the group of conductors 5–SI–000 to 5–SI–999, inclusive, said potential condition depending upon whether or not the subscriber line is in use in connection with a call, and whether or not the trunk circuit in use therewith requires the further services of an identifier circuit.

The operation of the system may be better understood and the initial operation of the system improved, if it is assumed that the drum is initially magnetized by applying a substantially continuous current to the coils of the recording heads 5–WDC and 5–WMC and substantially saturating the magnetic material in the related channels of the drum as it passes between the pole-pieces of each of the recording coils in one of the magnetic conditions caused by one of the two different types of signals or voltage conditions to be recorded in the drum. Thus, it is assumed that this voltage will be in the same direction as produced by the so-called O signal when it is desired to record such a signal in the drum. Of course, the opposite or X signal will then comprise magnetizing the drum in the reverse direction between the pole-pieces. In some instances, it is desirable to provide a third type of magnetization which will produce no voltage in the pick-up or reading coil. Such a magnetic condition is readily obtained by orienting an additional coil adjacent to the same channel and rotating the pole-pieces with respect to the channel so that they are 90 degrees displaced from the pole-pieces of the recording coil and the corresponding pick-up coil. Thus an O is recorded in the magnetic material by orienting the so-called magnetic vectors in one direction, which direction causes a voltage of one polarity to be obtained from the pick-up coil or coils when this portion of the drum passes under the pole tips. The recording of an X signal will apply a reverse magnetization to the magnetic material and thus in effect will orient the magnetic vectors in a direction substantially 180 degrees from the first direction and thus cause a voltage of the opposite polarity in the pick-up coil. The erasing or third magnetic condition will cause the magnetic vectors to be rotated at an angle of 90 degrees to the first direction and thus cause no voltage to be induced in the output of the pick-up coil.

When only two magnetic conditions are required then the first or zero condition in general does not cause a voltage to be induced in the pick-up coil, whereas the opposite magnetic condition representing an X signal causes a voltage of a predetermined polarity and wave shape to be induced in the corresponding pick-up coil. It should be noted that the pick-up coils, recording coils and all of the control equipment therefor, together with the electrostatic distributor or scanning mechanisms in accordance with this invention are common to all of the subscriber lines assigned to the slots on a given magnetic drum. The various elemental areas on this drum called "cells," however, are individually assigned to different ones of these subscriber lines and at all times during the call accurately record the electrical condition of that line. The cells or slots or elemental areas assigned to a given line are employed for recording the condition of only that line and are never employed to record the condition of any of the other lines individual to the drum.

*Operation of line scanner detector*

Considering now the operation of the system, and referring more particularly to Figs. 5 and 6 of the drawings, the sleeve conductor 5–SI–001, associated with subscriber line 5–L–1, is connected via cable 5–SLI to segment 5–001 of the line scanner 5–LS. When a subscriber line, such as 5–L–1, is not connected to an outgoing trunk to a distant office, or when a connection is established and the identification of the calling subscriber has been accomplished, a negative potential from the central office battery which operates the switching devices is applied to the sleeve conductor, such as 5–SI–001, of the subscriber line 5–L–1, with the result that the voltage applied to segment 5-001 of the line scanner 5-LS remains at a negative potential. However, when a calling subscriber served by subscriber line 5-L-1 dials a number and thereby causes the seizure of an outgoing trunk, a positive potential is applied to the sleeve conductor 5-SI-001, as previously described, with the result that a positive potential is applied to segment 5-001 of the line scanner. In the specific arrangement shown in the drawing the same battery voltage is connected to the shielding segments 5-30 as is normally applied to the sleeve conductors 5-SI-000 to 5-SI-999, inclusive. Consequently, so long as the subscriber lines are not in use in connection with a trunk connection, or when the identification of a calling subscriber for a completed connection has been accomplished, no change in voltage is induced upon the rotating member 5-25. Thus, as the end 5-27 of the rotating arm 5-25 of the line scanner 5-LS successively passes in proximity to the line segments, a negative potential is induced in the end 5-27 each time that a line segment associated with a line not requiring the services of an identifier is passed. Therefore, prior to the seizure of an outgoing trunk for use with subscriber line 5-L-1 and the consequent application of positive potential by the trunk circuit, and after the completion of identification, sleeve conductor 5-SI-001 is at a negative potential which is repetitively applied via line scanner 5-LS, over shielded cable 5-22 to the control grid of negative feedback cathode follower tube 6-LS1.

It is to be understood that the identifier circuits including the line scanner are common to all of the subscriber lines served by a central office and may be employed by one calling subscriber line at a time in ascertaining the directory number of said calling line. The sequential use of the identifier circuits is controlled by preferential use circuits previously described.

The plate voltages for the amplifier tubes 6-LS1, 6-LS2, 6-LS3 and 6-LS4 are supplied by battery 6-B1 which, it will be assumed, for example, furnishes a potential of 300 volts. With 300 volts positive applied to the plate of cathode follower tube 6-LS1, it is further assumed that the values of resistors 6-R1 and 6-R2 are chosen so as to produce a biasing potential on the control grid of tube 6-LS1 which, in conjunction with the repetitive negative potential applied to the control grid of 6-LS1, will permit only an extremely small current to flow from positive plate battery through the plate-cathode circuit of tube 6-LS1 and load resistor 6-R1 to ground so long as the potential applied to sleeve conductor 5-SI-001 remains negative. With the normal negative potential repetitively applied to the control grid of cathode follower tube 6-LS1, the voltage drop across the load resistor 6-R1 is very small, say .5 volt or less for example.

*Start of first revolution of drum to identify subscriber originating call*

Now, let it be assumed that the subscriber line 5-001 has become engaged in connection with a toll call, and that the line segment 5-001 is again traversed by end 5-27 of arm 5-25 during the time that subscriber line 5-L-1 is in use in connection with said toll call. The high positive potential extended to segment 5-001 via conductor 5-SI-001 induces a momentary positive potential in end 5-27, which potential is transmitted via shielded cable 5-22 to the control grid of tube 6-LS1 (see Fig. 6-A, item 1, Rev. 0).

Figs. 6-A and 6-B comprise a plurality of items each of which is graphically illustrative of the chronological relationship of the potential pulses applied to or delivered by the amplifiers or gate circuits, and the circuit operations controlled thereby, relative to the corresponding angular position of the drum during the several revolutions of the drum required to identify a calling subscriber. It is to be remembered that the drum is continuously rotating, therefore the terminology employed in Figs. 6-A and 6-B, such as Rev. 0, Rev. 1, etc., refers only to those particular revolutions of the drum encompassed by the time interval elapsing while a calling subscriber is being identified. Rev. 0, in Fig. 6-A, refers to that angular position of the drum at which time the first positive potential is detected on the sleeve conductor 5-SI-001 associated with subscriber line 5-L-1. Rev. 1, in Fig. 6-A, refers to the angular position of the drum 360 degrees later, after the detection of said first positive potential on the sleeve conductor 5-SI-001. Rev. 2 and successive revolutions each refer to the point in time at which the potential condition on sleeve conductor 5-SI-001 is sampled by the rotating element 5-27. The momentary positive input signal applied to the control grid of tube 6-LS1 overcomes the normal negative bias thereon and causes the current flow through the plate-cathode circuit of tube 6-LS1 and load resistor 6-R1 to momentarily increase. The momentary increase in current flow through load resistor 6-R1 causes its voltage drop to momentarily increase from its normal value of .5 volt positive to an appreciably higher value of say 5 volts positive, for example. The momentary potential increase to 5 volts positive across load resistor 6-R1 generates a positive-going pulse of short duration which is applied through capacitor 6-C1 to the grid of amplifier tube 6-LS2.

With 300 volts positive from battery 6-B1 applied through resistor 6-R3 to the plate of amplifier tube 6-LS2, it is assumed that the values of resistors 6-R3, 6-R4 and 6-R5 are chosen so as to produce a biasing potential on the grid of tube 6-LS2 which will normally, that is to say with no input or exciting signal applied, permit a substantially large current to flow from positive battery through resistor 6-R3, the plate-cathode current of tube 6-LS2 and load resistor 6-R4 to ground. During the absence of an input or exciting signal to the grid of tube 6-LS2 the voltage at the plate of tube 6-LS2 is, for example, 150 volts positive with respect to ground. When a momentary 5-volt positive-going pulse is applied through capacitor 6-C1 to the grid of tube 6-LS2 the plate-cathode current momentarily rises, thus causing an increased voltage drop across resistor 6-R3, thereby momentarily reducing the normal steady potential of 150 volts positive at the plate of tube 6-LS2 by a substantial amount, for example, 10 volts. The positive-going input pulse to tube 6-LS2 is thus inverted and produces a momentary negative-going output pulse at the plate of tube 6-LS2, which negative-going pulse is applied through capacitor 6-C2 to the grid of amplifier tube 6-LS3.

With 300 volts positive from battery 6-B1 applied through resistor 6-R6 to the plate of amplifier tube 6-LS3, it is assumed that the values of resistors 6-R6, 6-R7, and 6-R8 are chosen so as to produce a biasing potential on the grid of tube 6-LS3 which will normally, that is to say with no input signal applied, permit a fairly large current to flow from positive battery through resistor 6-R6, the plate-cathode circuit of tube 6-LS3 and load resistor 6-R7 to ground. During the absence of an input signal to the grid of tube 6-LS3 the voltage at the plate of tube 6-LS3 is, for example, 150 volts positive with respect to ground. When a momentary 10 volt negative-going pulse is applied through capacitor 6-C2 to the grid of amplifier tube 6-LS3, the plate-cathode current momentarily decreases thus momentarily causing a decreased voltage drop across resistors 6-R6 and 6-R7, thereby momentarily increasing the normal steady potential of 150 volts positive at the plate of tube 6-LS3 by a substantial amount, for example, 10 volts. The negative-going input pulse to tube 6-LS3 is thus inverted and produces a momentary positive-going output pulse at the plate of tube 6-LS3, which positive-going pulse is applied through capacitor 6-C4 to the grid of amplifier tube 6-LS4. During the absence of an input signal to the grid of tube 6-LS3 the normal voltage drop across load resistor 6-R7 is, for example, about 5 volts positive with respect to ground. When a momentary negative-going pulse is applied to the grid of tube 6–LS3, the momentary decrease in current flow through load resistor 6–R7 causes the voltage drop to momentarily decrease from its normal value of 5 volts to an appreciably lower value of say .5 volt, for example.

With 300 volts positive from battery 6–B1 applied through resistor 6–R9 to the plate of amplifier tube 6–LS4, it is assumed that the values of resistors 6–R9, 6–R10 and 6–R11 are chosen so as to produce a biasing potential on the grid of tube 6–LS4 which will normally permit a substantially large current to flow from positive battery through resistor 6–R9, the plate-cathode circuit of tube 6–LS4 and load resistor 6–R10 to ground. During the absence of an input signal to the grid of tube 6–LS4 the voltage at the plate of tube 6–LS4 is, for example, 225 volts positive with respect to ground. When a momentary 10 volt positive-going pulse is applied through capacitor 6–C4 to the grid of amplifier tube 6–LS4, the plate-cathode current momentarily increases, thus momentarily causing an increased voltage drop across resistors 6–R9 and 6–R10 and thereby momentarily decreasing the normal steady potential of 225 volts positive at the plate of tube 6–LS4 by a substantial amount, say 70 volts. The positive-going input pulse to tube 6–LS4 is thus inverted and produces a momentary negative-going output pulse at the plate of tube 6–LS4, which negative-going pulse is applied through the back contacts of armature No. 1 of relay 6–LSTR to capacitor 6–C6. During the absence of an input signal to the grid of tube 6–LS4 the normal voltage drop across load resistor 6–R10 is, for example, about 40 volts positive with respect to ground. When a momentary positive-going pulse is applied to the grid of tube 6–LS4, the momentary increase in current flow through load resistor 6–R10 causes the voltage drop to momentarily increase from its normal value of 40 volts to an appreciably higher value of say 60 volts, for example.

Referring now to Figs. 6 and 6–A, Rev. 0, it is apparent that a positive potential applied to the line segment 5–001 induces a positive potential in the scanning element 5–27, which positive or exciting potential is applied to the grid of amplifier 6–LS1 (see Fig. 6–A, item 1, Rev. 0), is inverted at the cathode of amplifier 6–LS3, and appears as a negative-going pulse applied to the upper terminal of diode 6–G2A of the gate circuit 6–G2 (see Fig. 6–A, item 2, Rev. 0). It is also apparent that the positive-going or exciting potential applied to grid of amplifier 6–LS1 is repeated at the cathode of amplifier 6–LS4 and appears as a positive-going pulse applied to the upper terminals of diodes 6–G1A and 6–G3A of the gate circuits 6–G1 and 6–G3, respectively (see Fig. 6–A, item 3, Rev. 0). Positive battery is connected through resistor 6–R12 and the No. 2 back contacts of relay 6–WSTR to the right-hand terminal of diode 6–G1B to partially enable gate circuit 6–G1. Positive battery is also connected through resistor 6–R20 and the No. 9 back contacts of relay 6–LS1 to the lower terminal of diode 6–G2D to partially enable gate circuit 6–G2.

Each of the gate circuits 6–G1, 6–G2 and 6–G3 comprises a plurality of rectifiers or diodes which may be of the germanium crystal type or other suitable forms of crystals or combinations of crystals or high vacuum diodes. Each of the gate circuits has a plurality of inputs such as indicated, for example, by the upper or rectangular terminal of diode 6–G1A. Each of the inputs to the gate circuits has either one or the other of two different potential or polarity conditions applied to it. In the exemplary system described herein in detail, the gate circuits are arranged to have their input circuits or rectangular terminals connected to relatively low impedance circuits which will apply thereto either a steady high positive or a steady high negative voltage of say about 75 volts or more, or a superimposed positive-going or a superimposed negative-going pulse of substantial amplitude.

The gate circuits 6–G1, 6–G2 and 6–G3 are of the type frequently referred to as "AND" gate circuits, that is, circuits arranged in such a way that a steady high positive potential or a positive-going pulse of high amplitude must be applied to all of the input terminals of the gate circuit before a high positive voltage is repeated from the output terminal of the gate circuit. Such circuits are obtained by applying suitable potentials to the diode elements and properly orienting the diode element. Furthermore, the voltages applied to these circuits may be such that input voltages so applied to the input terminals prevent a high positive output pulse instead of permitting one, as described above.

For example, with respect to the gate circuit 6–G1, with relay 6–WSTR in a non-operated condition, positive voltage is applied to the right-hand terminal of diode 6–G1B. It is necessary that a positive-going pulse be applied to the upper terminal of diode 6–G1A to open the gate circuit 6–G1 in order to permit a high positive pulse to be repeated from the output of gate circuit 6–G1, thereby causing an X signal to be recorded by the write X winding of writing head 5–WDC in the delay channel associated therewith.

The simultaneous application of a positive-going potential to diode 6–G1A and of a steady positive potential to diode 6–G1B opens or renders gate circuit 6–G1 conductive and permits the positive-going pulse from the cathode follower of amplifier 6–LS4 to be transmitted through capacitor 6–C5 to the grid of the upper section of writing amplifier 6–WA (see Fig. 6–A, items 3 and 5, Rev. 0). The application of a positive-going pulse to the grid of the upper section of amplifier 6–WA results in an increase in the current flowing through conductor 6–WX, thus energizing the right-hand winding of writing head 5–WDC, thereby causing an X signal to be recorded in the corresponding cell or unit area in the slot of the delay channel of the drum aligned with or corresponding to the line segment of the calling line, which cell is passing under the pole-pieces of writing head 5–WDC at this time (see Fig. 6–A, item 6, Rev. 0).

The gate circuit 6–G2, consisting of diodes 6–G2A, 6–G2B, 6–G2C, and 6–G2D is closed or disabled at this time by the negative battery connected through resistor 6–R13 and back contacts of armature No. 1 of relay 6–WSTR to diode 6–G2C.

The negative-going pulse from the plate of amplifier 6–LS4 (see Fig. 6–A, item 4, Rev. 0) charges capacitor 6–C6 to a potential approximately 70 volts below that of the plate voltage supply source. After capacitor 6–C6 is charged, the increased potential difference between the plate and the starter anode of cold cathode tube 6–LST causes cold cathode tube 6–LST to fire from positive voltage 6–B1 on its plate across the tube to a circuit from its cathode through the winding of relay 6–LSTR, conductor 6–10, No. 11 and No. 10 continuity contacts of relay 6–LSI, conductor 6–ONG1, cable 6–CA1 to Fig. 11, conductor 6–ONG1, the No. 3 back contacts of relay 11–2M, conductor 14–ONG to Fig. 14, and the upper No. 4 contacts of off-normal relay 14–ON to ground, thus causing relay 6–LSTR to operate (see Fig. 6–A, item 7, Rev. 0). Cold cathode tube 6–LST will remain in a conductive condition and relay 6–LSTR will remain operated so long as ground is connected to conductor 6–10. The operation of relay 6–LSTR connects resistor 6–R14 through the No. 1 front contacts of relay 6–LSTR to discharge capacitor 6–C6. The operation of relay 6–LSTR also opens its No. 2 back contacts, thus removing the short circuit across capacitor 6–C7. At the same time, a circuit is closed from the cathode of cold cathode tube 6–WST through the No. 2 front contacts of relay 6–LSTR and the winding of relay 6–WSTR to ground on conductor 6–10 (over a previously described circuit).

Positive voltage from cource 6–B1 through resistor 6–R15, capacitor 6–C7, the No. 2 front contacts of relay 6–LSTR and the winding of relay 6–WSTR to ground on conductor 6–10 starts the charging of capacitor 6–C7. After a suitable time interval has elapsed, capacitor 6–C7 is charged to a potential value sufficient to fire cold cathode tube 6–WST through resistor 6–R21 to the control anode of tube 6–WST, and thus to complete a circuit from positve battery 6–B1, through the plate-cathode circuit of tube 6–WST, the No. 2 front contacts of relay 6–LSTR and the winding of relay 6–WSTR to ground on conductor 6–10 (as previously described). Relay 6–WSTR operates (see Fig. 6–A, item 8, Rev. 0) and will remain operated so long as ground is connected to conductor 6–10 to maintain cold cathode tube 6–WST in a conductive condition. The operation of relay 6–WSTR closes or disables gate circuit 6–G1 by disconnecting the positive potential connected through resistor 6–R12 to diode 6–G1B and connecting a negative potential through resistor 6–R13 in its stead. With gate circuit 6–G1 disabled, further positive-going pulses from the cathode of amplifier 6–LS4 are prevented from being applied to the upper section of the writing amplifier 6–WA. Relay 6–WSTR, in operating, also partially enables gate circuit 6–G2 by disconnecting from diode 6–G2C the negative potential through resistor 6–R13 and connecting a positive potential through resistor 6–R12 in its stead. However, so long as a positive potential is connected to the sleeve conductor of the subscriber line, the line scanner at each revolution of the drum will traverse the line segment connected thereto and will momentarily apply a positive or exciting pulse to the input of amplifier 6–LS1 (see Fig. 6–A, item 1, Rev. 0) with the result that for each revolution of the drum a negative-going pulse is applied to the upper terminal of diode 6–G2A, thus rendering gate circuit 6–G2 ineffective to transmit erase or write O signal pulses through capacitor C–9 to the grid of the lower section of writing amplifier 6–WA. The operation of relay 6–WSTR also opens its No. 3 back contacts, thus removing the short circuit across capacitor 6–C8. At the same time, a circuit is closed from the cathode of cold cathode tube 6–EST through the No. 3 front contacts of relay 6–WSTR and the winding of relay 6–ESTR to ground on conductor 6–10 (as previously described).

Positive voltage from source 6–B1 through resistor 6–R16, capacitor 6–C8, the No. 3 front contacts of relay 6–WSTR, and the winding of relay 6–ESTR to ground on conductor 6–10, starts the charging of capacitor 6–C8.

After the above-described X signal is written in the cell in the delay channel in the slot corresponding to subscriber line 5–L–1 (see Fig. 6–A, item 6, Rev. 0) in the manner described above, the cell is carried by the rotation of the drum and, after one-half revolution, passes under the pole-pieces of the reading head 5–RDC and causes an output voltage to be developed in the winding of the reading head. The output winding of reading head 5–RDC is connected to transfer amplifier 5–113 which, under control of a coincident synchronizing or master pulse from reading head 5–MPC, causes the corresponding X signal to be recorded, that is to say superimposed upon the original O signal condition previously established therein at the time the drum was placed in service, said X signal being recorded by the writing head 5–WMC in the cell in the main channel in the slot corresponding to subscriber line S–L–1, which cell is passing under the pole-pieces of writing head 5–WMC at this time (see Fig. 6–A, item 9, Rev. ½). The cell in the delay channel in the slot corresponding to subscriber line 5–L–1, in which cell the X signal was recorded by the writing head 5–WDC, is carried by the rotation of the drum and, after a further quarter revolution of the drum, passes under the erasing head 5–118 which changes the magnetic state of the cell so as to effectively nullify the signal previously recorded therein (see Fig. 6–A, item 6, Rev. ¾).

In the meantime, capacitor 6–C8, which has been charging, achieves a potential value sufficient to fire cold cathode tube 6–EST through resistor 6–R22 to its control anode, and thus completes a circuit from positive battery 6–B1, through the plate-cathode circuit of tube 6–EST, the No. 3 front contacts of relay 6–WSTR and the winding of relay 6–ESTR to ground on conductor 6–10 (over a previously described circuit). Relay 6–ESTR operates (see Fig. 6–A, item 10) and will remain operated so long as ground is connected to conductor 6–10 to maintain cold cathode tube 6–EST in a conductive condition. The exact time at which tube 6–EST fires to operate relay 6–ESTR is not critical except that the time interval between the first scanning of the sleeve signal potential (at the beginning of the first revolution) and the subsequent operation of relay 6–ESTR should be appreciably less than the time required for the drum to complete its first revolution. This limitation is necessary in order to prepare the operating circuit for relay 6–LSI by the time that the drum has completed its first revolution. Relay 6–ESTR, in operating, enables cold cathode tube 6–CG (see Fig. 6–A, item 10) by connecting its cathode through the contacts of relay 6–ESTR to ground on conductor 6–10.

The slow-firing cold cathode tubes 6–LST, 6–WST and 6–EST, and the relays 6–LSTR, 6–WSTR and 6–ESTR, respectively controlled thereby, interpose a cumulative delay interval between the excitation of amplifiers 6–LS1, 6–LS2, 6–LS3 and 6–LS4 and the firing of cold cathode tube 6–CG. This delayed firing of cold cathode tube 6–CG prevents the premature operation of connector relay 6–LSI, and will be further described later.

Following the operation of relay 6–ESTR, the cell in the main channel in the slot corresponding to subscriber line 5–L–1, in which cell is stored the previously described X signal (transferred thereto), is carried by the continued rotation of the drum and, one-half revolution later, at the completion of the first revolution, passes under the pole-pieces of reading head 5–RMC, thereby causing an X output signal voltage to be developed in the winding thereof. As a result, the voltage induced in the winding of the reading head 5–RMC causes a momentary negative-going pulse to be applied to the grid of the reading amplifier tube 6–T1 (see Fig. 6–A, item 11, Rev. 1) wherein the negative-going input pulse is inverted and applied to the grid of amplifier tube 6–T2. The positive-going input pulse to tube 6–T2 is repeated and amplified therein and appears at the cathode of tube 6–T2 as a momentary positive-going pulse of substantial amplitude, which positive-going pulse is applied to the rectangular terminals of diodes 6–G2B and 6–G3B as an input signal to gate circuits 6–G2 and 6–G3, respectively (see Fig. 6–A, item 12, Rev. 1).

*Completion of first revolution of drum and start of second revolution*

At the same instant that the drum has completed its first revolution, as above described, and is starting its second revolution, the rotating element 5–27 of the line scanner again passes adjacent to line segment 5–001 associated with subscriber line 5–L–1. If the subscriber line is still engaged in connection with a bona fide call, the identification cycle of which has not been completed, a positive potential will still be present on the sleeve lead and the line segment connected thereto. The positive potential induced on the rotating element 5–27 is again momentarily applied to the grid of amplifier tube 6–LS1 (see Fig. 6–A, item 1, Rev. 1) and again causes a momentary negative-going pulse to appear at the cathode of amplifier 6–LS3 (see Fig. 6–A, item 2, Rev. 1), and a momentary positive-going pulse to again appear at the cathode of amplifier 6–LS4 (see Fig. 6–A, item 3, Rev. 1) in the manner previously described. The second momentary negative-going pulse from the cathode of amplifier 6–LS3, evidencing that a bona fide call is in progress and that the services of an identifier are required, is applied to the upper terminal of diode 6–G2A (see Fig.

6–A, item 2, Rev. 1), and simultaneously therewith the previously described positive-going pulse from the output of reading amplifier 6–RA (see Fig. 6–A, item 12, Rev. 1) is applied to the lower terminal of diode 6–G2B. The negative-going one of these two pulses disables gate circuit 6–G2, thereby preventing gate circuit 6–G2 from opening to permit the application of a positive-going or erase (or write O) pulse through capacitor 6–C9 to the grid of the lower section of writing amplifier 6–WA.

It should be borne in mind that the X signal which was recorded in the cell in the slot corresponding to subscriber line 5–L–1 in the delay channel, which cell was under the pole-pieces of writing head 5–WDC at the beginning of the first revolution of the drum (see Fig. 6–A, item 6, Rev. 0), was transferred to and recorded in the cell in the slot corresponding to subscriber line 5–L–1 in the main channel one-half revolution later (see Fig. 6–A, item 9, Rev. ½), and that the said X signal in the cell in the delay channel was erased therefrom approximately 270 degrees after having been recorded in the delay channel (see Fig. 6–A, item 6, Rev. ¾).

The momentary positive-going pulse from the cathode follower output of amplifier 6–LS4 is applied to the upper terminals of diodes 6–G1A and 6–G3A of gate circuits 6–G1 and 6–G3, respectively (see Fig. 6–A, item 3, Rev. 1). The gate circuit 6–G1 is at this time disabled by the operation of relay 6–WSTR as previously described, thus preventing a positive-going pulse from being repeated to the upper or write X section of the input of writing amplifier 6–WA (see Fig. 6–A, item 5, Rev. 1) thereby preventing the writing of an X signal in the delay channel (see Fig. 6–A, item 6, Rev. 1). The momentary positive-going pulse from the cathode follower output of amplifier 6–LS4, applied to the upper terminal of diode 6–G3A (see Fig. 6–A, item 3, Rev. 1), enables the gate circuit 6–G3 to be opened by the simultaneous application to the left-hand terminal of diode 6–G3B (see Fig. 6–A, item 12, Rev. 1) of the previously described momentary positive-going pulse from the cathode output of reading amplifier 6–RA. The opening of the gate circuit 6–G3, by the simultaneous application of positive-going input pulses to both of its diodes, permits a momentary positive-going pulse to be repeated from the output of gate circuit 6–G3 to the grid of amplifier tube 6–LS0 (see Fig. 6–A, item 13, Rev. 1).

With 300 volts positive from battery 6–B2 applied through resistor 6–R17 to the plate of amplifier tube 6–LS0, it is assumed that the values of resistors 6–R17, 6–R18 and 6–R19 are chosen so as to produce a biasing potential on the grid of tube 6–LS0 which will normally, that is to say with no input signal applied thereto, permit a fairly small current to flow from positive battery through resistor 6–R17, the plate-cathode circuit of tube 6–LS0 and load resistor 6–R18 to ground. During the absence of an input signal to the grid of tube 6–LS0 the voltage at the plate of tube 6–LS0 is, for example, 250 volts positive with respect to ground. When a momentary positive-going pulse is applied to the grid of tube 6–LS0 the plate-cathode current therethrough momentarily increases, thus momentarily causing an increased voltage drop across resistors 6–R17 and 6–R18, thereby momentarily decreasing the normal steady potential of 250 volts positive at the plate of tube 6–LS0 by a substantial amount, for example, say 40 volts. The momentary positive-going input pulse to tube 6–LS0 is thus inverted and produces a momentary negative-going output pulse at the plate of tube 6–LS0, which negative-going pulse is applied through conductor 6–11, the No. 7 back contacts of relay 6–LSI to the starter anode of cold cathode tube 6–CG (see Fig. 6–A, item 14, Rev. 1) and also through capacitor 6–C11 to ground. Capacitor 6–C11 charges after a short interval of time and permits tube 6–CG to fire and to complete a circuit from 130 volt positive battery, through the winding of relay 6–LS1 (see Fig. 6–A, item 15, Rev. 1), the plate-cathode circuit of tube 6–CG, and the contacts of relay 6–ESTR to ground on conductor 6–10 (over a previously described circuit), causing relay 6–LSI to operate and to lock up through its No. 6 front continuity contacts to off-normal ground (over a previously described circuit) on conductor 6–ONG1.

When relay 6–LSI operates and locks up to off-normal ground, it removes off-normal ground from conductor 6–10, thus causing the cold cathode tubes 6–LST, 6–WST and 6–EST to be extinguished and thereby to effect the release of relays 6–LSTR, 6–WSTR and 6–ESTR. Relays 6–LSTR and 6–ESTR, in releasing, causing the discharge of capacitors 6–C7 and 6–C8, respectively. With relay 6–WSTR released, positive potential through resistor 6–R12 is connected to diode 6–G1B, and a short time after the drum has completed its first revolution, the gate circuit 6–G1 is reenabled or opened to permit the transmission of a positive-going pulse from the cathode follower output of amplifier tube 6–LS4 to the input of the upper section of writing amplifier 6–WA if and when a positive line signal is again encountered at the completion of the second revolution of the drum. If so, this will, in the manner previously described, cause an X signal to be recorded in the delay channel of the drum. The locking ground on relay 6–LSI short-circuits the plate of cold cathode tube 6–CG and extinguishes it. Relay 6–LSI, in operating, also closes a circuit to connect ground through resistor 6–R24 and the No. 8 front contacts of relay 6–LSI to discharge capacitor 6–C11. Relay 6–LSI, in operating, disables gate circuit 6–G2 by disconnecting the positive battery through resistor 6–R20 connected to diode 6–G2D through the No. 9 back contacts of relay 6–LSI and connecting in its stead, through its No. 9 front contacts, negative battery through resistor 6–R23, thereby preventing the output of gate circuit 6–G2 from repeating an erase or write O pulse to the input of the lower section of writing amplifier 6–WA.

Relay 6–LSI, in operating, also disconnects the output conductor 6–11 of amplifier tube 6–LS0 from the start anode of tube 6–CG and connects the output conductor 6–11 through the No. 7 front contacts of relay 6–LSI, conductor 6–LS, cable 6–CA1 to Fig. 12, conductor 6–LS, through a one-out-of-four check circuit over contacts 10 of relays 12–CT and 12–BT, and contacts 11 of relays 12–AT and 12–NT, conductor 6–LSS, cable 6–CA1A to the No. 2 back contacts of relay 11–2M in the digit reader circuit of the "A" identifier. Conductor 6–LSS in Fig. 11 is also multipled to the corresponding relay contact of the 11–2M relay (not shown) in the digit reader circuit of the "B" identifier.

*Operation of line scanner detector responsive to a non-bona fide call condition*

Digressing at this point from the assumption that a bona fide call is in progress, it will now be assumed that the sleeve conductor 5–SI–001 connected to line segment 5–001 has a positive potential applied thereto, which positive potential condition is of a short duration and persists for a time interval less than the time required for one revolution of the drum. This assumption is made in order that the operation of the system in response to a non-bona fide call may be described and clearly understood. It will, therefore, be assumed that at the instant the rotating element 5–27 traverses segment 5–001 at the start of the first revolution of the drum, a positive potential is encountered thereon, which positive potential is of a transitory nature but is nevertheless of sufficient duration and amplitude to fire amplifier tube 6–LS1 and, sequentially, tubes 6–LS2, 6–LS3 and 6–LS4 (see Fig. 6–C, item 1, Rev. 0), in the manner previously described.

Amplifier tube 6–LS3, in firing, produces a momentary negative-going pulse at its cathode follower output, which pulse is applied to diode 6–G2A of the gate circuit 6–G2 (see Fig. 6–C, item 2, Rev. 0). The momentary negative-going pulse applied to diode 6–G2A prevents the gate circuit 6–G2 from repeating a positive-going pulse to the input of the lower section of amplifier tube 6–WA, in the manner previously described.

Amplifier tube 6–LS4, in firing, produces a positive-going pulse at its cathode follower output, which pulse is applied to diodes 6–G1A and 6–G3A (see Fig. 6–C, item 3, Rev. 0). Amplifier tube 6–LS4 also produces a negative-going pulse at its plate output, which pulse is applied to the input of cold cathode tube 6–LST (see Fig. 6–C, item 4, Rev. 0).

The gate circuit 6–G1 is enabled by the positive-going pulse applied to diode 6–G1A and repeats a positive-going pulse to the input of the upper section of amplifier tube 6–WA (see Fig. 6–C, item 5, Rev. 0). The output of the upper section of amplifier tube 6–WA applies a positive-going pulse to the write X winding of the writing head 5–WDC of the delay channel (see Fig. 6–C, item 6, Rev. 0), thereby causing an X signal to be written in the cell in the slot corresponding to subscriber line 5–L–1 in the delay channel, which cell is passing under the pole-pieces of writing head 5–WDC at that instant.

After capacitor 6–C6 has charged, cold cathode tube 6–LST fires (see Fig. 6–C, item 7, Rev. 0) through the winding of relay 6–LSTR to ground, causing relay 6–LSTR to operate as previously described. After capacitor 6–C7 has charged, cold cathode tube 6–WST fires (see Fig. 6–C, item 8, Rev. 0) through the No. 2 front contacts of relay 6–LSTR and the winding of relay 6–WSTR to ground, causing relay 6–WSTR to operate and to disable gate circuit 6–G1 and, at the same time, to enable gate circuit 6–G2, in the manner previously described.

After the above described X signal is written in the cell in the delay channel in the slot corresponding to subscriber line 5–L–1 (see Fig. 6–C, item 6, Rev. 0), as previously described, the cell is carried by the rotation of the drum and after one-half revolution passes under the pole-pieces of the reading head 5–RDC, thus causing an X output voltage to be developed in the winding of the reading head 5–RDC. The X output signal voltage from reading head 5–RDC is applied to the input of the transfer amplifier 5–113 and, together with a coincident synchronizing pulse from reading head 5–MPC, causes the corresponding X signal to be recorded by writing head 5–WMC in the cell in the main channel in the slot corresponding to subscriber line 5–L–1, which cell is passing under the pole-pieces of writing head 5–WMC at that instant (see Fig. 6–C, item 9, Rev. ½).

The cell in the delay channel in the slot corresponding to subscriber line 5–L–1, in which cell the X signal is recorded by the writing head 5–WDC, is carried by the rotation of the drum and, after a further quarter revolution of the drum, passes under the erasing head 5–118 and the X signal is thereby erased from the cell, in the manner previously described (see Fig. 6–C, item 6, Rev. ¾).

After capacitor 6–C8 has charged, cold cathode tube 6–EST fires (see Fig. 6–C, item 10) through the No. 3 front contacts of relay 6–WSTR and the winding of relay 6–ESTR to ground, causing relay 6–ESTR to operate and to enable cold cathode tube 6–CG, as previously described.

At this point in the description of a non-bona fide call as graphically illustrated in Fig. 6–C, it should be noted that the operation of the circuits as described with reference to Fig. 6–C, items 1 to 12, inclusive, Rev. 0, closely parallels the circuit operations for a bona fide call as previously described with reference to Fig. 6–A, items 1 to 12, inclusive, Rev. 0.

Continuing with the description of the circuit operations responsive to a non-bona fide call condition, the transitory positive potential on the sleeve conductor 5–SI–001 connected to line segment 5–001 having been removed, the drum in its rotation completes its first revolution and is starting its second revolution, at which time the rotating element 5–27 again passes adjacent to line segment 5–001 connected to sleeve conductor 5–SI–001 of line 5–L–1. At this instant, however, the rotating element 5–27 encounters a steady negative potential on line segment 5–001, which steady negative potential indicates an idle line condition, or that the services of an identifier are not required. The steady negative potential on line segment 5–001 does not induce any change in potential on rotating element 5–27 and, therefore, no positive-going or exciting pulse is applied to the input of amplifier 6–LS1 at the completion of the first revolution of the drum (see Fig. 6–C, item 1, Rev. 1).

In the absence of an input or exciting signal to amplifier 6–LS1, amplifier tubes 6–LS1, 6–LS2, 6–LS3, and 6–LS4 remain in their normal or non-excited state. With amplifier 6–LS3 in its non-excited state, the steady positive potential developed across load resistor 6–R7 (cathode of tube 6–LS3) is applied to the upper terminal of diode 6–G2A of gate circuit 6–G2 (see Fig. 6–C, item 2, Rev. 1).

With amplifier 6–LS4 in its non-excited state, the steady low positive potential developed across load resistor 6–R10 is applied to the upper terminals of diodes 6–G1A and 6–G3A of the gate circuits 6–G1 and 6–G3, respectively (see Fig. 6–C, item 3, Rev. 1), which steady potential is of insufficient amplitude to enable the gate circuits 6–G1 and 6–G3. Also, with amplifier 6–LS4 in its non-excited state, the steady high positive potential at the plate of tube 6–LS4 remains unchanged and, therefore, no negative-going pulse is applied to the starter anode of cold cathode tube 6–LST at this time (see Fig. 6–C, item 4, Rev. 1).

When relay 6–WSTR operated, it disabled gate circuit 6–G1 by disconnecting the positive potential connected through resistor 6–R12 to diode 6–G1B through the No. 2 back contacts of relay 6–WSTR, and by connecting in its stead negative battery through resistor 6–R13 and the No. 2 front contacts of 6–WSTR, thus preventing the application of a positive-going pulse from the output of gate circuit 6–G1 to the input of the upper section of writing amplifier 6–WA (see Fig. 6–C, item 5, Rev. 1) and, as a consequence thereof, preventing the application of a positive-going output pulse from the output of the upper section of writing amplifier 6–WA to the write X winding of writing head 5–WDC of the delay channel (see Fig. 6–C, item 6, Rev. 1).

When relay 6–WSTR operated, it also partially enabled gate circuit 6–G2 by disconnecting the negative potential connected to diode 6–G2C through resistor 6–R13 and the No. 1 back contacts of relay 6–WSTR, and by connecting in its stead positive battery through resistor 6–R12 and the No. 1 front contacts of relay 6–WSTR. Gate circuit 6–G2 is also partially enabled by positive battery connected to diode 6–G2D through resistor 6–R20 and the No. 9 back contacts of relay 6–LSI.

Relays 6–LSTR, 6–WSTR and 6–ESTR remain in their operated condition under control of off-normal ground on conductor 6–10 over a previously described circuit (see Fig. 6–C, items 7, 8 and 10, Rev. 1).

It will be remembered that the X signal which was recorded in the cell in the delay channel in the slot corresponding to subscriber line 5–L–1, which cell was under the pole-pieces of writing head 5–WDC at the beginning of the first revolution of the drum (see Fig. 6–C, item 6, Rev. 0), was transferred to the main channel one-half revolution later (see Fig. 6–C, item 9, Rev. ½), and that the said X signal in the delay channel was erased from the cell in the delay channel approximately 270 degrees after having been recorded therein (see Fig. 6–C, item 6, Rev. ¾). Therefore, at the end of the first revolution of the drum, no X signal is present in the cell in the delay channel in the slot corresponding to subscriber line 5–L–1 (see Fig. 6–C, item 6, Rev. 1), nor can another X signal be recorded therein because of the disabling of gate circuit 6–G1 by the operation of relay 6–WSTR as above described.

The cell in the main channel in the slot corresponding to subscriber line 5–L–1, to which cell the previously described X signal was transferred (see Fig. 6–C, item 9, Rev. ½), is carried by the continued rotation of the drum and, at the completion of the first revolution of the drum, passes under the pole-pieces of reading head 5–RMC, thereby causing an X output signal voltage to be developed in the winding thereof. As a result, the X output voltage induced in the winding of the reading head 5–RMC causes a momentary negative-going pulse to be applied to the grid of the reading amplifier tube 6–T1 (see Fig. 6–C, item 11, Rev. 1), wherein the negative-going input pulse is inverted and applied to the grid of amplifier tube 6–T2. The positive-going input pulse to tube 6–T2 is repeated and amplified therein and appears at the cathode of tube 6–T2 as a momentary positive-going pulse of substantial amplitude, which positive-going pulse is applied to the rectangular terminals of diodes 6–G2B and 6–G3B as an input signal to gate circuits 6–G2 and 6–G3, respectively (see Fig. 6–B, item 12, Rev. 1).

*Completion of first revolution of drum and start of second revolution (non-bona fide call)*

At the instant that the drum has completed its first revolution following the detection of the transitory pulse described above, and is starting its second revolution, the previously described steady positive potential from the cathode of tube 6–LS3 is applied to the upper terminal of diode 6–G2A of gate circuit 6–G2 (see Fig. 6–C, item 2, Rev. 1). As a result of the simultaneous application of positive potentials to diodes 6–G2A, 6–G2B, 6–G2C and 6–G2D, the gate circuit 6–G2 is enabled or opened and a positive-going pulse is applied from the output of gate circuit 6–G2 through capacitor 6–C9 to the grid of the lower section of writing amplifier 6–WA (see Fig. 6–C, item 13, Rev. 1). The application of a positive-going potential to the grid of the lower section of amplifier 6–WA results in an increase in the current flowing through conductor 6–WO, thus energizing the left-hand winding of writing head 5–WDC to cause an O or erase signal to be recorded in the cell or unit area in the delay channel in the slot corresponding to subscriber line 5–L–1 in the drum, which cell is passing under the pole-pieces of writing head 5–WDC at this time, see Fig. 6–C, item 14, Rev. 1).

The positive-going pulse from the cathode output of tube 6–T2 of reading amplifier 6–RA, applied to the input of diode 6–G3B at the completion of the first revolution of the drum (see Fig. 6–C, item 12, Rev. 1), is prevented from producing a positive-going output pulse from gate circuit 6–G3 to the grid of amplifier tube 6–LSO because the gate circuit 6–G3 is disabled or closed by the simultaneous application of a steady low positive potential from the cathode follower output of amplifier 6–LS4 to the upper terminal of diode 6–G3A (see Fig. 6–C, item 3, Rev. 1). Amplifier tube 6–LSO is, therefore, not excited at this time, and the plate of tube 6–LSO remains at its normal steady high potential which is applied to and maintains the starter anode of cold cathode tube 6–CG at the same steady high potential and thereby prevents cold cathode tube 6–CG from firing. Cold cathode tube 6–CG in its normal or unfired state is non-conducting and thereby prevents the completion of a circuit for the operation of relay 6–LSI.

After the above-described O or erase signal is written in the cell in the delay channel in the slot corresponding to subscriber line 5–L–1 (see Fig. 6–C, item 14, Rev. 1) as previously described, the cell is carried by the further rotation of the drum, and after one-half revolution passes under the pole-pieces of the reading head 5–RDC, thus causing an O or erase output signal voltage to be developed in the winding of reading head 5–RDC. The O or erase output signal voltage from reading head 5–RDC is applied to the input of the transfer amplifier 5–113 and, together with a coincident synchronizing pulse from reading head 5–MPC, causes the corresponding O or erase signal to be recorded, that is to say superimposed upon the X signal condition previously recorded therein, by the writing head 5–WMC in the cell in the main channel in the slot corresponding to subscriber line 5–L–1, which cell is passing under the pole-pieces of writing head 5–WMC at this time (see Fig. 6–C, item 15, Rev. 1½). The magnetic state of the cell in the main channel in the slot corresponding to subscriber line 5–L–1 has now been restored to the condition existing at the beginning of the first revolution of the drum.

The cell in the main channel in the slot corresponding to subscriber line 5–L–1, in which cell the above-described O or erase signal is recorded (see Fig. 6–C, item 15, Rev. 1½), is carried by the continued rotation of the drum and, at the completion of the second revolution of the drum, passes under the pole-pieces of reading head 5–RMC, thereby causing an O or erase signal voltage to be developed in the winding thereof. As a result, the O or erase output signal voltage induced in the winding of reading head 5–RMC causes a momentary positive-going pulse to be applied to the grid of the reading amplifier tube 6–T1 (see Fig. 6–C, item 16, Rev. 2) which is normally biased in a high current conducting condition; therefore the positive-going pulse applied to the grid of tube 6–T1 does not produce any further change in the current flowing through the plate-cathode circuit thereof. At this time, therefore, there is no change in the potential of the grid of tube 6–T2 and, consequently, the potential at the cathode follower output of tube 6–T2 of reading amplifier 6–RA remains at its normal steady low positive value (see Fig. 6–C, item 17, Rev. 2). The steady low positive potential from the cathode follower output of reading amplifier 6–RA is applied to the lower terminal of diode 6–G2B, thereby disabling the gate circuit 6–G2 to prevent the application of a positive-going pulse to the grid of the lower or erase section of writing amplifier 6–WA.

The relays 6–LSTR, 6–WSTR and 6–ESTR will be held in their operated condition under control of the off-normal ground on conductor 6–10 supplied over a previously described circuit from lockout circuits in the "A" or "B" identifiers. When the timing circuit associated with the "A" or "B" identifier times out, the off-normal ground is removed from conductor 6–10, thereby opening the plate-cathode circuits for the cold cathode tubes 6–LST, 6–WST and 6–EST, causing them to become non-conductive and to release the relays 6–LSTR, 6–WSTR and 6–ESTR respectively controlled thereby. The time interval between the completion of the second revolution of the drum and the release of the relays 6–LSTR, 6–WSTR and 6–ESTR is equal to the time required for several revolutions of the drum; therefore, the drum will complete a number of additional revolutions, at the end of which time the off-normal ground is removed from conductor 6–10 to effect the release of the relays 6–LSTR, 6–WSTR and 6–ESTR as above described (see Fig. 6–C, items 7, 8 and 10, Rev. N). The line scanner detector circuit is now restored to its normal condition and is in readiness to detect another positive potential condition on any of the line segments.

*Resume operation of line scanner detector responsive to a bona fide call condition*

Returning now to the assumption that a bona fide call is in progress with relay 6–LSI of Fig. 6 operated and locked, ground is extended through the No. 3 front contacts of relay 6–LSI, conductor 6–LSAI, cable 6–CA2 to Fig. 8, conductor 6–LSAI, and through the winding of connector relay 8–LSAI to battery, causing relay 8–LSAI to operate.

Reverting to the assumption that the call was originated by a "tip" subscriber and that the "A" identifier is to be employed, ground is extended through the No. 1 contacts of off-normal relay 14–ON, conductor 14–2, the lower No. 2 contacts of tip relay 14–T of the party test identifier circuit, conductor 14–TP, cable 14–PF into Fig. 8, conductor 14–TP, the No. 1 contacts of relay 6–LSI, conductor 6–TPI, cable 6–CA2 to Fig. 8, and through the winding of tip connector relay 8–TP to battery, causing relay 8–TP to operate. If, on the other hand, the call had been originated by a "ring" subscriber, ground would be extended through the No. 1 contacts of off-normal relay 14–ON, conductor 14–2, the lower No. 2 contacts of ring relay 14–R of the party test identifier circuit, conductor 14–RP in cable 14–PF, the No. 2 contacts of relay 6–LSI, conductor 6–RPI in cable 6–CA2, and through the winding of ring connector relay 8–RP to battery, causing relay 8–RP to operate. Ground is also extended through the lower front contacts of the normally operated relay 15–LSTA, conductor 10–ONLA into Fig. 12, cable 12–DWAC to Fig. 10, a chain circuit including the upper No. 4 back contacts of relay 10–CL and the upper No. 5 back contacts of relays 10–U, 10–T, 10–H and 10–TH, the upper No. 5 contacts of relay 10–A (the operating circuit for which was previously described), conductor 10–OF, cable 10–DWC to Fig. 8, the No. 11 contacts of relay 8–LSAI, conductor 8–OF, and through the winding of relay 8–ODS to battery, causing relay 8–ODS to operate.

Again referring to Fig. 4, it will be remembered that the right-hand or identification portion of the drum (shown in Fig. 5) comprises three sections, the tip party field section, the ring party field section, and the class section. The tip party field section and the ring party field section each have five digits prerecorded therein in two-out-of-five code, the first digit in each section representing the identity of the calling office, and the second, third, fourth and fifth digits in each section respectively representing the thousands, hundreds, tens and units digits of the calling subscriber's directory number, five channels being required to accommodate the code elements for each digit. Each channel has a reading head operatively associated therewith.

Referring now to Fig. 5, the first five channels in the tip party field section, wherein is prerecorded the digit expressing the identity of the tip calling office, have operatively associated therewith the reading heads 5–OT–0, 5–OT–1, 5–OT–2, 5–OT–4 and 5–OT–7, respectively, of which only heads 5–OT–0 and 5–OT–7 are shown. The windings of reading heads 5–OT–0 to 5–OT–7, inclusive, are respectively connected through output conductors 5–OT–0 to 5–OT–7, inclusive, in cables 5–OT and 5–IDC to Fig. 8, the contacts numbered 1, 2, 3, 4 and 5, respectively, of relay 8–ODS; the multipled conductors 8–TP0, 8–TP1, 8–TP2, 8–TP4 and 8–TP7, respectively; the contacts numbered 1, 2, 3, 4 and 5, respectively, of relay 8–TP; multipled conductors 8–0, 8–1, 8–2, 8–4 and 8–7, respectively; contacts numbered 5, 4, 3, 2 and 1, respectively, of relay 8–LSA1; multipled conductors 8–D0, 8–D1, 8–D2, 8–D4 and 8–D7, respectively; in cable 8–D to Fig. 11 and through respective resistances to the grids of digit reader tubes 11–DRA0, 11–DRA1, 11–DRA2, 11–DRA4 and 11–DRA7, respectively, of the "A" identifier; and to the corresponding grids of the "B" identifier tubes (not shown).

Thus it will be seen that the operation of the "office" field party connector relay 8–ODS selectively connects the ten "office" reader heads, five heads for the "tip" party and five heads for the "ring" party, to the ten multipled conductors 8–TP0 to 8–TP7, inclusive, and 8–RP0 to 8–RP7, inclusive. The coincident operation of relay 8–ODS and the "tip" party connector relay 8–TP selectively connects the five "tip" party "office" heads through the closed front contacts of relay 8–LSAI, via multipled conductors 8–D0 to 8–D7, inclusive, to the inputs of the digit reader circuits of Fig. 11, as above described.

The relays 6–LSF, 6LSI and 6–LSL are respectively associated with the first, intermediate, and last line scanner detector circuits and their respectively related drums, and for normal operation of the system, one, and one only, of the relays 6–LSF, 6–LSI and 6–LSL may be operated at one and the same time. With only the relay 6–LSI operated, ground is extended through the No. 4 armature and back contacts of relay 6–LSF, conductor 6–12, the No. 4 armature and front contacts of relay 6–LSI, conductor 6–13, the No. 5 armature and back contacts of relay 6–LSL, conductor 6–1, cable 6–CA3 to Fig. 11, and through the winding of slow operating and slow releasing relay 11–1AO to battery, causing relay 11–1AO to operate. Relay 11–1AO, in operating, completes a connection through its No. 2 contacts to extend the circuit of the conductor 6–LSS from the No. 2 contacts of relay 11–2M, via conductor 11–CC1 to the grids connected in multiple of digit reader gate tubes 11–DRG0, 11–DRG1, 11–DRG2, 11–DRG4 and 11–DRG7.

*Detection of line signal by more than one line scanner*

In the event that two or more line scanners should almost simultaneously find a line signal which satisfies their respective detector circuits, and thus result in the almost simultaneous operation of two relays, 6–LSF and 6–LSI, for example, and assuming that one of the relays, 6–LSI for example, operates a very short time prior to the operation of the other relay 6–LSF, relay 11–1AO will operate as previously described. If, after an extremely short interval, relay 6–LSF should operate, ground is removed from the conductor 6–12 at the No. 4 back contacts of relay 6–LSF, thus opening the operating circuit for relay 11–1AO which, being slow to release, does not release immediately. When relay 6–LSF operates, ground is extended through the No. 4 front contacts of relay 6–LSF, conductor 6–14, the No. 5 front contacts of relay 6–LSI, conductor 6–2M, cable 6–CA3 to Fig. 11, and through the winding of relay 11–2M to battery, causing relay 11–2M to operate and to lock to ground supplied through the No. 1 contacts of slow releasing relay 11–1AO. Relay 11–2M, in operating, breaks the circuit of conductor 6–LSS at its No. 2 contacts and also, at its No. 3 contacts, disconnects off-normal ground conductor 14–ONG from conductor 6–ONG1, thereby removing locking ground from relays 6–LSF, 6–LSI and 6–LSL. Relays 6–LSF, 6–LSI and 6–LSL release and remove locking ground from the tubes and relays respectively associated therewith, thus effecting the extinguishing of the tubes and the return of the circuits to their normal condition to await the initiation of a new operating cycle.

*Detection of line signal by one line scanner*

Resuming the assumption that the line scanner (associated with the group of line sleeve conductors 5–SI–000 to 5–SI–999, inclusive), at the instant that the drum has completed its first revolution and is starting its second revolution, has detected a positive potential on sleeve conductor 5–SI–001 connected to line segment 5–001, evidencing a bona fide call the identification cycle of which has not been completed on subscriber line 5–L–1 associated therewith, and also assuming that no other line sleeve conductor has a positive potential precondition thereon, the circuits will have operated as previously described, leaving relay 11–2M unoperated and relay 11–1AO operated in the digit reader of the "A" identifier circuit in Fig. 11.

*Completion of second revolution of drum and start of third revolution*

The drum continues to rotate and, at the instant that it completes its second revolution and is starting its third revolution, the rotating element 5–27 of the line scanner again passes adjacent to the line segment 5–001 associated with subscriber line 5–L–1 which, it is assumed, is still engaged in connection with a bona fide call requiring the services of an identifier. Line segment 5–001 consequently will still have a positive potential thereon. The positive potential induced on the rotating element 5–27 is again momentarily applied to the grid of amplifier tube 6–LS1 (see Fig. 6–A, item 1, Rev. 2) and again causes the amplifiers 6–LS1, 6–LS2, 6–LS3 and 6–LS4 to function in the manner previously described. Amplifier 6–LS3 delivers a negative-going output pulse from its cathode follower to the input of diode 6–G2A of gate circuit 6–G2 (see Fig. 6–A, item 2, Rev. 2). Amplifier 6–LS4 delivers a positive-going output pulse from its cathode follower to the inputs of diodes 6–G1A and 6–G3A of gate circuits 6–G1 and 6–G3, respectively (see Fig. 6–A, item 3, Rev. 2). Amplifier 6–LS4 also delivers a negative-going output pulse from its plate to the input of cold cathode tube 6–LST (see Fig. 6–A, item 4, Rev. 2). The cold cathode tubes 6–LST, 6–WST, 6–EST and 6–CG are prevented from firing at this time because ground was removed from conductor 6–10 by the operation of relay 6–LSI. The relays 6–LSTR, 6–WSTR and 6–ESTR also are prevented from operating because of the removal of ground from conductor 6–10.

The cell in the main channel in the slot corresponding to subscriber line 5–L–1, to which cell the previously described X signal was transferred at the completion of the first half revolution (see Fig. 6–A, item 9, Rev. ½), is carried by the further rotation of the drum and, at the completion of the second revolution of the drum, again passes under the pole-pieces of reading head 5–RMC, thereby causing an X output signal voltage to be again developed in the winding thereof. As a result, the X output signal voltage induced in the winding of reading head 5–RMC causes a momentary negative-going pulse to be applied to the input of reading amplifier 6–RA (see Fig. 6–A, item 11, Rev. 2) which functions, as previously described, to produce a momentary positive-going pulse at its output, which positive-going pulse is applied to the rectangular terminals of diodes 6–G2B and 6–G3B of gate circuits 6–G2 and 6–G3, respectively (see Fig. 6–A, item 12, Rev. 2).

The momentary negative-going pulse from the cathode of amplifier 6–LS3 is applied to the upper terminal of diode 6–G2A (see Fig. 6–A, item 2, Rev. 2), and simultaneously therewith the above-described positive-going pulse from the output of reading amplifier 6–RA (see Fig. 6–A, item 12, Rev. 2) is applied to the lower terminal of diode 6–G2B. The negative-going one of these two pulses disables gate circuit 6–G2, thereby preventing gate circuit 6–G2 from opening to permit the application of a positive-going or erase pulse through capacitor 6–C9 to the grid of the lower section of writing amplifier 6–WA.

The momentary positive-going pulse from the cathode follower of amplifier 6–LS4 is applied to the upper terminals of diodes 6–G1A and 6–G3A of gate circuits 6–G1 and 6–G3, respectively (see Fig. 6–A, item 3, Rev. 2). The gate circuit 6–G1 is at this time reenabled by the release of relay 6–WSTR which connects positive battery through resistor 6–R12 and the No. 2 back contacts of relay 6–WSTR to diode 6–G1B. The gate circuit 6–G1 in its enabled condition permits the positive-going pulse applied to the upper terminal of diode 6–G1A to be repeated through capacitor 6–C5 to the grid of the upper or write X section of writing amplifier 6–WA (see Fig. 6–A, item 5, Rev. 2). The application of a positive-going pulse to the grid of the upper section of amplifier 6–WA causes an X signal to be recorded in the cell in the delay channel slot corresponding to subscriber line 5–L–1 in the drum, which cell is passing under the pole-pieces of writing head 5–WDC at this time (see Fig. 6–A, item 6, Rev. 2), in the manner previously described.

The positive-going pulse from the cathode output of reading amplifier 6–RA applied to the diode 6–G3B at the end of the second revolution of the drum, in conjunction with the simultaneously applied positive-going pulse from the cathode follower of amplifier 6–LS4 to the diode 6–G3A, causes a momentary positive-going pulse to be applied to the grid of amplifier 6–LS0 (see Fig. 6–A, item 13, Rev. 2). The positive-going pulse applied to the grid of amplifier 6–LS0 is amplified and inverted therein, as previously described, and produces a momentary negative-going output pulse at the plate of tube 6–LS0, which negative-going pulse is applied through conductor 6–11, the No. 7 front contacts of relay 6–LS1, conductor 6–LS, cable 6–CA1 to Fig. 12, conductor 6–LS, contacts 10 of relays 12–CT and 12–BT, contacts 11 of relays 12–AT and 12–NT, conductor 6–LSS, cable 6–CA1A to Fig. 11 to the No. 2 contacts of relay 11–2M, and the No. 2 contacts of relay 11–1AQ to the grids of the digit reader gating tubes 11–DRG0, 11–DRG1, 11–DRG2, 11–DRG4 and 11–DRG7 (see Fig. 6–A, item 14, Rev. 2).

As previously stated, the calling subscriber's identification data prerecorded in the magnetic drum consists of a multi-digit number expressed in two-out-of-five code. A group of five channels in the drum is required to express each digit. A reading head is operatively associated with each channel. The five output conductors from each group of five reading heads operatively associated with each digit are sequentially connectable, a digit at a time, to the digit reader circuit.

Two digit reader circuits are provided, one for the "A" identifier which is shown in detail, and one for the "B" identifier which is indicated by a rectangular box at the lower portion of Fig. 11, and which is identical in construction and operation with the one shown in detail. Each digit reader comprises five channel reading circuits such as 11–CR0, 11–CR1, 11–CR2, 11–CR4 and 11–CR7, a set of code translating relays such as 11–CT0, 11–CT1, 11–CT2, 11–CT4 and 11–CT7, and relays such as 11–2M and 11–1AO for controlling the connection of the line scanner and detector circuits to the "A" or "B" digit reader circuit. One channel reading circuit such as 11–CR0, for example, is provided for each channel of the five channels, the elemental areas of which lie in the same slot, and which when simultaneously read at a given time are expressive of a particular digit. Each of the channel reading circuits 11–CR0, 11–CR1, 11–CR2, 11–CR4 and 11–CR7 is respectively responsive to the potential condition applied thereto by the output conductor from the reading head of that group of reading heads then connected to the digit reader circuit, and is conditioned to respond by the application of a negative-going pulse applied via conductor 11–CC1 over a previously described circuit, which it will be recalled requires that one and only one of the translator connectors 12–NT, 12–AT, 12–BT and 12–CT of Fig. 12 be operated.

The channel reading circuits 11–CR0, 11–CR1, 11–CR2, 11–CR4 and 11–CR7 are identical in construction and operation. The outputs from channel reading circuits 11–CR0, 11–CR1, 11–CR2, 11–CR4 and 11–CR7 are respectively connected to the windings of the digit translating relays 11–CT0, 11–CT1, 11–CT2, 11–CT4 and 11–CT7 to control the energization of said relays in accordance with the input potential conditions applied to the channel reading circuits from the output windings of the reading heads.

Since all of the channel reading circuits are constructed and operate in the same manner the operation of only the channel reading circuit 11–CR0 will be described in detail. Triode 11–DRA0 is a signal inverter tube. Tubes 11–DRG0 and 11–DRGA0 are gating tubes, and together constitute an electronic "AND" circuit which means that the grids of both of the tubes must be simultaneously excited with negative-going pulses of suitable amplitude in order to produce an output pulse to the control anode of the cold cathode tube 11–TO. The plate voltage for the inverter tube 11–DRA0 is fed through resistor 11–1RO, and the plate voltage for gating tubes 11–DRG0 and 11–DRGA0 is applied through plate resistor 11–RO from battery 11–BO which, it will be assumed, for example, furnishes a potential of 300 volts positive. The cathode of tube 11–DRA0 is connected directly to ground. The cathodes of gating tubes 11–DRG0 and 11–DRGA0 are connected to ground through load resistor 11–LRO. The grid of gating tube 11–DRG0 and also the grids of gating tubes 11–DRG1, 11–DRG2, 11–DRG4 and 11–DRG7 are connected to ground through the common grid resistor 11–BR1 to ground. With relay 11–1AO in a non-operated condition, the grids of gating tubes 11–DRG0, 11–DRG1, 11–DRG2, 11–DRG4 and 11–DRG7 are at a low positive potential relative to their respective cathodes. In the absence of a signal output from the reading heads respectively connected to the several channel reading circuits, the grids of inverter tubes 11–DRA0, 11–DRA1, 11–DRA2, 11–DRA4 and 11–DRA7 are maintained at a steady low negative potential by battery 5–B1 connected to the windings of all of the identification reading heads. Therefore, with no signal input applied to the grid of inverter tube 11–DRA0, the grid of gating tube 11–DRGA0 is at a positive potential with respect to its cathode. The plate resistor 11–1RO, through which plate potential is supplied to the inverter tube 11–DRA0, is of such a value that with a low negative potential applied to the grid, the plate-cathode circuit is at low conductivity and permits only a small value of plate current to flow through resistor 11–1RO. The plate resistor 11–RO, through which plate potential is supplied to the gating tubes 11–DRG0 and 11–DRGA0, and the load resistor 11–LRO are of such values that, with the grids of the gating tubes 11–DRG0 and 11–DRGA0 at their respective normal positive potentials, both of the gating tubes are at approximately maximum conductivity and therefore the current flow in the plate-cathode circuits is at or near the saturation value of the tubes.

With relays 6–LSI and 11–1AO operated and with one and only one of the translator connectors 12–NT, etc. of Fig. 12 operated, a high positive potential from the plate of amplifier 6–LSO is extended via conductor 6–11 and the above-described circuit to the grids of gating tubes 11–DRG0, 11–DRG1, 11–DRG2, 11–DRG4 and 11–DRG7. Since the current flow in the plate-cathode circuits of tubes 11–DRG0, 11–DRG1, 11–DRG2, 11–DGR4 and 11–DRG7 is approximately at saturation value with the grids at their normal low positive bias potential, the application of a high positive potential from the plate of amplifier tube 6–LSO will result in little or no change in the conductivity of gating tube 11–DRG0, and hence very little or no change in the plate-cathode current flowing through plate resistor 11–RO associated therewith. However, when the grid of tube 6–LSO is excited and a negative-going pulse of substantial amplitude is applied from its plate output to the grids of gating tubes 11–DRG0, 11–DRG1, 11–DRG2, 11–DRG4 and 11–DRG7 over the circuit previously described, the tubes become less conductive. However, the reduced conductivity of tube 11–DRG0 will not cause any appreciable change in the plate current flowing through plate resistor 11–RO because gating tube 11–DRGA0 is still at approximately maximum conductivity.

Now, again referring to Fig. 4, let it be assumed, as illustrated therein, that the office code is "2." The number "2" is represented in two-out-of-five code by an X signal condition prerecorded in the cells of the first and third channels, and an O signal condition prerecorded in the cells of the second, fourth and fifth channels of the "office" subdivision of the slot corresponding to the "tip" partly of the calling subscriber line.

At the instant that the drum completes its second revolution, the plate of amplifier tube 6–LSO delivers a negative-going pulse to the grids of the gating tubes 11–DRG0, 11–DRG1, 11–DRG2, 11–DRG4 and 11–DRG7, as previously described (see Fig. 6–A, item 14, Rev. 2), and simultaneously therewith the slot in the drum related to the calling subscriber line 5–L–1 again passes under the pole-pieces of the reading heads. At this instant, the X signals prerecorded in the cells of the first and third channels of that slot cause an X signal voltage to be induced in the windings of the "office" reading heads 5–OT–0 and 5–OT–2 (5–OT–2 not shown). The alternating-current voltages induced in the windings of the reading heads 5–OT–0 and 5–OT–2 by the X signals in the drum are superimposed on the negative direct-current voltage from battery 5–B1 and produce a potential having the wave form illustrated by the small curve shown in Fig. 6–D. The O signal conditions in the cells of the second, fourth and fifth channels of the slot cause an O signal voltage to be induced in the windings of the "office" reading heads 5–OT–1, 5–OT–4 and 5–OT–7 (5–OT–1 and 5–OT–4 not shown). The alternating-current voltages induced in the windings of the reading heads 5–OT–1, 5–OT–4 and 5–OT–7 by the O signal conditions are superimposed on the negative direct-current voltage from battery 5–B1 and produce a potential having the wave form illustrated by the small curve shown in Fig. 6–E.

The output voltages from the "office" reading heads 5–OT–0, 5–OT–1, 5–OT–2, 5–OT–4 and 5–OT–7 are respectively transmitted over correspondingly designated output conductors and through the previously described circuit established by the operation of relay 8–ODS, to the grids of the inverter tubes 11–DRA0, 11–DRA1, 11–DRA2, 11–DRA4 and 11–DRA7, respectively. The grid and plate of tubes 11–DRA0, 11–DRA1, 11–DRA2, 11–DRA4 and 11–DRA7 are respectively coupled by capacitors 11–C0, 11–C1, 11–C2, 11–C4 and 11–C7, which coupling capacity in combination with the resistance in the grid circuit causes the combined circuit to act as an integrating device, and in effect integrates the input signals respectively applied to the grids of the tubes 11–DRA0 to 11–DRA7, inclusive. The output voltage from inverter tubes 11–DRA0 and 11–DRA2 (as a result of an X signal in the first and third channels) has a wave form illustrated by the small curve in Fig. 6–F. The output from inverter tubes 11–DRA1, 11–DRA4 and 11–DRA7 (as a result of an O signal in the second, fourth and fifth channels) has a wave form as illustrated by the small curve in Fig. 6–G.

Referring again to channel reading circuit 11–CR0, when the inverter tube 11–DRA0 (responsive to an X signal in the first channel) delivers a negative-going pulse to the grid of gating tube 11–DRGA0, the latter becomes less conductive. With negative-going pulses simultaneously applied to the grids of tubes 11–DRG0 and 11–DRGA0, the conductivity of both tubes is reduced, and the plate current flowing through plate resistor 11–RO momentarily decreases, thereby causing a momentary positive-going pulse to appear at the parallel connected plates of gating tubes 11–DRG0 and 11–DRGA0. The positive-going pulse from the plates of tubes 11–DRG0 and 11–DRGA0 is applied through the No. 1 back contacts of relay 11–CT0 and capacitor 11–CA0 to ground, causing capacitor 11–CA0 to charge and to apply an increased positive potential to the control anode of cold cathode tube 11–TO. Cold cathode tube 11–TO fires and completes a circuit from battery 11–BO through the plate-cathode circuit of tube 11–TO, the winding of relay 11–CT0 conductor 11–DR to Fig. 10, the No. 4 contacts of relay 10–DS, to off-normal ground on conductor 14–ONGA, causing relay 11–CT0 to operate. The cold cathode tube 11–TO will remain conductive, and the relay 11–CT0 associated therewith will remain in its operated condition until released by the removal of off-normal ground from conductor 11–DR.

The channel reading circuit 11–CR2 (responsive to an X signal in the third channel) operates in a manner similar to that described with reference to channel reading circuit 11–CR0, and results in the operation of relay 11–CT2 in the same manner as described with reference to relay 11–CT0.

Referring to channel reading circuit 11–CR1, when the inverter tube 11–DRA1 (responsive to O signal in the second channel) delivers a positive-going pulse to the grid of gating tube 11–DRGA1, little or no change occurs in the conductivity of tube 11–DRGA1, because it is already at or near its saturation value. Therefore, no change is effected in the voltage drop at the plate of tube 11–DRGA1 at this time. The channel reading circuits 11–CR4 and 11–CR7 (respectively responsive to 0 signals in the fourth and fifth channels) operate in a manner similar to that described with reference to channel reading circuit 11–CR1.

With code translating relays 11–CT0 and 11–CT2 operated, off-normal ground on conductor 11–DR is extended through the No. 2 front contacts on relay 11–CT0, the No. 2 back contacts on relay 11–CT1, the No. 3 front contacts on relay 11–CT2, the No. 2 back contacts on relay 11–CT4 and the No. 2 back contacts on relay 11–CT7 to conductor 11–VC to check the validity of the combination of simultaneously operated code translating relays. In the event that more or less than two of the code translating relays (11–CT0, 11–CT1, 11–CT2, 11–CT4 and 11–CT7) are operated, ground will not be extended to conductor 11–VC. However, with relays 11–CT0 and 11–CT2 operated (a valid combination) ground on conductor 11–VC is extended through the No. 5 contacts on relay 11–CT2 and the No. 4 contacts on relay 11–CT0 to the decimal code conductor 11–DC2 into cable 11–DC. The ground extended through the series contacts of relays 11–CT2 and 11–CT0 to conductor 11–DC2 effects the translation of the number "2," expressed in two-out-of-five code by the coincident operation of relays 11–CT0 and 11–CT2, into a "2" expressed in a one-out-of-ten or decimal code. The ground extended to conductor 11–DC2 (expressive of the number "2" in decimal code) into cable 11–DC is extended into Fig. 12 and through the No. 2 contacts of relay 12–AT to terminal punching 12–A2.

In the exemplary disclosure of the invention, it is assumed that the subscriber lines, such as 5–L–1, are terminated in a local central office which is one of a small plurality of local central offices served by a tandem office equipped with automatic message accounting recording equipment for recording the central office code, director number, and class of the calling subscriber. In a large toll service area there most likely will be a plurality of such tandem offices each of which serves a different plurality of local central offices. In such a large toll service area, embracing a large number of local central offices, it is necessary that each such local central office be identified by a different "office" code, such as a three digit code. Since the number of local central offices in the group served by a tandem office does not exceed ten in the instant example, a single digit is sufficient to differentiate among the local central offices of such a group. However, in order to distinguish a particular local central office from the other local central offices in a large toll service area, the single digit "office" code for each local central office must be translated into the three digit "office" code assigned to that particular local office. The translation of the single digit "office" code, prerecorded in the drum, into an equivalent three digit "office" code is accomplished by means of the cross-connections between the upper row of terminal punchings, such as 12–A2, and the lower row of terminal punchings, such as 12–2. The successive operations of relays 12–AT, 12–BT and 12–CT will, in order, respectively effectuate a different cross-connection pattern between the upper and lower rows of terminal punchings, each cross-connection pattern representing a different translated value of the number read from the "office" code channels of the drum. The relay 12–NT ("NT" signifying "no translation"), when operated, will respectively connect the conductors 11–DC0 to 11–DC9, inclusive, to terminal punchings 12–N0 to 12–N9, inclusive. Since no translation is required when the relay 12–NT is operated, the terminal punchings 12–N0 to 12–N9, inclusive, in the upper row are respectively connected to the terminal punchings of like numerical value in the lower row, thereby permitting the numerical values read from the drum to be used unchanged for the directory number, and class indication.

In the exemplary disclosure of the invention, it is assumed, for example, that the number "2" prerecorded in the "Office" channels is to be translated to "234"; the three digit "office" code by which the calling office is identified. Since the first digit is a "2," there will be no change in the number as read from the drum; and, terminal punching 12–A2 is thus cross-connected to terminal punching 12–2. Ground extended to terminal punching 12–2 and through the winding of relay 12–DT2 to battery causes relay 12–DT2 to operate.

When an idle sender register is connected to the tandem sender (at the distant end of the tandem trunk), a source of high positive potential is connected through resistors to the conductors 7–53 and 7–54 of the trunk, thence from conductor 7–53 through the upper winding of polarized relay 7–HP, conductor 7–T, the upper No. 2 contacts of relay 7–SP, conductor 7–T2, the lower No. 3 front contacts of relay 7–IC, conductor 7–FTI, cable 7–TKI to Fig. 9, conductor 7–FTI, the upper No. 2 front front contacts of relay 9–TPAI, conductor 9–FT1 (and intervening sections of the trunk preference lockout circuit), the upper No. 2 back contacts of relay 9–TPAF, conductor 9–FTA, cable 9–OPA to Fig. 13, the upper right-hand winding of repeating coil 13–RC, and resistor 13–RST to gas-filled tube 13–SX. At the same time, the high positive potential on conductor 7–54 is connected through the lower winding of polarized relay 7–HP, conductor 7–R, the lower No. 3 front contacts of relay 7–SP, conductor 7–R2, the upper No. 3 front contacts of relay 7–IC, conductor 7–FRI, cable 7–TKI to Fig. 9, the upper No. 1 front contacts of relay 9–TPAI, conductor 9–FR1 (and intervening sections of the trunk preference lockout circuit), the upper No. 1 back contacts of relay 9–TPAF, conductor 9–FRA, cable 9–OPA to Fig. 13, the lower right-hand winding of repeating coil 13–RC and resistor 13–RSR to gas-filled tube 13–SX. Gas-filled tube 13–SX fires through the circuit including the winding of relay 13–SXR to negative battery, causing relay 13–SXR to operate.

Transmission of the calling-office, calling subscriber directory number, and class information to the register-sender is accomplished by a series of alternating current pulses from the digit translator circuit of the identifier, which pulses are transmitted over the tandem trunk to the register-sender in the tandem office, each pulse composed of a combination of two-out-of-five frequencies; from sources 12–A, 12–B, 12–C, 12–D and 12–E of Fig. 12. Each of the digit translating relays 12–DT0 to 12–DT9, inclusive, when operated, will connect in combination a different pair of the frequency sources 12–A to 12–E, inclusive, to the conductors 12–T and 12–R, each such combination being respectively representative of a different digital value between 0 and 9.

With relay 10–A in the digit walking circuit (Fig. 10) operated and with relay 12–AT in the digit translator circuit (Fig. 12) operated indicating that the "A" digit of the "office" code is being read from the drum, with relays 11–CT0 and 11–CT2 in the digit reader circuit (Fig. 11) operated responsive to a "2" in the five channels comprising the "office" subdivision of the drum, and with relay 12–DT2 in the digit translator circuit operated to represent a "2" in decimal code, the frequency sources 12–A and 12–C are connected through the No. 2 and No. 1 contacts, respectively, of relay 12–DT2 to conductors 12–T and 12–R, respectively. Conductor 12–T extends into Fig. 13 and is connected through the No. 7 back contacts of relay 13–PGZ to the upper left-hand winding of repeating coil 13–RC. Conductor 12–R likewise extends into Fig. 13 and is connected through the No. 4 front contacts of relay 13–PGW to the lower left-hand winding of repeating coil 13–RC. The frequencies induced in the right-hand windings of repeating coil 13–RC are transmitted over the previously described circuit, over which relay 13–SXR operated, to the sender-register at the distant end of the tandem trunk circuit. The combination of frequencies representing a value of "2" in the "A" digit of the "office" code has now been transmitted to and registered in the sender register at the tandem office.

When the output conductors from the "office" reading heads, which at this time furnish the "A" digit of the "office" code, have been connected to the digit reader circuit, and when the value read from the drum has been translated by the digit translator circuit into a multifrequency code representative of the value of the "A" digit of the three-digit code assigned to the calling office, and said multifrequency code or combination of frequencies has been transmitted to the tandem office, as above described, a circuit is completed from ground in the digit translator circuit of Fig. 12, through a one-out-of-ten up-check circuit comprising the No. 3 back contacts of relays 12–DT9, 12–DT8, 12–DT7, 12–DT6, 12–DT5, 12–DT4 and 12–DT3, the No. 4 front contacts of relay 12–DT2, the No. 4 back contacts of relay 12–DT1, and the No. 3 back contacts of relay 12–DT0, thence via conductor 12–CK, cables 10–DTA and 12–DWAC to Fig. 10, through a one-out-of-eight up-check circuit comprising the No. 2 back contacts of relay 10–CL, the No. 3 back contacts of relays 10–U, 10–T, 10–H, 10–TH, 10–C and 10–B, the No. 3 front contacts of relay 10–A, conductor 10–SP, cables 10–DW and 12–DWAC to Fig. 13, the contacts of relay 13–SXR, conductor 13–3, the upper No. 1 back contacts of relay 13–GT, and through the winding of pulse starting relay 13–SP to battery, causing relay 13–SP to operate.

The operation of relay 13–SP initiates a cycle of operations which results in the disconnection of the digit translator circuit from the input to the repeating coil 13–RC, thereby cutting off the transmission of the first multifrequency pulse to the tandem office. The operation of relay 13–SP also prepares the identifier circuit to read and to transmit the next succeeding digit of the "Office" code.

When relay 13–SP operates, off-normal ground on conductor 14–ONG1 is disconnected from the mid-point of the series-connected upper and lower windings of polarized relay 13–PG, thereby enabling capacitor 13–PC to charge in series with the upper winding of relay 13–PG and resistor 13–LR to negative battery. Resistor 13–LR has a low value of resistance. The current flowing in the upper winding of polarized relay 13–PG during the charging of capacitor 13–PC causes polarized relay 13–PG to operate and to move its armature to the left-hand contact. Because of its "stay-put" characteristic, the armature of polarized relay 13–PG will remain in its left-hand position until a change is effected in the currents flowing through the windings of the relay.

When the armature of polarized relay 13–PG operates to its left-hand position, its right-hand contacts are opened, thereby opening the operating circuit for and causing the release of relay 13–PG1. When relay 13–PG1 releases, off-normal ground on conductor 14–ONG3A is disconnected at the upper contacts of relay 13–PG1 from the conductor 13–1, thereby disconnecting ground from the circuit through the No. 1 and No. 2 transfer contacts of relay 13–PGZ to the junction of the right-hand end of the winding of relay 13–PGZ and resistor 13–RZ. With this ground circuit removed from resistor 13–RZ, relay 13–PGZ operates from off-normal ground on conductor 14–ONG3A, through the No. 1 and No. 2 continuity contacts of relay 13–PGW, conductor 13–2, the winding of relay 13–PGZ and resistor 13–RZ to battery.

When relay 13–PGZ operates, the conductor 12–T is disconnected, at the No. 7 contacts of relay 13–PGZ, from the upper left-hand winding of repeating coil 13–RC, thereby disconnecting the multifrequency pulsing circuit from the tandem trunk. When relay 13–PGZ operates, off-normal ground is extended through the upper No. 6 contacts of off-normal relay 14–ON, conductor 14–ONG2, cable 14–ONCA to Fig. 13, the No. 4 front contacts of relay 13–PGZ and the winding of relay 13–GT to battery, causing relay 13–GT to operate and to lock through its No. 1 front contacts to ground on conductor 13–3.

When relay 13–GT operates, the operating circuit for relay 13–SP is opened at the No. 1 back contacts of relay 13–GT. Relay 13–SP remains locked in its operated position under control of ground from conductor 13–3 through the No. 8 contacts of relay 13–PGZ.

The operation of the armature of polarized relay 13–PG to its left-hand position extends off-normal ground on conductor 14–ONG3A, through the left-hand contact of relay 13–PG, and the No. 3 and No. 1 transfer contacts of relay 13–SP, to the mid-point of the windings of polarized relay 13–PG. The capacitor 13–PC discharges through the upper winding of polarized relay 13–PG to ground. Current also flows through the lower winding of polarized relay 13–PG due to the potential from the mid-point of series-connected resistors 13–HR1 and 13–HR2. The currents flowing through the upper and the lower windings of polarized relay 13–PG produce additive magnetic fluxes, thereby causing the armature of polarized relay 13–PG to operate to its right-hand position, and again to close its right-hand contacts. Off-normal ground on conductor 14–ONG3A is again extended through the right-hand contacts of polarized relay 13–PG and the winding of relay 13–PG1 to battery, causing relay 13–PG1 to reoperate.

With relay 13–PG1 reoperated, off-normal ground on conductor 14–ONG3A is extended through the upper contacts of relay 13–PG1, conductor 13–1, the No. 1 and No. 3 transfer contacts of relay 13–PGZ to the junction of the right-hand end of the winding of relay 13–PGW and resistor 13–RW, thereby effectively short-circuiting the battery supply for relay 13–PGW through resistor 13–RW, causing relay 13–PGW to release. At this time, relay 13–PGZ is held in its operated position by off-normal ground on conductor 14–ONG3A, through the upper contacts of relay 13–PG1, conductor 13–1, the No. 3 and No. 2 continuity contacts of relay 13–PGW, conductor 13–2, the winding of relay 13–PGZ and resistor 13–RZ to battery. When relay 13–PGW releases, the pulsing circuit conductor 12–R is disconnected, at the No. 4 contacts of relay 13–PGW, from the lower left-hand winding of repeating coil 13–RC.

When the armature of polarized relay 13–PG returns to its right-hand position, ground on off-normal conductor 14–ONG3A through the left-hand contacts of polarized relay 13–PG, and the No. 3 and No. 1 transfer contacts of relay 13–SP is removed from the mid-point of the series-connected windings of polarized relay 13–PG. Capacitor 13–PC again charges in series with the upper winding of polarized relay 13–PG, causing relay 13–PG to again operate its armature to the left-hand position. Polarized relay 13–PG in operating to its left-hand position again opens the operating circuit for relay 13–PG1, causing relay 13–PG1 to again release. With relay 13–PG1 released, off-normal ground on conductor 14–ONG3A is disconnected at the upper contacts of relay 13–PG1 from conductor 13–1, through the No. 3 and No. 2 continuity contacts of relay 13–PGW, conductor 13–2 and the winding of relay 13–PGZ, causing relay 13–PGZ to release.

When the armature of polarized relay 13–PG again is operated to its left-hand position, off-normal ground on conductor 14–ONG3A is again extended through the left-hand contacts of polarized relay 13–PG, the No. 3 and No. 1 transfer contacts of relay 13–SP to the midpoint of the series-connected windings of polarized relay 13–PG. The capacitor 13–PC again discharges, and the armature of polarized relay 13–PG is again operated to its right-hand position. Thus it will be seen, that so long as relay 13–SP is in its operated position the circuitry of polarized relay 13–PG constitutes a self-interrupting arrangement which will cause the armature of polarized relay 13–PG to oscillate from right to left as the capacitor 13–PC charges and from left to right as the capacitor discharges. The time rate of the excursions of the armature is, of course, determined by the mechanical construction of the relay and the electrical constants of the circuit.

When relay 13–PGZ releases, the locking circuit for relay 13–SP is opened at the No. 8 contacts of relay 13–PGZ. Relay 13–SP releases and disables the self-interrupting circuit for polarized relay 13–PG. Capacitor 13–PC discharges as above described and causes the armature of polarized relay 13–PG again to return to its right-hand position, and again to extend off-normal ground on conductor 14–ONG3A through the right-hand contacts of relay 13–PG and the winding of relay 13–PG1 to battery, causing relay 13–PG1 to reoperate. With relay 13–PG1 operated, off-normal ground on conductor 14–ONG3A is extended through the upper contacts of relay 13–PG1, the No. 3 and No. 2 continuity contacts and winding of relay 13–PGW, and the resistor 13–RW to battery, causing relay 13–PGW to operate and to lock up through its No. 2 and No. 1 continuity contacts to ground on conductor 14–ONG3A. Relay 13–GT remains locked up under control of ground on conductor 13–3. With relay 13–PGZ released, off-normal ground on conductor 14–ONG2 is extended through the No. 4 back contacts of relay 13–PGZ, the No. 2 contacts of relay 13–GT, conductor 13–DS, cables 10–DW and 12–DWAC to Fig. 10, and the winding of relay 10–DS to battery, causing relay 10–DS to operate.

When relay 10–DS operates, following the reading and transmission of the "A" digit of the "office" code, and breaks its No. 5 contacts, the locking circuit for off-normal relay 14–ON is maintained through the upper No. 1 contacts of relay 10–CL connected in parallel to the No. 5 contacts of relay 10–DS. When relay 10–DS operates and breaks its No. 4 contacts, off-normal ground on conductor 14–ONGA is disconnected from conductor 11–DR, thus removing operating ground for the relays 11–CT0 and 11–CT2 and the cold cathode tubes 11–T0 and 11–T2, respectively associated therewith. The cold cathode tubes 11–T0 and 11–T2 deionize and relays 11–CT0 and 11–CT2 release, which in releasing disconnect ground from conductor 11–DC2 in cable 11–DC, causing relay 12–DT2 to release, thereby preparing the digit reader to read the next succeeding digit which is the "B" digit of the "office" code.

When relay 10–DS operates, ground is extended through its No. 1 and No. 2 follow-through contacts to conductor 10–1, and also through the No. 1, No. 2 and No. 3 follow-through contacts of relay 10–DS, the upper No. 1 transfer front contacts of relay 10–A, the lower No. 6 and No. 5 continuity contacts and the winding of relay 10–B to battery, causing relay 10–B to operate and to lock up through its lower No. 5 and No. 4 continuity contacts, and the lower No. 2 and No. 3 continuity contacts of relay 10–C, to off-normal ground on conductor 14–ONGA. Relay 10–A does not release at this time, but remains locked up through its lower No. 2 and No. 1 continuity contacts, the lower No. 2 and No. 1 continuity contacts of relay 10–B, and the No. 2 and No. 1 follow-through contacts of relay 10–DS to ground.

When relay 10–B operates, the upper No. 5 contacts of relay 10–B are closed in parallel to the upper No. 5 contacts of relay 10–A, through which parallel contacts ground on conductor 10–ONLA is extended through the upper No. 4 transfer back contacts of relay 10–CL, the upper No. 5 transfer back contacts of relays 10–U, 10–T, 10–H and 10–TH, conductor 10–OF, cable 10–DWC to Fig. 8, the No. 11 contacts of relay 8–LSAI, conductor 8–OF and the winding of "office" connector relay 8–ODS to battery, causing relay 8–ODS to remain operated. When relay 10–B operates, ground is extended through its upper No. 4 contacts, conductor 10–BT, cables 10–DTA and 12–DWAC to Fig. 12, and the winding of relay 12–BT to battery, causing relay 12–BT to operate. At this point, since relay 12–AT and 12–BT are operated, the pulse level 6–LS is disconnected in Fig. 12 from level 6–LSS so that no gate pulse can cause the sender of Fig. 11 to respond until the one-out-of-four check circuit is again completed in Fig. 12.

The coincident operation of relays 10–A and 10–B causes the upper No. 3 transfer back contacts of relay 10–B, and the upper No. 2 back contact of relay 10–A to be simultaneously in an open condition, thereby disconnecting ground from the up-check circuit which extends via conductor 10–SP, cables 10–DW and 12–DWAC to Fig. 13, through the contacts of relay 13–SXR, conductor 13–3, and the No. 1 front contacts and the winding of relay 13–GT to battery, causing relay 13–GT to release.

Relay 13–GT, in releasing, reconnects conductor 13–3 through the winding of relay 13–SP to battery, but is ineffective to operate relay 13–SP at this time because of the above-described break in the circuit of conductor 10–SP at the contacts of relays 10–A and 10–B. Relay 13–GT, in releasing, opens its No. 2 contacts, thereby disconnecting ground from conductor 13–DS which extends via cables 10–DW and 12–DWAC to Fig. 10 and through the winding of relay 10–DS to battery, causing relay 10–DS to release.

When relay 10–DS releases, the No. 5 back contacts of relay 10–DS are again closed in parallel to the upper No. 1 contacts of relay 10–CL to maintain the locking circuit for off-normal relay 14–ON. Also, off-normal ground on conductor 14–ONGA is restored through the No. 4 contacts of relay 10–DS, conductor 11–DR, the respective windings of code translating relays 11–CT0 to 11–CT7, inclusive, to the respective cathodes of cold cathode tubes 11–T0 to 11–T7, inclusive, to prepare the digit reader for the reception of the next succeeding digit. When relay 10–DS releases, ground is disconnected from conductor 10–1 extended through the lower No. 1 and No. 2 continuity contacts of relay 10–B, the lower No. 1 and No. 2 continuity contacts and the winding of relay 10–A to battery, causing relay 10–A to release.

Relay 10–A, in releasing, opens its upper No. 5 contacts which are in parallel to the upper No. 5 contacts of relay 10–B. When relay 10–A releases, ground is disconnected at its upper No. 4 contacts from conductor 10–AT, opening the operating circuit for relay 12–AT, which releases to complete in Fig. 12 the pulsing path between conductors 6–LS and 6–LSS.

The cell in the delay channel in the slot corresponding to subscriber line 5–L–1, in which cell the previously described X signal was written at the completion of the second revolution of the drum (see Fig. 6–A, item 6, Rev. 2), is carried by the continued rotation of the drum and, 180 degrees after having been written therein, again passes under the pole-pieces of reading head 5–RDC at which time, in the manner previously described, the X signal is transferred from the cell in the delay channel to the cell in the main channel in the slot corresponding to subscriber line 5–L–1 (see Fig. 6–A, item 9, Rev. 2½). With the continued rotation of the drum, the cell in the delay channel in the slot corresponding to subscriber line 5–L–1, in which cell the X signal was written at the completion of this second revolution of the drum, again passes beneath the erasing head 5–118, and the X signal is erased from the delay channel 270 degrees after having been recorded therein (see Fig. 6–A, item 6, Rev. 2¾).

*Completion of third revolution of drum and start of fourth revolution*

The drum continues to rotate and, at the instant that it completes its third revolution and is starting its fourth revolution, the rotating element 5–27 of the line scanner again passes adjacent to the line segment 5–001 associated with subscriber line 5–L–1 which, it is assumed, is still engaged with a bona fide call requiring the services of an identifier, and line segment 5–001 consequently still has a positive potential thereon. The positive potential induced on the rotating element 5–27 is again momentarily applied to the grid of amplifier tube 6–LS1 (see Fig. 6–A, item 1, Rev. 3), and again causes the amplifiers 6–LS1, 6–LS2, 6–LS3 and 6–LS4 to function in the manner previously described with reference to the start of the first revolution of the drum. Amplifier 6–LS3 produces a negative-going output pulse (as illustrated in Fig. 6–A, item 2, Rev. 3). Amplifier 6–LS4 produces a positive-going and a negative-going output pulse (as illustrated in Fig. 6–A, items 3 and 4, respectively, Rev. 3).

The cell in the main channel in the slot corresponding to subscriber line 5–L–1, to which cell the previously described X signal was transferred, at the completion of the third revolution again passes under the pole-pieces of reading head 5–RMC, thereby causing an X output signal voltage to be again developed in the winding thereof. As a result, the X output signal voltage induced in the winding of reading head 5–RMC causes a momentary negative-going pulse to be applied to the input of reading amplifier 6–RA (see Fig. 6–A, item 11, Rev. 3) which functions as previously described to produce a momentary positive-going pulse at its output, which positive-going pulse is applied to the rectangular terminals of diodes 6–G2B and 6–G3B of gate circuits 6–G2 and 6–G3, respectively (see Fig. 6–A, item 12, Rev. 3).

The momentary negative-going pulse from the cathode of amplifier 6–LS3 (see Fig. 6–A, item 2, Rev. 3) is applied to the upper terminal of diode 6–G2A, and simultaneously therewith the above-described positive-going pulse from the output of reading amplifier 6–RA is applied to the lower terminal of diode 6–G2B, which negative pulse disables gate circuit 6–G2, thereby preventing gate circuit 6–G2 from opening to permit the application of a positive-going or erase pulse through capacitor 6–C9 to the grid of the lower section of writing amplifier 6–WA.

The momentary positive-going pulse from the cathode follower of amplifier 6–LS4 (see Fig. 6–A, item 3, Rev. 3) is applied to the upper terminals of diodes 6–G1A and 6–G3A of gate circuits 6–G1 and 6–G3, respectively. The gate circuit 6–G1 is at this time reenabled due to the release of relay 6–WSTR which connects positive battery through resistor 6–R12 and the No. 2 back contacts of relay 6–WSTR to diode 6–G1B. The gate circuit 6–G1, in its enabled condition, permits the positive-going pulse applied to the upper terminal of diode 6–G1A to be repeated through capacitor 6–C5 to the grid of the upper or write X section of writing amplifier 6–WA (see Fig. 6–A, item 5, Rev. 3). The application of a positive-going pulse to the grid of the upper section of amplifier 6–WA causes an X signal to be recorded in the cell in the slot corresponding to subscriber line 5–L–1 in the delay channel of the drum, which cell is passing under the pole-pieces of writing head 5–WDC at this time, in the manner previously described (see Fig. 6–A, item 6, Rev. 3).

The positive-going pulse from the cathode output of reading amplifier 6–RA applied to the diode 6–G3B at the end of the third revolution of the drum, in conjunction with the simultaneously applied positive-going pulse from the cathode follower of amplifier 6–LS4 to the diode 6–G3A, causes a momentary positive-going pulse to be applied to the grid of amplifier 6–LS0 (see Fig. 6–A, item 13, Rev. 3). The positive-going pulse applied to the grid of amplifier 6–LS0 is amplified and inverted therein, in a manner previously described, and produces a momentary negative-going output pulse at the plate of tube 6–LS0 (see Fig. 6–A, item 14, Rev. 3), which negative-going pulse is applied over conductor 6–11, and over a previously described path to the grids of the digit reader gating tubes 11–DRG0, 11–DRG1, 11–DRG2, 11–DRG4 and 11–DRG7 (see Fig. 6–A, item 14, Rev. 3).

*Connection of reading heads to digit reader to read second or "B" digit of "office" code*

Since the "office" code required by the automatic message accounting equipment at the tandem office must be expressed as a three-digit number, it is necessary that the single digit "office" designation prerecorded in the "office" channels of the drum must be read, that is to say traversed, three times by the reading heads associated with the "office" channels. Therefore, as the drum is completing its third revolution, the cells in the "office" channels of the drum comprising the slot corresponding to subscriber line 5–L–1 again pass under the "office" reading heads 5–OT–0, 5–OT–1, 5–OT–2, 5–OT–4 and 5–OT–7, thereby reading, for the second time, the number "2" prerecorded therein. The previously described alternating-current voltages induced in the windings of the reading heads 5–OT–0, 5–OT–1, 5–OT–2, 5–OT–4 and 5–OT–7 are respectively transmitted via the correspondingly designated conductors, and through the previously described circuit established by the operation of relay 8–ODS, to the grids of the inverter tubes 11–DRA0, 11–DRA1, 11–DRA2, 11–DRA4 and 11–DRA7, respectively, of the digit reader circuit.

Since the number being read from the drum at this time is again a "2," the digit reader circuit functions in the same manner as previously described with reference to the first reading of the number "2," thereby again causing the operation of digit translating relays 11–CT0 and 11–CT2.

With code translating relays 11–CT0 and 11–CT2 operated, off-normal ground on conductor 11–DR is extended through a previously described circuit to the decimal code conductor 11–DC2 in cable 11–DC to Fig. 12, and through the No. 2 contacts of relay 12–BT to terminal punching 12–B2. Since, in the exemplary disclosure of the invention, it is assumed that the calling subscriber office code of "2" is to be translated to "234," the terminal punching 12–B2 is cross-connected to terminal-punching 12–3. Ground extended to terminal punching 12–3, and through the winding of relay 12–DT3 to battery, causes relay 12–DT3 to operate.

With relay 10–B in the digit walking circuit operated, and with relay 12–BT in the digit translator circuit operated, indicating that the "B" digit of the "office" code is being read from the drum, with relays 11–CT0 and 11–CT2 in the digit reader circuit operated responsive to a "2" in the five channels comprising the "office" subdivision of the drum, and with relay 12–DT3 in the digit translator circuit operated to represent a "3" in decimal code, the frequency sources 12–B and 12–C are connected through the No. 2 and No. 1 contacts, respectively, of relay 12–DT3 to conductors 12–T and 12–R, respectively. Conductor 12–T is connected through the No. 7 back contacts of relay 13–PGZ to the upper left-hand winding of repeating coil 13–RC. Conductor 12–R is connected through the No. 4 front contacts of relay 13–PGW to the lower left-hand winding of repeating coil 13–RC. The frequencies induced in the right-hand windings of repeating coil 13–RC are transmitted over a previously described circuit to the sender-register at the distant end of the tandem trunk circuit. The combination of frequencies representing a value of "3" in the "B" digit of the "office" code has now been transmitted to and registered in the sender register at the tandem office.

When the output conductors from the "office" reading heads, which at this time furnish the "B" digit of the "office" code, have been connected to the digit reader circuit and when the value read from the drum has been translated by the digit translator circuit into a multifrequency code representative of the value of the "B" digit of the three-digit code assigned to the calling office, and when said multifrequency code or combination of frequencies has been transmitted to the tandem office, in the manner as above described, a circuit is completed from ground in the digit translator circuit through a one-out-of-ten up-check circuit comprising the No. 3 back contacts of relays 12–DT9, 12–DT8, 12–DT7, 12–DT6, 12–DT5 and 12–DT4; the No. 4 front contacts of relay 12–DT3, the No. 4 back contacts of relays 12–DT2 and 12–DT1, and the No. 3 back contacts of relay 12–DT0, thence via conductor 12–CK, cables 10–DTA and 12–DWAC to Fig. 10, through a one-out-of-eight up-check circuit comprising the No. 2 back contacts of relay 10–CL, the No. 3 back contacts of relays 10–U, 10–T, 10–H, 10–TH and 10–C, the No. 3 front contacts of relay 10–B, and the No. 2 back contacts of relay 10–A, conductor 10–SP, cables 10–DW and 12–DWAC to Fig. 13, the contacts of relay 13–SXR, conductor 13–3, the upper No. 1 back contacts of relay 13–GT, and through the winding of relay 13–SP to battery, causing relay 13–SP to operate.

The operation of relay 13–SP again initiates a cycle of operations resulting in the armature of polarized relay 13–PG again making a plurality of excursions between its right-hand and its left-hand contacts, thereby causing the relase of relay 13–PG1, the operation of relay 13–PGZ, the operation of relay 13–GT, the reoperation of relay 13–PG1, the release of relay 13–PGW, the release of relay 13–PG1, the release of relay 13–PGZ, the reoperation of relays 13–PG1 and 13–PGW, the release of relay 13–SP, and the operation of relay 10–DS, in the order recited, and as previously described with reference to the detailed description of the operation of the system with reference to the reading of the "A" digit of the "office" code from the drum.

When relay 10–DS operates following the reading and transmission of the "B" digit, and breaks its No. 5 contacts, the locking circuit for off-normal relay 14–ON is again maintained through the upper No. 1 contacts of relay 10–CL. When relay 10–DS operates, the opening of its No. 4 contacts again disconnects off-normal ground from conductor 11–DR, causing the deionization of cold cathode tubes 11–T0 and 11–T2 and causing relays 11–CT0 and 11–CT2 to release, which in releasing disconnect ground from conductor 11–DC2 in cable 11–DC, causing relay 12–DT3 to release, thereby preparing the digit reader to read the next succeeding, or "C," digit of the "office" code.

When relay 10–DS operates, ground is extended through its No. 1, No. 2 and No. 3 follow-through contacts, the upper No. 1 back contacts of relay 10–A, the upper No. 1 front contacts of relay 10–B, the lower No. 6 and No. 5 continuity contacts and the winding of relay 10–C to battery, causing relay 10–C to operate and to lock up through its lower No. 5 and No. 4 continuity contacts, and the lower No. 2 and No. 3 continuity contacts of relay 10–TH to off-normal ground on conductor 14–ONGA. Relay 10–B does not release at this time but remains locked up through its lower No. 5 and No. 4 continuity contacts, the lower No. 2 and No. 1 continuity contacts of relay 10–C, and the No. 2 and No. 1 follow-through contacts of relay 10–DS to ground.

When relay 10–C operates, its upper No. 5 contacts are closed in parallel to the upper No. 5 contacts of relay 10–B, through which parallel contacts ground on conductor 10–ONLA is extended through the upper No. 4 back contacts of relay 10–CL, the upper No. 5 back contacts of relays 10–U, 10–T, 10–H and 10–TH, conductor 10–OF, cable 10–DWC to Fig. 8, the No. 11 contacts of relay 8–LSAI, conductor 8–OF, and the winding of "office" connector relay 8–ODS to battery, causing relay 8–ODS to remain operated. When relay 10–C operates, ground is extended through its upper No. 4 contacts, conductor 10–CT, cables 10–DTA and 12–DWAC to Fig. 12, and the winding of relay 12–CT to battery, causing relay 12–CT to operate, thus opening the connection to the pulsing conductor 6–LSS of Fig. 11.

The coincident operation of relays 10–B and 10–C causes the upper No. 3 back contacts of relay 10–C, and the upper No. 2 back contacts of relay 10–B to be simultaneously in an open condition, thereby disconnecting ground from the up-check circuit which extends via conductor 10–SP, cables 10–DW and 12–DWAC to Fig. 13, through the contacts of relay 13–SXR, conductor 13–3, and the No. 1 front contacts and the winding of relay 13–GT to battery, causing relay 13–GT to release. Relay 13–GT, in releasing, reconnects conductor 13–3 through the winding of relay 13–SP to battery, but is ineffective to operate relay 13–SP at this time because of the above described break in the circuit of conductor 10–SP at the contacts of relays 10–B and 10–C. Relay 13–GT, in releasing, opens its No. 2 contacts, thereby disconnecting ground from conductor 13–DS which extends via cables 10–DW and 12–DWAC to Fig. 10 and through the winding of relay 10–DS to battery, causing relay 10–DS to release.

When relay 10–DS releases, the No. 5 contacts of relay 10–DS are again closed in parallel to the upper No. 1 contacts of relay 10–CL which maintain the locking circuit for off-normal relay 14–ON. Also, off-normal ground on conductor 14–ONGA is restored through the No. 4 contacts of relay 10–DS, conductor 11–DR, the respective windings of code translating relays 11–CT0 to 11–CT7, inclusive, to the respective cathodes of cold cathode tubes 11–T0 to 11–T7, inclusive, to prepare the digit reader for the reception of the next succeeding digit. When relay 10–DS releases, ground is disconnected from conductor 10–1 extended through the lower No. 1 and No. 2 continuity contacts of relay 10–C, the lower No. 4 and No. 5 continuity contacts and the winding of relay 10–B to battery, causing relay 10–B to release.

Relay 10–B, in releasing, opens its upper No. 5 contacts which are in parallel to the upper No. 5 contacts of relay 10–C. When relay 10–B releases, ground is disconnected at its upper No. 4 contacts from conductor 10–BT, opening the operating circuit for relay 12–BT which releases, thus again closing the pulse circuit to conductor 6–LSS of Fig. 11.

The cell in the delay channel in the slot corresponding to subscriber line 5–L–1, in which cell the previously described X signal was written at the completion of the third revolution of the drum (see Fig. 6–A, item 6, Rev. 3), is carried by the continued rotation of the drum and, 180 degrees after having been recorded therein, again passes under the pole-pieces of reading head 5–RDC at which time, in the manner previously described, the X signal is transferred from the cell in the delay channel to the cell in the main channel in the slot corresponding to subscriber line 5–L–1. With the continued rotation of the drum, the cell in the delay channel in the slot corresponding to subscriber line 5–L–1, in which cell the X signal was written at the completion of the third revolution of the drum, again passes beneath the erasing head 5–118, and the X signal is erased from the delay channel 270 degrees after having been recorded therein. The transfer and erase functions occurring during the fourth to ninth, inclusive, revolutions of the drum are not indicated in Figs. 6–A and 6–B, the time relationship being the same as indicated for the preceding or third revolution of the drum.

*Completion of fourth revolution of drum and start of fifth revolution*

The drum continues to rotate and, at the instant that it completes its fourth revolution and is starting its fifth revolution, the rotating element 5–27 of the line scanner again passes adjacent to the line segment 5–001 associated with subscriber line 5–L–1 which, it is assumed, is still engaged with a bona fide call requiring the services of an identifier, and line segment 5–001 consequently still has a positive potential thereon. The positive potential induced on the rotating element 5–27 is again momentarily applied to the grid of amplifier tube 6–LS1 (see Fig. 6–A, item 1, Rev. 4), and again causes the amplifiers 6–LS1, 6–LS2, 6–LS3 and 6–LS4 to function in the manner previously described with reference to the start of the first revolution of the drum (also see Fig. 6–A, items 2, 3 and 4, Rev. 4).

The cell in the main channel in the slot corresponding to subscriber line 5–L–1, to which cell the previously described X signal was transferred, at the completion of the fourth revolution again passes under the pole-pieces of reading head 5–RMC, thereby causing an X output signal voltage to be again developed in the winding thereof. As a result, the X output signal voltage induced in the winding of reading head 5–RMC causes a momentary negative-going pulse to be applied to the input of reading amplifier 6–RA (see Fig. 6–A, item 11, Rev. 4) which functions as previously described to produce a momentary positive-going pulse at its output, which positive-going pulse is applied as an input to the gate circuits 6–G2 and 6–G3 (see Fig. 6–A, item 12, Rev. 4).

The momentary negative-going pulse from the cathode of amplifier 6–LS3 (see Fig. 6–A, item 2, Rev. 4) is applied to the gate circuit 6–G2, and simultaneously therewith the above-described positive-going pulse from the reading amplifier 6–RA is applied to the gate circuit 6–G2, which negative pulse disables gate circuit 6–G2, thereby preventing the application of a positive-going or erase pulse through capacitor 6–C9 to the grid of the lower section of writing amplifier 6–WA.

The momentary positive-going pulse from the cathode follower of amplifier 6–LS4 (see Fig. 6–A, item 3, Rev. 4) is applied to the upper terminals of diodes 6–G1A and 6–G3A of gate circuits 6–G1 and 6–G3, respectively. The gate circuit 6–G1 is at this time reenabled due to the release of relay 6–WSTR which connects positive battery through resistor 6–R12 and the No. 2 back contacts of relay 6–WSTR to diode 6–G1B. The gate circuit 6–G1, in its enabled condition, permits the positive-going pulse applied to the upper terminal of diode 6–G1A to be repeated through capacitor 6–C5 to the grid of the upper or write X section of writing amplifier 6–WA (see Fig. 6–A, item 5, Rev. 4). The application of a positive-going pulse to the grid of the upper section of amplifier 6–WA causes an X signal to be recorded in the cell in the delay channel in the slot corresponding to subscriber line 5–L–1 in the drum, which cell is passing under the pole-pieces of writing head 5–WDC at this time, in the manner previously described (see Fig. 6–A, item 6, Rev. 4).

The positive-going pulse from the cathode output of reading amplifier 6–RA applied to the diode 6–G3B at the end of the fourth revolution of the drum, in conjunction with the simultaneously applied positive-going pulse from the cathode follower of amplifier 6–LS4 to the diode 6–G3A, causes a momentary positive-going pulse to be applied to the grid of amplifier 6–LS0 (see Fig. 6–A, item 13, Rev. 4). The positive-going pulse applied to the grid of amplifier 6–LS0 is amplified and inverted therein, in a manner previously described, and produces a momentary negative-going output pulse at the plate of tube 6–LS0 (see Fig. 6–A, item 14, Rev. 4), which negative-going pulse is applied over conductor 6–11, and over a previously described path to the grids of the digit reader gating tubes 11–DRG0, 11–DRG1, 11–DRG2, 11–DRG4 and 11–DRG7 (see Fig. 6–A, item 14, Rev. 4).

*Connection of reading heads to digit reader to read third or "C" digit of office code*

As earlier stated, the single digit "office" designation prerecorded in the "office" channels of the drum must be read or traversed three times by the reading heads associated with the "office" channels. Therefore, as the drum is completing its fourth revolution, the cells in the "office" channels of the drum comprising the slot corresponding to subscriber line 5–L–1 again pass under the "office" reading heads 5–OT–0, 5–OT–1, 5–OT–2, 5–OT–4 and 5–OT–7, thereby reading, for the third time, the number "2" prerecorded therein. The previously described alternating-current voltages induced in the windings of the reading heads 5–OT–0, 5–OT–1, 5–OT–2, 5–OT–4 and 5–OT–7 are respectively transmitted via the correspondingly designated conductors, and through the previously described circuit established by the operation of relay 8–ODS, to the grids of the inverter tubes 11–DRA0, 11–DRA1, 11–DRA2, 11–DRA4 and 11–DRA7, respectively, of the digit reader circuit.

Since the number being read from the drum for the third time is again a "2," the digit reader circuit functions in the same manner as previously described with reference to the first reading of the number "2," thereby again causing the operation of digit translating relays 11–CT0 and 11–CT2.

With code translating relays 11–CT0 and 11–CT2 operated, off-normal ground on conductor 11–DR is extended through a previously described circuit to the decimal code conductor 11–DC2 in cable 11–DC to Fig. 12 and through the No. 2 contacts of relay 12–CT to terminal punching 12–C2. Since, in the exemplary disclosure of the invention, it is assumed that the calling subscriber "office" code of "2" is to be translated to "234," the terminal punching 12–C2 is cross-connected to terminal punching 12–4. Ground is extended to terminal punching 12–4 and through the winding of relay 12–DT4 to battery to cause relay 12–DT4 to operate.

With relay 10–C in the digit walking circuit operated, and relay 12–CT in the digit translator circuit operated, indicating that the "C" digit of the "office" code is being read from the drum, with relays 11–CT0 and 11–CT2 in the digit reader circuit operated responsive to a "2" in the five channels comprising the "office" subdivision of the drum, and with relay 12–DT4 in the digit translator circuit operated to represent a "4" in decimal code, the frequency sources 12–A and 12–D are connected through the No. 2 and No. 1 contacts, respectively, of relay 12–DT4 to conductors 12–T and 12–R, respectively. Conductors 12–T and 12–R are connected through a previously described path to the left-hand windings of repeating coil 13–RC. The frequencies induced in the right-hand windings of repeating coil 13–RC are transmitted over a previously described circuit to the sender register at the distant end of the tandem trunk circuit. The combination of frequencies representing a value of "4" in the "C" digit of the "office" code has now been transmitted to and registered in the sender-register at the tandem office.

When the output conductors from the "office" reading heads, which at this time furnish the "C" digit of the "office" code, have been connected to the digit reader circuit and when the value read from the drum has been translated by the digit translator circuit into a multifrequency code representative of the value of the "C" digit of the three digit code assigned to the calling office and when said multifrequency code has been transmitted to the tandem office in the manner as above described, a circuit is completed from ground in the digit translator circuit through a one-out-of-ten up-check circuit comprising the No. 3 back contacts of relays 12–DT9, 12–DT8, 12–DT7, 12–DT6 and 12–DT5, the No. 4 front contacts of relay 12–DT4, the No. 4 back contacts of relays 12–DT3, 12–DT2 and 12–DT1, and the No. 3 back contacts of relay 12–DT0, thence via conductor 12–CK and cables 10–DTA and 12–DWAC to Fig. 10, through a one-out-of-eight up-check circuit comprising the No. 2 back contacts of relay 10–CL, the No. 3 back contacts of relays 10–U, 10–T, 10–H and 10–TH, the No. 3 front contacts of relay 10–C, and the No. 2 back contacts of relays 10–B and 10–A, conductor 10–SP, cables 10–DW and 12–DWAC to Fig. 13, the contacts of relay 13–SXR, conductor 13–3, the upper No. 1 back contacts of relay 13–GT, and through the winding of relay 13–SP to battery, causing relay 13–SP to operate.

The operation of relay 13–SP again initiates a cycle of operations resulting in the armature of polarized relay 13–PG again making a plurality of excursions between its right-hand and its left-hand contacts, the release of relay 13–PG1, the operation of relay 13–PGZ, the operation of relay 13–GT, the reoperation of relay 13–PG1, the release of relay 13–PGW, the release of relay 13–PG1, the release of relay 13–PGZ, the reoperation of relays 13–PG1 and 13–PGW, the release of relay 13–SP, and the operation of relay 10–DS, in the order recited, and as previously described with reference to the detailed description of the operation of the system with reference to the reading of the "A" digit of the "office" code from the drum.

When relay 10–DS operates, following the reading and transmission of the "C" digit, and breaks its No. 5 contacts, the locking circuit for off-normal relay 14–ON is again maintained through the upper No. 1 contacts of relay 10–CL. When relay 10–DS operates, the opening of its No. 4 contacts again disconnects off-normal ground from conductor 11–DR, causing the deionization of cold cathode tubes 11–T0 and 11–T2, and causing relays 11–CT0 and 11–CT2 to release, which in releasing disconnect ground from conductor 11–DC2 in cable 11–DC, causing relay 12–DT4 to release, thereby preparing the digit reader to read the next succeeding digit which is the "thousands" digit of the calling subscriber's directory number.

When relay 10–DS operates, ground is extended through its No. 1, No. 2 and No. 3 follow-through contacts, the upper No. 1 back contacts of relays 10–A and 10–B, the upper No. 1 front contacts of relay 10–C, the lower No. 6 and No. 5 continuity contacts and the winding of relay 10–TH to battery, causing relay 10–TH to operate and to lock up through its lower No. 5 and No. 4 continuity contacts and the lower No. 2 and No. 3 continuity contacts of relay 10–H to off-normal ground on conductor 14–ONGA. Relay 10–C does not release at this time, but remains locked up through its lower No. 5 and No. 4 continuity contacts, the lower No. 2 and No. 1 continuity contacts of relay 10–TH, and the No. 2 and No. 1 follow-through contacts of relay 10–DS to ground.

When relay 10–TH operates, ground on conductor 14–ONLA is extended through the upper No. 4 back contacts of relay 10–CL, the upper No. 5 back contacts of relays 10–U, 10–T and 10–H, the upper No. 5 front contacts of relay 10–TH, conductor 10–TH, cable 10–DWC to Fig. 8, the No. 10 contacts of relay 8–LSAI, conductor 8–TH, and the winding of "thousands" connector relay 8–THDS to battery, causing relay 8–THDS to operate. When relay 10–TH operates, ground is extended through its upper No. 4 contacts, conductor 10–NT, cables 10–DTA and 12–DWAC to Fig. 12, and the winding of relay 12–NT to battery, causing relay 12–NT to operate.

The coincident operation of relays 10–C and 10–TH causes the upper No. 3 back contacts of relay 10–TH, and the upper No. 2 back contacts of relay 10–C to be simultaneously in an open condition, thereby disconnecting ground from the up-check circuit which extends via conductor 10–SP in cables 10–DW and 12–DWAC to Fig. 13, through the contacts of relay 13–SXR, conductor 13–3, and the No. 1 front contacts and the winding of relay 13–GT to battery, causing relay 13–GT to release. Relay 13–GT, in releasing, reconnects conductor 13–3 through the winding of relay 13–SP to battery, but is ineffective to operate relay 13–SP at this time because of the above-described break in the circuit of conductor 10–SP at the contacts of relays 10–C and 10–TH. Relay 13–GT, in releasing, opens its No. 2 contacts, thereby disconnecting ground from conductor 13–DS which extends via cables 10–DW and 12–DWAC to Fig. 10 and through the winding of relay 10–DS to battery, causing relay 10–DS to release.

When relay 10–DS releases, the No. 5 contacts of relay 10–DS are again closed in parallel to the upper No. 1 contacts of relay 10–CL which maintain the locking circuit for off-normal relay 14–ON. Also, off-normal ground on conductor 14–ONGA is restored through the No. 4 contacts of relay 10–DS, conductor 11–DR to Fig. 11, the respective windings of code translating relays 11–CT0 to 11–CT7, inclusive, to the respective cathodes of cold cathode tubes 11–T0 to 11–T7, inclusive, to prepare the digit reader for the reception of the next succeeding digit. When relay 10–DS releases, ground is disconnected from conductor 10–1 extended through the lower No. 1 and No. 2 continuity contacts of relay 10–TH, the lower No. 4 and No. 5 continuity contacts and the winding of relay 10–C to battery, causing relay 10–C to release.

Relay 10–C, in releasing, opens its upper No. 5 contacts, thereby disconnecting ground from conductor 10–OF into cable 10–DWC and opening the operating circuit for the "office" connector relay 8–ODS, causing relay 8–ODS to release and to disconnect the "office" reading heads from the digit reader circuit. When relay 10–C releases, ground is disconnected at its upper No. 4 contacts from conductor 10–CT, opening the operating circuit for relay 12–CT which releases.

The cell in the delay channel in the slot corresponding to subscriber line 5–L–1, in which cell the previously described X signal was written at the completion of the fourth revolution of the drum (see Fig. 6–A, item 6, Rev. 4), is carried by the continued rotation of the drum and, 180 degrees after having been recorded therein, again passes under the pole-pieces of reading head 5–RDC at which time, in the manner previously described, the X signal is transferred from the cell in the delay channel to the cell in the main channel in the slot corresponding to subscriber line 5–L–1. With the continued rotation of the drum, the cell in the delay channel in the slot corresponding to subscriber line 5–L–1, in which cell the X signal was written at the completion of the fourth revolution of the drum, again passes beneath the erasing head 5–118, and the X signal is erased from the delay channel 270 degrees after having been recorded therein.

*Completion of fifth revolution of drum and start of sixth revolution*

The drum continues to rotate and, at the instant that it completes its fifth revolution and is starting its sixth revolution, the rotating element 5–27 of the line scanner again passes adjacent to the line segment 5–001 associated with subscriber line 5–L–1 which, it is assumed, is still engaged with a bona fide call requiring the services of an identifier; thus, line segment 5–001 consequently still has a positive potential thereon. The positive potential induced on the rotating element 5–27 is again momentarily applied to the grid of amplifier tube 6–LS1 (see Fig. 6–A, item 1, Rev. 5) and again causes the amplifiers 6–LS1, 6–LS2, 6–LS3 and 6–LS4 to function in the manner previously described with reference to the start of the first revolution of the drum (also see Fig. 6–A, items 2, 3 and 4, Rev. 5).

The cell in the main channel in the slot corresponding to subscriber line 5–L–1, to which cell the previously described X signal was transferred, at the completion of the fifth revolution again passes under the pole-pieces of reading head 5–RMC, thereby causing an X output signal voltage to be again developed in the winding thereof. As a result, the X output signal voltage induced in the winding of reading head 5–RMC causes a momentary negative-going pulse to be applied to the input of reading amplifier 6–RA (see Fig. 6–A, item 11, Rev. 5) which functions as previously described to produce a momentary positive-going pulse at its output, which positive-going pulse is applied as an input to the gate circuits 6–G2 and 6–G3 (see Fig. 6–A, item 12, Rev. 5).

The momentary negative-going pulse from the cathode of amplifier 6–LS3 (see Fig. 6–A, item 2, Rev. 5) is applied to the gate circuit 6–G2, and simultaneously therewith the above-described positive-going pulse from the reading amplifier 6–RA is applied to the gate circuit 6–G2. The negative pulse disables gate circuit 6–G2, thereby preventing the application of a positive-going or erase pulse through capacitor 6–C9 to the grid of the lower section of writing amplifier 6–WA.

The momentary positive-going pulse from the cathode follower of amplifier 6–LS4 (see Fig. 6–A, item 3, Rev. 5) is applied to the upper terminals of diodes 6–G1A and 6–G3A of gate circuits 6–G1 and 6–G3, respectively. The gate circuit 6–G1 is reenabled, as previously described, by the release of relay 6–WSTR. The gate circuit 6–G1, in its enabled condition, permits the positive-going pulse applied to the uper terminal of diode 6–G1A to be repeated through capacitor 6–C5 to the grid of the uper or write X section of writing amplifier 6–WA (see Fig. 6–A, item 5, Rev. 5). The application of a positive-going pulse to the grid of the upper section of amplifier 6–WA causes an X signal to be recorded in the cell in the delay channel in the slot corresponding to subscriber line 5–L–1 in the drum, which cell is passing under the pole-pieces of writing head 5–WDC at this time, in the manner previously described (see Fig. 6–A, item 6, Rev. 5).

The positive-going pulse from the cathode output of reading amplifier 6–RA applied to the diode 6–G3B at the end of the fifth revolution of the drum, in conjunction with the simultaneously applied positive-going output pulse from the cathode follower of amplifier 6–LS4 to the diode 6–G3A, causes a momentary positive-going pulse to be applied to the grid of amplifier 6–LS0 (see Fig. 6–A, item 13, Rev. 5). The positive-going pulse applied to the grid of amplifier 6–LS0 is amplified and inverted therein, in a manner previously described, and produces a momentary negative-going output pulse at the plate of tube 6–LS0 (see Fig. 6–A, item 14, Rev. 5), which negative-going pulse is applied through conductor 6–11, and over a previously described path to the grids of the digit reader gating tubes 11–DRG0 to 11–DRG7, inclusive (see Fig. 6–A, item 14, Rev. 5).

*Connection of reading heads to digit reader to read "thousands" digit of calling subscriber's directory number*

Now, again referring to Fig. 4, let it be assumed, as illustrated therein, that the subscriber's directory number is "2221," and that the "class" designation is "2." The number "2," indicating the "thousands" digit, is represented by an X signal condition prerecorded in the cells of the first and third channels, and an O signal condition prerecorded in the second, fourth and fifth channels of the "thousands" subdivision of the slot corresponding to the "tip" party of the calling subscriber line.

At the instant that the drum completes its fifth revolution, the plate of amplifier tube 6–LS0 delivers a negative-going pulse via conductor 6–11 and a previously described circuit to the grids of the gating tubes 11–DRG0 to 11–DRG7, inclusive (see Fig. 6–A, item 14, Rev. 5), and simultaneously therewith the slot in the drum related to the calling subscriber line 5–L–1 again passes under the pole-pieces of the reading heads. At this instant, the X signal conditions prerecorded in the cells of the first and third channels of the "thousands" subdivision of that slot cause an X signal voltage to be induced in the windings of the "thousands" reading heads 5–THT–0 and 5–THT–2 (not shown). The alterating-current voltages induced in the windings of the reading heads 5–THT–0 and 5–THT–2 by the X signals in the drum are superimposed on the negative direct-current voltage from battery 5–B1 and produce a potential having the wave form illustrated by the small curve shown in Fig. 6–D. The O signal condition prerecorded in the cells of the second, fourth and fifth channels of the "thousands" subdivision of the slot cause an O signal voltage to be induced in the windings of the "thousands" reading heads 5–THT–1, 5–THT–4 and 5–THT–7 (not shown). The alternating-current voltages induced in the windings of the reading heads 5–THT–1, 5–THT–4 and 5–THT–7 by the O signal conditions are superimposed on the negative direct-current voltage from battery 5–B1, and produce a potential having the wave form illustrated by the small curve shown in Fig. 6–E.

The output voltages from the "thousands" reading heads 5–THT–0, 5–THT–1, 5–THT–2, 5–THT–4 and 5–THT–7 are respectively transmitted over correspondingly designated output conductors, cables 5–THT and 5–IDC to Fig. 8, the No. 1, 2, 3, 4 and 5 contacts, respectively, of "thousands" connector relay 8–THDS, conductors 8–TP0, 8–TP1, 8–TP2, 8–TP4 and 8–TP7, respectively, contacts No. 1, 2, 3, 4 and 5, respectively, of relay 8–TP, conductors 8–0, 8–1, 8–2, 8–4 and 8–7 respectively, contacts numbered 5, 4, 3, 2 and 1, respectively, of relay 8–LSAI, conductors 8–D0, 8–D1, 8–D2, 8–D4 and 8–D7, respectively, in cable 8–D to Fig. 11 to the grids of digit reader tubes 11–DRA0, 11–DRA1, 11–DRA2, 11–DRA4 and 11–DRA7, respectively.

Thus, it will be seen that the operation of the "thousands" field party connector relay 8–THDS selectively connects the ten "thousands" reader heads (five heads for the "tip" party and five heads for the "ring" party) to the ten multipled conductors 8–TP0 to 8–TP7, inclusive, and 8–RP0 to 8–RP7, inclusive. The coincident operation of relay 8–THDS and the "tip" party connector relay 8–TP selectively connects the five "tip" party "thousands" heads through the closed front contacts of relay 8–LSAI, via multipled conductors 8–D0 to 8–D7, inclusive, to the inputs of the digit reader circuits, as above described. The tubes 11–DRA0 and 11–DRA2 function in the manner previously described to integrate and to invert the X input signal voltages applied thereto, and respectively to produce output voltages having the wave form illustrated by the small curve in Fig. 6–F. The tubes 11–DRA1, 11–DRA4 and 11–DRA7 also function in the manner previously described to integrate and to invert the O signal voltages applied thereto, and respectively to produce output voltages having the wave form illustrated by the small curve in Fig. 6–G.

The channel reading circuits 11–CR0 and 11–CR2, respectively, responsive to X signals in the first and third channels of the "thousands" subdivision of the drum, function in the manner previously described to effect the operation of code translating relays 11–CT0 and 11–CT2.

With code translating relays 11–CT0 and 11–CT2 operated, off-normal ground on conductor 11–DR is extended through a previously described circuit comprising a valid combination of operated and non-operated contacts of the code translating relays to the decimal code conductor 11–DC2 into cable 11–DC to Fig. 12, and through the No. 2 contacts of relay 12–NT to terminal punching 12–N2. Since no translation of the subscriber's directory number prerecorded in the drum is required, terminal punching 12–N2 is cross-connected to terminal punching 12–2. Ground extended to terminal punching 12–2 and through the winding of relay 12–DT2 to battery causes relay 12–DT2 to operate.

With relay 10–TH in the digit walking circuit operated, and with relay 12–NT in the digit translator circuit operated, indicating that the "thousands" digit of the calling subscriber's directory number is being read from the drum with relays 11–CT0 and 11–CT2 in the digit reader circuit operated responsive to a "2" in the five channels comprising the "thousands" subdivision of the drum, and with relay 12–DT2 in the digit translator circuit operated to represent a "2" in decimal code, the frequency sources 12–A and 12–C are connected through the No. 2 and No. 1 contacts, respectively, of relay 12–DT2 to conductors 12–T and 12–R, respectively. Conductors 12–T and 12–R are connected through a previously described path to the left-hand windings of repeating coil 13–RC. The frequencies induced in the right-hand windings of repeating coil 13–RC are transmitted over a previously described circuit to the sender-register at the distant end of the tandem trunk circuit. The combination of frequencies representing a value of "2" in the "thousands" digit of the calling subscriber's directory number has now been transmitted to and registered in the sender-register at the tandem office.

When the output conductors from the "thousands" reading heads, which furnish the "thousands" digit of the calling subscriber's directory number, have been connected to the digit reader circuit, and when the value read from the drum has been translated by the digit translator circuit into a multifrequency code representative of the value of the "thousands" digit, and when said multifrequency code has been transmitted to the tandem office in the manner as above described, a circuit is completed from ground in the digit translator circuit through a one-out-of-ten up-check circuit comprising the No. 3 back contacts of relays 12–DT9, 12–DT8, 12–DT7, 12–DT6, 12–DT5, 12–DT4 and 12–DT3, the No. 4 front contacts of relay 12–DT2, the No. 4 back contacts of relay 12–DT1 and the No. 3 back contacts of relay 12–DT0, thence via conductor 12–CK, cables 10–DTA and 12–DWAC to Fig. 10, through a one-out-of-eight up-check circuit comprising the No. 2 back contacts of relay 10–CL, the No. 3 back contacts of relays 10–U, 10–T and 10–H, the No. 3 front contacts of relay 10–TH, and the No. 2 back contacts of relays 10–C, 10–B and 10–A, conductor 10–SP, cables 10–DW and 12–DWAC to Fig. 13, the contacts of relay 13–SXR, conductor 13–3, the upper No. 1 back contacts of relay 13–GT, and through the winding of relay 13–SP to battery, causing relay 13–SP to operate.

The operation of relay 13–SP again initiates a cycle of operations resulting in the armature of polarized relay 13–PG again making a plurality of excursions between its right-hand and its left-hand contacts, the release of relay 13–PG1, the operation of relay 13–PGZ, the operation of relay 13–GT, the reoperation of relay 13–PG1, the release of relay 13–PGW, the release of relay 13–PG1, the release of relay 13–PGZ, the reoperation of relays 13–PG1 and 13–PGW, the release of relay 13–SP, and the operation of relay 10–DS, in the order recited, and as previously described with reference to the detailed description of the operation of the system with reference to the reading of the "A" digit of the " office" code from the drum.

When relay 10–DS operates, following the reading and transmission of the "thousands" digit, and opens its No. 5 contacts, the locking circuit for off-normal relay 14–ON is again maintained through the upper No. 1 contacts of relay 10–CL. When relay 10–DS operates, the opening of its No. 4 contacts again disconnects off-normal ground from conductor 11–DR, causing the deionization of cold cathode tubes 11–T0 and 11–T2, and causing relays 11CT0 and 11CT2 to release, which in turn disconnect ground from conductor 11–DC2 into cable 11–DC, causing relay 12–DT2 to release, thereby preparing the digit reader to read the next succeeding digit which is the "hundreds" digit of the calling subscriber's directory number.

When relay 10–DS operates, ground is extended through its No. 1, No. 2 and No. 3 follow-through contacts, the upper No. 1 back contacts of relays 10–A, 10–B and 10–C, the upper No. 1 front contacts of relay 10–TH, the lower No. 6 and No. 5 continuity contacts and the winding of relay 10–H to battery, causing relay 10–H to operate and to lock up through its lower No. 5 and No. 4 continuity contacts, the lower No. 2 and No. 3 continuity contacts of relay 10–T to off-normal ground on conductor 14–ONGA. Relay 10–TH does not release at this time, but remains locked up through its lower No. 5 and No. 4 continuity contacts, the lower No. 2 and No. 1 continuity contacts of relay 10–H, and the No. 2 and No. 1 follow-through contacts of relay 10–DS to ground.

When relay 10–H operates, ground on conductor 10–ONLA is extended through the upper No. 4 back contacts of relay 10–CL, the upper No. 5 back contacts of relays 10–U and 10–T, the upper No. 5 front contacts of relay 10–H, conductor 10–H, cable 10–DWC to Fig. 8, the No. 9 contacts of relay 8–LSAI, conductor 8–H, and the winding of "hundreds" connector relay 8–HDS to battery, causing relay 8–HDS to operate. When relay 10–H operates, ground is extended through its upper No. 4 contacts to conductor 10–NT, cables 10–DTA and 12–DWAC to Fig. 12, and the winding of relay 12–NT to battery, causing relay 12–NT to remain operated.

The coincident operation of relays 10–TH and 10–H causes the upper No. 3 back contacts of relay 10–H and the upper No. 2 back contacts of relay 10–TH to be simultaneously in an open condition, thereby disconnecting ground from the up-check circuit condition, thereby disconnecting ground from the up-check circuit which extends via conductor 10–SP in cables 10–DW and 12–DWAC, through the contacts of relay 13–SXR, conductor 13–3 and the No. 1 front contacts and the winding of relay 13–GT to battery, causing relay 13–GT to release. Relay 13–GT, in releasing, reconnects conductor 13–3 through the winding of relay 13–SP to battery, but is ineffective to operate relay 13–SP at this time because of the above-described break in the circuit of conductor 10–SP at the contacts of relays 10–TH and 10–H. Relay 13–GT, in releasing, opens its No. 2 contacts, thereby disconnecting ground from conductor 13–DS, cables 10–DW and 12–DWAC to Fig. 10, through the winding of relay 10–DS to battery, causing relay 10–DS to release.

When relay 10–DS releases, the No. 5 contacts of relay 10–DS are again closed in parallel to the upper No. 1 contacts of relay 10–CL which maintain the locking circuit for off-normal relay 14–ON. Also, off-normal ground on conductor 14–ONGA is restored through the No. 4 contacts of relay 10–DS, conductor 11–DR, the respective windings of code translating relays 11–CT0 to 11CT7, inclusive, to the respective cathodes of cold cathode tubes 11–T0 to 11–T7, inclusive, to prepare the digit reader for the reception of the next succeeding digit. When relay 10–DS releases, ground is disconnected from conductor 10–1 extended through the lower No. 1 and No. 2 continuity contacts of relay 10–H, the lower No. 4 and No. 5 continuity contacts and the winding of relay 10–TH to battery, causing relay 10–TH to release.

Relay 10–TH, in releasing, opens its upper No. 4 contacts, but ground is still connected to the conductor 10–NT through the upper No. 4 contacts of relay 10–H, and over a previously described path, to maintain relay 12–NT in its operated condition. When relay 10–TH releases, ground is disconnected at its upper No. 5 front contact from conductor 10–TH into cable 10–DWC, thereby opening the operating circuit for the "thousands"

connector relay 8–THDS, causing relay 8–THDS to release.

The cell in the delay channel in the slot corresponding to subscriber line 5–L–1, in which cell the previously described X signal was written at the completion of the fifth revolution of the drum (see Fig. 6–A, item 6, Rev. 5), is carried by the continued rotation of the drum, and 180 degrees after having been recorded therein, again passes under the pole-pieces of reading head 5–RDC at which time, in the manner previously described, the X signal is transferred from the cell in the delay channel to the cell in the main channel in the slot corresponding to subscriber line 5–L–1. With the continued rotation of the drum, the cell in the delay channel in the slot corresponding to subscriber line 5–L–1, in which cell the X signal was written at the completion of the fifth revolution of the drum, again passes beneath the erasing head 5–118, and the X signal is erased from the delay channel 270 degrees after having been recorded therein.

*Completion of sixth revolution of drum and start of seventh revolution*

The drum continues to rotate and, at the instant that it completes its sixth revolution and is starting its seventh revolution, the rotating element 5–27 of the line scanner again passes adjacent to the line segment 5–001 associated with subscriber line 5–L–1, which, it is assumed, is still engaged with a bona fide call requiring the services of an identifier. Thus, line segment 5–001 consequently still has a positive potential thereon. The positive potential induced on the rotating element 5–27 is again momentarily applied to the grid of amplifier tube 6–LS1 (see Figs. 6–A and 6–B, item 1, Rev. 6), and again causes the amplifiers 6–LS1, 6–LS2, 6–LS3 and 6–LS4 to function in the manner previously described with reference to the start of the first revolution of the drum (also see Figs. 6–A and 6–B, items 2, 3 and 4, Rev. 6).

The cell in the main channel in the slot corresponding to subscriber line 5–L–1, to which cell the previously described X signal was transferred, at the completion of the sixth revolution again passes under the pole-pieces of reading head 5–RMC thereby causing an X output signal voltage to be again developed in the winding thereof. As a result, the X output signal voltage induced in the winding of reading head 5–RMC causes a momentary negative-going pulse to be applied to the input of reading amplifier 6–RA (see Figs. 6–A and 6–B, item 11, Rev. 6) which functions as previously described to produce a momentary positive-going pulse at its output, which positive-going pulse is applied as an input to the gate circuits 6–G2 and 6–G3 (see Figs. 6–A and 6–B, item 12, Rev. 6).

The momentary negative-going pulse from the cathode of amplifier 6–LS3 (see Figs. 6–A and 6–B, item 2, Rev. 6) is applied to the gate circuit 6–G2, and simultaneously therewith the above-described positive-going pulse from the reading amplifier 6–RA is applied to the gate circuit 6–G2. The negative pulse disables gate circuit 6–G2, thereby preventing the application of a positive-going or erase pulse through capacitor 6–C9 to the grid of the lower section of writing amplifier 6–WA.

The momentary positive-going pulse from the cathode follower of amplifier 6–LS4 (see Figs. 6–A and 6–B, item 3, Rev. 6) is applied to the upper terminals of diodes 6–G1A and 6–G3A of gate circuits 6–G1 and 6–G3, respectively. The gate circuit 6–G1 is reenabled, as previously described, by the release of relay 6–WSTR. The gate circuit 6–G1, in its enabled condition, permits the positive-going pulse applied to the upper terminal of diode 6–G1A to be repeated through capacitor 6–C5 to the grid of the upper or write X section of writing amplifier 6–WA (see Figs. 6–A and 6–B, item 5, Rev. 6). The application of a positive-going pulse to the grid of the upper section of amplifier 6–WA causes an X signal to be recorded in the cell in the delay channel in the slot corresponding to subscriber line 5–L–1 in the drum, which cell is passing under the pole-pieces of writing head 5–WDC at this time, in the manner previously described (see Figs. 6–A and 6–B, item 6, Rev. 6).

The positive-going pulse from the cathode output of reading amplifier 6–RA applied to the diode 6–G3B at the end of the sixth revolution of the drum, in conjunction with the simultaneously applied positive-going output pulse from the cathode follower of amplifier 6–LS4 to the diode 6–G3A, causes a momentary positive-going pulse to be applied to the grid of amplifier 6–LS0 (see Figs. 6–A and 6–B, item 13. Rev. 6). The positive-going pulse applied to the grid of amplifier 6–LS0 is amplified and inverted therein, in a manner previously described, and produces a momentary negative-going output pulse at the plate of tube 6–LS0 (see Figs. 6–A and 6–B, item 14, Rev. 6), which negative-going pulse is applied through conductor 6–11, and over a previously described path to the grids of the digit reader gating tubes 11–DRG0 to 11–DRG7, inclusive (see Figs. 6–A and 6–B, item 14, Rev. 6).

*Connection of reading heads to digit reader to read "hundreds" digit of calling subscriber's directory number*

Now, again referring to Fig. 4, it will be remembered that, in the exemplary disclosure, the calling subscriber's directory number is assumed to be "2221." The number "2," indicating the "hundreds" digit, is represented by an X signal condition prerecorded in the cells of the first and third channels, and an O signal condition prerecorded in the second, fourth and fifth channels of the "hundreds" subdivision of the slot corresponding to the "tip" party of the calling subscriber line.

At the instant that the drum completes its sixth revolution, the plate of amplifier tube 6–LS0 delivers a negative-going pulse via conductor 6–11 and a previously described circuit to the grids of the gating tubes 11–DRG0 to 11–DRG7, inclusive (see Figs. 6–A and 6–B, item 14, Rev. 6), and simultaneously therewith the slot in the drum related to the calling subscriber line 5–L–1 again passes under the pole-pieces of the reading heads. At this instant, the X signal conditions prerecorded in the cells of the first and third channels of the "hundreds" subdivision of that slot cause an X signal voltage to be induced in the windings of the "hundreds" reading heads 5–HDT–0 and 5–HDT–2 (not shown). The O signal conditions prerecorded in the cells of the second, fourth and fifth channels of the "hundreds" subdivision of the slot cause an O signal voltage to be induced in the windings of the "hundreds" reading heads 5–HDT–1, 5–HDT–4 and 5–HDT–7 (not shown). The X and O alternating-current voltages induced in the windings of the "hundreds" reading heads are superimposed on the negative direct-current voltage from battery 5–B1 and produce X and O output potentials having the wave forms illustrated in Figs. 6–D and 6–E, respectively.

The output voltages from the "hundreds" reading heads 5–HDT–0, 5–HTD–1, 5–HDT–2, 5–HDT–4 and 5–HDT–7 are respectively transmitted over correspondingly designated output conductors in cable 5–HDT; the No. 1, 2, 3, 4 and 5 contacts, respectively, of "hundreds" connector relay 8–HDS, conductors 8–TP0, 8–TP1, 8–TP2, 8–TP4 and 8–TP7, respectively, contacts No. 1, 2, 3, 4 and 5, respectively, of relay 8–TP, conductors 8–0, 8–1, 8–2, 8–4 and 8–7, respectively, contacts numbered 5, 4, 3, 2 and 1, respectively, of relay 8–LSAI, conductors 8–D0, 8–D1, 8–D2, 8–D4 and 8–D7, respectively, cable 8–D to Fig. 11, to the grids of digit reader tubes 11–DRA0, 11–DRA1, 11–DRA2, 11–DRA4 and 11–DRA7, respectively.

Thus, it will be seen that the operation of the "hundreds" field party connector relay 8–HDS selectively connects the "hundreds" reader heads (five heads for the "tip" party and five heads for the "ring" party) to the ten multipled conductors 8–TP0 to 8–TP7, inclusive, and 8–RP0 to 8–RP7, inclusive. The coincident operation of relay 8–HDS and the "tip" party connector relay 8–TP selectively connects the five "tip" party "hundreds" heads through the closed front contacts of relay 8–LSAI, via multipled conductors 8–D0 to 8–D7, inclusive, to the inputs of the digit reader circuits, as above described. The tubes 11–DRA0 and 11–DRA2 function in the manner previously described to integrate and to invert the X input signal voltages applied thereto, and respectively to produce output voltages having the wave form illustrated by the small curve in Fig. 6–F. The tubes 11–DRA1, 11–DRA4 and 11–DRA7 also function in the manner previously described to integrate and to invert the O signal voltages applied thereto, and respectively to produce output voltages having the wave form illustrated by the small curve in Fig. 6–G.

The channel reading circuits 11–CR0 and 11–CR2, respectively responsive to X signals in the first and third channels of the "hundreds" subdivision of the drum, function in the manner previously described to effect the operation of code translating relays 11–CT0 and 11–CT2.

With code translating relays 11–CT0 and 11–CT2 operated, off-normal ground on conductor 11–DR is extended through a previously described circuit, comprising a valid combination of operated and non-operated contacts of the code translating relays, to the decimal code conductor 11–DC2 into cable 11–DC, and through the No. 2 contacts of relay 12–NT to terminal punching 12–N2, thence via a cross-connection to terminal punching 12–2, and through the winding of relay 12–DT2 to battery, causing relay 12–DT2 to operate.

With relay 10—H in the digit walking circuit operated, and with relay 12–NT in the digit translator circuit operated, indicating that the "hundreds" digit of the calling subscriber's directory number is being read from the drum, with relays 11–CT0 and 11–CT2 in the digit reader circuit operated responsive to a "2" in the five channels comprising the "hundreds" subdivision of the drum, and with relay 12–DT2 in the digit translator circuit operated to represent a "2" in decimal code, the frequency sources 12–A and 12–C are connected through the No. 2 and No. 1 contacts, respectively, of relay 12–DT2 to conductors 12–T and 12–R, respectively. Conductors 12–T and 12–R are connected through a previously described path to the left-hand windings of repeating coil 13–RC. The frequencies induced in the righthand windings of repeating coil 13–RC are transmitted over a previously described circuit to the sender-register at the distant end of the tandem trunk circuit. The combination of frequencies representing a value of "2" in the "hundreds" digit of the calling subscriber's directory number has now been transmitted to and registered in the sender-register at the tandem office.

When the output conductors from the "hundreds" reading heads, which furnish the "hundreds" digit of the calling subscriber's directory number, have been connected to the digit reader circuit, and when the value read from the drum has been translated by the digit translator circuit into a multifrequency code representative of the value of the "hundreds" digit, and when said multifrequency code has been transmitted to the tandem office in the manner as above described, a circuit is completed from ground in the digit translator circuit through a one-out-of-ten up-check circuit comprising the No. 3 back contacts of relays 12–DT9, 12–DT8, 12–DT7, 12–DT6, 12–DT5, 12–DT4 and 12–DT3, the No. 4 front contacts of relay 12–DT2, the No. 4 back contacts of relay 12–DT1, and the No. 3 back contacts of relay 12–DT0, thence via conductor 12–CK and cables 10–DTA and 12–DWAC to Fig. 10, through a one-out-of-eight up-check circuit comprising the No. 2 back contacts of relay 10–CL, the No. 3 back contacts of relays 10–U and 10–T, the No. 3 front contacts of relay 10–H, and the No. 2 back contacts of relays 10–TH, 10–C, 10–B and 10–A, conductor 10–SP, cables 10–DW and 12–DWAC to Fig. 13, the contacts of relay 13–SXR, conductor 13–3, the upper No. 1 back contacts of relay 13–GT, and through the winding of relay 13–SP to battery, causing relay 13–SP to operate.

The operation of relay 13–SP again initiates a cycle of operations resulting in the armature of polarized relay 13–PG again making a plurality of excursions between its right-hand and its left-hand contacts, the release of relay 13–PG1, the operation of relay 13–PGZ, the operation of relay 13–GT, the reoperation of relay 13–PG1, the release of relay 13–PGW, the release of relay 13–PG1, the release of relay 13–PGZ, the reoperation of relays 13–PG1 and 13–PGW, the release of relay 13–SP, and the operation of relay 10–DS, in the order recited, and as previously described with reference to the detailed description of the operation of the system with reference to the reading of the "A" digit of the "office" code from the drum.

When relay 10–DS operates, following the reading and transmission of the "hundreds" digit, and breaks its No. 5 contacts, the locking circuit for off-normal relay 14–0N 5 contacts, the locking circuit for off-normal relay 14–ON is again maintained through the upper No. 1 contacts of relay 10–CL. When relay 10–DS operates, the opening of its No. 4 contacts again disconnects off-normal ground from conductor 11–DR, causing the deionization of cold cathode tubes 11–T0 and 11–T2, and causing relays 11–CT0 and 11–CT2 to release, which in turn disconnect ground from conductor 11–DC2 in cable 11–DC, causing relay 12–DC2 to release, thereby preparing the digit reader to read the next succeeding digit which is the "tens" digit of the calling subscriber's directory number.

When relay 10–DS operates, ground is extended through its No. 1, No. 2 and No. 3 follow-through contacts, the upper No. 1 back contacts of relays 10–A, 10–B, 10–C and 10–TH, the upper No. 1 front contacts of relay 10–H, the lower No. 6 and No. 5 continuity contacts and the winding of relay 10–T to battery, causing relay 10–T to operate and to lock up through its lower No. 5 and No. 4 continuity contacts, and the lower No. 2 and No. 3 continuity contacts of relay 10–U to off-normal ground on conductor 14–ONGA. Relay 10–H does not release at this time, but remains locked up through its lower No. 5 and No. 4 continuity contacts, the lower No. 2 and No. 1 continuity contacts of relay 10–T, and the No. 2 and No. 1 follow-through contacts of relay 10–DS to ground.

When relay 10–T operates, ground on conductor 14–ONLA is extended through the upper No. 4 back contacts of relay 10–CL, the upper No. 5 back contacts of relay 10–U, the upper No. 5 front contacts of relay 10–T, conductor 10–T, cable 10–DWC, the No. 8 contacts of relay 8–LSAI, conductor 8–T, and the winding of "tens" connector relay 8–TDS to battery, causing relay 8–TDS to operate. When relay 10–T operates, ground is extended through its upper No. 4 contacts to conductor 10–NT, cables 10–DTA and 12–DWAC to Fig. 12, and the winding of relay 12–NT to battery, causing relay 12–NT to remain operated.

The coincident operation of relays 10–H and 10–T causes the upper No. 3 back contacts of relay 10–T and the upper No. 2 back contacts of relay 10–H to be simultaneously in an open condition, thereby disconnecting ground from the up-check circuit which extends via conductor 10–SP and cables 10–DW and 12–DWAC to Fig. 13, through the contacts of relay 13–SXR, conductor 13–3, and the No. 1 front contacts and the winding of relay 13–GT to battery, causing relay 13–GT to release. Relay 13–GT, in releasing, reconnects conductor 13–3 through the winding of relay 13–SP to battery, but is ineffective to operate relay 13–SP at this time because of the above-described break in the circuit of conductor 10–SP at the contacts of relays 10–H and 10–T. Relay 13–GT, in releasing, opens its No. 2 contacts, thereby disconnecting ground from conductor 13–DS into cables 10–DW and 12–DWAC and through the winding of relay 10–DS to battery, causing relay 10–DS to release.

When relay 10–DS releases, the No. 5 contacts of relay 10–DS are again closed in parallel with the upper No. 1 contacts of relay 10–CL which maintains the locking circuit for off-normal relay 14–ON. Also, off-normal ground on conductor 14–ONGA is restored through the No. 4 contacts of relay 10–DS, conductor 11–DR, the respective windings of code translating relays 11–CT0 to 11–CT7, inclusive, to the respective cathodes of cold cathode tubes 11–T0 to 11–T7, inclusive, to prepare the digit reader for the reception of the next succeeding digit. When relay 10–DS releases, ground is disconnected from conductor 10–1 extended through the lower No. 1 and No. 2 continuity contacts of relay 10–T, the lower No. 4 and No. 5 continuity contacts and the winding of relay 10–H to battery, causing relay 10–H to release.

Relay 10–H, in releasing, opens its upper No. 4 contacts, but ground is still connected to the conductor 10–NT through the upper No. 4 contacts of relay 10–T, and over a previously described path, to maintain relay 12–NT in its operated condition. When relay 10–H releases, ground is disconnected at its upper No. 5 front contacts from conductor 10–H into cable 10–DWC, thereby opening the operating circuit for the "hundreds" connector relay 8–HDS, causing relay 8–HDS to release.

The cell in the delay channel in the slot corresponding to subscriber line 5–L–1, in which cell the previously described X signal was written at the completion of the sixth revolution of the drum (see Figs. 6–A and 6–B, item 6, Rev. 6), is carried by the continued rotation of the drum and, 180 degrees after having been recorded therein, again passes under the pole-pieces of reading head 5–RDC at which time, in the manner previously described, the X signal is transferred from the cell in the delay channel to the cell in the main channel in the slot corresponding to subscriber line 5–L–1. With the continued rotation of the drum, the cell in the delay channel in the slot corresponding to subscriber line 5–L–1, in which cell the X signal was written at the completion of the sixth revolution of the drum, again passes beneath the erasing head 5–118, and the X signal is erased from the delay channel 270 degrees after having been recorded therein.

*Completion of seventh revolution of drum and start of eighth revolution*

The drum continues to rotate and at the instant that it completes its seventh revolution and is starting its eighth revolution, the rotating element 5–27 of the line scanner again passes adjacent to the line segment 5–001 associated with subscriber line 5–L–1 which, it is assumed, is still engaged with a bona fide call requiring the services of an identifier. Thus, line segment 5–001 consequently still has a positive potential thereon. The positive potential induced on the rotating element 5–27 is again momentarily applied to the grid of amplifier tube 6–LS1 (see Figs. 6–A and 6–B, item 1, Rev. 7), and again causes the amplifiers 6–LS1, 6–LS2, 6–LS3 and 6–LS4 to function in the manner previously described with reference to the start of the first revolution of the drum (also see Figs. 6–A and 6–B, items 2, 3 and 4, Rev. 7).

The cell in the main channel in the slot corresponding to subscriber line 5–L–1, to which cell the previously described X signal was transferred, at the completion of the seventh revolution again passes under the pole-pieces of reading head 5–RMC thereby causing an X output signal voltage to be again developed in the winding thereof. As a result, the X output signal voltage induced in the winding of reading head 5–RMC causes a momentary negative-going pulse to be applied to the input of reading amplifier 6–RA (see Figs. 6–A and 6–B, item 11, Rev. 7) which functions as previously described to produce a momentary positive-going pulse at its output, which positive-going pulse is applied as an input to the gate circuits 6–G2 and 6–G3 (see Figs. 6–A and 6–B, item 12, Rev. 7).

The momentary negative-going pulse from the cathode of amplifier 6–LS3 (see Figs. 6–A and 6–B, item 2, Rev. 7) is applied to the gate circuit 6–G2, and simultaneously therewith the above-described positive-going pulse from the reading amplifier 6–RA is applied to the gate circuit 6–G2. The negative pulse disables gate circuit 6–G2, thereby preventing the application of a positive-going or erase pulse through capacitor 6–C9 to the grid of the lower section of writing amplifier 6–WA.

The momentary positive-going pulse from the cathode follower of amplifier 6–LS4 (see Figs. 6–A and 6–B, item 3, Rev. 7) is applied to the upper terminals of diodes 6–G1A and 6–G3A of gate circuits 6–G1 and 6–G3, respectively. The gate circuit 6–G1 is reenabled, as previously described, by the release of relay 6–WSTR. The gate circuit 6–G1, in its enabled condition, permits the positive-going pulse applied to the upper terminal of diode 6–G1A to be repeated through capacitor 6–C5 to the grid of the upper or write X section of writing amplifier 6–WA (see Figs. 6–A and 6–B, item 5, Rev. 7). The application of a positive-going pulse to the grid of the upper section of amplifier 6–WA causes an X signal to be recorded in the cell in the delay channel in the slot corresponding to subscriber line 5–L–1 in the drum, which cell is passing under the pole-pieces of writing head 5–WDC at this time, in the manner previously described (see Figs. 6–A and 6–B, item 6, Rev. 7).

The positive-going pulse from the cathode output of reading amplifier 6–RA applied to the diode 6–G3B at the end of the seventh revolution of the drum, in conjunction with the simultaneously applied positive-going output pulse from the cathode follower of amplifier 6–LS4 to the diode 6–G3A, causes a momentary positive-going pulse to be applied to the grid of amplifier 6–LS0 (see Figs. 6–A and 6–B, item 13, Rev. 7). The positive-going pulse applied to the grid of amplifier 6–LS0 is amplified and inverted therein, in a manner previously described, and produces a momentary negative-going output pulse at the plate of tube 6–LS0 (see Figs. 6–A and 6–B, item 14, Rev. 7), which negative-going pulse is applied through conductor 6–11 and over a previously described path to the grids of the digit reader gating tubes 11–DRG0 to 11–DRG7, inclusive (see Figs. 6–A and 6–B, item 14, Rev. 7).

*Connection of reading heads to digit reader to read "tens" digit of calling subscriber's directory number*

Again referring to Fig. 4, and assuming that the calling subscriber's directory number is "2221," the number "2," indicating the "tens" digit, is represented by an X signal condition prerecorded in the cells of the first and third channels, and an O signal condition prerecorded in the second, fourth and fifth channels of the "tens" subdivision of the slot corresponding to the "tip" party of the calling subscriber line.

At the instant that the drum completes its seventh revolution, the plate of amplifier tube 6–LS0 delivers a negative-going pulse via conductor 6–11 and a previously described circuit to the grids of the gating tubes 11–DRG0 to 11–DRG7, inclusive (see Figs. 6–A and 6–B, item 14, Rev. 7), and simultaneously therewith the slot in the drum related to the calling subscriber line 5–L–1 again passes under the pole-pieces of the reading heads. At this instant, the X signal conditions prerecorded in the cells of the first and third channels of the "tens" subdivision of that slot cause an X signal voltage to be induced in the windings of the "tens" reading heads 5–TDT–0 and 5–TDT–2 (not shown). The O signal conditions prerecorded in the cells of the second, fourth and fifth channels of the "tens" subdivision of the slot cause an O signal voltage to be induced in the windings of the "tens" reading heads 5–TDT–1, 5–TDT–4 and 5–TDT–7 (not shown). The X and O alternating-current voltages induced in the windings of the "tens" reading heads are superimposed on the negative direct-current voltage from battery 5–BI, and produce X and O output potentials having the wave forms illustrated in Figs. 6–D and 6–E, respectively.

The output voltages from the "tens" reading heads 5–TDT–0, 5–TDT–1, 5–TDT–2, 5–TDT–4 and 5–TDT–7 are respectively transmitted over correspondingly designated output conductors in cable 5–TDT and 5–IDC to Fig. 8, the No. 1, 2, 3, 4 and 5 contacts, respectively, of "tens" connector relay 8–TDS, conductors 8–TP0, 8–TP1, 8–TP2, 8–TP4 and 8–TP7, respectively, contacts No. 1, 2, 3, 4 and 5, respectively, of relay 8–TP, conductors 8–0, 8–1, 8–2, 8–4 and 8–7, respectively, contacts numbered 5, 4, 3, 2 and 1, respectively, of relay 8–LSAI, conductors 8–D0, 8–D1, 8–D2, 8–D4 and 8–D7, respectively, in cable 8–D to Fig. 11 to the grids of digit reader tubes 11–DRA0, 11–DRA1, 11–DRA2, 11–DRA4 and 11–DRA7, respectively.

Thus, it will be seen that the operation of the "tens" field party connector relay 8–TDS selectively connects the "tens" reader heads (five heads for the "tip" party and five heads for the "ring" party) to the ten multipled conductors 8–TP0 to 8–TP7, inclusive, and 8–RP0 to 8–RP7, inclusive. The coincident operation of relay 8–TDS and the "tip" party connector relay 8–TP selectively connects the five "tip" party "tens" heads through the closed front contacts of relay 8–LSAI, via multipled conductors 8–D0 to 8–D7, inclusive, to the inputs of the digit reader circuits, as above described. The tubes 11–DRA0 and 11–DRA2 function in the manner previously described to integrate and to invert the X input signal voltages applied thereto, and respectively to produce output voltages having the wave form illustrated by the small curve in Fig. 6–F. The tubes 11–DRA1, 11–DRA4 and 11–DRA7 also function in the manner previously described to integrate and to invert the O signal voltages applied thereto, and respectively to produce output voltages having the wave form illustrated by the small curve in Fig. 6–G.

The channel reading circuits 11–CR0 and 11–CR2, respectively responsive to X signals in the first and third channels of the "tens" subdivision of the drum, function in the manner previously described to effect the operation of code translating relays 11–CTO and 11–CT2.

With code translating relays 11–CT0 and 11–CT2 operated, off-normal ground on conductor 11–DR is extended through a previously described circuit, comprising a valid combination of operated and non-operated contacts of the code translating relays, to the decimal code conductor 11–DC2 into cable 11–DC, and through the No. 2 contacts of relay 12–NT to terminal punching 12–N2, thence via a cross-connection to terminal punching 12–2, and through the winding of relay 12–DT2 to battery, causing relay 12–DT2 to operate.

With relay 10–T in the digit walking circuit operated, and with relay 12–NT in the digit translator circuit operated, indicating that the "tens" digit of the calling subscriber's directory number is being read from the drum, with relays 11–CT0 and 11–CT2 in the digit reader circuit operated responsive to a "2" in the five channels comprising the "tens" subdivision of the drum, and with relay 12–DT2 in the digit translator circuit operated to represent a "2" in a decimal code, the frequency sources 12–A and 12–C are connected through the No. 2 and No. 1 contacts, respectively, of relay 12–DT2 to conductors 12–T and 12–R, respectively. Conductors 12–T and 12–R are connected through a previously described path to the left-hand windings of repeating coil 13–RC. The frequencies induced in the right-hand windings of repeating coil 13–RC are transmitted over a previously described circuit to the sender-register at the distant end of the tandem trunk circuit. The combination of frequencies representing a value of "2" in the "tens" digit of the calling subscriber's directory number has now been transmitted to and registered in the sender-register at the tandem office.

When the output conductors from the "tens" reading heads, which furnish the "tens" digit of the calling subscriber's directory number, have been connected to the digit reader circuit, and when the value read from the drum has been translated by the digit translator circuit into a multifrequency code representative of the value of the "tens" digit, and when said multifrequency code has been transmitted to the tandem office in the manner as above described, a circuit is completed from ground in the digit translator circuit through a one-out-of-ten up-check circuit comprising the No. 3 back contacts of relays 12–DT9, 12–DT8, 12–DT7, 12–DT6, 12–DT5, 12–DT4 and 12–DT3, the No. 4 front contacts of relay 12–DT2, the No. 4 back contacts of relay 12–DT1, and the No. 3 back contacts of relay 12–DT0, thence via conductor 12–CK into cables 10–DTA and 12–DWAC to Fig. 10, through a one-out-of-eight up-check circuit comprising the No. 2 back contacts of relay 10–CL, the No. 3 back contacts of relay 10–U, the No. 3 front contacts of relay 10–T and the No. 2 back contacts of relays 10–H, 10–TH, 10–C, 10–B and 10–A, conductor 10–SP into cables 10–DW and 12–DWAC, the contacts of relay 13–SXR, conductor 13–3, the upper No. 1 front contacts of relay 13–GT, and through the winding of relay 13–SP to battery, causing relay 13–SP to operate.

The operation of relay 13–SP again initiates a cycle of operations resulting in the armature of polarized relay 13–PG again making a plurality of excursions between its right-hand and its left-hand contacts, the release of relay 13–PG1, the operation of relay 13–PGZ, the operation of relay 13–GT, the operation of relay 13–PG1, the release of relay 13–PGW, the release of relay 13–PG1, the release of relay 13–PGZ, the reoperation of relays 13–PG1 and 13–PGW, the release of relay 13–SP, and the operation of relay 10–DS, in the order recited, and as previously described with reference to the detailed description of the operation of the system with reference to the reading of the "A" digit of the "office" code from the drum.

When relay 10–DS operates, following the reading and transmission of the "tens" digit, and breaks its No. 5 contacts, the locking circuit for off-normal relay 14–ON is again maintained through the upper No. 1 contacts of relay 10–CL. When relay 10–DS operates, the opening of its No. 4 contacts again disconnects off-normal ground from conductor 11–DR, causing the deionization of cold cathode tubes 11–T0 and 11–T2, and causing relays 11–CT0 and 11–CT2 to release, which in releasing disconnect ground from conductor 11–DC2 in cable 11–DC, causing relay 12–DT2 to release, thereby preparing the digit reader to read the next succeeding digit which is the "units" digit of the calling subscriber's directory number.

When relay 10–DS operates, ground is extended through its No. 1, No. 2 and No. 3 follow-through contacts, the upper No. 1 back contacts of relays 10–A, 10–B, 10–C, 10–TH and 10–H, the upper No. 1 front contacts of relay 10–T, the lower No. 6 and No. 5 continuity contacts and the winding of relay 10–U to battery, causing relay 10–U to operate and to lock up through its lower No. 5 and No. 4 continuity contacts, and the lower No. 2 and No. 3 continuity contacts of relay 10–CL to off-normal ground on conductor 14–ONGA. Relay 10–T does not release at this time, but remains locked up through its lower No. 5 and No. 4 continuity contacts, the lower No. 2 and No. 1 continuity contacts of relay 10–U, and the No. 2 and No. 1 follow-through contacts of relay 10–DS to ground.

When relay 10–U operates, ground on conductor 14–ONLA is extended through the upper No. 4 back contacts of relay 10–CL, the upper No. 5 front contacts of relay 10–U, conductor 10–U, cable 10–DWC to Fig. 8, the No. 7 contacts of relay 8–LSAI, conductor 8–U, and the winding of "units" connector relay 8–UDS to battery, causing relay 8–UDS to operate. When relay 10–U operates, ground is extended through its upper No. 4 contacts to conductor 10–NT, cables 10–DTA and 12–DWAC to Fig. 12, and the winding of relay 12–NT to battery, causing relay 12–NT to remain operated.

The coincident operation of relays 10–T and 10–U causes the upper No. 3 back contacts of relay 10–U and the upper No. 2 back contacts of relay 10–T to be simultaneously in an open condition, thereby disconnecting ground from the up-check circuit which extends via conductor 10–SP into cables 10–DW and 12–DWAC to Fig. 13, through the contacts of relay 13–SXR, conductor 13–3 and the No. 1 front contacts and the winding of relay 13–GT to battery, causing relay 13–GT to release. Relay 13–GT, in releasing, reconnects conductor 13–3 through the winding of relay 13–SP to battery, but is ineffective to operate relay 13–SP at this time because of the above-described break in the circuit of conductor 10–SP at the contacts of relays 10–T and 10–U. Relay 13–GT, in releasing, opens its No. 4 contacts, thereby disconnecting ground from conductor 13–DS into cables 10–DW and 12–DWAC into Fig. 10 and through the winding of relay 10–DS to battery, causing relay 10–DS to release.

When relay 10–DS releases, the No. 5 contacts of relay 10–DS are closed in parallel to the lower No. 7 contacts of relay 10–U and the upper No. 1 contacts of relay 10–CL, which maintain the locking circuit for off-normal relay 14–ON. Also, off-normal ground on conductor 14–ONGA is restored through the No. 4 contacts of relay 10–DS, conductor 11–DR, the respective windings of code translating relays 11–CT0 to 11–CT7, inclusive, to the respective cathodes of cold cathode tubes 11–T0 to 11–T7, inclusive, to prepare the digit reader for the reception of the next succeeding digit. When relay 10–DS releases, ground is disconnected from conductor 10–1 extended through the lower No. 1 and No. 2 continuity contacts of relay 10–U, the lower No. 4 and No. 5, continuity contacts and the winding of relay 10–T to battery, causing relay 10–T to release.

Relay 10–T, in releasing, opens its upper No. 4 contacts, but ground is still connected to the conductor 10–NT through the upper No. 4 contacts of relay 10–U, and over a previously described path, to maintain relay 12–NT in its operated condition. When relay 10–T releases, ground is disconnected at its upper No. 5 front contacts from conductor 10–T into cable 10–DWC, thereby opening the operating circuit for the "tens" connector relay 8–TDS, causing relay 8–TDS to release.

The cell in the delay channel in the slot corresponding to subscriber line 5–L–1, in which cell the previously described X signal was written at the completion of the seventh revolution of the drum (see Figs. 6–A and 6–B, item 6, Rev. 7), is carried by the continued rotation of the drum and, 180 degrees after having been recorded therein, again passes under the pole-pieces of reading head 5–RDC at which time, in the manner previously described, the X signal is transferred from the cell in the delay channel to the cell in the main channel in the slot corresponding to subscriber line 5–L–1. With the continued rotation of the drum, the cell in the delay channel in the slot corresponding to subscriber line 5–L–1, in which cell the X signal was written at the completion of the seventh revolution of the drum, again passes beneath the erasing head 5–118, and the X signal is erased from the delay channel 270 degrees after having been recorded therein.

*Completion of eighth revolution of drum and start of ninth revolution*

The drum continues to rotate and, at the instant that it completes its eighth revolution and is starting its ninth revolution, the rotating element 5–27 of the line scanner again passes adjacent to the line segment 5–001 associated with subscriber line 5–L–1 which, it is assumed, is still engaged with a bona fide call requiring the services of an identifier. Thus, line segment 5–001 consequently still has a positive potential thereon. The positive potential induced on the rotating element 5–27 is again momentarily applied to the grid of amplifier tube 6–LS1 (see Figs. 6–A and 6–B, item 1, Rev. 8), and again causes the amplifiers 6–LS1, 6–LS2, 6–LS3 and 6–LS4 to function in the manner previously described with reference to the start of the first revolution of the drum (also see Figs. 6–A and 6–B, items 2, 3 and 4, Rev. 8).

The cell in the main channel in the slot corresponding to subscriber line 5–L–1, to which cell the previously described X signal was transferred, at the completion of the eighth revolution again passes under the pole-pieces of reading head 5–RMC, thereby causing an X output signal voltage to be again developed in the winding thereof. As a result, the X output signal voltage induced in the winding of reading head 5–RMC causes a momentary negative-going pulse to be applied to the input of reading amplifier 6–RA (see Figs. 6–A and 6–B, item 11, Rev. 8) which functions as previously described to produce a momentary positive-going pulse at its output, which positive-going pulse is applied as an input to the gate circuits 6–G2 and 6–G3 (see Figs. 6–A and 6–B, item 12, Rev. 8).

The momentary negative-going pulse from the cathode of amplifier 6–LS3 (see Fig. 6–A, item 2, Rev. 8) is applied to the gate circuit 6–G2, and simultaneously therewith the above-described positive-going pulse from the reading amplifier 6–RA is applied to the gate circuit 6–G2. The negative pulse disables gate circuit 6–G2, thereby preventing the application of a positive-going or erase pulse through capacitor 6–C9 to the grid of the lower section of writing amplifier 6–WA.

The momentary positive-going pulse from the cathode follower of amplifier 6–LS4 (see Figs. 6–A and 6–B, item 3, Rev. 8) is applied to the upper terminals of diode 6–G1A and 6–G3A of gate circuits 6–G1 and 6–G3, respectively. The gate circuit 6–G1 is reenabled, as previously described, by the release of relay 6–WSTR. The gate circuit 6–G1, in its enabled condition permits the positive-going pulse applied to the upper terminal of diode 6–G1A to be repeated through capacitor 6–C5 to the grid of the upper or write X section of writing amplifier 6–WA (see Figs. 6–A and 6–B, item 5, Rev. 8). The application of a positive-going pulse to the grid of the upper section of amplifier 6–WA causes an X signal to be recorded in the cell in the delay channel in the slot corresponding to subscriber line 5–L–1 in the drum, which cell is passing under the pole-pieces of writing head 5–WDC at this time, in the manner previously described (see Figs. 6–A and 6–B, item 6, Rev. 8).

The positive-going pulse from the cathode output of reading amplifier 6–RA, applied to the diode 6–G3B at the end of the eighth revolution of the drum in conjunction with the simultaneously applied positive-going output pulse from the cathode follower of amplifier 6–LS4 to the diode 6–G3A, causes a momentary positive-going pulse to be applied to the grid of amplifier 6–LS0 (see Figs. 6–A and 6–B, item 13, Rev. 8). The positive-going pulse applied to the grid of amplifier 6–LS0 is amplified and inverted therein, in a manner previously described, and produces a momentary negative-going output pulse at the plate of tube 6–LS0 (see Figs. 6–A and 6–B, item 14, Rev. 8), which negative-going pulse is applied through conductor 6–11, and over a previously described path to the grids of the digit reader gating tubes 11–DRG0 to 11–DRG7, inclusive (see Figs. 6–A and 6–B, item 14, Rev. 8).

*Connection of reading heads to digit reader to read "units" digit of calling subscriber's directory number*

Again referring to Fig. 4, and assuming that the calling subscriber's directory number is "2221," the number "1," indicating the "units" digit, is represented by an X signal condition prerecorded in the cells of the first and second channels, and an O signal condition prerecorded in the third, fourth and fifth channels of the "units" subdivision of the slot corresponding to the "tip" party of the calling subscriber line.

At the instant that the drum completes its eighth revolution, the plate of amplifier tube 6–LS0 delivers a negative-going pulse via conductor 6–11 and a previously described circuit to the grids of the gating tubes 11–DRG0 to 11–DRG7, inclusive (see Figs. 6–A and 6–B, item 14, Rev. 8), and simultaneously therewith the slot in the drum related to the calling subscriber line 5–L–1 again passes under the pole-pieces of the reading heads. At this instant, the X signal conditions prerecorded in the cells of the first and second channels of the "units" subdivision of that slot cause an X signal voltage to be induced in the windings of the "units" reading heads 5–UDT–0 and 5–UDT–1 (not shown). The O signal conditions prerecorded in the cells of the third, fourth and fifth channels of the "units" subdivision of the slot cause an O signal voltage to be induced in the windings of the "units" reading heads 5–UDT–2, 5–UDT–4 and 5–UDT–7 (not shown). The X and O alternating-current voltages induced in the windings of the "units" reading heads are superimposed on the negative direct-current voltage from battery 5–B1 and produce X and O output potentials having the wave forms illustrated in Figs. 6–D and 6–E, respectively.

The output voltages from the "units" reading heads 5–UDT–0, 5–UDT–1, 5–UDT–2, 5–UDT–4 and 5–UDT–7 are respectively transmitted over correspondingly designated output conductors in cables 5–UDT and 5–1DC to Fig. 8, the No. 1, 2, 3, 4 and 5 contacts, respectively, of "units" connector relay 8–UDS, conductors 8–TP0, 8–TP1, 8–TP2, 8–TP4 and 8–TP7, respectively, contacts No. 1, 2, 3, 4 and 5, respectively of relay 8–TP, conductors 8–0, 8–1, 8–2, 8–4 and 8–7, respectively, contacts numbered 5, 4, 3, 2 and 1, respectively, of relay 8–LSAI, conductors 8–D0, 8–D1, 8–D2, 8–D4 and 8–D7, respectively, into cable 8–D to Fig. 11 and to the grids of digit reader tubes 11–DRA0, 11–DRA1, 11–DRA2, 11–DRA4 and 11–DRA7, respectively.

Thus, it will be seen that the operation of "units" field party connector relay 8–UDS selectively connects the units reader heads (five heads for the "tip" party and five heads for the ring party) to the ten multiplied conductors 8–TP0 to 8–TP7, inclusive, and 8–RP0 to 8–RP7, inclusive. The coincident operation of relay 8–UDS and the "tip" party connector relay 8–TP selectively connects the five "tip" party "units" heads through the closed front contacts of relay 8–LSAI, via multiplied conductors 8–D0 to 8–D7, inclusive, to the inputs of the digit reader circuits, as above described. The tubes 11–DRA0 and 11–DRA1 function in the manner previously described to integrate and to invert the X input signal voltages applied thereto, and respectively to produce output voltages having the wave form illustrated by the small curve in Fig. 6–F. The tubes 11–DRA2, 11–DRA4 and 11–DRA7 also function in the manner previously described to integrate and to invert the O signal voltages applied thereto, and respectively to produce output voltages having the wave form illustrated by the small curve in Fig. 6–G.

The channel reading circuits 11–CR0 and 11–CR1, respectively responsive to X signals in the first and second channels of the "units" subdivision of the drum, function in the manner previously described to effect the operation of code translating relays 11–CT0 and 11–CT1.

With code translating relays 11–CT0 and 11CT1 operated, off-normal ground on conductor 11–DR is extended through the No. 2 front contacts of relays 11–CT0 and 11–CT1 in series, and the No. 2 back contacts of relays 11–CT2, 11–CT4 and 11–CT7 in series to conductor 11–VC to check the validity of the combination of simultaneously operated code translating relays. Ground on conductor 11–VC is extended through the No. 4 contacts of relay 11–CT2 and the No. 3 contacts of relay 11–CT0 in series to the decimal code conductor 11–DC1 into cable 11–DC. The ground extended through the series contacts of relays 11–CT0 and 11–CT1 to conductor 11–DC1 effects the translation of the No. "1" expressed in two-out-of-five code, by the coincident operation of relays 11–CT0 and 11–CT1, into a "1" expressed in a one-out-of-ten or decimal code. The ground extended to conductor 11–DC1 into cable 11–DC is extended to Fig. 12 and through the No. 1 contacts of relay 12–NT to terminal punching 12–N1, thence via a cross-connection to terminal punching 12–1, and through the winding of relay 12–DT1 to battery, causing relay 12–DT1 to operate.

With relay 10–U in the digit walking circuit operated, and with relay 12–NT in the digit translator circuit operated, indicating that the "units" digit of the calling subscriber's directory number is being read from the drum, with relays 11–CT0 and 11–CT1 in the digit reader circuit operated responsive to a "1" in the five channels comprising the "units" subdivision of the drum, and with relay 12–DT1 in the digit translator circuit operated to represent a "1" in decimal code, the frequency sources 12–A and 12–B are connected through the No. 2 and No. 1 contacts, respectively, of relay 12DT1 to conductors 12–T and 12–R, respectively. Conductors 12–T and 12–R are connected through a previously described path to the left-hand windings of repeating coil 13–RC. The frequencies induced in the right-hand windings of repeating coil 13–RC are transmitted over a previously described circuit to the sender register at the distant end of the tandem trunk circuit. The combiation of frequencies representing a value of "1" in the "units" digit of the calling subscriber's directory number has now been transmitted to and registered in the sender register at the tandem office.

When the output conductors from the "units" reading heads, which furnish the "units" digit of the calling subscriber's directory number, have been connected to the digit reader circuit, and when the value read from the drum has been translated by the digit translator circuit into a multifrequency code representative of the value of the "units" digit, and when said multifrequency code has been transmitted to the tandem office in the manner as above described, a circuit is completed from ground in the digit translator circuit through a one-out-of-ten up-check circuit comprising the No. 3 back contacts of relays 12–DT9, 12–DT8, 12–DT7, 12–DT6, 12–DT5, 12–DT4, 12–DT3 and 12–DT2, the No. 4 front contacts of relay 12–DT1, and the No. 3 back contacts of relay 12–DT0, thence via conductor 12–CK into cables 10–DTA and 12–DWAC to Fig. 10, through a one-out-of-eight up-check circuit comprising the No. 2 back contacts of relay 10–CL, the No. 3 front contacts of relay 10–U, the No. 2 back contacts of relays 10–T, 10–H, 10–TH, 10–C, 10–B and 10–A, conductor 10–SP into cables 10–DW and 12–DWAC to Fig. 13, the contacts of relay 13–SXR, conductor 13–3, the upper No. 1 back contacts of relay 13–GT, and through the winding of relay 13–SP to battery, causing relay 13–SP to operate.

The operation of relay 13–SP again initiates a cycle of operations resulting in the armature of polarized relay 13–PG again making a plurality of excursions between its right-hand and its left-hand contacts, the release of relay 13–PG1, the operation of relay 13–PGZ, the operation of relay 13–GT, the operation of relay 13–PG1, the release of relay 13–PGW, the release of relay 13–PG1, the release of relay 13–PGZ, the reoperation of relays 13–PG1 and 13–PGW, the release of relay 13–SP, and the operation of relay 10–DS, in the order recited, and as previously described with reference to the detailed description of the operation of the system with reference to the reading of the "A" digit of the "office" code from the drum.

When relay 10–DS operates, following the reading and transmission of the "units" digit, and breaks its No. 5 contacts, the locking circuit for off-normal relay 14–ON is again maintained through the upper No. 1 contacts of relay 10–CL which, at this time, are also shunted by the lower No. 7 contacts of relay 10–U closed in parallel thereto. When relay 10–DS operates, the opening of its No. 4 contacts again disconnects off-normal ground from conductor 11–DR, causing the deionization of cold cathode tubes 11–T0 and 11–T1, and causing relays 11–CT0 and 11–CT1 to release, which in releasing disconnect ground from conductor 11–DC1 into cable 11–DC, causing relay 12–DT1 to release, thereby preparing the digit reader to read the next succeeding digit which is the "class" digit related to the calling subscriber line having the directory number "2221."

When relay 10–DS operates, ground is extended through its No. 1, No. 2 and No. 3 follow-through contacts, the upper No. 1 back contacts of relays 10–A, 10–B, 10–C, 10–TH, 10–H and 10–T, the upper No. 1 contacts of relay 10–U, the lower No. 6 and No. 5 continuity contacts and the winding of relay 10–CL to battery, causing relay 10–CL to operate and to lock up through its lower No. 5 and No. 4 continuity contacts to off-normal ground on conductor 14–ONGA. Relay 10–U does not release at this time, but remains locked up through its lower No. 5 and No. 4 continuity contacts, the lower No. 2 and No. 1 continuity contacts of relay 10–CL, and the No. 2 and No. 1 follow through contacts of relay 10–DS to ground.

When relay 10–CL operates, ground on conductor 14–ONLA is extended through the upper No. 4 front contacts of relay 10–CL, conductor 10–CL into cable 10–DWC to Fig. 8, the No. 6 contacts of relay 8–LSAI, conductor 8–CL and the winding of "Class" connector relay 8–CLDS to battery, causing relay 8–CLDS to operate. When relay 10–CL operates, ground is extended through its upper No. 3 contacts to conductor 10–NT into cables 10–DTA and 12–DWAC to Fig. 12 and the winding of relay 12–NT to battery, causing relay 12–NT to remain operated.

The coincident operation of relays 10–U and 10–CL causes the upper No. 2 back contacts of relay 10–CL and the upper No. 2 back contacts of relay 10–U to be simultaneously in an open condition, thereby disconnecting ground from the up-check circuit which extends via conductor 10–SP into cables 10–DW and 12–DWAC to Fig. 13 and through the contacts of relay 13–SXR, conductor 13–3 and the No. 1 front contacts and the winding of relay 13–GT to battery, causing relay 13–GT to release. Relay 13–GT, in releasing, reconnects conductor 13–3 through the winding of relay 13–SP to battery, but is ineffective to operate relay 13–SP at this time because of the above-described break in the circuit of conductor 10–SP at the contacts of relays 10–U and 10–CL. Relay 13–GT, in releasing, opens its No. 2 contacts, thereby disconnecting ground from conductor 13–DS into cables 10–DW and 12–DWAC to Fig. 10 and through the winding of relay 10–DS to battery, causing relay 10–DS to release.

When relay 10–DS releases, the No. 5 contacts of relay 10–DS are closed in parallel to the lower No. 7 contacts of relay 10–U and maintain the locking circuit for off-normal relay 14–ON. Also, off-normal ground on conductor 14–ONGA is restored through the No. 4 contacts of relay 10–DS, conductor 11–DR to Fig. 12, the respective windings of code translating relays 11–CT0 to 11–CT7, inclusive, to the respective cathodes of cold cathode tubes 11–T0 to 11–T7, inclusive, to prepare the digit reader for the reception of the next succeeding digit. When relay 10–DS releases, ground is disconnected from conductor 10–1 extended through the lower No. 1 and No. 2 continuity contacts of relay 10–CL, the lower No. 4 and No. 5 continuity contacts and the winding of relay 10–U to battery, causing relay 10–U to release.

Relay 10–U, in releasing, opens its upper No. 4 contacts, but ground is still connected to conductor 10–NT through the upper No. 3 contacts of relay 10–CL, and over a previously described path, to maintain relay 12–NT in its operated condition. When relay 10–U releases, ground is disconnected at its upper No. 5 front contacts from conductor 10–U into cable 10–DWC, thereby opening the operating circuit for the "units" connector relay 8–UDS, causing relay 8–UDS to release.

The cell in the delay channel in the slot corresponding to subscriber line 5–L–1, in which cell the previously described X signal was written at the completion of the eighth revolution of the drum (see Figs. 6–A and 6–B, item 6, Rev. 8), is carried by the continued rotation of the drum and, 180 degrees after having been recorded therein, again passes under the pole-pieces of reading head 5–RDC, at which time, in the manner previously described, the X signal is transferred from the cell in the delay channel to the cell in the main channel in the slot corresponding to subscriber line 5–L–1. With the continued rotation of the drum, the cell in the delay channel in the slot corresponding to subscriber line 5–L–1, in which cell the X signal was written at the completion of the eighth revolution of the drum, again passes beneath the erasing head 5–118, and the X signal is erased from the delay channel 270 degrees after having been recorded therein.

*Completion of ninth revolution of drum and start of tenth revolution*

The drum continues to rotate and, at the instant that it completes its ninth revolution and is starting its tenth revolution, the rotating element 5–27 of the line scanner again passes adjacent to the line segment 5–001 associated with subscriber line 5–L–1 which, it is assumed, is still engaged with a bona fide call requiring the services of an identifier. Line segment 5–001 consequently still has a positive potential thereon. The positive potential induced on the rotating element 5–27 is again momentarily applied to the grid of amplifier tube 6–LS1 (see Figs. 6–A and 6–B, item 1, Rev. 9), and again causes the amplifiers 6–LS1, 6–LS2, 6–LS3 and 6–LS4 to function in the manner previously described with reference to the start of the first revolution of the drum (also see Figs. 6–A and 6–B, items 2, 3 and 4, Rev. 9).

The cell in the main channel in the slot corresponding to subscriber line 5–L–1 to which cell the previously described X signal was transferred, at the completion of the ninth revolution again passes under the pole-pieces of reading head 5–RMC thereby causing an X output signal voltage to be again developed in the winding thereof. As a result, the X output signal voltage induced in the winding of reading head 5–RMC causes a momentary negative-going pulse to be applied to the input of reading amplifier 6–RA (see Figs. 6–A and 6–B, item 11, Rev. 9) which functions as previously described to produce a momentary positive-going pulse at its output, which positive-going pulse is applied as an input to the gate circuits 6–G2 and 6–G3 (see Figs. 6–A and 6–B, item 12, Rev. 9).

The momentary negative-going pulse from the cathode of amplifier 6–LS3 (see Figs. 6–A and 6–B, item 2, Rev. 9) is applied to the gate circuit 6–G2, and simultaneously therewith the above-described positive-going pulse from the reading amplifier 6–RA is applied to the gate circuit 6–G2. The negative pulse disables gate circuit 6–G2, thereby preventing the application of a positive-going or erase pulse through capacitor 6–C9 to the grid of the lower section of writing amplifier 6–WA.

The momentary positive-going pulse from the cathode follower of amplifier 6–LS4 (see Figs. 6–A and 6–B, item 3, Rev. 9) is applied to the upper terminals of diodes 6–G1A and 6–G3A of gate circuits 6–G1 and 6–G3, respectively. The gate circuit 6–G1 is reenabled, as previously described, by the release of relay 6–WSTR. The gate circuit 6–G1, in its enabled condition, permits the positive-going pulse applied to the upper terminal of diode 6–G1A to be repeated through capacitor 6–C5 to the grid of the upper or write X section of writing amplifier 6–WA (see Figs. 6–A and 6–B, item 5, Rev. 9). The application of a positive-going pulse to the grid of the upper section of amplifier 6–WA causes an X signal to be recorded in the cell in the delay channel in the slot corresponding to subscriber line 5–L–1 in the drum, which cell is passing under the pole-pieces of writing head 5–WDC at this time, in the manner previously described (see Figs. 6–A and 6–B, item 6, Rev. 9).

The positive-going pulse from the cathode output of reading amplifier 6–RA, applied to the diode 6–G3B at the end of the ninth revolution of the drum in conjunction with the simultaneously applied positive-going output pulse from the cathode follower of amplifier 6–LS4 to the diode 6–G3A, causes a momentary positive-going pulse to be applied to the grid of amplifier 6–LS0 (see Figs. 6–A and 6–B, item 13, Rev. 9). The positive-going pulse applied to the grid of amplifier 6–LS0 is amplified and inverted therein, in a manner previously described, and produces a momentary negative-going output pulse at the plate of tube 6–LS0 (see Figs. 6–A and 6–B, item 14, Rev. 9), which negative-going pulse is applied through conductor 6–11, and over a previously described path to the grids of the digit reader gating tubes 11–DRG0 to 11–DRG7, inclusive (see Figs. 6–A and 6–B, item 14, Rev. 9).

*Connection of reading heads to digit reader to read "class" digit of calling subscriber's directory number*

Again referring to Fig. 4, and assuming that the calling subscriber's directory number is 2221, it will be seen that the calling subscriber's line is characterized by the "class" digit "2." The number "2," indicating the "class" digit, is represented by an X signal condition prerecorded in the cells of first and third channels, and an O signal condition prerecorded in the second, fourth and fifth channels of the "class" subdivision of the slot corresponding to the calling subscriber line.

At the instant that the drum completes its ninth revolution, the plate of amplifier tube 6–LS0 delivers a negative-going pulse via conductor 6–11 and a previously described circuit to the grids of the gating tubes 11–DRG0 to 11–DRG7, inclusive (see Figs. 6–A and 6–B, item 14, Rev. 9), and simultaneously therewith the slot in the drum related to the calling subscriber line 5–L–1 again passes under the pole-pieces of the reading heads. At this instant, the X signal conditions prerecorded in the cells of the first and third channels of the "class" subdivision of that slot cause an X signal voltage to be induced in the windings of the "class" reading heads 5–CL–0 and 5–CL–2 (not shown). The O signal conditions prerecorded in the cells of the second, fourth and fifth channels of the "class" subdivision of the slot cause an O signal voltage to be induced in the windings of the "class" reading heads 5–CL–1, 5–CL–4 and 5–CL–7 (5–CL–1 and 5–CL–4 not shown). The X and O alternating-current voltages induced in the windings of the "class" reading heads are superimposed on the negative direct-current voltage from battery 5–B1 and produce X and O output potentials having the wave forms illustrated in Figs. 6–D and 6–E, respectively.

The output voltages from the "class" reading heads 5–CL–0, 5–CL–1, 5–CL–2, 5–CL–4 and 5–CL–7 are respectively transmitted over corresponding designated output conductors into cables 5–CL and 5–IDC to Fig. 8, the No. 1, 2, 3, 4 and 5 contacts, respectively, of "class" connector relay 8–CLDS, conductors 8–0, 8–1, 8–2, 8–4 and 8–7, respectively, contacts numbered 5, 4, 3, 2 and 1, respectively, of relay 8–LSAI, conductors 8–D0, 8–D1, 8–D2, 8–D4 and 8–D7, respectively, into cable 8–D to Fig. 11 and to the grids of digit reader tubes 11–DRA0, 11–DRA1, 11–DRA2, 11–DRA4 and 11–DRA7, respectively.

Thus, it will be seen that the operation of the "class" field party connector relay 8–CLDS connects the five "class" reader heads to the multipled conductors 8–0 to 8–7, inclusive, and through the closed front contacts of relay 8–LSAI, via multipled conductors 8–D0 to 8–D7, inclusive, to the inputs of the digit reader circuits, as above described. The tubes 11–DRA0 and 11–DRA2 function in the manner previously described to integrate and to invert the X input signal voltages applied thereto, and respectively to produce output voltages having the wave form illustrated by the small curve in Fig. 6–F. The tubes 11–DRA1, 11–DRA4 and 11–DRA7 also function in the manner previously described to integrate and to invert the O signal voltages applied thereto, and respectively to produce output voltages having the wave form illustrated by the small curve in Fig. 6–G.

The channel reading circuits 11–CR0 and 11–CR2, respectively responsive to X signals in the first and third channels of the "class" subdivision of the drum, function in the manner previously described to effect the operation of code translating relays 11–CT0 and 11–CT2.

With code translating relays 11–CT0 and 11–CT2 operated, off-normal ground on conductor 11–DR is extended through the No. 2 front contact of relay 11–CT0, the No. 2 back contact of relay 11–CT1, the No. 3 front contact of relay 11–CT2, and the No. 2 back contacts of relays 11–CT4 and 11–CT7 in series to conductor 11–VC to check the validity of the combination of simultaneously operated code translating relays. Ground on conductor 11–VC is extended through the No. 5 contacts on relay 11–CT2 and the No. 4 contacts on relay 11–CT0 in series to the decimal code conductor 11–DC2 into cable 11–DC. The ground extended through the series contacts of relays 11–CT0 and 11–CT2 to conductor 11–DC2 effects the translation of the No. "2," expressed in two-out-of-five code by the coincident operation of relays 11–CT0 and 11–CT2, into a "2" expressed in a one-out-of-ten or decimal code. The ground extended to conductor 11–DC2 into cable 11–DC is extended to Fig. 12 and through the No. 2 contacts of relay 12–NT to terminal punching 12–N2, thence via a cross-connection to terminal punching 12–2, and through the windings of relay 12–DT2 to battery, causing relay 12–DT2 to operate.

With relay 10–CL in the digit walking circuit operated, and with relay 12–NT in the digit translator circuit operated, indicating that the "class" digit of the calling subscriber's line is being read from the drum, with relays 11–CT0 and 11–CT2 in the digit reader circuit operated responsive to a "2" in the five channels comprising the "class" subdivision of the drum, and with relay 12–DT2 in the digit translator circuit operated to represent a "2" in decimal code, the frequency sources 12–A and 12–C are connected through the No. 2 and No. 1 contacts, respectively, of relay 12–DT2 to conductors 12–T and 12–R, respectively. Conductors 12–T and 12–R are connected through a previously described path to the left-hand windings of repeating coil 13–RC. The frequencies induced in the right-hand windings of repeating coil 13–RC are transmitted over a previously described circuit to the sender register at the distant end of the tandem trunk circuit. The combination of frequencies representing a value of "2" in the "class" digit of the calling subscriber's line identification data has now been transmitted to and registered in the sender register at the tandem office.

When the output conductors from the "class" reading heads, which furnish the "class" digit of the calling subscriber's line, have been connected to the digit reader circuit, and when the value read from the drum has been translated by the digit translator circuit into a multifrequency code representative of the value of the "class" digit, and when said multifrequency code has been transmitted to the tandem office in the manner as above described, a circuit is completed from ground in the digit translator circuit through a one-out-of-ten up-check circuit comprising the No. 3 back contacts of relays 12–DT9, 12–DT8, 12–DT7, 12–DT6, 12–DT5, 12–DT4 and 12–DT3, the No. 4 front contacts of relay 12–DT2, the No. 4 back contacts of relay 12–DT1, and the No. 3 back contacts of relay 12–DT0, thence via conductor 12–CK into cables 10–DTA and 12–DWAC to Fig. 10, through a one-out-of-eight up-check circuit comprising the No. 2 front contacts of relay 10–CL, the No. 2 back contacts of relays 10–U, 10–T, 10–H, 10–TH, 10–C, 10–B and 10–A, conductor 10–SP into cables 10–DW and 12–DWAC to Fig. 13, the contacts of relay 13–SXR, conductor 13–3, the upper No. 1 back contacts of relay 13–GT, and through the winding of relay 13–SP to battery, causing relay 13–SP to operate.

The operation of relay 13–SP again initiates a cycle of operations resulting in the armature of polarized relay 13–PG again making a plurality of excursions between its right-hand and its left-hand contacts, the release of relay 13–PG1, the operation of relay 13–PGZ, the operation of relay 13–GT, the operation of relay 13–PG1, the release of relay 13–PGW, the release of relay 13–PG1, the release of relay 13–PGZ, the reoperation of relays 13–PG1 and 13–PGW, the release of relay 13–SP, and the operation of relay 10–DS, in the order recited, and as previously described with reference to the detailed description of the operation of the system with reference to the reading of the "A" digit of the "office" code from the drum.

*Disconnection of identifier from trunk circuit and release of connector relays*

When relay 10–DS operates, following the reading and transmission of the "class" digit, and breaks its No. 5 contacts, conductor 10–ONLA, which supplies locking ground for the off-normal relay 14–ON, is disconnected from conductor 14–ONPLA which is connected to the upper No. 1 or locking contact of off-normal relay 14–ON, thereby causing relay 14–ON to release. When relay 10–DS operates, the opening of its No. 4 contacts breaks the circuit over which ground is supplied to conductor 11–DR, thereby disconnecting ground from the digit reader circuit, which causes the deionization of cold cathode tubes 11–T0 and 11–T2 and thereby causing relays 11–CT0 and 11–CT2 to release, which in releasing disconnect ground from conductor 11–DC2 into cable 11–DC, causing relay 12–DT2 to release.

The off-normal relay 14–ON, in releasing, opens a plurality of circuits, thus effecting the release and the return to normal of the related circuits and equipment, and disabling the operating circuits therefor until the relay 14–ON shall have been reoperated at the beginning of a new identification cycle. Also, circuits are closed through back contacts of relay 14–ON to reestablish certain functions of the system preparatory to the beginning of a new identification cycle.

When off-normal relay 14–ON releases, ground is disconnected at the upper No. 3 contacts of relay 14–ON from conductor 14–ONGA into cables 14–PTA and 12–DWAC to Fig. 10, thereby removing locking ground from the No. 4 continuity contacts of digit walking relays 10–A to 10–CL, inclusive, thus disabling the locking circuits therefor and causing relay 10–CL to release. The disconnection of off-normal ground from conductor 14–ONGA also prevents ground from being extended through the No. 4 contacts of relay 10–DS to conductor 11–DR (when relay 10–DS shall have been released), thereby rendering the digit reader circuit inoperative until the identifier equipment shall have again seized in connection with another call.

Relay 10–CL, in releasing, opens its upper No. 3 contacts and disconnects ground from conductor 10–NT into cables 10–DTA and 12–DWAC, thereby opening the operating circuit for relay 12–NT, causing relay 12–NT to release. Relay 12–NT, in releasing, opens the operating circuit for relay 12–DT2.

When relay 10–CL releases, ground through its upper No. 4 front contacts is disconnected from conductor 10–CL into cable 10–DWC to Fig. 8 and the No. 6 contacts of relay 8–LSAI and the winding of "class" connector relay 8–CLDS to battery, thereby opening the operating circuit for relay 8–CLDS, and causing it to release.

Relay 10–DS, in operating, closes ground to its No. 2 and No. 3 follow through contacts, but no circuit is completed thereby because, with the release of relay 10–CL, all of the digital relays of the digit walking circuit are now released. With all of the relays of the digit walking circuit released, ground is disconnected from the up-check circuit which extends via conductor 10–SP into cables 10–DW and 12–DWAC to Fig. 13, through the contacts of relay 13–SXR, conductor 13–3, and the No. 1 front contacts and the winding of relay 13–GT to battery, causing relay 13–GT to release. Relay 13–GT, in releasing, reconnects conductor 13–3 through the winding of relay 13–SP to battery, but is ineffective to operate relay 13–SP at this time because No. 3 front contacts of relay 10–A are open and cause a discontinuity in the chain circuit over which ground is supplied to conductor 10–SP. Relay 13–GT, in releasing, opens its No. 2 contacts, thereby disconnecting ground from conductor 13–DS into cables 10–DW and 12–DWAC to Fig. 10 and through the winding of relay 10–DS to battery, causing relay 10–DS to release.

When relay 10–DS releases, the No. 5 contacts of relay 10–DS are closed in parallel to the upper No. 1 contacts of relay 10–CL, thereby reconnecting ground on conductor 14–ONLA to conductor 14–ONPLA into cables 14–PTA and 12–DWAC, which extends ground to Fig. 14 and to the lower No. 1 (locking contacts) of off-normal relay 14–ON, thus preparing a locking circuit for relay 14–ON when it shall have again been operated at the beginning of a succeeding identification cycle. When relay 10–DS releases, conductor 14–ONGA is reconnected through the No. 4 contacts of relay 10–DS to conductor 11–DR which, when off-normal relay 14–ON is operated at the beginning of a new identification cycle, will extend ground to the windings of the digit reader relays 11–CT0 to 11–CT7, inclusive, to enable the digit reader circuit to read the identification data for a succeeding call.

When relay 14–ON releases, ground through the upper No. 6 contacts of relay 14–ON is disconnected from conductor 14–ONG2 into cable 14–ONCA to Fig. 13, through the No. 4 back contacts of relay 13–PGZ, the No. 2 contacts of relay 13–GT, conductor 13–DS in cables 10–DW and 12–DWAC to Fig. 10 and through the winding of 10–DS to battery, thereby preventing the reoperation of relay 10–DS until the off-normal relay 14–ON is reoperated at the beginning of a new identification cycle. Disconnection of ground from conductor 14–ONG2 also prevents the false operation of relay 13–GT if relay 13–PGZ should fail to release.

When relay 14–ON releases, ground through the upper No. 4 contacts of relay 14–ON is disconnected from conductor 14–ONG, thereby opening the locking circuit for relay 6–LSI, and causing relay 6–LSI to release.

The release of relay 6–LSI, through its No. 10 and No. 11 continuity contacts, reconnects conductor 6–ONG1 to conductor 6–10, over which circuit operating ground may be extended through the windings of relay 6–LSTR, 6–WSTR and 6–ESTR to cold cathode tubes 6–LST, 6–WST and 6–EST, respectively, when a new identification cycle shall have been inaugurated.

When relay 6–LSI releases, ground through the No. 1 contacts of relay 6–LSI and the winding of "tip" party connector relay 8–TP to battery are disconnected, causing relay 8–TP to release. When relay 6–LSI releases, ground through the No. 3 contacts of relay 6–LSI is disconnected from conductor 6–LSAI, causing relay 8–LSAI to release. When relay 6–LSI releases, ground through the No. 4 front contacts of relay 6–LSI is disconnected from conductor 6–1 into cable 6–CA3, causing relay 11–1AO to release after a short delay interval. With relays 6–LSI and 11–1AO released, the circuit by which an enabling potential is extended from the plate of amplifier tube 6–LS0, through conductor 6–11, the No. 7 front contacts of relay 6–LSI, conductor 6–LS into cable 6–CA1 to Fig. 11, the No. 2 contacts of relay 11–2M, the No. 2 contacts of relay 11–1AO, and common conductor 11–CC1 to the grids of the digit reader gating tubes 11–DRG0 to 11–DRG7, inclusive, is disabled. The digit reader gating tubes 11–DRG0 to 11–DRG7 are thus prevented from functioning until the identifier is again seized in connection with another call. The release of relay 6–LSI opens its No. 8 contacts, thereby disconnecting resistor 6–R24 from the starter anode of cold cathode tube 6–CG, and permitting the capacitor 6–C11 to receive a charging potential. The release of relay 6–LSI reestablishes a circuit from the plate of amplifier tube 6–LS0, through conductor 6–11, the No. 7 back contacts of relay 6–LSI to the starter anode of cold cathode tube 6–CG and to capacitor 6–C11, over which circuit capacitor 6–C11 may be charged to control the firing of cold cathode tube 6–CG at the beginning of a new identification cycle.

Relay 6–LSI, in releasing, reenables gate circuit 6–G2 by disconnecting the negative battery through resistor 6–R23 connected to diode 6–G2D through the No. 9 front contacts of relay 6–LSI, and by connecting in its stead, through its No. 9 back contacts, positive battery through resistor 6–R20, thereby enabling the gate circuit 6–G2 to respond to input pulses at the beginning of a new identification cycle.

When relay 14–ON releases, ground through the upper No. 5 contacts of relay 14–ON is disconnected from conductor 14–ONG1, thus disabling the operating circuit for polarized relay 13–PG until relay 14–ON is reoperated at the beginning of a new identification cycle.

When relay 14–ON releases, ground through the upper No. 1 contacts of relay 14–ON is disconnected from conductor 14–2, thereby opening the locking circuit for relay 14–T and causing it to release. The disconnection of ground at the upper No. 1 contacts of relay 14–ON from conductor 14–2, and the release of relay 14–T, opens the circuit by which ground on conductor 14–2 is extended through the winding of slow release relay 14–PTC to battery, thereby opening the operating circuit for relay 14–PTC which, because of its slow-releasing characteristic, will remain in its operated condition until relay 14–TC shall have released to disconnect the ground extended through the upper No. 1 contacts of relay 14–TC, conductor 14–ONG3A into cable 14–ONCA to Fig. 13, the right-hand contacts of polarized relay 13–PG, and the winding of relay 13–PG1 to battery. Relay 13–PGW, as previously described, is locked up to ground on conductor 14–ONG3A. Relay 14–PTC is made slow to release in order to prevent the false reoperation of offnormal relay 14–ON from ground extended through the lower No. 1 front contacts of relay 14–TC, conductor 14–ON1A in cable 14–ONCA, the lower contacts of relay 13–PG1, conductor 13–ONA in cable 14–ONCA, the upper back contacts of relay 14–PTC, and the winding of relay 14–ON to battery.

The disconnection of ground at the upper No. 1 contacts of relay 14–ON from conductor 14–2, and the release of relay 14–T, also opens the circuit by which ground on conductor 14–2 is extended through the winding of "tip" party connector relay 8–TP to battery, thereby disabling the operating circuit for relay 8–TP.

When relay 14–ON releases, ground extended through the upper No. 7 contacts of relay 14–ON to conductor 14–ONG3A is disconnected therefrom, but no circuit operation is effected thereby at this time because ground is extended through the upper No. 1 contacts of relay 14–TC (which is still operated) to conductor 14–ONG3A.

When relay 14–ON releases, the lower No. 2 front contacts of relay 14–ON are opened, thereby disabling the operating circuit for relay 14–PTT until relay 14–ON is operated at the beginning of a new identification cycle.

When relay 14–ON releases, the lower No. 2 back contacts are closed, but no circuit operation is effected at this time because the lower No. 1 front contacts of slow releasing relay 14–PTC maintain the resistor 14–R1A in a shunt connection to the capacitor 14–C1A of the timing circuit 14–PTTA, thereby disabling the timing circuit.

When relay 14–ON releases, ground through the lower No. 3 contacts of relay 14–ON is disconnected from conductor 14–APT and the winding of digit walking relay 10–A to battery, thereby disabling the preoperating circuit for relay 10–A, and preventing its reoperation until relay 14–ON is operated at the beginning of a new identification cycle.

When relay 14–ON releases, ground through the lower No. 4 contacts of relay 14–ON is extended through the lower No. 3 contacts of slow releasing relay 14–PTC, conductor 9–TMSCA into cable 9–ICA to Fig. 9 and into Fig. 15 to the winding of slow operating timer start relay 15–TMSA to battery. Ground on conductor 9–TMSCA is also extended through the No. 3 and No. 2 continuity contacts of relay 9–TPAF to the right-hand end of the winding of relay 9–TPAF to furnish operating ground therefor, thereby again making relay 9–TPAF available for use with its associated trunk circuit when the latter is seized to serve another call.

When relay 14–ON releases, it opens its lower No. 5 contacts, thus disabling the operating circuit for "ring" party test relay 14–RC.

When relay 14–ON releases, ground extended through the upper No. 2 contacts of relay 14–ON, is removed from conductor 14–1 and from conductor 7–CI in Fig. 7 and from the winding of relay 7–IC, causing relay 7–IC to release.

When 7–IC releases, the connection between "tip" conductor 7–T1 and "ring" conductor 7–R1 through the lower No. 1 and 2 contacts of relay 7–IC (utilized during "party test") is opened. When relay 7–IC releases, the "tip" conductor 5–55 is extended through the upper No. 1 front contacts of relay 7–SP, conductor 7–T1, the upper No. 2 back contacts of relay 7–IC, the upper left-hand winding of repeating coil 7–RC, and the upper winding of supervisory relay 7–A to battery; also, ring conductor 5–56 is extended through the lower No. 2 front contacts of relay 7–SP, conductor 7–R1, the lower No. 2 back contacts of relay 7–IC, the lower left-hand winding of repeating coil 7–RR, and the lower winding of relay 7–A to ground. If the subscriber has not abandoned the call, the supervisory relay 7–A will operate at this time over the circuit completed over the line loop. When relay 7–IC releases, the upper right-hand winding of repeating coil 7–RC is connected through the upper No. 3 back contacts of relay 7–IC, conductor 7–R2, the lower No. 3 contacts of relay 7–SP, conductor 7–R, and the lower winding of polarized relay 7–HP to the trunk "ring" conductor 7–54; also, the lower right-hand winding of repeating coil 7–RC is connected through the lower No. 3 back contacts of relay 7–IC, conductor 7–T2, the upper No. 2 front contacts of relay 7–SP, conductor 7–T, and the upper winding of polarized relay 7–HP to the trunk "tip" conductor 7–53. Repeating coil transmission is now restored through the trunk circuit.

Relay 7–A, in operating, extends ground through its contacts and the winding of slow releasing 7–A1 to battery, causing relay 7–A1 to remain operated after relay 7–IC has released and has disconnected operating ground for relay 7–A1 at the lower No. 4 contacts of relay 7–IC. Ground extended through the lower No. 3 contacts of relay 7–A1, the upper (locking) contacts and winding of relay 7–ICR to battery, causes relay 7–ICR to remain locked up after relay 7–IC has released and has disconnected operating ground for relay 7–ICR at the lower No. 7 contacts of relay 7–IC.

When relay 7–IC releases, battery through resistor 7–R3 is disconnected at the lower No. 6 contacts of relay 7–IC from conductor 7–ST1 to Fig. 9, through the No. 2 contacts of relay 9–STA, conductor 9–ISA, the winding of relay 9–TPAI, conductor 9–1 (and intervening sections of the trunk preference lockout circuit), and the No. 3 and No. 2 continuity contacts of relay 9–TPAL to ground, causing relay 9–TPAI to release, thus relinquishing the trunk's bid for an identifier.

When relay 9–TPAI releases, the conductors 9–FTA and 9–FRA in cable 9–OPA are respectively disconnected (by the opening of No. 2 and No. 1 front contacts of relay 9–TPAI) from the trunk circuit, thereby opening the simplex circuit over which relay 13–SXR was operated, causing relay 13–SXR to release. Relay 13–SXR, in releasing, disables the operating circuit for relay 10–DS, releasing same, until the identifier circuits shall have again been seized by a trunk circuit in connection with another call.

Relay 7–IC, in releasing, reconnects "test" ground through its No. 1 back contacts to conductor 7–TI into cable 7–TKI and through a previously described circuit including the winding of relay 14–TC to battery, which circuit, however, is opened by the operation of relay 9–TPAI. Relay 14–TC releases, followed, a short time interval thereafter, by the release of slow releasing relay 14–PTC.

When relay 7–IC releases, the high positive potential from battery 7–HV, through parallel connected coil 7–C and resistor 7–SR, is disconnected at the lower No. 5 and No. 8 continuity contacts of relay 7–IC from sleeve conductor 5–SL, thereby causing a negative potential to be restored to sleeve conductor 5–SI–001 connected to segment 5–001 of the line scanner 5–LS. Ground through the lower No. 2 contacts of slow releasing relay 7–ICR, and the lower No. 1 contacts of slow releasing relay 7–AI in parallel thereto, is connected to extended sleeve conductor 7–SLE and through the lower No. 1 (locking) contacts and winding of relay 7–SP to battery, causing relay 7–SP to remain locked up. Ground on extended sleeve conductor 7–SLE is also connected through the upper contacts and winding of relay 7–HPR to battery, causing relay 7–HPR to remain locked up. Ground on extended sleeve conductor 7–SLE is further connected through the No. 9 and No. 8 continuity contacts of relay 7–IC to sleeve conductor 5–SL, and via cable 5–10 to Fig. 5 and over the previously described circuits through the connector switches to hold the district selector in an operated condition during the remaining interval of the call. Relays 7–ICR and 7–A1 are made slow releasing in order to hold the connection over momentary flashes by the calling subscriber.

Relay 7–IC, in releasing, disconnects conductors 7–TI, 7–RI, 7–FTI and 7–FRI (in cable 7–TKI) at the upper No. 2 front, lower No. 2 front, lower No. 3 front and upper No. 3 front contacts, respectively, of relay 7–IC, thereby severing the connection between the trunk circuit and its associated section of the trunk preference lockout circuit.

The cycle of operations by which the calling subscriber's station is identified and by which multifrequency pulses representative of said calling subscriber's office code, directory nuumber and "class" designation are transmitted to and recorded at the tandem office, has now been completed. The circuits and equipment are now in condition for the transmission of conversation between the calling and the called subscriber's stations.

The cell in the delay channel in the slot corresponding to subscriber line 5–L–1, in which cell the previously described X signal was written at the completion of the ninth revolution of the drum (see Figs. 6–A and 6–B, item 6, Rev. 9), is carried by the continued rotation of the drum and, 180 degrees after having been recorded in the delay channel, again passes under the pole-pieces of reading head 5–RDC, at which time, in the manner previously described, the X signal is transferred from the cell in the delay channel to the cell in the main channel in the slot corresponding to subscriber line 5–L–1. With the continued rotation of the drum, the cell in the delay channel in the slot corresponding to subscriber line 5–L–1, in which cell the X signal was written at the completion of the ninth revolution of the drum, again passes beneath the erasing head 5–118, and the X signal is erased from the delay channel 270 degrees after having been recorded therein.

*Completion of tenth revolution of drum and start of eleventh revolution*

The drum continues to rotate and, at the instant that it completes its tenth revolution and is starting its eleventh revolution, the rotating element 5–27 of the line scanner again passes adjacent to the line segment 5–001 associated with subscriber line 5–L–1 which, it is assumed, is still engaged with a bona fide call. At this time, however, a steady negative potential is present on line segment 5–001 because, as above described, the identification cycle has been completed and the trunk circuit has relinquished its bid for the services of an identifier and has signaled the completion of the identification cycle by removing the high positive potential from the sleeve conductor of the trunk circuit. The steady negative potential on line segment 5–001 when scanned by rotating element 5–27 does not induce any potential change thereon, and therefore no positive-going or exciting pulse is applied to the input of amplifier 6–LS1 at the completion of the tenth revolution of the drum (see Figs. 6–A and 6–B, item 1, Rev. 10). In the absence of a positive input or exciting potential to amplifier 6–LS1, amplifier tubes 6–LS1, 6–LS2, 6–LS3 and 6–LS4 remain in their normal or non-excited state.

When relay 6–WSTR released, it partially reenabled gate circuit 6–G1 by disconnecting the negative potential connected through resistor 6–R13 to diode 6–G1B through the No. 2 front contacts of relay 6–WSTR, and by connecting in its stead positive potential through resistor 6–R12 and the No. 2 back contacts of relay 6–WSTR.

With amplifier 6–LS4 in its non-excited state, the steady low positive potential developed across load resistor 6–R10 is applied to the upper terminals of diodes 6–G1A and 6–G3A of the gate circuits 6–G1 and 6–G3, respectively (see Figs. 6–A and 6–B, item 3, Rev. 10). The steady low positive potential across load resistor 6–R10 of amplifier 6–LS4 is of insufficient amplitude to enable gate circuit 6–G1; therefore, no positive-going pulse is applied to the grid of the upper or write X section of writing amplifier 6–WA (see Figs. 6–A and 6–B, item 5, Rev. 10), thereby preventing the recording of an X signal in the cell in the delay channel in the slot corresponding to subscriber line 5–L–1 in the drum, which cell is passing under the pole-pieces of writing head 5–WDC at this time (see Figs. 6–A and 6–B, item 6, Rev. 10).

With amplifier 6–LS4 in its non-excited state, the steady high positive potential at the plate of amplifier tube 6–LS4 remains unchanged. Therefore, no negative-going pulse is applied to the starter anode of cold cathode tube 6–LST at this time (see Figs. 6–A and 6–B, item 4, Rev, 10). The cold cathode tubes 6–LST, 6–WST, 6–EST and 6–CG are further prevented from firing at this time because of the disconnection of ground from conductor 6–10 by the release of off-normal relay 14–ON, which also prevents the reoperation of relays 6–LST, 6–WSTR and 6–ESTR (see Figs. 6–A and 6–B, items 7, 8 and 10, Rev. 10) until the start of a new identification cycle.

When relay 6–WSTR released, it disabled gate circuit 6–G2 by disconnecting the positive potential connected through resistor 6–R12 to diode 6–G2C through the No. 1 front contacts of relay 6–WSTR and by connecting in its stead negative potential through resistor 6–R13 and the No. 1 back contacts of relay 6–WSTR. With amplifier tube 6–LS3 in its non-excited state, the steady high positive potential developed across load resistor 6–R7 (cathode follower of tube 6–LS3) is applied to the upper terminal of diode 6–G2A of gate circuit 6–G2 (see Figs. 6–A and 6–B, item 2, Rev. 10). Gate circuit 6–G2, in its disabled condition, prevents the transmission of a positive-going pulse to the grid of the lower or write O (or erase) section of writing amplifier 6–WA, thereby preventing the recording of an O or erase signal in the cell in the delay channel in the slot corresponding subscriber line 5–L–1, which cell is passing under the pole-pieces of writing head 5–WDC at that instant.

At the same instant that the rotating element 5–27 is again traversing line segment 5–001 corresponding to subscriber line 5–L–1, the cell in the main channel in the slot corresponding to subscriber line 5–L–1, to which cell the previously-described X signal was transferred, at the completion of the tenth revolution again passes under the pole-pieces of reading head 5–RMC thereby causing an X output signal voltage to be again developed in the winding thereof. As a result, the X output signal voltage induced in the winding of reading head 5–RMC causes a momentary negative-going pulse to be applied to the input of reading amplifier 6–RA (see Figs. 6–A and 6–B, item 11, Rev. 10), which functions in the manner previously described to produce a momentary positive-going pulse at its output, which positive-going pulse is applied as an input to the gate circuits 6–G2 and 6–G3 (see Figs. 6–A and 6–B, item 12, Rev. 10).

The steady low positive potential developed across load resistor 6–R10 of amplifier tube 6–LS4, in its non-excited state, is of insufficient amplitude to enable the gate circuit 6–G3, therefore no positive-going or exciting pulse is applied to the grid of amplifier tube 6–LS0 (see Figs. 6–A and 6–B, item 13, Rev. 10) at this time. Tube 6–LS0 remains in its normal or non-excited condition; therefore, no negative-going pulse is applied to the starter anode of cold cathode tube 6–CG at this time (see Figs. 6–A and 6–B, item 14, Rev. 10). Gate circuit 6–G2, it will be remembered, was disabled by the release of relay 6–WSTR.

It should be borne in mind that the X signal which was recorded in the cell in the delay channel in the slot corresponding to subscriber line 5–L–1, which cell was under the pole-pieces of writing head 5–WDC at the beginning of the ninth revolution of the drum (see Figs. 6–A and 6–B, item 6, Rev. 9), was transferred to and recorded in the cell in the main channel in the slot corresponding to subscriber line 5–L–1 180 degrees after having been recorded in the delay channel, and that said X signal in said cell in the delay channel was erased therefrom 270 degrees after having been recorded therein (see Figs. 6–A and 6–B, item 6, Rev. 9¾). Therefore, at the end of the tenth revolution of the drum, no X signal is present in the cell in the delay channel in the slot corresponding to subscriber line 5–L–1 (see Figs. 6–A and 6–B, item 6, Rev. 10), nor can another X signal be recorded therein until the sleeve conductor connected to line segment 5–001 has a positive potential applied thereto from a trunk circuit seized for use therewith and connected to an identifier circuit. It should also be noted that, the X signal which was transferred to and recorded in the cell in the main channel in the slot corresponding to subscriber line 5–L–1 180 degrees after the completion of the ninth revolution of the drum is still present at the completion of the tenth revolution of the drum.

*Completion of eleventh revolution of drum and start of twelfth revolution*

The drum continues to rotate and, at the instant that it completes its eleventh revolution and is starting its twelth revolution, the rotating element 5–27 of the line scanner again passes adjacent to the line segment 5–001 associated with subscriber line 5–L–1 which, it is assumed, is still engaged with a bona fide call. At this time, the steady negative potential present on line segment 5–001 (indicating the completion of the identification cycle as previously described) is encountered by the rotating element 5–27 and, as previously described, causes no change in the potential thereon. Therefore, no positive-going or exciting pulse is applied to the input of amplifier 6–LS1 at the completion of the eleventh revolution of the drum (see Figs. 6–A and 6–B, item 1, Rev. 11). In the absence of a positive input or exciting potential to amplifier 6–LS1, amplifier tubes 6–LS1, 6–LS2, 6–LS3 and 6–LS4 remain in the normal or non-excited state.

Gate circuit 6–G1 was partially reenabled by the release of relay 6–WSTR (as previously described), but with amplifier 6–LS4 in its non-excited state, the steady low positive potential developed across load resistor 6–R10 is of insufficient amplitude to enable gate circuit 6–G1 (see Figs. 6–A and 6–B, item 3, Rev. 11); therefore, no positive-going pulse is applied to the grid of the upper or write X section of writing amplifier 6–WA (see Figs. 6–A and 6–B, item 5, Rev. 11), thereby preventing the recording of an X signal in the cell in the delay channel in the slot corresponding to subscriber line 5–L–1 in the drum, which cell is passing under the pole-pieces of writing head 5–WDC at this time (see Figs. 6–A and 6–B, item 6, Rev. 11).

Gate circuit 6–G2 was disabled by the release of relay 6–WSTR (as previously described); therefore, at this time no positive-going pulse is applied to the grid of the lower or write O section of writing amplifier 6–WA, thereby preventing the recording of an O or erase signal in the cell in the delay channel in the slot corresponding to subscriber line 5–L–1, which cell is passing under the pole-pieces of writing head 5–WDC at that instant.

At the same instant that the rotating element 5–27 is again traversing line segment 5–001 corresponding to subscriber line 5–L–1, the cell in the main channel in the slot corresponding to subscriber line 5–L–1 still has recorded therein the previounsly described X signal which was transferred to and recorded in said cell in the main channel 180 degrees after the ninth revolution of the drum. Therefore, at this instant (the end of the eleventh revolution of the drum), the cell in the main channel in the slot corresponding to subscriber line 5–L–1 again passes under the reading head 5–RMC, causing a negative-going pulse to be applied to the input of reading amplifier 6–RA. However, the gate circuit 6–G3 is disabled by the steady low positive potential from the cathode follower of amplifier 6–LS4 (as previously described), and therefore amplifier tube 6–LS0 is not fired at this time.

Therefore, at the end of the eleventh and subsequent revolutions of the drum, because of the absence of a positive potential on the sleeve conductor of subscriber line 5–L–1, the amplifiers 6–LS1, 6–LS2, 6–LS3 and 6–LS4 will remain in the normal or non-excited state. With amplifiers 6–LS1, 6–LS2, 6–LS3 and 6–LS4 non-excited and with the gate circuits 6–G2 and 6–G3 disabled, no signals, either X or O, can be written in the cell in the delay channel in the slot corresponding to subscriber line 5–L–1.

From the above, it will be seen that the X signal which was transferred to and recorded in the cell in the main channel in the slot corresponding to subscriber line 5–L–1 180 degrees after the ninth revolution of the drum is still present at the completion of the eleventh revolution of the drum, and that this "residual" X signal will be present at the completion of subsequent revolutions of the drum, and can be removed only by the superimposing thereon of an O or erase signal. When, at some subsequent revolution of the drum, another toll call is extended over subscriber line 5–L–1, the residual X signal in the cell in the main channel in the slot corresponding to subscriber line 5–L–1 will have no deleterious effect on the operation of the line scanner detector circuit. The line scanner detector circuit has operative elements incorporated therein to safeguard against its false operation by said residual X signal, as will appear later in the description.

Now, let it be assumed that, at the conclusion of the conversation, the subscriber at subscriber station 5–ST terminates the call by replacing his telephone on its cradle, thereby opening the line loop. The circuit which extended from battery through the upper winding of supervisory relay 7–A, the upper left-hand winding of repeating coil 7–RC, the upper No. 2 back contacts of relay 7–IC, conductor 7–T1, the upper No. 1 front contacts of relay 7–SP, tip conductor 5–55 to Fig. 5, the tip side of the switching train, the tip conductor of the subscriber line loop, the subscriber's set, the ring conductor of the subscriber line loop, the ring side of the switching train, ring conductor 5–56 to Fig. 7, the lower No. 2 front contacts of relay 7–SP, conductor 7–R1, the lower No. 2 back contacts of relay 7–IC, the lower left-hand winding of repeating coil 7–RC, and the lower winding of supervisory relay 7–A to ground is now opened, causing supervisory 7–A to release.

When relay 7–A releases, ground through the contacts of relay 7–A and the winding of slow releasing relay 7–A1 to battery is disconnected, causing relay 7–A1 to release after a brief delay interval.

When relay 7–A1 releases, it opens its upper No. 4 contacts, thereby disconnecting resistor 7–R4 which shunted capacitor 7–C1 to provide a direct-current holding bridge for the tandem trunk. With the direct-current holding bridge disconnected, the tandem trunk connection is eventually released.

When relay 7–A1 releases, it also disconnects ground through its lower No. 1 contacts from extended sleeve conductor 7–SLE, thereby opening the locking circuits for relays 7–SP and 7–HPR, causing relays 7–SP and 7–HPR to release. Also, ground through the lower No. 3 contacts of relay 7–A1 is disconnected from the locking contacts of slow releasing relay 7–ICR, causing relay 7–ICR to release after a brief delay interval.

All of the relays and equipment have now been returned to their normal conditions, and are in readiness for use in connection with the completion of another toll call requiring the services of an identifier.

It will be recalled from the foregoing detailed description that it is considered that all of the circuits will be in readiness each time a repetitive pulse occurs. As a practical matter, due to a sticking relay, a dirty contact, etc., at some times this may not be the case. That is, the relay circuits may not be ready each time a scan cycle occurs. The one-out-of-four check circuit through contacts of the translator connectors 12–NT, 12–AT, 12–BT and 12–CT of Fig. 12 precludes a gate pulse being applied to a digit reader of Fig. 11 until these connectors are in readiness. This, coupled with other protective features such as the up-check circuits of Figs. 10 and 12, prevents response to a gate pulse until the circuits are ready. It may, therefore, happen that two line scan cycles, or more, may be passed before the circuit can take action. This does not represent an inoperative condition but merely delays the overall result, a matter of milliseconds perhaps, to insure response only under legitimate circuit conditions.

Also, as will be appreciated from the detailed description, particularly regarding the outpulsing circuit of Fig. 13, each time an up-check occurs in the translator of Fig. 12, and in the walking relay circuit of Fig. 10, the outpulsing relay circuit of Fig. 13 goes through a cycle involving somewhere in the neighborhood of 18 relay operations or releases, all in cascade. Not until this cycle is complete will the relay 13–PGZ be released and the relay 13–PGW be operated to complete the tone path to the outgoing trunk. The exemplary embodiment describes circuitry such that this reiterative outpulsing cycle completes itself within the time interval of a single scan cycle. It is to be understood, however, that such is not necessary. The out-pulsing cycle can be faster or slower than the scan cycle because there is no requirement that they be accurately synchronized or timed with respect to each other in order that the system be operative. There are advantages to be gained in having the outpulsing cycle timed to be of somewhat shorter duration than the scan cycle. However, except for economies involved in trying to use all equipment at optimum efficiency there is no reason why these operations cannot be independent of each other. It is therefore to be understood, particularly with regard to the detailed description of the successive "revolutions" of the drum, etc., that these "revolutions" need not necessarily be consecutive. To facilitate description, consecutive successive revolutions are assumed in the preferred embodiment chosen to illustrate the invention, and such illustration is not intended to be considered a limitation on the use or adaptation of the invention.

While the invention has been illustrated in its exemplary application to a particular telephone system, it should be understood that it is not limited to such exemplary application nor to the specific arrangements and instrumentalities herein disclosed. It will be apparent to one skilled in the art that various other applications, modifications, and arrangements other than disclosed herein are within the spirit and scope of the invention.

What is claimed is:

1. In a switching system wherein connections are extended from station lines in response to calling conditions placed on said lines by calling stations thereon, wherein a signal is applied to each line incident to the extension therefrom of a connection, and wherein a calling station is identified incident to the application to said line of said signal, an identifier comprising storage means having stored therein identity data unique to each station, scanner-detector means for scanning said lines one at a time to detect whenever a line has said signal applied thereto, reading means selectively operable to read from said storage means selected unique identity data, and gating means controlled by said scanner-detector means to selectively operate said reading means uniquely for each different line having said signal applied thereto.

2. In a switching system wherein connections are extended from station lines in response to calling conditions placed on said lines by calling stations thereon, wherein a signal is applied to each line incident to the extension therefrom of a connection, and wherein a calling station is identified incident to the application to said line of said signal, an identifier comprising storage means including a physical part thereof unique to each station, each said part divided into a plurality of sections having stored therein a plurality of identity items comprising identity data unique to the corresponding station, scanner-detector means for scanning said lines one at a time to detect whenever a line has said signal applied thereto, reading means selectively operable to read from selected sections of a physical part of said storage means identity data contained in said selected sections, and gating means controlled by said scanner-detector means to selectively operate said reading means uniquely for each different line having said signal applied thereto.

3. In a switching system wherein connections are extended from station lines in response to calling conditions placed on said lines by calling stations thereon, wherein a signal is applied to each line incident to the extension therefrom of a connection, and wherein a calling station is identified incident to the application to said line of said signal, an identifier comprising storage means including a physical part thereof unique to each station, each said part divided into a plurality of sections having stored therein a plurality of identity items comprising identity data unique to the corresponding station, scanning means for repeatedly scanning said lines one at a time, detector means controlled by said scanning means to detect the presence of a line signal on a scanned line, control means effective under the control of said detection to provide a control signal unique to said scanned line, reading means selectively operable to read from selected sections of a physical part of said storage means identity data contained in said selected sections, and gating means controlled by said control signal to selectively operate said reading means uniquely for said scanned line.

4. In a switching system wherein connections are extended from station lines in response to calling conditions placed on said lines by calling stations thereon, wherein a signal is applied to each line incident to the extension therefrom of a connection, and wherein a calling station is identified incident to the application to said line of said signal, an identifier comprising storage means including a storage section unique to each line, each said section having stored therein identity data unique to a station on the corresponding line, scanning means for repeatedly and sequentially scanning said lines one at a time in a prescribed order, detector means controlled by said scanning means to detect the presence of a line signal on a scanned line, control means effective under the control of said detection to generate a gate signal during a time unique to the storage section corresponding to said scanned line, register means operable to register identity data therein, reading means repeatedly and sequentially reading said storage sections one at a time in a prescribed order, a transmission channel interconnecting said register means and said reading means whereby said reading means may transmit read data to said register means to operate said register means according to the read data, and gating means in said channel controlled by said gate signal to enable transmission between said reading means and said register means only during the time unique to the storage section corresponding to said scanned line.

5. In a switching system wherein connections are extended from station lines in response to calling conditions placed on said lines by calling stations thereon, wherein the same distinctive signal condition is applied to a control conductor of any line incident to the extension therefrom of a connection, and wherein a calling station is identified incident to the application to its line control conductor of said distinctive signal, an identifier comprising a record medium including a section exclusive to each line, each said section having recorded thereon identity data unique to a station on the corresponding line, a scanner for cyclically scanning the control conductors of said lines one at a time in a prescribed sequence such that the scanning of each line control conductor takes place once each scan cycle during a time interval thereof unique to said line, a detector circuit controlled by said scanner to detect the presence of said distinctive signal on the control conductor of a scanned line and responsive to said detection to generate a line gate pulse only during the time interval unique to said scanned line, a register operable to register identity data therein, a reader for reading from said record medium identity data recorded on sections thereof, means interrelating said scanner and said record medium and said reader for causing relative motion between said record medium and said reader whereby said reader reads the data on a record medium section only during the time interval unique to the line scanned during that time interval, a transmission channel interconnecting said register and said reader whereby data read by said reader may be transmitted to and may operate said register accordingly, and an electronic gate in said channel controlled by said line gate pulse to enable transmission between said reader and said register only during the time interval unique to the record medium section corresponding to said scanned line.

6. In a switching system wherein connections are extended from station lines in response to calling conditions placed on said lines by calling stations thereon, wherein the same distinctive signal condition is applied to a control conductor of any line incident to the extension therefrom of a connection, and wherein a calling station is identified incident to the application to its line control conductor of said distinctive signal, an identifier comprising a record medium including a section exclusive to each line, each said section having recorded thereon identity data unique to a station on the corresponding line, a scanner for cyclically scanning the control conductors of said lines one at a time in a prescribed sequence such that the scanning of each line control conductor takes place once each scan cycle during a time interval thereof unique to said line, a detector circuit controlled by said scanner to detect the presence of said distinctive signal on control conductors of scanned lines, a pulse generator operable to generate a gate pulse, means including said detector circuit for recognizing the first signal recurring on successive scans of a given scanned line and for operating said pulse generator to generate a line gate pulse only during the time interval unique to said given scanned line and only if said first signal continues to recur on successive scans of said given scanned line, a register operable to register identity data therein, a reader for reading from said record medium identity data recorded on sections thereof, means interrelating said scanner and said record medium and said reader for causing relative motion between said record medium and said reader whereby said reader reads the data on a record medium section only during the time interval unique to the line scanned during that time interval, a transmission channel interconnecting said register and said reader whereby data read by said reader may be transmitted to and may operate said register accordingly, and an electronic gate in said channel controlled by said line gate pulse to enable transmission between said reader and said register only during the time interval unique to the record medium section corresponding to said given scanned line.

7. In a switching system wherein connections are extended from station lines through switching apparatus and over trunks in response to calling conditions placed on said lines by calling stations thereon, wherein the same distinctive signal condition is applied by any trunk through said switching apparatus to a control conductor of a line incident to the extension therefrom of a connection over said trunk, and wherein a calling station is identified incident to the application to its line control conductor of said distinctive signal, an identifier comprising a record medium including a section exclusive to each line, each said section including a plurality of parts each having recorded thereon a discrete item of identity data unique to a station on the corresponding line, a scanner for cyclically scanning the control conductors of said lines one at a time in a prescribed sequence such that the scanning of each line control conductor takes place once each scan cycle during a time interval thereof unique to said line, a detector circuit controlled by said scanner to detect the presence of said distinctive signal on control conductors of scanned lines, a pulse generator operable to generate a gate pulse, means including said detector circuit for recognizing the first signal recurring on successive scans of a given scanned line and for operating said pulse generator to generate a line gate pulse only during the time interval unique to said given scanned line and only if said first signal continues to recur on successive scans of said given scanned line, a register operable to register one item of data at a time therein, a reader for each record medium section part for reading the discrete item therefrom, means interrelating said scanner and said record medium and said readers for causing relative motion between said record medium and said readers whereby said readers read items from associated record medium section parts only during the time interval unique to the line scanned a transmission channel, a selectively operable connector arrangement for selectively connecting one reader at a time to one end of said channel whereby the item read by said connected reader is applied to said channel, an electronic gate interconnecting the other end of said channel to said register and controlled by said line gate pulses to enable the operation of said register by the item applied to said channel and to so enable such operation only during the time interval unique to the record medium section corresponding to the given scanned line, signaling means connected with said trunk and controlled by said register when operated to transmit over said trunk the said one item of data registered in said register, circuit means operated incident to said transmission to release said register, and a connector advance control circuit operated sequentially incident to successive said transmissions to release and to reoperate said connector arrangement selectively according to a predetermined pattern to cause different readers to read successive different items of data relating to said scanned line and to register same successively in said register.

8. In a switching system wherein connections are extended from station lines through switching apparatus and over trunks in response to calling conditions placed on said lines by calling stations thereon, wherein the same distinctive signal condition is applied by a trunk through said switching apparatus to a control conductor of a line incident to the extension therefrom of a connection over said trunk, and wherein any calling station is identified incident to the application to its line control conductor of said distinctive signal, an identifier comprising a record medium including a section exclusive to each line, each said section including separate parts having recorded thereon separate discrete items of identity data unique to a station on the corresponding line, the said discrete items unique to a station including office and thousands and hundreds and tens and units items comprising the directory number of the said station, a line scanner for cyclically scanning the control conductors of said lines one at a time in a prescribed sequence such that the scanning of each line control conductor takes place once each scan cycle during a time interval thereof unique to said line, a detector circuit controlled by said scanner to detect the presence of said distinctive signal on control conductors of scanned lines, a pulse generator operable to generate a gate pulse, means including said detector circuit for recognizing the first signal recurring on successive scans of a given scanned line and for operating said pulse generator to generate a line gate pulse only during the time interval unique to said given scanned line and only if said first signal continues to recur on successive scans of said given scanned line, a trunk connector circuit operated under the control of a trunk over which a connection is extended from said given scanned line to connect said trunk with said identifier to the exclusion of other trunks, a control relay in said identifier operated incident to the interconnection of said identifier with said connected trunk, means in said connected trunk controlled by the operation of said identifier control relay to cause said trunk to apply the said distinctive signal condition to said control conductor of said given scanned line, a pulse generator connector circuit operable under the control of a line gate pulse to connect said pulse generator with said identifier, a reader for each record medium section part for reading the identity item therefrom, means interrelating said scanner and said record medium and said readers for causing relative motion between said record medium and said readers whereby said readers read all identity items for a given line only during the time interval unique to the line scanned during that time interval, a transmission channel, a separate reading connector for each reader and operable to connect the associated reader to one end of said channel whereby the item read by said connected reader is applied to said channel, a sequence control relay circuit including at least one sequence relay corresponding to each identity item to be read, said sequence control circuit controllable to cause each sequence relay to be operated and the others to be released in turn in a predetermined order, each said sequence relay effective when operated to operate the corresponding one of said reading connectors, a register for registering therein one identity item at a time and circuitry interconnecting said register with said sequence control circuit whereby said register is operable only when one sequence relay is operated and whereby said register is released at other times, an electronic gate interconnecting the other end of said channel to said register and controlled by said line gate pulses to operate said register according to the identity item applied to said channel during the time interval unique to the record medium section part corresponding to the said given scanned line, an outpulsing circuit connected with said connected trunk over said trunk connector circuit, said outpulsing circuit controlled by said operated register to outpulse the registered identity item each time said register is operated, and circuit means interrelating said outpulsing circuit and said sequence control relay circuit whereby said sequence control circuit is controlled to operate a different sequence relay therein each time said outpulsing circuit outpulses an identity item.

9. In a switching system wherein connections are extended from station lines through switching apparatus and over trunks in response to calling conditions placed on said lines by calling stations thereon, wherein the same distinctive signal condition is applied by any trunk through said switching apparatus to a control conductor of a line incident to the extension therefrom of a connection over said trunk, and wherein a calling station is identified incident to the application to its line control conductor of said distinctive signal, an identifier comprising a rotatable drum having a longitudinal axis shaft and a magnetizable circular cylindrical surface the circumference of which is divided into a plurality of substantially equal arcs defining a like plurality of surface slots substantially parallel to the axis shaft of said drum where each slot is exclusive to one of said lines, each said slot divided longitudinally of said drum surface into a plurality of substantially equal length cells having recorded thereon in binary form elements of coded data, at least thirty cells being provided per slot where said thirty cells are arranged in six groups of five cells each and wherein said six groups contain in a two-out-of-five code the office and thousands and hundreds and tens and units digits comprising a corresponding station directory number and a class digit indicative of the class of service to which a station on said line is entitled, corresponding cells for different lines making up a circumferential drum channel the width of one cell, a line scanner comprising a plurality of fixed electrodes arranged in a circle about the shaft axis of said drum where the number of said fixed electrodes is equal to the number of drum slots and where each fixed electrode corresponds to one of said lines and covers an arc substantially equal to the arc of a slot and said line scanner comprising an arm radially extending from said shaft axis and having on the end of said arm an electrode which rotates with said drum such as to pass and to scan each fixed electrode in a capacitive relationship once per revolution of said drum, the control conductor of each said line being connected to a separate one of said fixed electrodes, an electronic detector circuit connected to said rotatable electrode and controlled by distinctive signal conditions on control conductors of said lines to indicate whenever said rotatable electrode scans a fixed electrode having said distinctive signal condition thereon, an electronic pulse generator operable to generate a line gate pulse during a line scan time interval, means including said detector circuit for recognizing the first fixed electrode to exhibit said distinctive signal condition on successive consecutive scans thereof and for operating said pulse generator to generate a line gate pulse only during the time interval unique to the line scanned during the scan interval of the said first fixed electrode and for operating said pulse generator to generate said line gate pulse once per scan cycle only as long as said first fixed electrode exhibits said distinctive signal condition on successive consecutive scans thereof, a trunk connector circuit operated under the control of a trunk over which a connection is extended from said given scanned line to connect said trunk with said identifier to the exclusion of other trunks, a control relay in said identifier operated incident to the interconnection of said identifier with said connected trunk, a source of said distinctive signal condition and a signal relay in said connected trunk and circuits whereby the operation of said identifier control relay causes said signal relay to operate to in turn apply said signal condition to the control conductor of said given scanned line, a pulse generator connector circuit operable under the control of a line gate pulse to connect said pulse generator with said identifier, a fixed reading head for each drum channel arranged in proximity to the drum surface for reading from said surface the successive code elements in successive cells as said drum surface is rotated past said reading head, said heads being arranged in at least six groups of five heads each so as to read all thirty code elements per slot during the time interval unique to the line whose corresponding fixed electrode is being scanned by the rotating electrode during the same time interval, a transmission channel comprising five conductors, a separate reading connector for each group of reading heads and operable to connect each one of the heads of the associated group at the same time to a different one of said five conductors whereby the code elements read by said five heads are applied in a two-out-of-five code to said channel, a sequence control relay circuit including at least one sequence relay corresponding to each group of reading heads, said sequence control relay circuit controllable to be advanced to cause each sequence relay to be operated and the others to be released in turn in a predetermined order, each said sequence relay effective when operated to operate the corresponding reading connector, a register including five register relays controlled by five individual gas tubes and circuitry interconnecting said register with said sequence control circuit whereby said register relays are operable only when the corresponding gas tubes are energized and when one sequence relay is operated and whereby said register relays are released at other times, An electronic gate interconnecting each of said five gas tubes with one of said five channel conductors, said gates controlled concurrently by said line gate pulses to energize said gas tubes in a two-out-of-five code according to the code elements applied to said channel during the time interval unique to the drum slot corresponding to the said given scanned line, an outpulsing circuit connected with said connected trunk over said trunk connector circuit, said outpulsing circuit controlled by said operated register relays to outpulse the registered digit each time said register relays are operated, and circuit means interrelating said outpulsing circuit and said sequence control relay circuit and said register relays whereby said sequence control circuit is controlled to operate a different sequence relay therein each time said outpulsing circuit outpulses a digit registered in said register relays, said latter circuit means including circuitry controlled by said register relays and by said sequence control relay circuit to permit said outpulsing circuit to outpulse a digit only when a two-out-of-five registration exists in said register and when only one sequence relay is operated, said latter circuit means also including circuitry controlled by said outpulsing circuit to release said register relays and to control the advance of said sequence control relay circuit incident to each outpulsing of a digit.

10. The invention claimed in claim 9 wherein said given scanned line has a plurality of party stations thereon, wherein the drum slot corresponding to said multi-party line includes a separate field of twenty-five cells for each station on said line and wherein an additional corresponding number of reading heads is provided, wherein said identifier includes means controlled over the connected trunk for identifying the calling party station, and wherein a party field connector circuit is controlled by said party station identification to permit only reading heads in the proper party field of cells and in the class group common to the line to be interconnected with said five channel conductors.

11. In a storage read-out device, storage means having stored therein units of data which units are divided into discrete items, said storage means having a physical portion unique to each of said units of data and said portions being divided into discrete sections respectively corresponding to said discrete items, reading means selectively operable to read said items from said sections one at a time, control means to selectively operate said reading means uniquely for the unit of data being read and whereby the same item of said read unit may be read more than once, and translating means under the control of said control means whereby an item read more than once may be translated differently according to a pre-established plan on each successive reading.

12. In a storage read-out device, storage means having units of data stored in corresponding physical parts thereof, said physical parts and said units of data being respectively divided into corresponding sections and items, reading means associated with said storage means and selectively operable to read selected items from the corresponding sections, gating means to cause said reading means to read at different times according to the unit of data which includes the said selected items being read, selective control means for operating said reading means to read items one at a time selectively and capable of operating said reading means to read the same item repeatedly, and translating means controlled by said control means whereby the repeated readings of a selected item are capable of being translated differently according to a pre-established plan each time said selected item is read.

13. In a storage read-out device, storage means having units of data stored in corresponding physical parts thereof, said physical parts and said units of data being respectively divided into corresponding sections and items, reading means associated with said storage means and selectively operable to read selected items from the corresponding sections, gating means to cause said reading means to read at different times according to the unit of data which includes the said selected items being read, selective control means for operating said reading means to read items one at a time selectively and capable of operating said reading means to read the same item repeatedly, circuit means for registering said read selected items, and selectively operable connector means controlled by said control means for connecting said reading means and said circuit means and capable of connecting said reading means and said circuit means differently for each reading of an item read repeatedly, whereby said read selected items are registered in a manner determined by the selective operation of said connector means.

14. In a storage read-out device, storage means having units of data stored in corresponding physical parts thereof, said physical parts and said units of data being respectively divided into corresponding sections and items, reading means associated with said storage means and selectively operable to read selected items from the corresponding sections, gating means to cause said reading means to read at different times according to the unit of data which includes the said selected items being read, selective control means for operating said reading means to read items one at a time selectively and capable of operating said reading means to read the same item repeatedly, register means having a separate portion assigned to each desired digital value which can represent a said selected item and wherein a representation of each said item is registered, and a plurality of connectors selectively operated one at a time by said control means to connect said reading means and said register means, said connectors comprising a direct connector which is operated for each reading of an item which is to be read but once whereby a representation of said once read item is registered in that portion of said register means assigned to the digital value representing said once read item as untranslated and a plurality of translating connectors a different one of which is operated for each reading of an item which is read repeatedly whereby a representation of said latter item is registered in a predetermined portion of said register means on each reading thereof, said latter registrations being dependent upon which connector is operated on corresponding ones of said repeated readings.

15. The invention defined in claim 3 wherein said reading means is operable to read an item from a section more than once and wherein is provided translating means under the control of said control means whereby an item read more than once is translated differently according to a pre-established plan on each reading.

16. The invention defined in claim 3 wherein said reading means is operable to read an item from a section repeatedly and wherein is provided translating means controlled by said control means whereby an item read repeatedly is capable of being translated differently according to a pre-established plan each time it is read.

17. The invention defined in claim 16 wherein said translating means comprises circuit means for registering said items and wherein is provided selectively operable connector means controlled by said control means for connecting said reading means and said circuit means and capable of connecting said reading means and said circuit means differently for each reading of an item read repeatedly.

18. The invention claimed in claim 17 wherein said registering means has a separate portion assigned to each desired digital value which can represent a said selected item and wherein a representation of each said item is registered, and a plurality of connectors selectively operated one at a time by said control means to connect said reading means and said register means, said connectors comprising a direct connector which is operated for each reading of an item which is to be read but once whereby a representation of said once read item is registered in that portion of said registered means assigned to the digital value representing said once read item as untranslated and a plurality of translating connectors a different one of which is operated for each reading of an item which is read repeatedly whereby a representation of said latter item is registered in a predetermined portion of said register means on each reading thereof, said latter registrations being dependent upon which connector is operated in corresponding ones of said repeated readings.

References Cited in the file of this patent

UNITED STATES PATENTS

| | | |
|---|---|---|
| 2,675,427 | Newby | Apr. 13, 1954 |
| 2,694,753 | Den Hertog | Nov. 16, 1954 |
| 2,724,018 | Pouliart et al. | Nov. 15, 1955 |